United States Patent
Habuto et al.

(10) Patent No.: US 8,032,683 B2
(45) Date of Patent: *Oct. 4, 2011

(54) DATA COMMUNICATION SYSTEM, CRADLE APPARATUS, SERVER APPARATUS AND DATA COMMUNICATION METHOD

(75) Inventors: Reiko Habuto, Kanaqawa (JP); Yoshiyasu Kubota, Kanagawa (JP); Nobuki Furue, Tokyo (JP)

(73) Assignee: Sony Corporation, Tokyo (JP)

( * ) Notice: Subject to any disclaimer, the term of this patent is extended or adjusted under 35 U.S.C. 154(b) by 259 days.

This patent is subject to a terminal disclaimer.

(21) Appl. No.: 12/106,761

(22) Filed: Apr. 21, 2008

(65) Prior Publication Data
US 2009/0031069 A1    Jan. 29, 2009

(30) Foreign Application Priority Data

| Apr. 20, 2007 | (JP) | 2007-111469 |
| Apr. 4, 2008 | (JP) | 2008-098483 |
| Apr. 4, 2008 | (JP) | 2008-098484 |
| Apr. 4, 2008 | (JP) | 2008-098485 |

(51) Int. Cl.
*G06F 13/00* (2006.01)
*G06F 13/12* (2006.01)

(52) U.S. Cl. ........ 710/303; 710/304
(58) Field of Classification Search ........ 710/303
See application file for complete search history.

(56) References Cited

U.S. PATENT DOCUMENTS

| 5,841,424 A * | 11/1998 | Kikinis | 345/168 |
| 6,734,915 B2 * | 5/2004 | Nagaoka | 348/375 |
| 6,832,281 B2 * | 12/2004 | Jones et al. | 710/301 |
| 6,882,866 B2 * | 4/2005 | Sato | 455/556.2 |
| 6,900,980 B2 * | 5/2005 | Christopher | 361/679.31 |
| 7,647,346 B2 * | 1/2010 | Silverman et al. | 1/1 |
| 2001/0034803 A1 * | 10/2001 | Sorek et al. | 710/129 |
| 2002/0065964 A1 * | 5/2002 | Lemke et al. | 710/48 |
| 2002/0149695 A1 * | 10/2002 | Kayanuma | 348/375 |
| 2003/0041203 A1 * | 2/2003 | Jones et al. | 710/301 |
| 2003/0154334 A1 * | 8/2003 | Chuang | 710/72 |
| 2004/0059857 A1 * | 3/2004 | Wakeley et al. | 710/302 |
| 2004/0268006 A1 * | 12/2004 | Kang et al. | 710/303 |
| 2006/0127034 A1 * | 6/2006 | Brooking et al. | 386/46 |
| 2006/0184705 A1 * | 8/2006 | Nakajima | 710/303 |
| 2006/0224620 A1 * | 10/2006 | Silverman et al. | 707/104.1 |
| 2006/0253636 A1 * | 11/2006 | Jones et al. | 710/301 |
| 2007/0015550 A1 * | 1/2007 | Kayanuma | 455/575.1 |
| 2007/0026799 A1 * | 2/2007 | Wang et al. | 455/41.2 |

(Continued)

FOREIGN PATENT DOCUMENTS
EP    1760899 A1  *  3/2007
(Continued)

OTHER PUBLICATIONS
U.S. Appl. No. 12/106,726, Apr. 21, 2008, Habuto, et al.
(Continued)

*Primary Examiner* — Ryan Stiglic
(74) *Attorney, Agent, or Firm* — Oblon, Spivak, McClelland, Maier & Neustadt, L,.L.P.

(57) ABSTRACT

A data communication system includes a server apparatus and a cradle apparatus. The cradle apparatus includes a first communication section, a second communication section, a connection detection section, a notification control section, and a relay control section. The server apparatus includes a communication section, a data preparation section, and a communication control section.

10 Claims, 61 Drawing Sheets

U.S. PATENT DOCUMENTS

| | | | |
|---|---|---|---|
| 2007/0271400 A1* | 11/2007 | Lemke et al. | 710/8 |
| 2008/0005440 A1* | 1/2008 | Li et al. | 710/303 |
| 2008/0071937 A1* | 3/2008 | Yoshida | 710/12 |
| 2008/0168185 A1* | 7/2008 | Robbin et al. | 709/248 |
| 2008/0263146 A1* | 10/2008 | Habuto et al. | 709/203 |
| 2008/0263252 A1* | 10/2008 | Habuto et al. | 710/303 |

FOREIGN PATENT DOCUMENTS

JP  2006-148284  6/2006

OTHER PUBLICATIONS

U.S. Appl. No. 12/106,804, Apr. 21, 2008, Habuto, et al.

\* cited by examiner

FIG. 7A

EXAMPLE OF LAYOUT OF COMMAND DATA

| TRANSMISSION DESTINATION | TRANSMISSION SOURCE | COMMAND | DATA |
|---|---|---|---|

FIG. 7B

INQUIRY ABOUT APPARATUS ID (FROM CRADLE TO NON-RESPONDING MOBILE APPARATUS)

| NON-RESPONDING APPARATUS | CRADLE | INQUIRY ABOUT APPARATUS ID |
|---|---|---|

FIG. 7C

APPARATUS ID RESPONSE (FROM NON-RESPONDING MOBILE APPARATUS TO CRADLE)

| CRADLE | MOBILE APPARATUS | APPARATUS ID RESPONSE | APPARATUS ATTRIBUTE | OTHERS |
|---|---|---|---|---|

FIG. 8

EXAMPLE OF LAYOUT OF ACCUMULATED DATA LIST

| TRANSMISSION DESTINATION | TRANSMISSION SOURCE | DATA ATTRIBUTE | OTHERS | |
|---|---|---|---|---|
| DATA ID | DATA ATTRIBUTE | PRODUCTION DATE AND TIME | DATA SIZE | OTHERS |
| DATA ID | DATA ATTRIBUTE | PRODUCTION DATE AND TIME | DATA SIZE | OTHERS |
| DATA ID | DATA ATTRIBUTE | PRODUCTION DATE AND TIME | DATA SIZE | OTHERS |
| ... | | | | |

FIG. 9

EXAMPLE OF LAYOUT OF ACCUMULATED DATA (ex. INCASE OF IMAGE DATA)

| APPARATUS ID | DATA ID | DATA ATTRIBUTE | PRODUCTION DATE AND TIME | PROTECT | PRINT MARK | DATA SIZE |
|---|---|---|---|---|---|---|
| NUMBER OF TIMES OF USE | OTHERS | | | | | |
| DATA | | | | | | |

FIG.11

EXAMPLE OF LAYOUT OF WRITING BACK HISTORY

| WRITING BACK DATE AND TIME | WRITING BACK DESTINATION | DATA ID | DATA ATTRIBUTE | PRODUCTION DATE AND TIME | DATA SIZE | OTHERS |
|---|---|---|---|---|---|---|
| ..... | ..... | ..... | ..... | ..... | ..... | ..... |

FIG.12
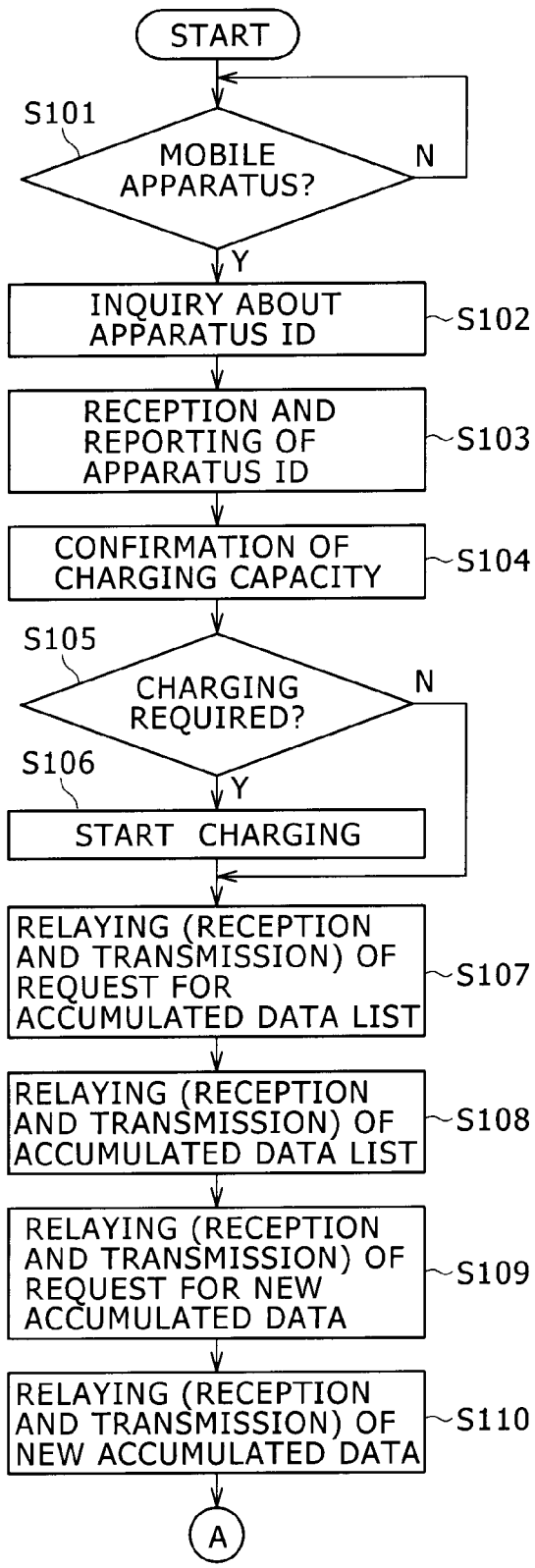
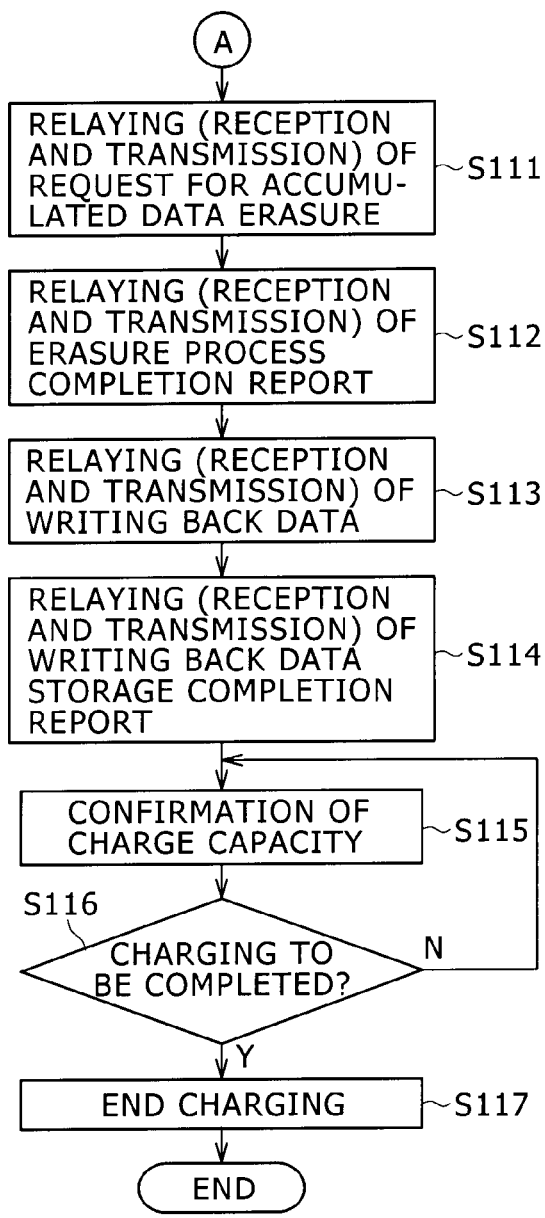

PROCESS OF SERVER APPARATUS

FIG. 17  PROCESS OF MOBILE APPARATUS

FIG.26

APPARATUS LINKAGE TABLE

| NO. | LINKED APPARATUS | | LINKAGE PROCESS SUBSTANCE | PROGRAM ID |
| --- | --- | --- | --- | --- |
| | APPARATUS 1 | APPARATUS 2 | | |
| 1 | DIGITAL STILL CAMERA | PORTABLE TELEPHONE TERMINAL | STILL PICTURE DATA OF APPARATUS 1 ARE RESIZED AND COPIED INTO APPARATUS 2 ((1)CAPACITY, DATE, (2)EVENT, (3)PRIORITY DEGREE) | PG1 |
| 2 | DIGITAL VIDEO CAMERA | PORTABLE TELEPHONE TERMINAL | DIGEST IS PRODUCED FROM MOVING PICTURE DATA OF APPARATUS 1 AND COPIED INTO APPARATUS 2 | PG2 |
| ... | ... | ... | ... | ... |

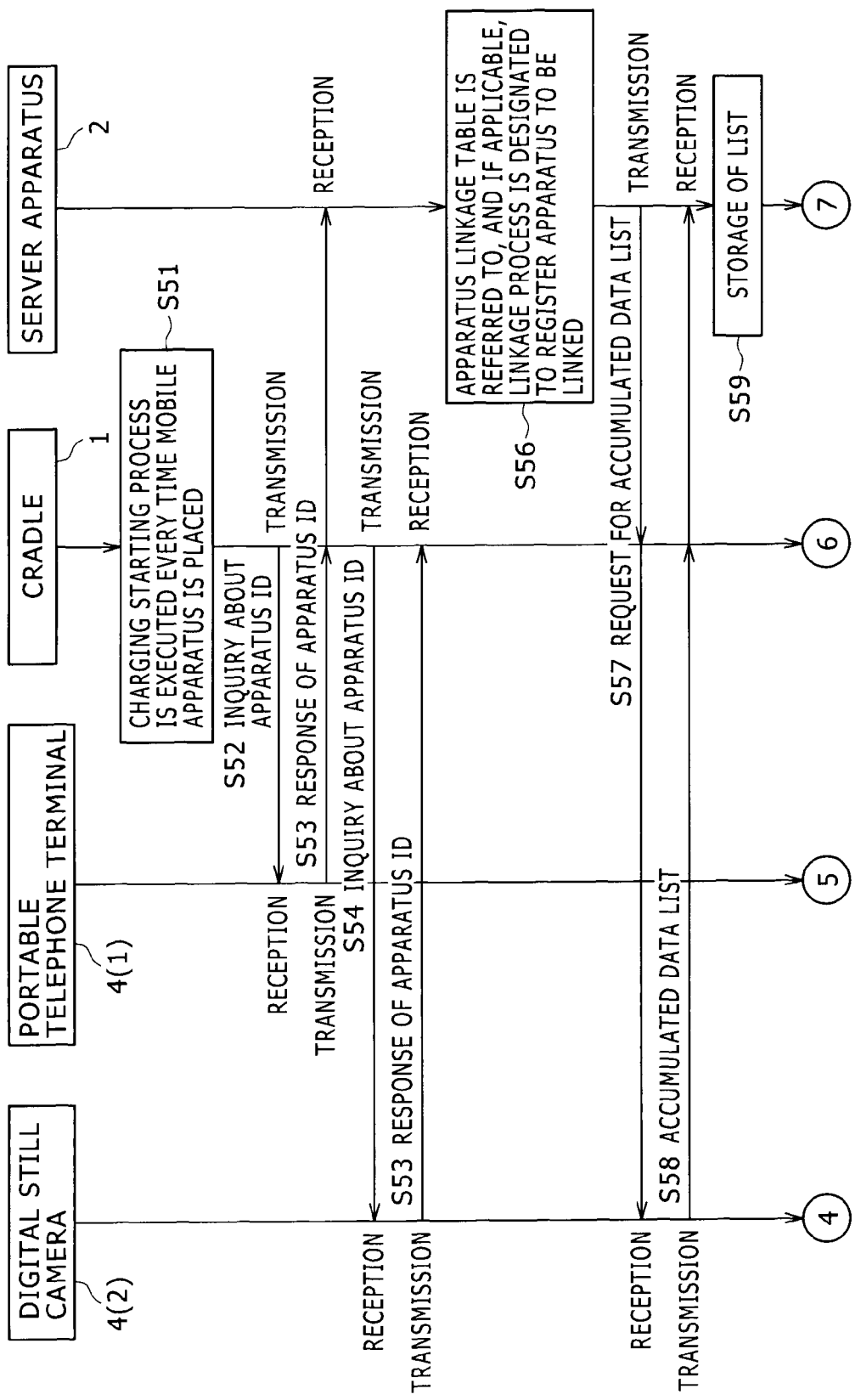

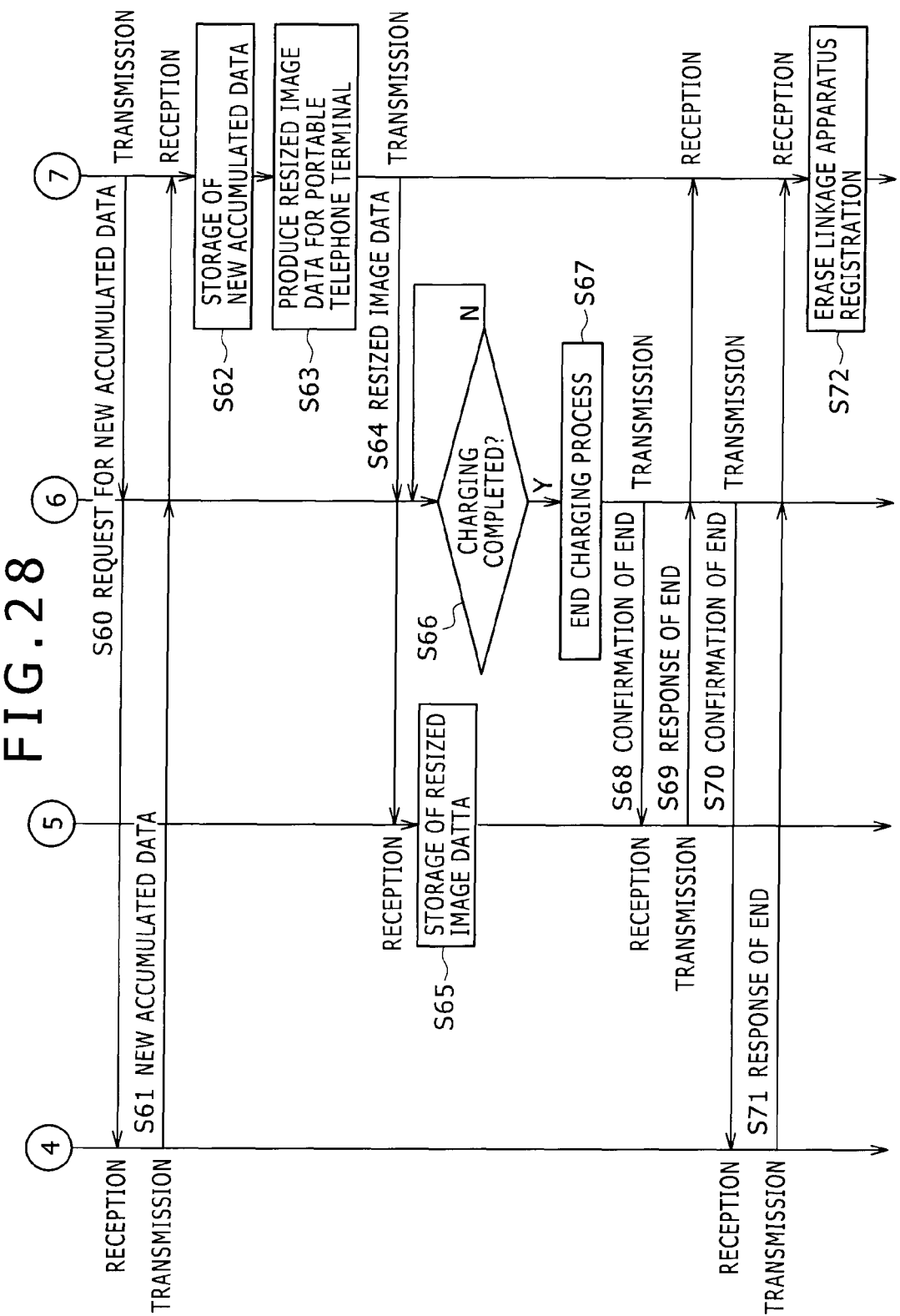

FIG.35

EXAMPLE OF LAYOUT OF MUSIC DATA AS ACCUMULATED DATA

| APPARATUS ID | DATA ID | DATA ATTRIBUTE | PRODUCTION DATE AND TIME | DATA SIZE | PROTECT | NUMBER OF TIMES OF USE |
|---|---|---|---|---|---|---|
| REPRODUCTION DATE AND TIME 1 | REPRODUCTION DATE AND TIME 2 | REPRODUCTION DATE AND TIME 3 | REPRODUCTION DATE AND TIME 4 | REPRODUCTION DATE AND TIME 5 | OTHERS | |
| MUSIC DATA | | | | | | |

FIG.36

EXAMPLE OF LAYOUT OF IMAGE DATA AS ACCUMULATED DATA

| APPARATUS ID | DATA ID | DATA ATTRIBUTE | PRODUCTION DATE AND TIME | PROTECT | PRINT MARK | DATA SIZE |
|---|---|---|---|---|---|---|
| NUMBER OF TIMES OF USE | OTHERS | | | | | |
| STILL IMAGE DATA | | | | | | |

FIG.37

APPARATUS LINKAGE TABLE

| NO. | LINKED APPARATUS | | LINKAGE PROCESS SUBSTANCE | PROGRAM ID |
|---|---|---|---|---|
| | APPARATUS 1 | APPARATUS 2 | | |
| 1 | DIGITAL STILL CAMERA | PORTABLE TELEPHONE TERMINAL | STILL PICTURE DATA OF APPARATUS 1 ARE RESIZED AND COPIED INTO APPARATUS 2 ((1)CAPACITY, DATE, (2)EVENT, (3)PRIORITY DEGREE) | PG1 |
| 2 | DIGITAL VIDEO CAMERA | PORTABLE TELEPHONE TERMINAL | DIGEST IS PRODUCED FROM MOVING PICTURE DATA OF APPARATUS 1 AND COPIED INTO APPARATUS 2 | PG2 |
| 3 | PORTABLE MUSIC REPRODUCTION MACHINE (INCLUDING PORTABLE TELEPHONE TERMINAL) | DIGITAL STILL CAMERA | THOSE OF MUSIC DATA OF APPARATUS 1 WHICH SATISFY PREDETERMINED CONDITION ARE COPIED INTO APPARATUS 2 | PG3 |
| ... | ... | | ... | ... |

PROCESS OF PORTABLE TELEPHONE TERMINAL WITH MUSIC REPRODUCTION FUNCTION

FIG. 46

EXAMPLE OF LAYOUT OF ACCUMULATED DATA OF DIGITAL STILL CAMERA

| APPARATUS ID | DATA ID | DATA ATTRIBUTE | PRODUCTION DATE AND TIME | PROTECT | PRINT MARK | DATA SIZE |
|---|---|---|---|---|---|---|
| NUMBER OF TIMES OF USE | IMAGE PICKUP MODE | OTHERS | | | | |
| STILL IMAGE DATA | | | | | | |

FIG.47

EXAMPLE OF LAYOUT OF ACCUMULATED DATA OF PORTABLE TELEPHONE TERMINAL

| APPARATUS ID | DATA ID | DATA ATTRIBUTE | PRODUCTION DATE AND TIME | PROTECT | PRINT MARK | DATA SIZE |
|---|---|---|---|---|---|---|
| NUMBER OF TIMES OF USE | PROVIDING SOURCE ID | OTHERS | | | | |
| TEXT DATA | | | | | | |

FIG.48

APPARATUS LINKAGE TABLE

| NO. | LINKED APPARATUS | | LINKAGE PROCESS SUBSTANCE | PROGRAM ID |
|---|---|---|---|---|
| | APPARATUS 1 | APPARATUS 2 | | |
| 1 | DIGITAL STILL CAMERA | PORTABLE TELEPHONE TERMINAL | STILL PICTURE DATA OF APPARATUS 1 ARE RESIZED AND COPIED INTO APPARATUS 2 ((1)CAPACITY, DATE, (2)EVENT, (3)PRIORITY DEGREE) | PG1 |
| 2 | DIGITAL VIDEO CAMERA | PORTABLE TELEPHONE TERMINAL | DIGEST IS PRODUCED FROM MOVING PICTURE DATA OF APPARATUS 1 AND COPIED INTO APPARATUS 2 | PG2 |
| 3 | PORTABLE MUSIC REPRODUCTION MACHINE (INCLUDING PORTABLE TELEPHONE TERMINAL) | DIGITAL STILL CAMERA | THOSE OF MUSIC DATA OF APPARATUS 1 WHICH SATISFY PREDETERMINED CONDITION ARE COPIED INTO APPARATUS 2 | PG3 |
| 4 | DIGITAL STILL CAMERA | PORTABLE TELEPHONE TERMINAL | IMAGE FOR MEMO USE OF APPARATUS 1 IS CONVERTED INTO TEXT AND TRANSFERRED TO APPARATUS 2 | PG4 |
| 5 | DIGITAL STILL CAMERA WITH GPS | PORTABLE TELEPHONE TERMINAL | PICKED UP IMAGE TO WHICH ADDRESS DATA IS ADDED IS FORMED FROM PICKED UP IMAGE OF APPARATUS 1 + PICKUP POSITION DATA AND TRANSFERRED TO APPARATUS 2 | PG5 |
| ... | ... | ... | ... | ... |

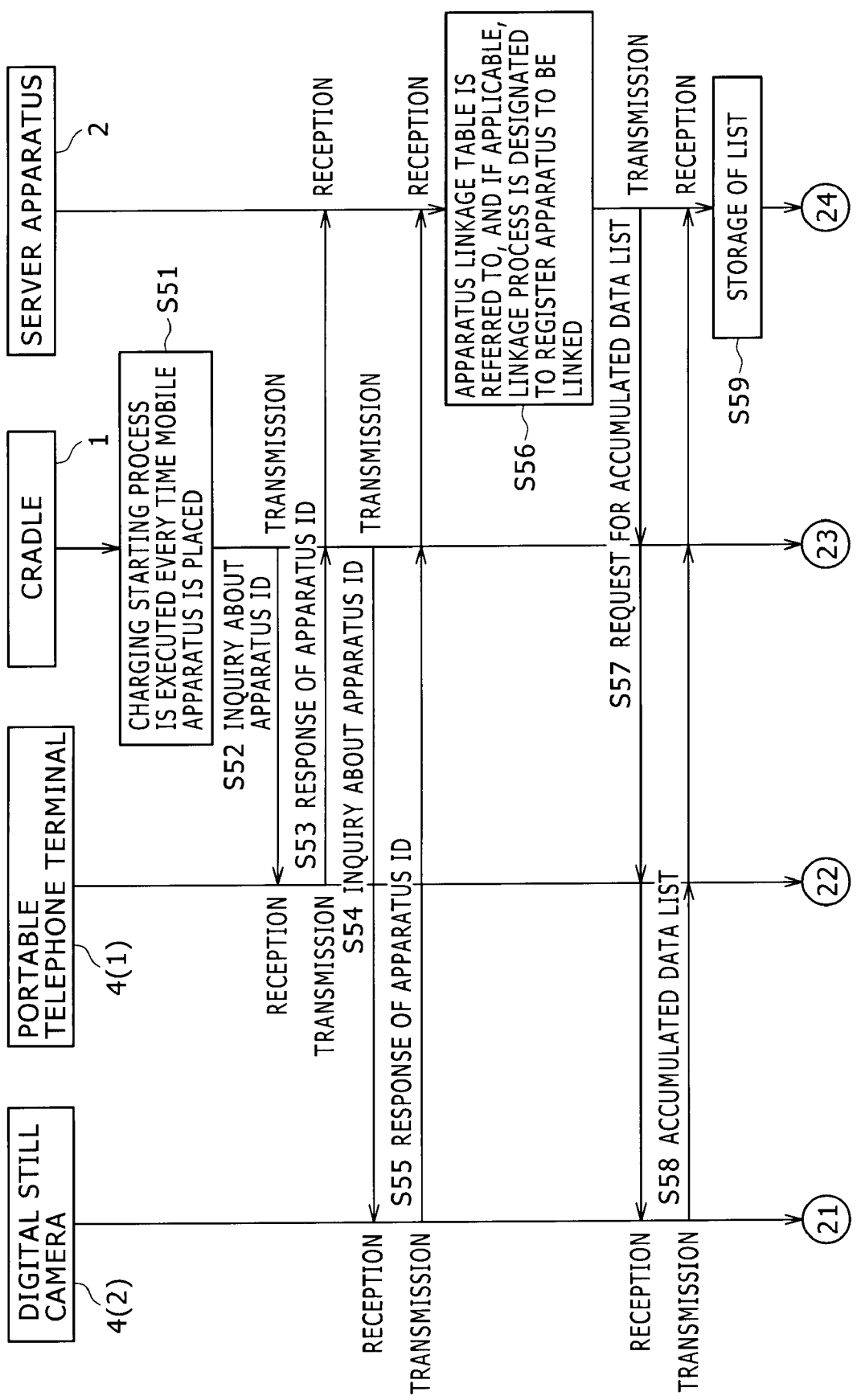

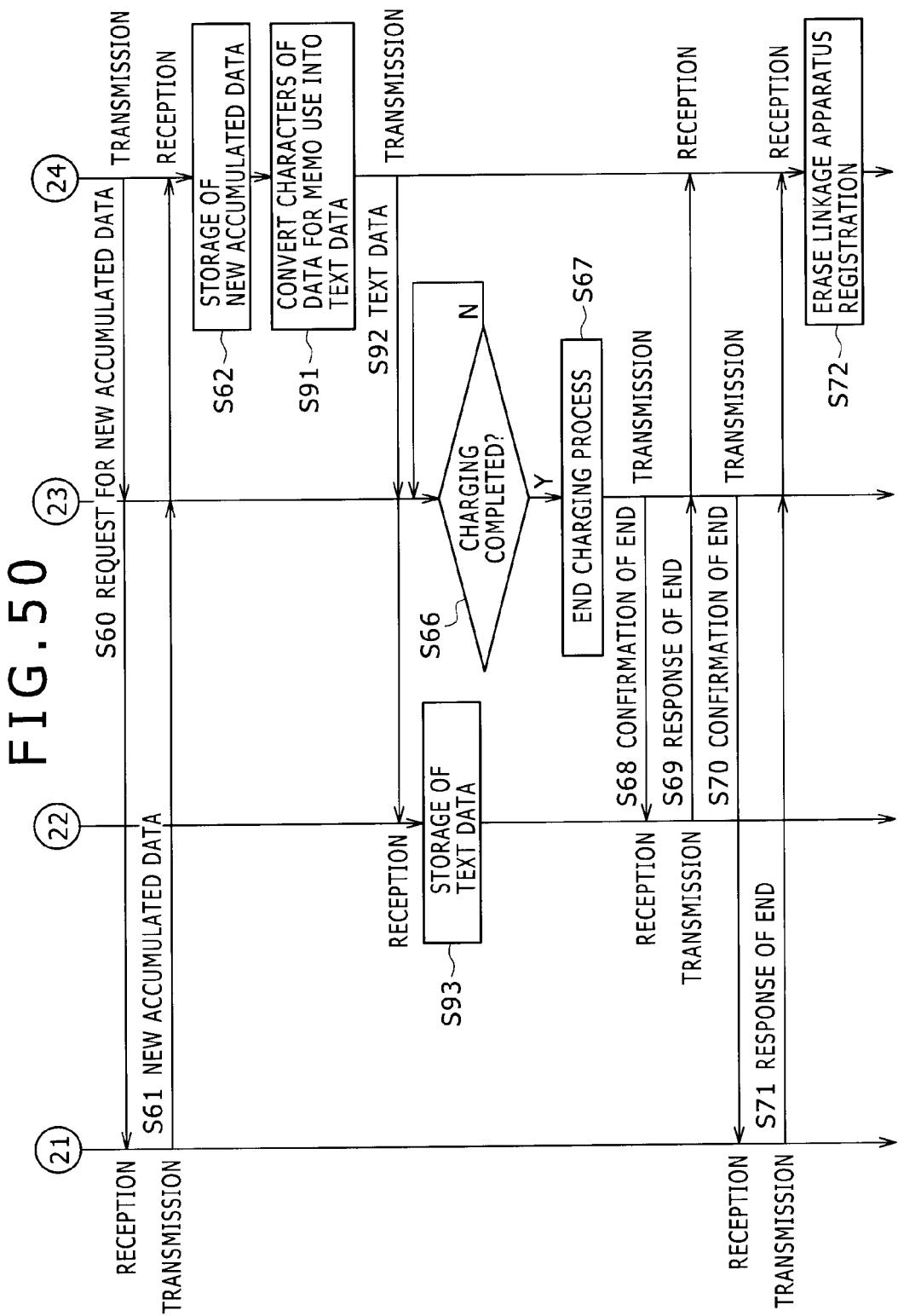

FIG.51
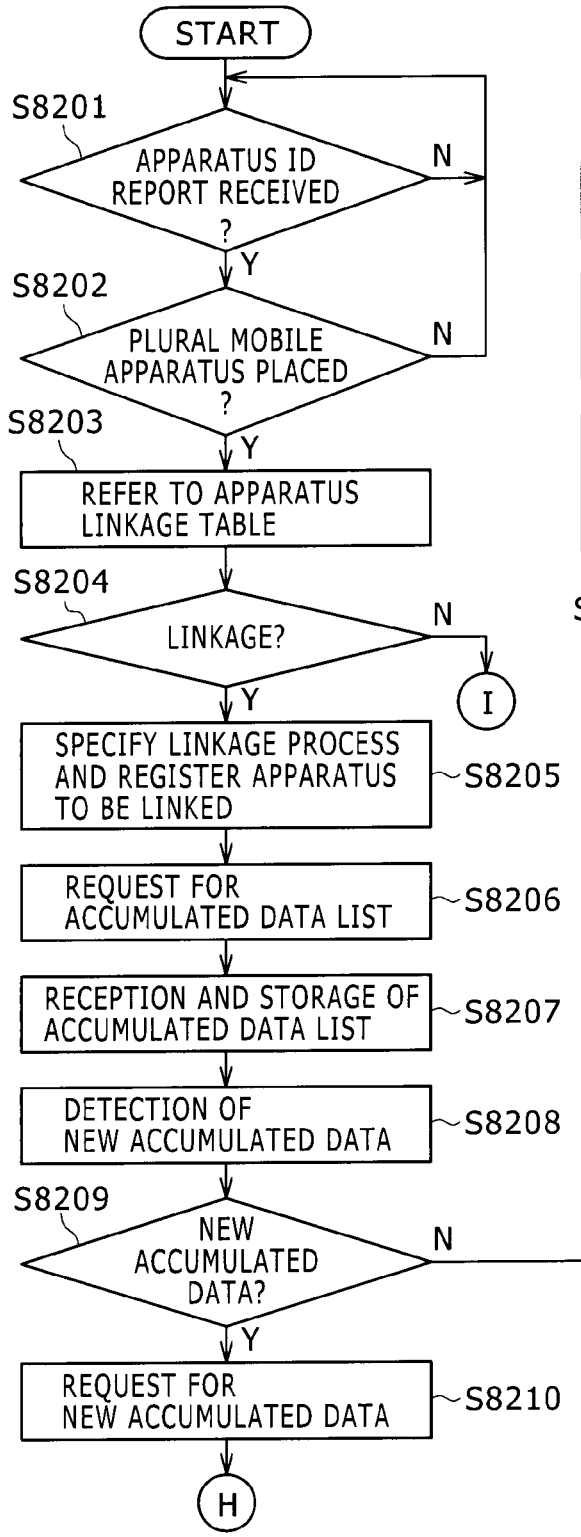
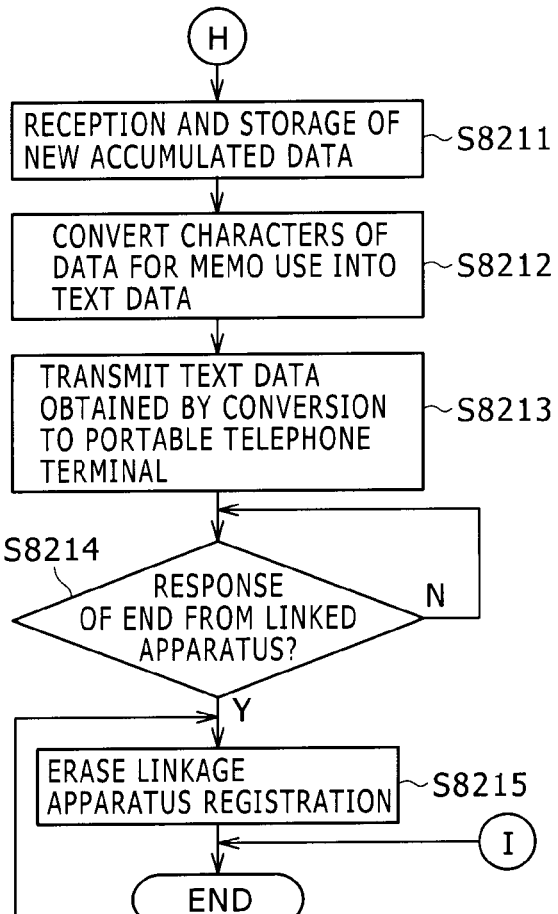

FIG.56

EXAMPLE OF LAYOUT OF ACCUMULATED DATA OF DIGITAL STILL CAMERA

| APPARATUS ID | DATA ID | DATA ATTRIBUTE | PRODUCTION DATE AND TIME | PROTECT | PRINT MARK | DATA SIZE |
|---|---|---|---|---|---|---|
| NUMBER OF TIMES OF USE | POSITION DATA | OTHERS | | | | |
| STILL IMAGE DATA | | | | | | |

FIG. 57

EXAMPLE OF LAYOUT OF ACCUMULATED DATA OF PORTABLE TELEPHONE TERMINAL

| APPARATUS ID | DATA ID | DATA ATTRIBUTE | PRODUCTION DATE AND TIME | PROTECT | PRINT MARK | DATA SIZE |
|---|---|---|---|---|---|---|
| NAME (SHOP NAME, COMPANY NAME) | | ADDRESS | | OTHERS | | |
| STILL IMAGE DATA | | | | | | |

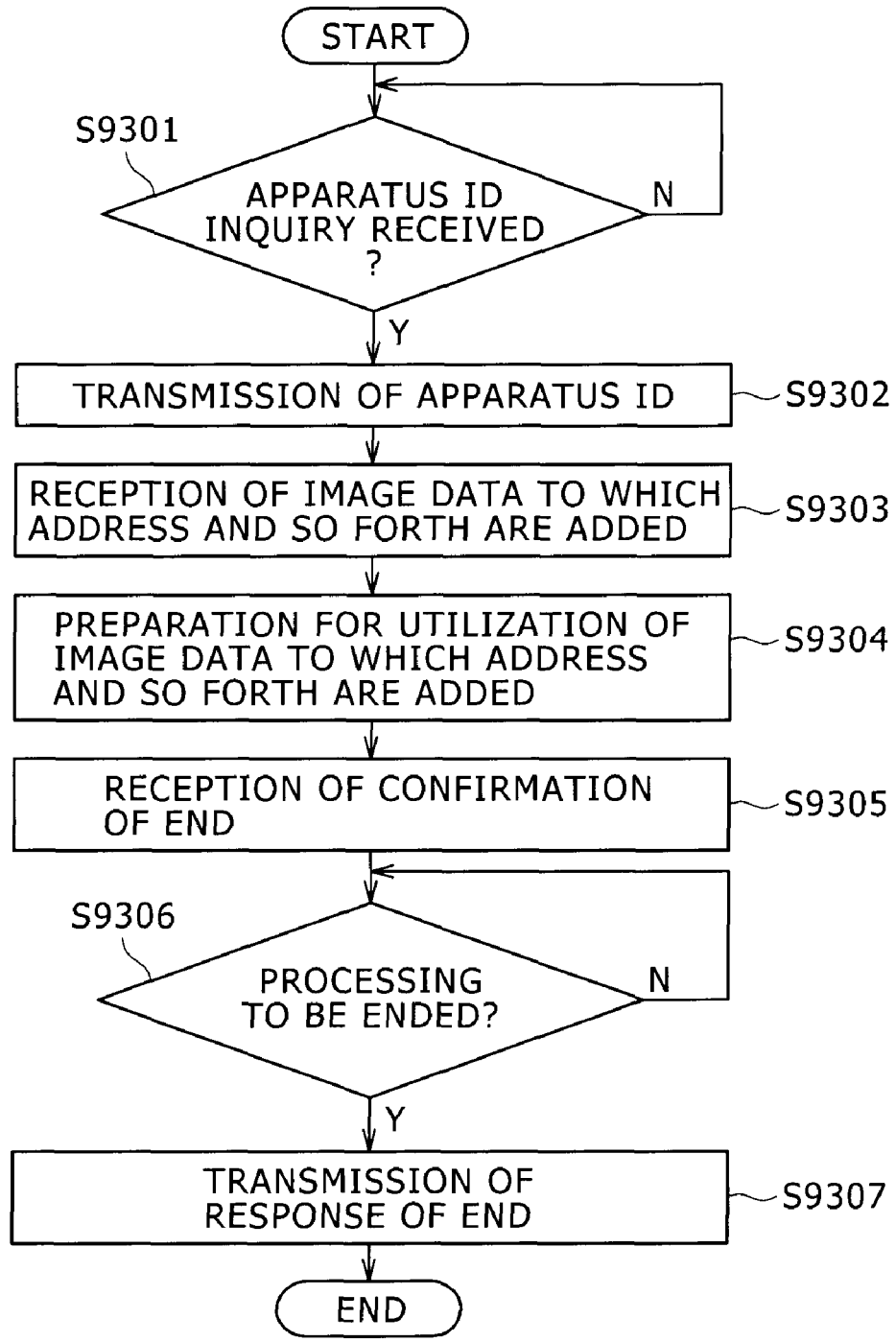

DATA COMMUNICATION SYSTEM, CRADLE APPARATUS, SERVER APPARATUS AND DATA COMMUNICATION METHOD

CROSS REFERENCES TO RELATED APPLICATIONS

The present invention contains subject matter related to Japanese Patent Application JP 2007-111469 filed in the Japan Patent Office on Apr. 20, 2007, and Japanese Patent Applications JP 2008-98484, JP 2008-98483 and JP 2008-98485 filed in the Japan Patent Office on Apr. 4, 2008, the entire contents of which are incorporated herein by reference.

BACKGROUND OF THE INVENTION

1. Field of the Invention

This invention relates to a system including a cradle apparatus which mediates transmission and reception of data between various portable electronic apparatus or mobile apparatus such as, for example, a portable telephone terminal, a digital camera and a portable music reproduction apparatus and a server apparatus such as a personal computer, and an apparatus, a method and a program for use with the system.

2. Description of the Related Art

As mobile apparatus which can be carried and used, portable music reproduction apparatus and portable video/audio reproduction apparatus are utilized. As portable music reproduction apparatus, an MD player wherein an MD (Mini Disc; trademark) is used as a recording medium, a memory player wherein a semiconductor memory is used as a recording medium, a hard disk recorder wherein a hard disk is used as a recording medium and so forth are available. Meanwhile, as portable video/audio reproduction apparatus, for example, a notebook type personal computer, a game machine and so forth are implemented, and also a portable video/audio reproduction apparatus for exclusive use is provided.

In such portable music reproduction apparatus and portable video/audio reproduction apparatus as described above, music data or AV data, which are data composed of video data and audio data to be reproduced in synchronism with each other, to be utilized must be recorded on a recording medium which can be utilized on such portable music reproduction apparatus and portable video/audio reproduction apparatus or in a recording medium built in such apparatus. In particular, in order to use a portable music reproduction apparatus or a portable video/audio reproduction apparatus to utilize object content data, prior preparations of recording the object content data on an object recording medium are required.

However, it is cumbersome for a user itself to separately carry out a work of recording content data, which the user wants to utilize on a portable music reproduction apparatus and portable video/audio reproduction apparatus, on an object recording medium. Further, where sufficient time is not available, the work of recording content data on an object recording medium may not be carried out.

SUMMARY OF THE INVENTION

According to one embodiment of the present invention, a mobile apparatus or portable electronic apparatus can be normally maintained in an appropriately utilizable state without any participation of a user thereof to improve the convenience in use of the mobile apparatus.

BRIEF DESCRIPTION OF THE DRAWINGS

FIGS. 7A, 7B and 7C are diagrammatic views illustrating examples of a layout of command data and particular example of the command data;

FIG. 8 is a diagrammatic view illustrating an example of a layout of an accumulated data list;

FIG. 9 is a diagrammatic view illustrating an example of a layout of accumulated data;

FIG. 11 is a diagrammatic view illustrating an example of a layout of a writing back history;

FIG. 12 is a flow chart illustrating a process carried out by the cradle;

FIG. 26 is a view illustrating an example of a configuration of an apparatus linkage table used in the first example of the second embodiment;

FIGS. 27 and 28 are timing charts illustrating operation of the data communication system of the first example of the second embodiment;

FIG. 35 is a diagrammatic view illustrating an example of a layout of music data stored and retained in the portable telephone terminal with a music reproduction function used in the data communication system of the second example of the second embodiment;

FIG. 36 is a diagrammatic view illustrating an example of a layout of still image data stored and retained in the digital still camera with a music reproduction function used in the data communication system of the second example of the second embodiment;

FIG. 37 is a diagrammatic view illustrating an example of a configuration of an apparatus linkage table used in the data communication system of the second example of the second embodiment;

FIG. 46 is a diagrammatic view illustrating an example of a layout of still image data stored and retained in the digital still camera used in the data communication system of the third example of the second embodiment;

FIG. 47 is a diagrammatic view illustrating an example of a layout of text data stored and retained in a portable telephone terminal used in the data communication system of the third example of the second embodiment;

FIG. 48 is a diagrammatic view illustrating an example of a configuration of an apparatus linkage table used in the data communication system of the third and fourth examples of the second embodiment;

FIGS. 49 and 50 are timing charts illustrating operation of the data communication system of the third example of the second embodiment;

FIG. 51 is a flow chart illustrating a process carried out by the server apparatus used in the third example of the second embodiment;

FIG. 56 is a diagrammatic view illustrating an example of a layout of still image data stored and retained in the digital still camera used in the data communication system of the fourth example of the second embodiment;

FIG. 57 is a diagrammatic view illustrating an example of a layout of still image data stored and retained in the portable telephone terminal used in the data communication system of the fourth example of the second embodiment;

FIG. 61 is a flow chart illustrating a process carried out by the portable telephone terminal used in the fourth example of the second embodiment.

DETAILED DESCRIPTION OF THE PREFERRED EMBODIMENTS

In the following, a system, an apparatus, a program and a method to which the present invention is applied are described.

First Embodiment

[Outline of the Data Communication System]

Figure 1:
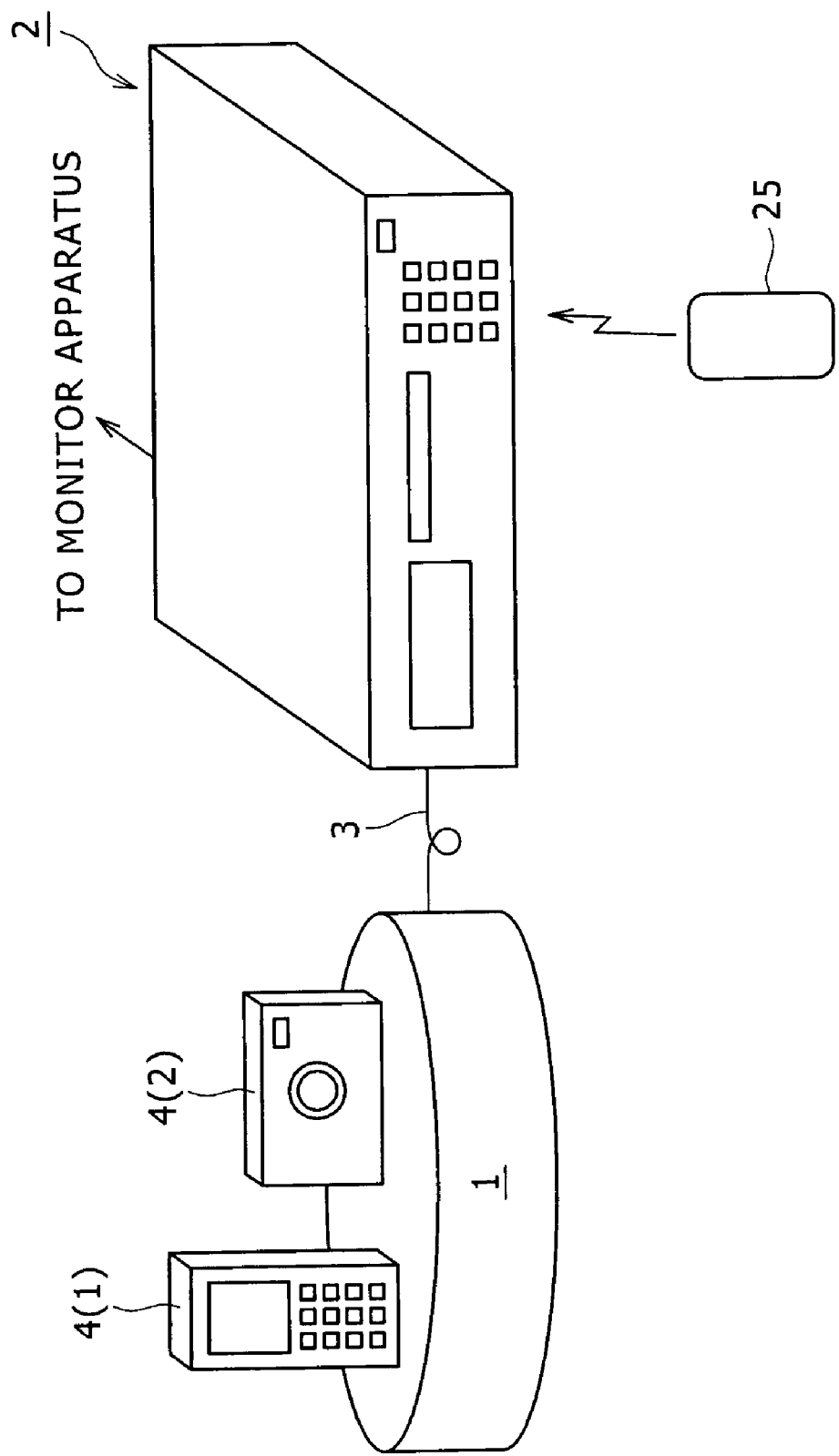
FIG. 1 is a schematic view showing a general configuration of a data communication system according to a first embodiment of the present invention.

FIG. 1 shows a general configuration of a data communication system to which the present invention is applied.

Referring to FIG. 1, the data communication system shown includes a cradle 1 and a server apparatus 2 connected to each other through an interface cable 3. While the cradle 1 and the server apparatus 2 are connected to each other by a wire, they may otherwise be connected to each other by radio in accordance with a predetermined radio interface.

The cradle 1 has a function of mediating transmission and reception of data carried out between various mobile apparatus mounted on the cradle 1 and a server apparatus 2. Further, the cradle 1 has also a function of charging a mobile apparatus placed thereon.

In the present embodiment, various mobile apparatus and the cradle 1 do not require direct connection between contacts for feeding or between contacts for communication but allow both of feeding and communication to be carried out without contact therebetween. In particular, feeding is carried out by electromagnetic induction while transmission and reception of data are carried out by short distance wireless communication. However, different frequency bands are used so that the charging process and the communication process may not have an influence on each other.

It is to be noted that the cradle 1 can receive various mobile apparatus having a function of receiving supply of power from the cradle 1 to charge a battery therein or another function of communicating with the cradle 1 by short distance wireless communication of both of the functions such as, for example, a camera-equipped portable telephone terminal, a digital still camera, a digital video camera or a portable music reproduction apparatus such that the apparatus can receive supply of power from the cradle 1 or/and communicating with the cradle 1.

In particular, the cradle 1 is not for exclusive use with a predetermined mobile apparatus but for universal use such that various apparatus can be utilized on the cradle 1. Further, the cradle 1 can receive a plurality of mobile apparatus thereon at a time such that the mobile apparatus can receive supply of power from the cradle 1 and can individually communicate with the cradle 1.

The server apparatus 2 includes a recording apparatus of a large capacity and can receive, store and retain accumulation data transmitted from various mobile apparatus through the cradle 1. Further, the server apparatus 2 can issue an instruction to execute a process and provide necessary information to a mobile apparatus loaded on the cradle 1 through the cradle 1. The server apparatus 2 is implemented, for example, as a hard disk recorder or a personal computer or as a server apparatus for exclusive use where a home network system is constructed.

In the data communication system of the present embodiment, if, for example, a camera-equipped portable telephone terminal 4(1) is placed on the cradle 1, then still image data picked up newly and accumulated in the camera-equipped portable telephone terminal 4(1) are transmitted to the server apparatus 2 through the cradle 1 in response to a request from the server apparatus 2 transmitted through the cradle 1 so that the still image data can be recorded as backup data into the recording apparatus of the server apparatus 2.

Further, in response to an erasure instruction from the server apparatus 2, still image data accumulated in the camera-equipped portable telephone terminal 4(1) stored as backup data in the server apparatus 2 can be erased. In this instance, all of still image data stored as backup data are not erased, but those still image data which can be estimated as important still image data from incidental information to the still image data or the like can be left without being deleted. These incidental information indicate whether the data are protected, the printing marking are added to the data, or the like.

Further, as regards still image data erased as described above, a reduced image can be reproduced based on still image data whose backup data are stored in the server apparatus 2 and transferred from the server apparatus 2 to the camera-equipped portable telephone terminal 4(1) through the cradle 1. Consequently, it is possible to appropriately recognize it on the camera-equipped portable telephone terminal 4(1) what still image data are erased after backed up without wastefully using the memory of the camera-equipped portable telephone terminal 4(1).

It is to be noted that, while it is described above as an example that still image data accumulated in the camera-equipped portable telephone terminal 4(1) are handled, if a digital video camera is placed as a mobile apparatus on the cradle 1, then moving image data are determined as a processing object. Thus, moving image data picked up newly are erased in response to an erasure instruction from the server apparatus 2 after they are backed up into the server apparatus 2.

Where moving image data are a processing object, the server apparatus 2 produces moving image data for digest reproduction to be used for digest reproduction of the moving image data and returns the moving image data to the digital video camera as the mobile apparatus. Consequently, a digest version of the moving image data backed up in the server apparatus 2 can be confirmed at any time.

On the other hand, where the mobile apparatus is a portable music reproduction apparatus, music data accumulated in the portable music reproduction apparatus may not necessarily be backed up because they are backed up in a server apparatus already or stored and retained in a recording medium such as a CD (Compact Disk). In such an instance, for example, only music data of a trial version which allows trial enjoyment of part of music data which have become available newly can be provided to the portable music reproduction apparatus without carrying out backup storage of the storage data.

That is, in the case that the mobile apparatus is a portable music reproduction apparatus, the server apparatus 2 can select music data which have not provided before to the portable music reproduction apparatus among the music data stored in the server apparatus 2 and provide the selected music data to the portable music reproduction apparatus, and the server apparatus 2 can fetch the music data which can newly be provided from a server on the Internet to provide it or a part of it to the portable music reproduction apparatus.

In this instance, information to be returned to the mobile apparatus, that is, data for the mobile apparatus, differs depending upon the apparatus of the opposite party of communication, data of the processing object and so forth. Therefore, the server apparatus 2 can specify what data should be prepared and returned as data for the mobile apparatus based on an apparatus attribute transferred from the mobile apparatus, based on a transmission history in the past to the object mobile apparatus managed by the server apparatus 2, based on a data attribute of the data accumulated in the object mobile apparatus or based on an instruction input from a user accepted by the server apparatus 2.

Here, the apparatus attribute indicates a type or kind of an apparatus such as a digital still camera, a digital video camera or a portable telephone terminal. Meanwhile, the data attribute indicates a type or kind of data such as still image data, moving image data or sound data.

In this manner, in the data communication system of the present embodiment, only if any mobile apparatus is placed on the cradle 1, then (1) backup storage of data accumulated in the mobile apparatus, (2) erasure or management of data accumulated in the mobile apparatus and (3) provision of necessary data to the mobile apparatus can be carried out so that a normally appropriate utilization state of the portable electronic apparatus can be maintained without bothering the user thereby to improve the convenience in use of the portable electronic apparatus.

[Example of a Configuration of Apparatus Which Construct the Data Communication System]

Now, an example of a configuration of the apparatus which construct the data communication system according to the present embodiment is described. In the following description, an example of a configuration of the cradle 1 and the server apparatus 2 and an example of a configuration of a digital still camera or a digital video camera as an example of the mobile apparatus to be placed on the cradle 1 are described.

[Example of a Configuration of the Cradle 1]

Figure 2:
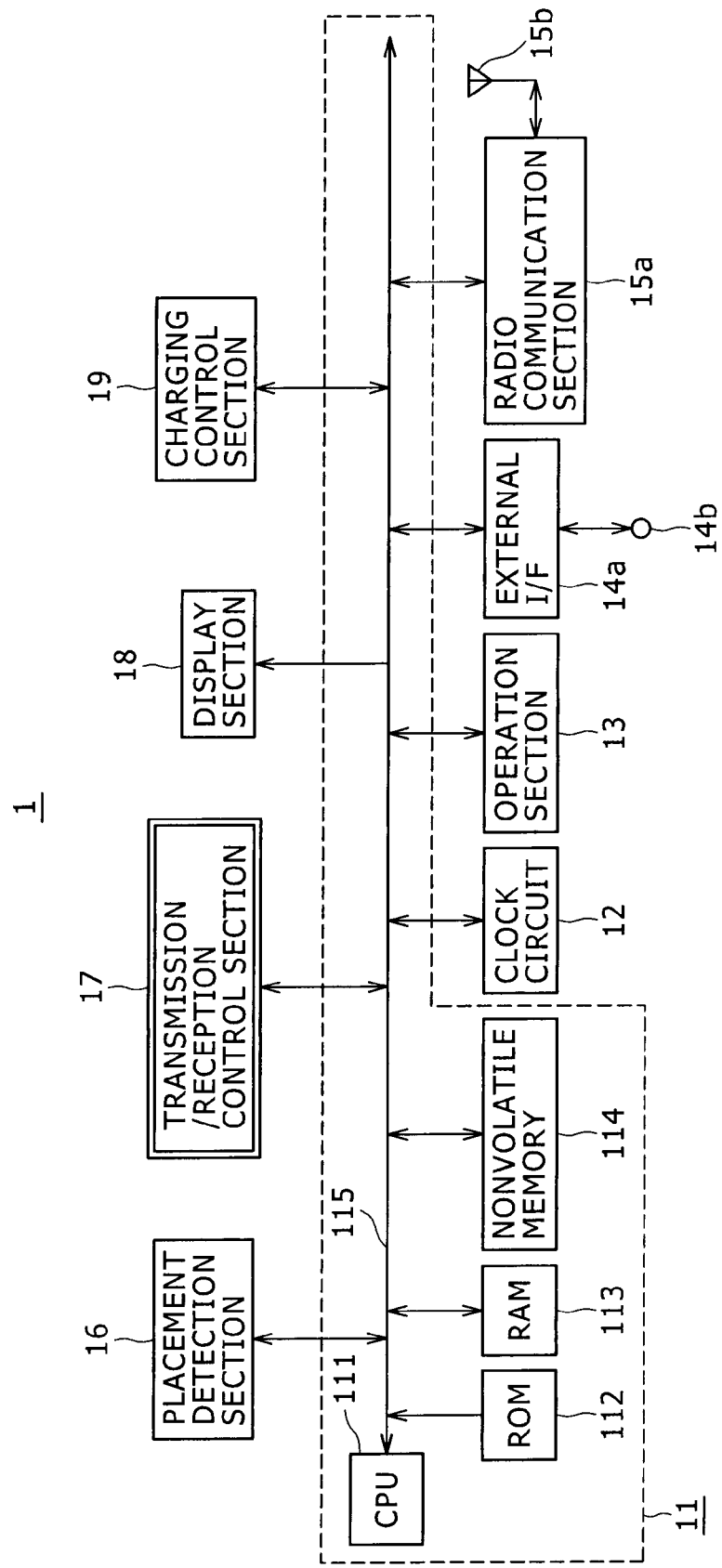
FIG. 2 is a block diagram showing an example of a configuration of a cradle used in the data communication system shown in FIG. 1.

FIG. 2 shows an example of a configuration of the cradle 1 used in the data communication system according to the present embodiment. Referring to FIG. 2, the cradle 1 shown includes a control section 11, a clock circuit 12, an operation section 13, an external interface (I/F) 14a, an input/output terminal 14b, a radio communication section 15a, and a transmission/reception antenna 15b. The cradle 1 further includes a placement detection section 16, a transmission/reception control section 17, a display section 18, and a charging control section 19.

The control section 11 controls the components of the cradle 1 and is formed as a microcomputer including a CPU (Central Processing Unit) 111, a ROM (Read Only Memory) 112, a RAM (Random Access Memory) 113 and a nonvolatile memory 114 such as an EEPROM (Electrically Erasable and Programmable ROM) or a flash memory which are connected to each other by a CPU bus 115.

The CPU 111 serves as a core of control which executes a program stored and retained in the ROM 112 to form control signals and supplies the control signals to the appropriate components of the cradle 1 to control the components. The ROM 112 stores programs to be executed by the CPU 111 and further stores data and so forth in advance which are required in various processes.

The RAM 113 is used as a working area principally for temporarily storing midway results of processing. The nonvolatile memory 114 stores and retains data to be retained even if power supply to the cradle 1 is turned off such as, for example, various setting parameters and additional programs for additional provision of functions.

The clock circuit 12 includes a calendar function and provides the year, month and day at present, a day of the week at present and the time at present. The operation section 13 has operation keys such as, for example, numeral keys and various function keys and can accept an operation input from a user, convert the operation input into an electric signal and send the electric signal to the control section 11. Consequently, an instruction input accepted through the operation section 13 is supplied as an electric signal to the control section 11, and the control section 11 can control the components of the cradle 1 in response to an instruction from the user to carry out a process in accordance with the instruction of the user.

The input/output terminal 14b forms a connection terminal portion to an external apparatus, and, in the present embodiment, the server apparatus 2 is connected to the input/output terminal 14b through the interface cable 3. The external interface 14a has a function of converting data to be signaled from the cradle 1 into data of a format for signaling and a function of converting data supplied from the outside into data of a format which can be processed in the cradle 1. The radio communication section 15a and the transmission/reception antenna 15b carry out data communication by short distance wireless communication to the mobile apparatus placed on the cradle 1.

It is to be noted that, for the short distance wireless communication, a radio technique for transmitting and receiving data using a radio wave in a wide frequency band such as several GHz (Giga Hertz) called UWB (Ultra Wide Band), a short distance radio communication technique called Bluetooth and other various short distance radio communication techniques can be used.

The placement detection section 16 detects whether or not a mobile apparatus which can communicate data or can be charged is placed on the cradle 1. The placement detection section 16 can electrically detect placement of a mobile apparatus on the cradle 1. For example, if the radio communication section 15a is controlled to signal a request for response at predetermined intervals and a mobile apparatus which responds to the request for response is detected, then the placement detection section 16 can detect that a mobile apparatus is placed on the cradle 1.

Alternatively, a sensor such as a piezoelectric sensor may be provided. In this instance, if it is detected through the piezoelectric sensor that some article is placed on a receiving portion of the cradle 1 which receives a mobile apparatus, that is, that a pressure is applied to the receiving portion, then the radio communication section 15a is controlled to signal a response request. Then, if some mobile apparatus responds to the response request, then it can be detected that a mobile apparatus is placed on the cradle 1. In this instance, there is no necessity to normally transmit a response request at predetermined intervals, but when it is detected that some article is placed on the cradle 1, it may be detected whether or not the article placed is a mobile apparatus which can communicate. Therefore, addition of the radio communication section 15a and so forth can be moderated.

The transmission/reception control section 17 controls transmission and reception to and from a mobile apparatus via the radio communication section 15a and the transmission/reception antenna 15b, and transmission and reception to and from the server apparatus 2 through the external interface 14a and the input/output terminal 14b. In particular, the transmission/reception control section 17 controls a process of transmitting information from a mobile apparatus received through the radio communication section 15a and the transmission/reception antenna 15b to the server apparatus 2 through the external interface 14a and the input/output terminal 14b. The transmission/reception control section 17 further controls a process of conversely transmitting information from the server apparatus 2 received through the external interface 14a and the input/output terminal 14b to the mobile apparatus through the radio communication section 15a and the transmission/reception antenna 15b.

In this manner, the transmission/reception control section 17 can implement a function as a relay control section for repeating communication between the mobile apparatus and the server apparatus 2. Naturally, the transmission/reception control section 17 can control a communication process carried out between the mobile apparatus and the cradle 1 merely through the radio communication section 15a and the transmission/reception antenna 15b and a communication process carried out between the server apparatus 2 and the cradle 1 through the external interface 14a and the input/output terminal 14b.

It is to be noted that the functions of the transmission/reception control section 17 indicated by double lines in FIG. 2 can be implemented also as functions of the control section 11 by a program or software executed by the CPU 111. Further, where a piezoelectric sensor or the like is not used for the placement detection section 16, it can carry out detection of placement of a mobile apparatus through communication through the radio communication section 15a and the transmission/reception antenna 15b. Therefore, it is possible to implement the function of the placement detection section 16 also as a function of the control section 11 by a program or software executed by the CPU 111.

The display section 18 includes a display device such as, for example, an LCD (Liquid Crystal Display) apparatus or an organic EL panel (Organic Electroluminescence panel) and a control circuit for the display device. The display section 18 can display various kinds of display information such as characters, symbols and pictures to display guidance messages, alarming messages and indications representative of operation states under the control of the control section 11.

The charging control section 19 supplies power by electromagnetic induction to a mobile apparatus placed on the cradle 1 so as to charge the battery incorporated in the mobile apparatus as described hereinabove.

If the cradle 1 detects that a mobile apparatus is placed thereon through the placement detection section 16, then it uses the function of the transmission/reception control section 17 to control the external interface 14a to notify the server apparatus 2 of such placement of the mobile apparatus connected to the cradle 1 through the input/output terminal 14b.

Further, the cradle 1 receives accumulated data provided from the mobile apparatus placed thereon through the radio communication section 15a and the transmission/reception antenna 15b under the control of the transmission/reception control section 17 in accordance with an instruction provided from the server apparatus 2 through the input/output terminal 14b and the external interface 14a. Further, the cradle 1 controls the external interface 14a to provide the received accumulated data to the server apparatus 2 connected to the cradle 1 through the input/output terminal 14b.

Furthermore, the cradle 1 can receive a data erasure instruction or rewinding data provided from the server apparatus 2 through the input/output terminal 14b and the external interface 14a and transmit such erasure instruction or rewinding data to the mobile apparatus placed on the cradle 1 through the radio communication section 15a and the transmission/reception antenna 15b under the control of the transmission/reception control section 17.

In this manner, in the cradle 1, the radio communication section 15a and the transmission/reception antenna 15b implement a function as a first communication section for communicating with a mobile apparatus, and the external interface 14a and the input/output terminal 14b implement a function as a second communication section for communicating with a server apparatus.

Further, the placement detection section 16 implements a function as a placement detection section, and the transmission/reception control section 17 implements a function as a communication control section for notifying, when the transmission/reception control section 17 detects that a mobile apparatus is placed on the cradle 1, a server apparatus of such placement and a function as a relay control section for controlling communication between the mobile apparatus placed on the cradle 1 and the server apparatus.

[Example of a Configuration of the Server Apparatus 2]

Figure 3:
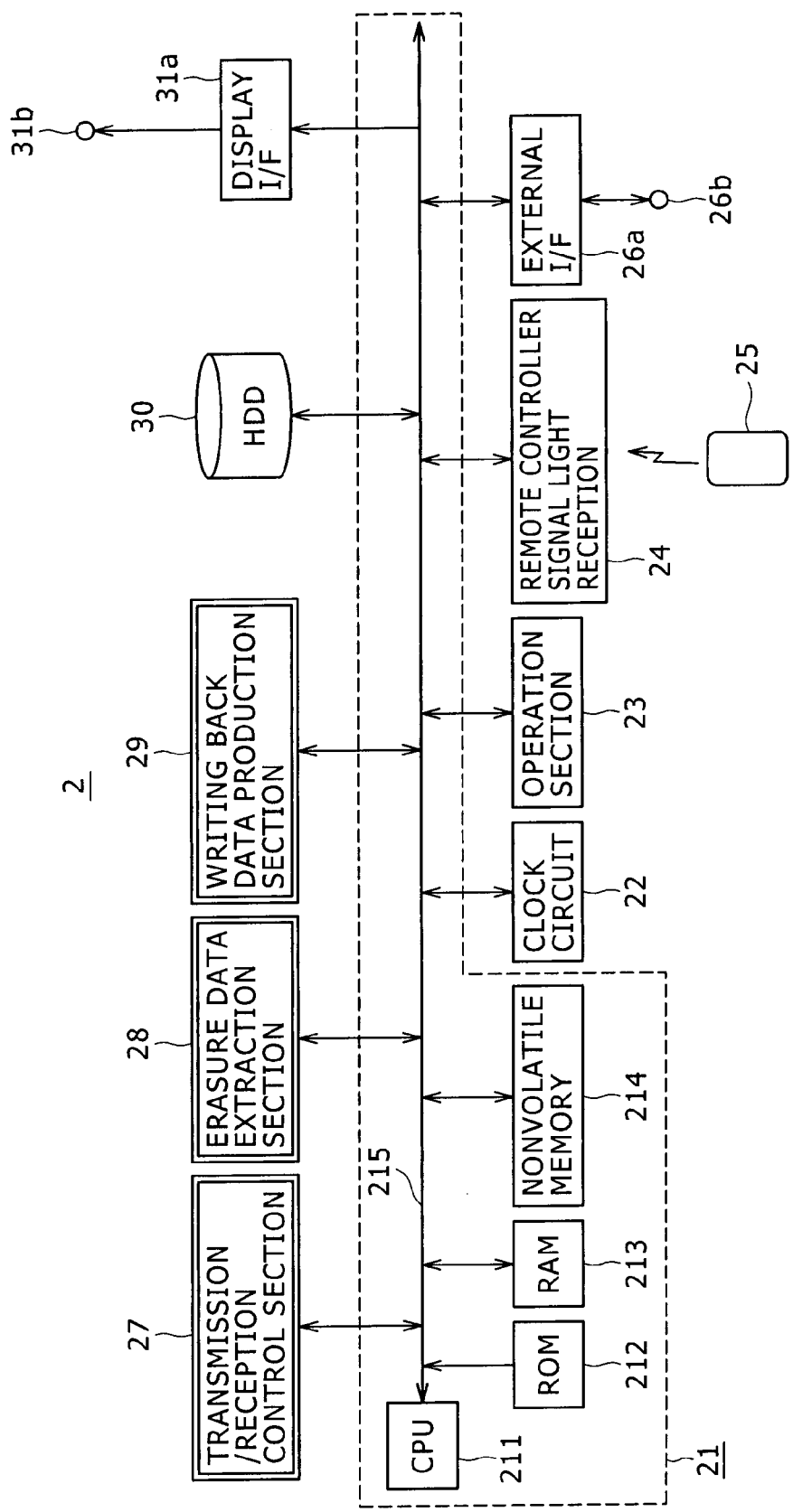
FIG. 3 is a block diagram showing an example of a configuration of a server apparatus used in the data communication system shown in FIG. 1.

FIG. 3 shows an example of a configuration of the server apparatus 2 used in the data communication system. Referring to FIG. 3, the server apparatus 2 shown includes a control section 21, a clock circuit 22, an operation section 23, a remote controller signal light reception section 24, an external interface (I/F) 26a, and an input/output terminal 26b. The server apparatus 2 further includes a transmission/reception control section 27, an erasure data extraction section 28, a writing back data production section 29, a hard disk driver 30, a display interface (I/F) 31a, and an output terminal 31b for an image signal. A remote controller 25 for exclusive use is provided for the server apparatus 2.

The control section 21 controls the components of the server apparatus 2 and is formed from a microcomputer including a CPU 211, a ROM 212, a RAM 213 and a nonvolatile memory 214 connected to each other by a CPU bus 215.

The CPU 211 serves as a core of control which executes a program stored and retained in the ROM 212 to form and supply control signals to pertaining components of the server apparatus 2 to control the components of the server apparatus 2. The ROM 212 stores programs to be executed by the CPU 211 and data and so forth required in various processes in advance therein.

The RAM 213 is used as a working area principally for temporarily storing midway results of processing and so forth. The nonvolatile memory 214 may be formed from an EEPROM, a flash memory or the like and stores and retains data to be retained even if power supply to the server apparatus 2 is turned off such as, for example, various setting parameters and additional programs for additional provision of functions.

The clock circuit 22 includes a calendar function and provides the year, month and day at present, a day of the week at present and the time at present. The operation section 23 has operation keys such as, for example, numeral keys and various function keys and can accept an operation input from a user, convert the operation input into an electric signal and send the electric signal to the control section 21. Consequently, an instruction input accepted through the operation section 23 is supplied as an electric signal to the control section 21, and the control section 21 can control the components of the server apparatus 2 in response to an instruction from the user to carry out a process in accordance with the instruction of the user.

It is to be noted that the operation section 23 may be provided on the body of the server apparatus 2 or may otherwise be provided as a keyboard apparatus having numeral keys, alphabet keys, function keys and so forth separate from the server apparatus 2. Or the operation section 23 may be provided as a pointing device such as a mouse or may include a plurality of such devices.

The remote controller signal light reception section 24 receives a remote control signal in the form of an infrared ray from the remote controller 25, converts the remote control signal into an electric signal and signals the electric signal to the control section 21. The remote controller 25 includes various operation keys, and can accept an operation input from a user, form a remote control signal of an infrared ray in accordance with the accepted operation input and signal the remote control signal.

Thus, even if the user is at a remote place from the server apparatus 2, if it is within a range within which a remote control signal can be communicated, then the user can use the remote controller signal light reception section 24 and the remote controller 25 to issue an instruction to the server apparatus 2 to remotely control the server apparatus 2.

The input/output terminal 26b forms a connection terminal portion to an external apparatus such that the cradle 1 is connected thereto through the interface cable 3. The external interface 26a has a function of converting data to be signaled from the server apparatus 2 into data of a format for signaling and a function of converting data supplied from the outside into data of a format in which the data can be processed in the server apparatus 2.

The transmission/reception control section 27 controls a communication process with the cradle 1 connected to the server apparatus 2 through the external interface 26a and the input/output terminal 26b. In particular, the transmission/reception control section 27 controls a process of transmitting information from the server apparatus 2 to the cradle 1 or a mobile apparatus 4 placed on the cradle 1 through the cradle 1 and a process of receiving information transmitted from the cradle 1 or the mobile apparatus 4 placed on the cradle 1 through the cradle 1.

The erasure data extraction section 28 receives, from a mobile apparatus placed on the cradle 1, provision of data accumulated in the mobile apparatus, that is, accumulated data, and backup records the data on a hard disk of the hard disk driver 30. Further, the erasure data extraction section 28 detects and specifies data to be erased from the mobile apparatus from among the backed up accumulation data.

Although a detailed extraction process is hereinafter described, where accumulated data are estimated to be significant since, for example, protect information or printing marking is added thereto, they are specified as accumulated data to be maintained, but those accumulated data which are not estimated to be significant are specified as erasure data to be erased.

Those data specified as data to be erased by the erasure data extraction section 28 are conveyed to the mobile apparatus through the cradle 1 so that they may be erased from the mobile apparatus thereby to assure a storage capacity of the memory of the mobile apparatus 4.

The writing back data production section 29 compresses erasure data to produce compressed data and returns the compressed data to the mobile apparatus 4 in order to allow the mobile apparatus 4 to recognize, for example, what accumulated data have been extracted and specified by the erasure data extraction section 28 and erased from the memory of the mobile apparatus 4.

Naturally, writing back data are not restrictively formed based on erasure data and used for such writing back as described above, but writing back data or provision data here may be formed from various data to be provided to the mobile apparatus 4 and then provided to the mobile apparatus 4. It is to be noted that, in the following description, it is described that writing back data are produced from accumulated data to be erased from the mobile apparatus 4 for simplified description.

For example, where accumulated data to be erased are still image data, the writing back data production section 29 may produce and prepare a reduced image of the still image data as writing back data. Where accumulated data to be erased are moving image data, the writing back data production section 29 may produce and prepare moving image data of a digest version for reproducing a digest image of the moving image data. Where accumulated data to be erased are music data, the writing back data production section 29 may produce and prepare music data of a reduction version including, for example, only a top portion of the music data for several to approximately 10 seconds.

It is to be noted that, in the data communication system, since the mobile apparatus 4 handles still image data or moving image data, for example, like a camera-equipped portable telephone terminal, a digital still camera or a digital video camera, production of writing back data based on data of an erasure object is described above. However, production of writing back data is not limited to this.

As described hereinabove, for example, where the mobile apparatus is a portable music reproduction apparatus, a portable image and sound reproduction apparatus or the like, music data or AV data which have newly become applicable to such apparatus may be prepared, or notification data for the notification of the substance of such music data or AV data may be prepared. In other words, the writing back data production section 29 has a function of preparing not only data formed in response to data of an erasure object but also data and so forth which have newly become available for a mobile apparatus.

It is to be noted that the functions of the transmission/reception control section 27, erasure data extraction section 28 and writing back data production section 29 which are each indicated by double lines in FIG. 3 can be implemented as functions of the control section 21 by a program or software executed by the CPU 211.

The hard disk driver includes a hard disk and a driver, and records data supplied thereto on the hard disk and reads out data recorded on the hard disk under the control of the control section 11.

The display interface 31a forms image data to be provided to an external display apparatus and outputs the image data to the output terminal 31b for an image signal under the control of the control section 11. Accordingly, an external display apparatus is connected to the output terminal 31b for an image signal.

Thus, the server apparatus 2 can receive a placement notification transmitted thereto through the input/output terminal 14b and the external interface 14a from the cradle 1 or receive accumulated data from the mobile apparatus and accumulate the received information or data on the hard disk of the hard disk driver 30.

Further, the server apparatus 2 can transmit an erasure instruction of erasure data extracted and specified by the erasure data extraction section 28 or writing back data produced and prepared by the writing back data production section 29 through the external interface 14a and the input/output terminal 14b under the control of the transmission/reception control section 27 so as to be transmitted to the mobile apparatus placed on the cradle 1 through the cradle 1.

In this manner, in the server apparatus 2, the external interface 26a and the input/output terminal 26b implement a function as a communication section, and the writing back data production section 29 implements a function as a data preparation section. Further, the transmission/reception control section 27 implements a function as a communication control section.

Further, the hard disk driver 30 implements a function as a transmission history storage section and a function as a storage section for storing and retaining accumulated data from a mobile apparatus. The erasure data extraction section 28 and the control section 21 cooperate to implement a function as an erasure instruction formation section.

[Example of a Configuration of a Mobile Apparatus]

Figure 4:
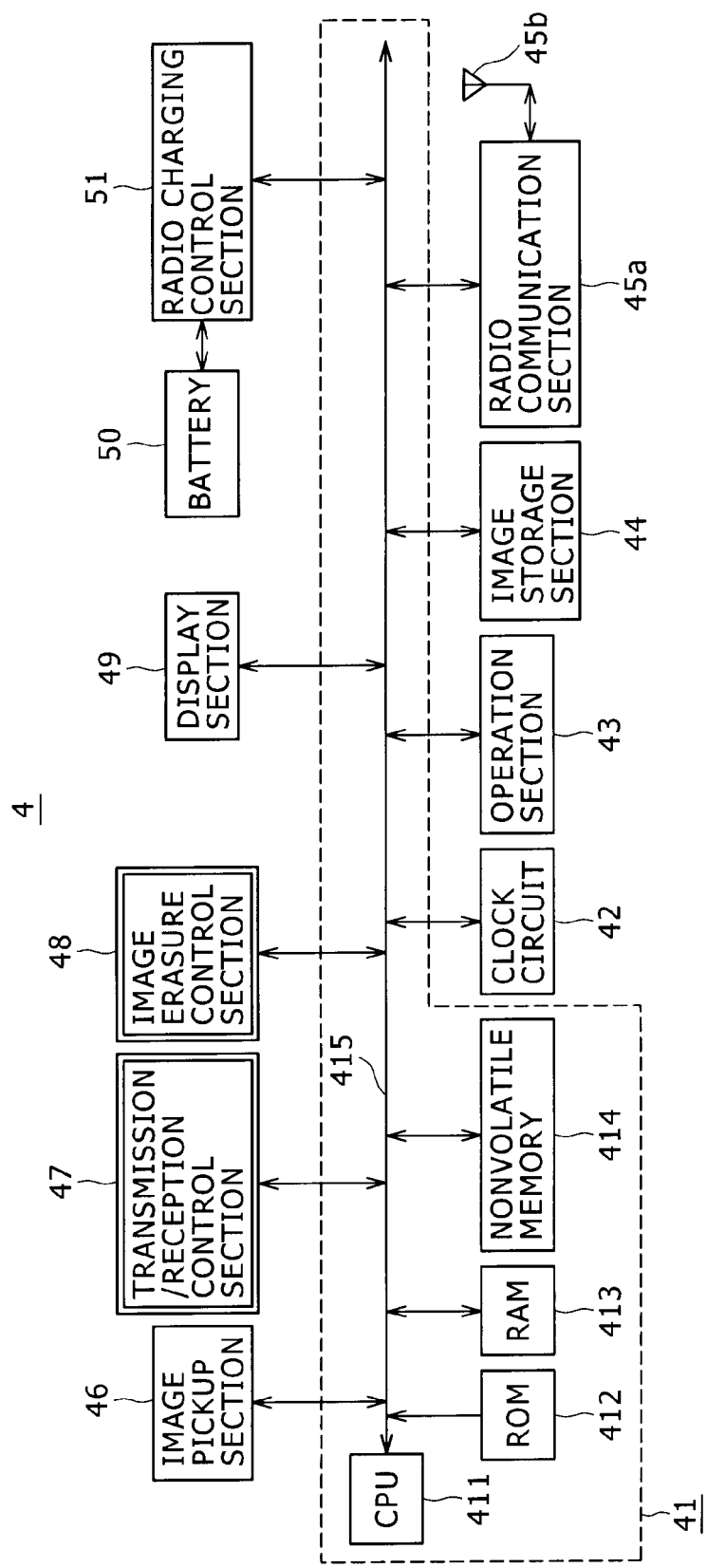
FIG. 4 is a block diagram showing an example of a configuration of a digital still camera or a digital video camera which is an example of a mobile apparatus which is placed on the cradle used in the data communication system shown in FIG. 1.

FIG. 4 shows an example of a configuration of a mobile apparatus 4 which can be placed on the cradle 1 of the data communication system and can communicate with and be charged by the cradle 1. The mobile apparatus 4 may have various forms such as a camera-equipped portable telephone terminal, a digital still camera or a portable music reproduction apparatus as described hereinabove. However, in the following description, it is assumed that the mobile apparatus 4 is a digital still camera or a digital video camera for simplified description.

Referring to FIG. 4, the mobile apparatus 4 shown includes a control section 41, a clock circuit 42, an operation section 43, an image storage section 44, a radio communication section 45a, a transmission/reception antenna 45b, and an image pickup section 46. The mobile apparatus 4 further includes a transmission/reception control section 47, an image erasure control section 48, a display section 49, a battery 50, and a radio charging control section 51.

The control section 41 controls the components of the mobile apparatus 4 and is a microcomputer including a CPU 411, a ROM 412, a RAM 413 and a nonvolatile memory 414 connected to each other by a CPU bus 415.

The CPU 411 serves as a core of control which executes a program stored and retained in the ROM 412 to produce and supply control signals to pertaining components of the mobile apparatus 4 to control the components. The ROM 412 stores programs to be executed by the CPU 411 as described above and data and so forth required for various processes in advance therein.

The RAM 413 is used as a working area principally for temporarily storing midway results of processing and so forth. The nonvolatile memory 414 may be formed from an EEPROM, a flash memory or the like and stores and retains data to be retained even if power supply to the mobile apparatus 4 is turned off such as, for example, various setting parameters and additional programs for additional provision of functions.

The clock circuit 42 includes a calendar function and provides the year, month and day at present, a day of the week at present and the time at present. The operation section 43 has various operation keys, operation dials and operation levers, and can accept an operation input from a user, convert the operation input into an electric signal and send the electric signal to the control section 41. Consequently, an instruction input accepted through the operation section 43 is supplied as an electric signal to the control section 41, and the control section 41 can control the components of the mobile apparatus 4 in response to an instruction from the user to carry out a process in accordance with the instruction of the user.

The image storage section 44 includes a recording medium, a driver section and so forth and receives supply of and stores and retains still image data or moving image data obtained by image pickup through the image pickup section 46 under the control of the control section 41. The recording medium may have various forms such as a hard disk, a semiconductor memory, an optical disk such as a DVD and so forth, and may be built in the image storage section 44 or may be removably loaded into the image storage section 44. It is assumed that, in the mobile apparatus 4, the image storage section 44 includes a built-in hard disk as a recording medium.

The radio communication section 45a and the transmission/reception antenna 45b, as well as the radio communication section 15a and the transmission/reception antenna 15b of the cradle 1, carry out data communication by short distance wireless communication with the cradle 1. Accordingly, the radio communication section 45a and the transmission/reception antenna 45b can use a wireless communication technique such as, for example, the UWB (Ultra Wide Band) or the Bluetooth or various other short distance wireless communication techniques to carry out radio communication with the cradle 1.

The image pickup section 46 includes image pickup devices such as an objective lens, an iris mechanism, a shutter mechanism, a CCD (Charge Coupled Device), a CMOS (Complementary Metal Oxide Semiconductor) image sensor and so forth, a mathematical operation circuit, and so forth. The image pickup section 46 can fetch an image of an image pickup object as an electric signal and convert the electric signal into a digital signal. Still image data or moving image data converted into a digital signal by the image pickup section 46 are recorded on a recording medium of the image storage section 44 through the control section 41 as described hereinabove.

The transmission/reception control section 47 controls communication with the cradle 1 through the radio communication section 45a and the transmission/reception antenna 45b. In particular, the transmission/reception control section 47 receives information from the cradle 1 through the radio communication section 45a and the transmission/reception antenna 45b and transmits transmission information produced by the control section 41 to the cradle 1 through the radio communication section 45a and the transmission/reception antenna 45b. In other words, the transmission/reception control section 47 controls communication of data between the mobile apparatus 4 and the cradle 1.

The image erasure control section 48 controls a process of erasing, when it receives a data erasure request from the server apparatus 2 transmitted through the transmission/reception antenna 45b and the radio communication section 45a and further through the cradle 1, still image data or moving image data designated so as to be erased from among still image data or moving image data recorded on the recording medium of the image storage section 44 from the recording medium of the image storage section 44 in accordance with the received data erasure request.

It is to be noted that the functions of the transmission/reception control section 47 and the image erasure control section 48 indicated by double solid lines in FIG. 4 can be implemented also as functions of the control section 41 by a program or software executed by the CPU 411 of the control section 41.

The battery 50 accumulates power to be supplied to the components of the mobile apparatus 4. The radio charging control section 51 supplies power supplied thereto through the charging control section 19 of the cradle 1 to the battery 50 to control a charging process of the battery 50. The radio charging control section 51 and the battery 50 can cooperate with each other to receive supply of power from the cradle 1 to charge the battery 50.

The mobile apparatus 4 can record still image data or moving image data picked up through the image pickup section 46 into the image storage section 44. Various image data recorded in the image storage section 44 can be accumulated on the hard disk of the server apparatus 2, that is, backed up by the hard disk when the mobile apparatus 4 is placed on the cradle 1, whereupon the transmission/reception control section 47 and the radio communication section 45a function to transmit the image data to the server apparatus 2 through the cradle 1.

Further, if the mobile apparatus 4 receives an erasure request for image data from the server apparatus 2 transmitted thereto through the transmission/reception antenna 45b and the radio communication section 45a and further through the cradle 1, then the image erasure control section 48 functions to control the image storage section 44 to erase image data, which have become unnecessary for the mobile apparatus 4 as a result of backup thereof into the server apparatus 2, from the recording medium of the image storage section 44 so that the storage capacity of the recording medium of the image storage section 44 may be assured.

On the other hand, if writing back data from the server apparatus 2 transmitted through the cradle 1 are received through the transmission/reception antenna 45b and the radio communication section 45a, then the transmission/reception control section 47 can control the image storage section 44 to record the writing back data from the server apparatus 2 on the storage medium of the image storage section 44.

In this manner, only if the mobile apparatus 4 is placed on the cradle 1, then if it carries out data communication through the cradle 1, then backup of data into the server apparatus 2, an erasure process of data stored and retained in the image storage section 44 in accordance with an instruction from the server apparatus 2 and a recording process of writing back data from the server apparatus 2 into the image storage section 44 can be carried out. Besides, also charging of the battery 50 of the mobile apparatus 4 can be carried out through the cradle 1.

[Operation of the Data Communication System]

Now, general operation of the data communication system is described with reference to timing charts of FIGS. 5 and 6. As described hereinabove with reference to FIG. 1, the cradle 1 and the server apparatus 2 are connected by wire connection using the interface cable 3. Meanwhile, the cradle 1 is connected by wireless connection to the mobile apparatus 4 placed thereon using a short distance wireless communication technique.

Further, as described below, the mobile apparatus 4 placed on the cradle 1 and the server apparatus 2 connected by wire connection to the cradle 1 communicate with each other through the cradle 1.

While the power supply to the cradle 1 is on, the cradle 1 determines after every predetermined interval of time using the function of the placement detection section 16 whether or not a mobile apparatus 4 is placed thereon (step S1). As described hereinabove, the cradle 1 is configured such that a plurality of mobile apparatus can be placed at a time thereon, and every time a new mobile apparatus is placed on the cradle 1, the cradle 1 can determine that a mobile apparatus is placed thereon.

Then, if it is determined in the decision process at step S1 that no mobile apparatus 4 is placed, then the decision process at step S1 is repeated to wait that a mobile apparatus is placed. If it is determined in the decision process at step S1 that a mobile apparatus 4 is placed, then the transmission/reception control section 17 of the cradle 1 controls the radio communication section 15a to transmit a request for inquiry about an apparatus ID to the mobile apparatus 4 placed newly on the cradle 1 (step S2).

The mobile apparatus 4 receives the request for inquiry about an apparatus ID from the cradle 1 through the transmission/reception antenna 45b and the radio communication section 45a, and the transmission/reception control section 47 of the mobile apparatus 4 controls the radio communication section 45a to transmit the apparatus ID of the mobile apparatus 4 to the cradle 1 (step S3).

The cradle 1 receives the apparatus ID from the mobile apparatus 4 newly placed thereon through the transmission/reception antenna 15b and the radio communication section 15a, and the transmission/reception control section 17 of the cradle 1 controls the external interface 14a to report the apparatus ID from the mobile apparatus 4 to the server apparatus 2 (step S4). Consequently, the server apparatus 2 recognizes that a new mobile apparatus is placed on the cradle 1. Then, the cradle 1 executes a starting process for charging of the mobile apparatus 4 placed newly thereon.

Meanwhile, the server apparatus 2 receives the apparatus ID report from the mobile apparatus 4 placed newly on the cradle 1 through the input/output terminal 26b and the external interface 26a. Then, the transmission/reception control section 27 of the server apparatus 2 controls the external interface 26a to transmit a request for an accumulated data list, which is a request for provision of a list of accumulated data, to the mobile apparatus 4 which is specified from the received apparatus ID (step S6).

The request for an accumulated data list is received by the cradle 1 through the input/output terminal 14b and the external interface 14a and is transmitted to the mobile apparatus 4 through the radio communication section 15a and the transmission/reception antenna 15b under the control of the transmission/reception control section 17.

The mobile apparatus 4 receives the request for an accumulated data list from the server apparatus 2 through the transmission/reception antenna 45b and the radio communication section 45a. Thus, the control section 41 of the mobile apparatus 4 forms an accumulated data list based on image data stored and retained in the image storage section 44, and the transmission/reception control section 47 controls the radio communication section 45a to transmit the accumulated data list (step S7).

The accumulated data list is received by the cradle 1 through the transmission/reception antenna 15b and the radio communication section 15a and is transmitted to the server apparatus 2 through the external interface 14a and the input/output terminal 14b under the control of the transmission/reception control section 17.

The server apparatus 2 receives the accumulated data list from the mobile apparatus 4 through the input/output terminal 26b and the external interface 26a and stores the accumulated data list into a predetermined region of the hard disk of the HDD 30 (step S8). Then, the control section 21 of the server apparatus 2 forms a request for new accumulated data, which is a request for provision of data accumulated newly, based on the stored accumulated data list. Then, the transmission/reception control section 27 controls the external interface 26a to transmit the request for new accumulated data (step S9).

The request for new accumulated data is information for specifying data which has not been provided as yet and should be provided newly based on the date and time of production of the accumulated data list from the mobile apparatus 4 and the date and time of production of accumulated data provided already from the mobile apparatus 4 and requesting provision of the specified data to the mobile apparatus 4.

It is to be noted that the request for new accumulated data may be formed so as to request image data collectively, for example, like all of image data whose date and time of production is later than the ddth day of the mm month of the yy year or so as to specify and request image data which should be provided using a data ID added to each accumulated data.

The request for new accumulated data is received by the cradle 1 through the input/output terminal 14b and the external interface 14a and is then transmitted to the mobile apparatus 4 through the radio communication section 15a and the transmission/reception antenna 15b under the control of the transmission/reception control section 17.

The mobile apparatus 4 receives the request for new accumulated data from the server apparatus 2 through the transmission/reception antenna 45b and the radio communication section 45a. The control section 41 of the mobile apparatus 4 extracts requested new accumulated data from among image data stored and retained in the image storage section 44, and the transmission/reception control section 47 controls the radio communication section 45a to transmit the extracted new accumulated data (step S10).

The new accumulated data is received by the cradle 1 through the transmission/reception antenna 15b and the radio communication section 15a and then transmitted to the server apparatus 2 through the external interface 14a and the input/output terminal 14b under the control of the transmission/reception control section 17.

The server apparatus 2 receives the new accumulated data from the mobile apparatus 4 through the input/output terminal 26b and the external interface 26a, and the control section 21 of the server apparatus 2 stores the new accumulated data into a predetermined region of the hard disk of the HDD 30 (step S11). In this manner, accumulated data such as image data in the mobile apparatus 4 placed on the cradle 1 can be backed up into the HDD 30 of the server apparatus 2 through the cradle 1.

Figure 6:
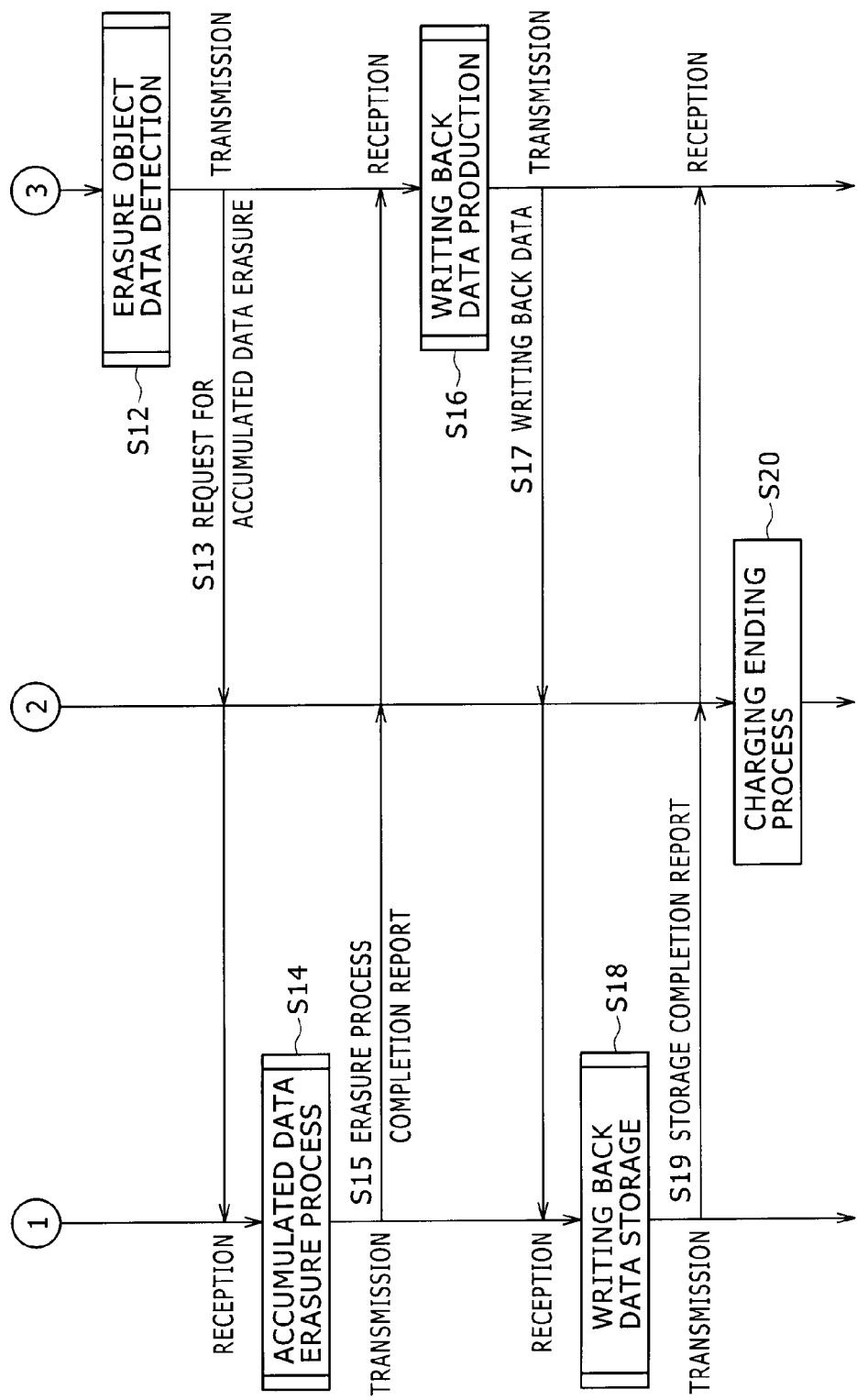

Referring now to FIG. 6, the server apparatus 2 detects data to be erased from among the image data stored in the image storage section 44 of the mobile apparatus 4 based on the acquired new accumulated data (step S12). While details of the erasure object data detection process are hereinafter described, the erasure object data process is a process of confirming additional information added to each of image data as new accumulated data and specifying all image data as an object of erasure except those image data which can be estimated as important image data based on the confirmed additional information. In this instance, such estimation may be carried out such that, if the additional information indicates that a deletion protect for preventing deletion is applied to the image data, if printing marking which indicates that it is necessary to print the information is applied to the image data or if the number of times of use should be updated, then the image data is estimated as important image data.

Therefore, the server apparatus 2 forms a request for erasure of accumulated data indicative of erasure of image data specified as erasable image data based on the detection process at step S12. Further, the transmission/reception control section 27 of the server apparatus 2 controls the external interface 26a to transmit the request for accumulated data erasure (step S13).

The request for accumulated data erasure is received by the cradle 1 through the input/output terminal 14b and the external interface 14a and is then transmitted to the mobile apparatus 4 through the radio communication section 15a and the transmission/reception antenna 15b under the control of the transmission/reception control section 17.

The mobile apparatus 4 receives the request for accumulated data erasure from the server apparatus 2 through the transmission/reception antenna 45b and the radio communication section 45a. Then, the image erasure control section 48 of the mobile apparatus 4 controls the image storage section 44 to execute a process of erasing image data whose erasure is designated from the image storage section 44 (step S14).

After the designated erasure of the image data ends, the control section 41 of the mobile apparatus 4 forms an erasure process completion report and transmits the erasure process completion report through the radio communication section 45a and the transmission/reception antenna 45b under the control of the transmission/reception control section 47 (step S15).

The erasure process completion report is received by the cradle 1 through the transmission/reception antenna 15b and the radio communication section 15a and is then transmitted to the server apparatus 2 through the external interface 14a and the input/output terminal 14b under the control of the transmission/reception control section 17.

The server apparatus 2 receives the erasure completion report from the mobile apparatus 4 through the input/output terminal 26b and the external interface 26a. Then, the writing back data production section 29 functions to produce writing back data based on the image data to be erased from the image storage section 44 of the mobile apparatus 4. In this instance, the writing back data production section 29 of the server apparatus 2 determines what writing back data should be produced in response to an apparatus attribute of the mobile apparatus 4, a type of accumulated data of a processing object, an accumulation history of accumulated data stored and retained in the mobile apparatus 4 itself or an instruction input from the user.

Here, it is assumed that an apparatus attribute indicating that the mobile apparatus 4 is a digital still camera is reported upon reporting of an apparatus ID at step S4. In this instance, since it can be recognized from an apparatus attribute that accumulated data of an erasure object are still image data, image data of accumulated data of an object of erasure is subjected to a reduction process to produce writing back data to be written back into the mobile apparatus 4 (step S16). In this instance, the writing back data production section 29 forms image data of a size equal to several fractions to several tens fractions of original image data as writing back data.

Then, the transmission/reception control section 27 of the server apparatus 2 controls the external interface 26a to transmit the writing back data to the mobile apparatus 4 (step S17). The writing back data are received by the cradle 1 through the input/output terminal 14b and the external interface 14a and then transmitted to the mobile apparatus 4 through the radio communication section 15a and the transmission/reception antenna 15b under the control of the transmission/reception control section 17.

The mobile apparatus 4 receives the writing back data through the transmission/reception antenna 45b and the radio communication section 45a, and the control section 41 of the mobile apparatus 4 stores the received writing back data into the image storage section 44 (step S18). This writing back data is image data which has been accumulated in the mobile apparatus 4 and indicates a reduced image of the image data to be erased after backed up into the HDD 30 of the server apparatus 2.

Accordingly, the reduced image of the writing back data from the server apparatus 2 is displayed on the display screen of the display section 49 so that it can be confirmed what image is erased after backed up into the server apparatus 2. Then, if necessary, the image data backed up in the server apparatus 2 can be utilized, or can be recorded into the image storage section 44 of the mobile apparatus 4 such that it can be utilized again on the mobile apparatus 4.

After the storage of the writing back data at step S18 ends, the control section 41 of the control section 41 forms a storage completion report and transmits the storage completion report through the radio communication section 45a and the transmission/reception antenna 45b under the control of the transmission/reception control section 47 (step 19).

The storage completion report is received by the cradle 1 through the transmission/reception antenna 15b and the radio communication section 15a, and transmitted by control of the transmission/reception control section 17 to the server apparatus 2 through the external interface 14a and the input/output terminal 14b.

The server apparatus 2 receives the storage completion report through the input/output terminal 26b and the external interface 26a. Consequently, the control section 21 of the server apparatus 2 can recognize that transmission and reception of data to and from the mobile apparatus 4 placed newly on the cradle 1 is completed appropriately.

Thereafter, the cradle 1 executes a charging ending process (step S20). Then, if the battery of the mobile apparatus 4 is placed into an overcharged state and the charging process is completed, then the series of processes where a new mobile apparatus is placed on the cradle 1 in the data communication system described hereinabove with reference to FIGS. 5 and 6 is completed.

In this manner, in the data communication system, only if a mobile apparatus 4 is placed on the cradle 1 connected to the server apparatus 2, then accumulated data accumulated in the mobile apparatus 4 can be transmitted to the server apparatus 2 through the cradle 1 and stored as backup data into the HDD 30 of the server apparatus 2.

Further, if the functions of the server apparatus 2 are used such that erasure object data which can be erased from among accumulated data backed up from the mobile apparatus 4 is detected and a request for accumulated data erasure is provided from the server apparatus 2 to the mobile apparatus 4, then the storage area of the image storage section 44 of the mobile apparatus 4 can be arranged thereby to achieve efficient utilization of the image storage section 44 of the mobile apparatus 4.

Furthermore, writing back data for being written back into the mobile apparatus 4 is produced based on accumulated data backed up from the mobile apparatus 4 into the server apparatus 2 and to be erased from the mobile apparatus 4 such that it can be written back into the mobile apparatus 4. This writing back data is, as described above, where the accumulated data is still image data, a reduced image as described hereinabove, and is information having a data amount compressed from that of the original image data. Consequently, the mobile apparatus 4 can manage what accumulated data is determined to be erased after backed up into the server apparatus 2 without wastefully using the storage capacity of the image storage section 44.

It is to be noted that, if the mobile apparatus 4 placed on the cradle 1 does not include data to be backed up into the server apparatus 2, then the processing advances to step S16 illustrated in FIG. 6, at which a process of forming information which has newly become able to be provided and providing the formed information to the mobile apparatus 4 is carried out. In particular, if the mobile apparatus 4 placed on the cradle 1 does not include data to be backed up into the server apparatus 2, then a charging process and a writing back data providing process can be executed.

[Examples of a Layout of Data to be Transmitted/Received]

Now, examples of a layout of data to be communicated between different apparatus in the data communication system described above with reference to FIGS. 5 and 6 are described.

[Example of a Layout of Command Data]

FIGS. 7A to 7C illustrate an example of a layout of command data and a particular example of the layout. Referring first to FIG. 7A, command data to be communicated between different apparatus include "transmission designation ID", "transmission source ID", "command information indicative of the substance and so forth of a command or an instruction" and "data necessary for execution of the command or instruction and data to be advised", and so forth.

Figure 5:
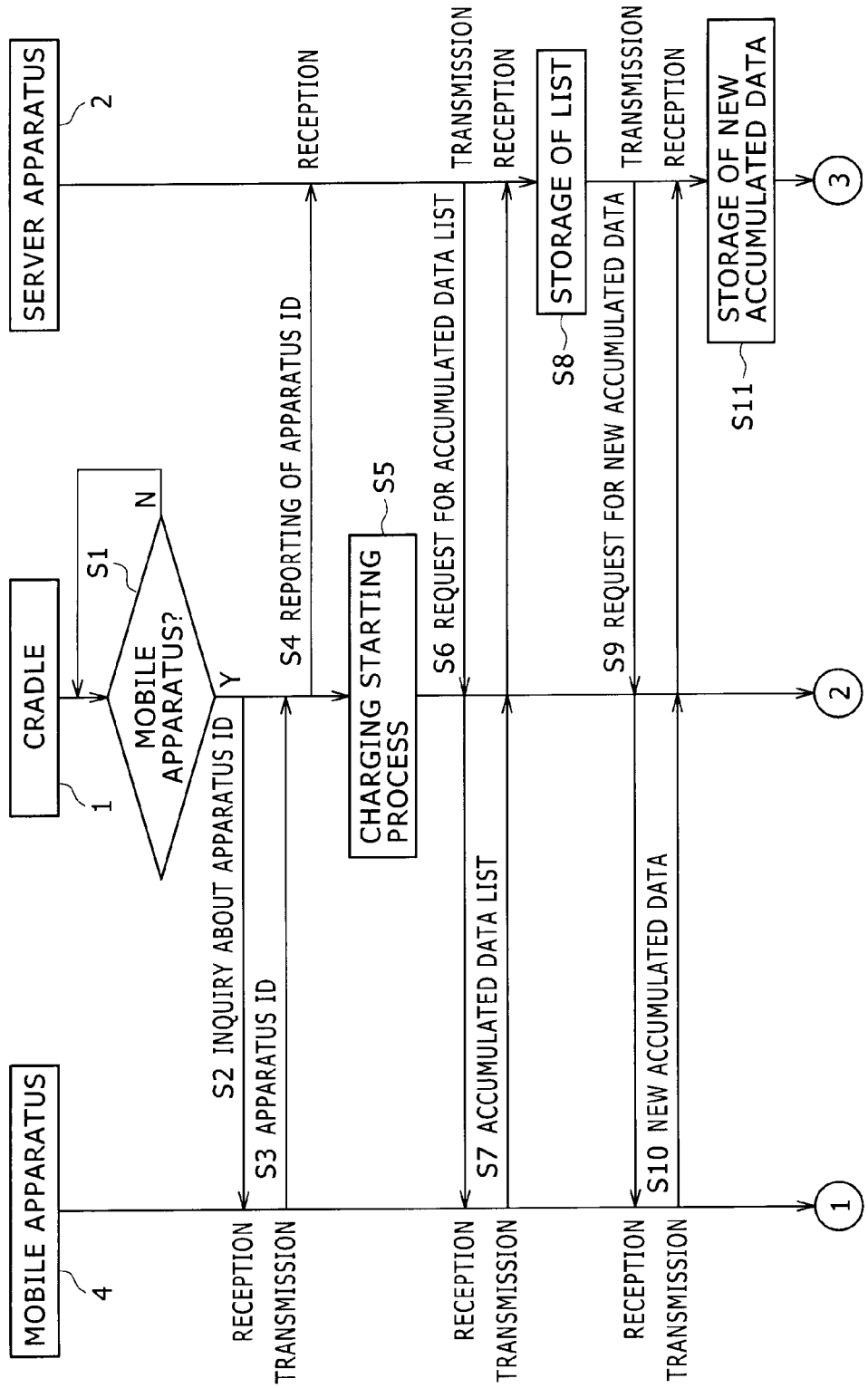
FIGS. 5 and 6 are timing charts illustrating operation of the entire data communication system of FIG. 1.

FIG. 7B illustrates an example of command data for inquiry about an apparatus ID to be transmitted from the cradle 1 to a mobile apparatus 4 placed newly at step S2 of the sequence diagram illustrated in FIG. 5. As seen in FIG. 7B, in response to an inquiry about an apparatus ID, "information representative of a non-responding apparatus" is inputted to the transmission destination ID; an "apparatus ID of the cradle 1" is inputted to the transmission source ID; and "information representative of an inquiry about an apparatus ID" is inputted to the information representative of a command.

Here, the "information representative of a non-responding apparatus" is information indicative of an apparatus which has not yet communicated with the cradle 1. For example, if the apparatus ID is represented by five alphanumeric characters, then the "information representative of a non-responding apparatus" is determined in advance like "00000". Then, it is determined that, from among mobile apparatus which receive the "information representative of a non-responding apparatus" as the transmission destination ID, any mobile apparatus which does not have a communication history with the cradle 1 is determined as a non-responding apparatus. Then, a process in accordance with the command information received, in the present case, notification of an apparatus ID, is carried out.

FIG. 7C illustrates an example of an apparatus ID response transmitted from a mobile apparatus 4, which is newly placed on the cradle 1 at step S3 of the sequence diagram shown in FIG. 5 but does not yet carry out communication, to the cradle 1 when the mobile apparatus 4 receives the apparatus ID inquiry command illustrated in FIG. 7B.

As seen in FIG. 7C, in the apparatus ID response, an "apparatus ID of the cradle 1" is inputted to the transmission destination ID, an "apparatus ID of the mobile apparatus 4" is inputted to the transmission source ID, and "information representing that this is a response of an apparatus ID" is inputted to the information indicative of the command. Consequently, the cradle 1 can recognize the apparatus ID of the mobile apparatus 4 from the transmission source ID.

Then, in the example described, also an apparatus attribute and other information are conveyed from the mobile apparatus 4 to the cradle 1 through the apparatus ID response. The apparatus attribute represents a type or kind of an apparatus such as whether the mobile apparatus 4 is a digital still camera, a digital video camera, a portable telephone terminal or the like. From the apparatus attribute, the cradle 1 can recognize what mobile apparatus the mobile apparatus 4 is and what data is handled by the mobile apparatus 4.

It is to be noted that command information regarding (1) the "apparatus ID report" transmitted from the cradle 1 to the server apparatus 2 at step S4, (2) the "accumulated data list request" transmitted from the server apparatus 2 to the mobile apparatus 4 at step S6, (3) the "new accumulated data request" transmitted from the server apparatus 2 to the mobile apparatus 4 at step S9, (4) the "accumulated data erasure request" transmitted from the server apparatus 2 to the mobile apparatus 4 at step S13, (5) the "erasure process end report" transmitted from the mobile apparatus 4 to the server apparatus 2 at step S15 and (6) the "storage completion report" transmitted from the mobile apparatus 4 to the server apparatus 2 at step S19 in the sequence diagrams of FIGS. 5 and 6 is communicated in a form illustrated in FIG. 7A, that is, in the form of the transmission destination ID, transmission source ID, command information and other data.

[Example of a Layout of an Accumulated Data List]

FIG. 8 illustrates an example of a layout of an accumulated data list produced by the mobile apparatus 4 and transmitted from the mobile apparatus 4 to the server apparatus 2 at step S7 described hereinabove with reference to FIG. 5.

Referring to FIG. 8, the accumulated data list illustrated has a transmission destination ID, a transmission source ID, a data attribute and other information as header information of the overall accumulated data list. The transmission destination ID is an apparatus ID of an apparatus which is a transmission destination of the accumulated data list. The transmission source ID is an apparatus ID of a mobile apparatus 4 which transmits the accumulated data list. The data attribute indicates that the overall information forms the accumulated data list. The other information may include date information such as the date and time of production and the date and time of transmission of the accumulated data list, as well as various other information.

Further, for each of pieces of information accumulated in the mobile apparatus 4, information including a data ID, a data attribute, a production date and time, a data size and other information is formed, and an accumulated data list is formed from such information. Here, the data ID is information for specifying each data and particularly corresponds to the file name of each data. The data attribute is information representative of whether the data is still image data, moving image data, sound data, text data or the like.

The production date and time represents a date and time at which the accumulated data was produced and includes also the date and time at which the accumulated data was acquired by the mobile apparatus. Further, the data size represents the size or capacity of the accumulated data. The other information may be additional information and may include various kinds of information such as text data of memory information incidental to each accumulated data.

Such an accumulated data list as described above is produced by the mobile apparatus 4 in accordance with a request for an accumulated data list from the server apparatus 2 and is transmitted from the mobile apparatus 4 to the server apparatus 2 at step S7 described hereinabove with reference to FIG. 5.

Consequently, the server apparatus 2 can accurately recognize what information is accumulated in the mobile apparatus 4. Then, the server apparatus 2 can specify accumulated data to be provided newly from the mobile apparatus 4 based on the information of the production date and time of each data of the accumulated data which have already accumulated in the server apparatus 2 supplied from the mobile apparatus 4 and the accumulated data list provided newly from the mobile apparatus 4.

[Example of a Layout of Accumulated Data]

FIG. 9 illustrates an example of a layout of accumulated data. Referring to FIG. 9, the accumulated data includes a header information part and an actual data part. In the example illustrated, the header information of the accumulated data includes an apparatus ID, a data ID, a data attribute, a production date and time, protect information, a print mark, a data size, the number of times of use and other information. Here, the apparatus ID is information which specifies an apparatus in which the accumulated data is accumulated. The data ID can uniquely specify the accumulated data.

The data attribute is information indicative of a type of data such as whether the accumulated data is still image data, moving image data or sound data. The production date and time is information representative of a date and time at which the accumulated data was produced. The protect information is flag information indicative of whether or not the accumulated data should be deleted, and is set to "on" where the accumulated data should be protected so as not to be deleted but is set to "off" where the accumulated data may be deleted as occasion demands.

The print mark is information corresponding to the printing marking described hereinabove and designating in advance that the accumulated information requires printing. The data size indicates the size of the accumulated data, and the number of times of use indicates a number of times by which the accumulated information is used in the mobile apparatus 4. The other information may include, for example, comment information regarding the accumulated data.

In this manner, the accumulated data accumulated in the mobile apparatus 4 has such a format that actual data is added to the head information, which includes the various information. Here, the actual data is main data which becomes an object of accumulation such as still image data, moving image data, sound data and text data. In the present embodiment, the actual data is, for example, still image data.

Such accumulated data as described above is transmitted from the mobile apparatus 4 to the server apparatus 2 in response to a request for new accumulated data at step S9 of FIG. 5. The request for new accumulated data transmitted from the server apparatus 2 to the mobile apparatus 4 at step S9 of FIG. 5 has, as described hereinabove with reference to FIG. 7, a transmission destination ID, a transmission source ID and command information representing that the request is a request for new accumulated data. The request for new accumulated data further includes, as the other data, a data ID of accumulated data desired to be provided, information indicative of the date and time of production of the accumulated data to be provided, and so forth.

It is to be noted that, where accumulated data to be provided are designated using a data ID and besides a plurality of accumulated data are desired to be provided, command data including data IDs of all of accumulated data desired to be provided may be transmitted to the mobile apparatus 4. Further, information which designates a date and time of production of accumulated data desired to be provided may designate only one particular day or may designate a date and time through a range like "a starting date and time to an ending date and time".

In response to such a request for new accumulated data from the server apparatus 2 to the mobile apparatus 4 as described above, the mobile apparatus 4 extracts accumulated data desired to be provided from among the data accumulated in a form illustrated in FIG. 9 in the image storage section 44 of the mobile apparatus 4 or the like, and transmits the extracted accumulated data to the server apparatus 2 at step S10 illustrated in FIG. 5.

[Example of a Layout of Writing Back Data]

Figure 10:
FIG. 10 is a diagrammatic view illustrating an example of a layout of writing back data.

FIG. 10 illustrates an example of a layout of writing back data produced at step S16 of the sequence diagram shown in FIG. 6 and transmitted from the server apparatus 2 to the mobile apparatus 4 at step S17. As seen in FIG. 10, the writing back data illustrated includes a header information part and a writing back data part.

In the example illustrated in FIG. 10, the header information of the writing back data includes a data ID, a data attribute, a date and time of reproduction, a data size, a providing destination, an original data ID, an original production date and time, an original data size and other information. Here, the data ID can be used to uniquely specify the writing back data. The data attribute is information representative of a type of the writing back data such as whether the writing back data is still image data, moving image data, sound data or the like. The production date and time is information indicative of the date and time at which the writing back data was produced in the server apparatus 2.

The data size represents the size of the writing back data, and the providing destination represents an apparatus ID of an apparatus to which the writing back data is to be provided. In the present embodiment, the writing back data is data to be returned to the mobile apparatus 4 from which the accumulated data has been provided to the server apparatus 2. The original data ID is data for specifying the original data of the writing back data, and the original production date and time is data representative of a date and time of reproduction of the original data. In addition, the original data size is data representative of the size of the original data. Further, the other information may be various information such as comment data regarding the writing back data.

In this manner, in the present embodiment, writing back data formed by the server apparatus 2 and returned to the mobile apparatus 4 has a form wherein the writing back data is added to the header information having various kinds of information. Here, the writing back data is formed in response to various accumulated data provided from the mobile apparatus 4 to the server apparatus 2.

Further, in the present embodiment, accumulated data provided from the mobile apparatus 4 to the server apparatus 2 is still image data as described hereinabove, and in the server apparatus 2, reduced image data of still image data provided is formed and returned as the writing back data to be provided to the mobile apparatus 4.

Consequently, as described hereinabove, accumulated data or still image data transmitted to and backed up by the server apparatus 2 is erased in response to a request for erasure of accumulated data supplied from the server apparatus 2 to the mobile apparatus 4 at step S13 illustrated in FIG. 6.

However, still image data erased after backed up into the server apparatus 2 is returned as reduced image data from the server apparatus 2 to the mobile apparatus 4. Consequently, the mobile apparatus 4 can manage what accumulated is erased after backed up into the server apparatus 2 without wastefully using the storage capacity of the image storage section 44.

[Example of a Layout of a Writing Back History]

FIG. 11 illustrates an example of a layout of a writing back history formed, for example, on the HDD 30 of the server apparatus 2 when the server apparatus 2 produces writing back data described hereinabove with reference to FIG. 10 and writes the writing back data into the mobile apparatus 4. As seen in FIG. 11, the writing back history illustrated includes a writing back date and time, a writing back destination, a data ID, a data attribute, a production date and time, a data size and other information.

The writing back date and time is information indicative of the date and time at which writing back data is produced and provided to an object electronic apparatus. The writing back destination is information including an apparatus ID or the like which specifies an electronic apparatus of the opposite party to which the produced writing back data is provided. The data ID is a data ID of the writing back data provided, and the data attribute is information representative of a type of the writing back data, that is, whether the writing back data is still image data, moving image data, sound data or the like.

The production date and time is information representative of a date and time at which the writing data was produced, and the data size is information representative of the size of the writing back data. Further, the other information may be information such as comment information regarding the accumulated data.

Then, such a writing back history as illustrated in FIG. 11 is stored into and retained in the server apparatus 2 so that the server apparatus 2 can accurately recognize time of production of writing back data, an attribute of the writing back data, time of writing back of the writing back data and an electronic apparatus of a destination of the writing back.

[Operation of the Component Apparatus of the Data Communication System]

Now, operation of each of the component apparatus of the data communication system described hereinabove with reference to FIGS. 1 to 11 is described in detail. In the following, operations of the cradle 1 positioned at the center of the data communication system, the server apparatus 2 which manages data through the cradle 1 and a mobile apparatus 4 placed on the cradle 1 are described in detail in this order. It is to be noted that the mobile apparatus 4 is a digital still camera as described hereinabove.

[Processing of the Cradle 1]

FIG. 12 is a flowchart which illustrates a process executed by the cradle 1 of the data communication system. The process illustrated in FIG. 12 is executed principally by the control section 11 and the transmission/reception control section 17 when the cradle 1 is in a state wherein the power supply thereto is on. It is to be noted that, as described hereinabove, the cradle 1 allows placement of a plurality of mobile apparatus at a time thereon and can execute the process illustrated in FIG. 12 in a multi-task fashion for a maximum number of mobile apparatus which can be placed on the cradle 1.

If the power supply is turned on, then the control section 11 controls the placement detection section 16 to start placement detection of a mobile apparatus and determines whether or not a mobile apparatus is placed on the cradle 1 (step S01). If it is determined at step S101 that no mobile apparatus is placed, then the placement detection of a mobile apparatus is repeated until a mobile apparatus is placed on the cradle 1.

If it is determined by the decision process at step S101 that a mobile apparatus is placed on the cradle 1, then the control section 11 forms command data for inquiry about an apparatus ID described hereinabove with reference to FIG. 7B. Then, the transmission/reception control section 17 controls the radio communication section 15a and the transmission/reception antenna 15b to transmit the command data to the mobile apparatus 4 newly placed on the cradle 1 (step S102).

Then, the transmission/reception control section 17 receives an apparatus ID response described hereinabove with reference to FIG. 7C from the mobile apparatus 4 through the transmission/reception antenna 15b and the radio communication section 15a and then reports the apparatus ID response to the server apparatus 2 through the external interface 14a and the input/output terminal 14b (step S103).

Then, the control section 11 controls the charging control section 19 to confirm a charging capacity of the newly placed mobile apparatus 4 (step S104). The process at step S104 can be implemented by an electric detection process such as detection of a voltage of the battery of the mobile apparatus 4.

Then, the control section 11 determines based on a result of the confirmation at step S104 whether or not the newly placed mobile apparatus 4 requires charging (step S105). If it is determined that the mobile apparatus 4 requires charging, then the control section 11 controls the charging control section 19 to start charging of the battery of the newly placed mobile apparatus 4 (step S106). On the other hand, if it is determined by the decision process at step S105 that the mobile apparatus 4 does not require charging, then the processing advances to step S107.

After the process at step S106 or after it is determined by the decision process at step S105 that the mobile apparatus 4 does not require charging, a series of relaying processes described below is executed. In particular, the transmission/reception control section 17 first receives a request for an accumulated data list from the server apparatus 2 through the input/output terminal 14b and the external interface 14a and transmits the request for an accumulated data list to the mobile apparatus 4 through the radio communication section 15a and the transmission/reception antenna 15b (step S107).

Thus, the transmission/reception control section 17 receives an accumulated data list from the mobile apparatus 4 through the transmission/reception antenna 15b and the radio communication section 15a and transmits the accumulated data list to the server apparatus 2 through the external interface 14a and the input/output terminal 14b (step S108). Then, the transmission/reception control section 17 receives a request for new accumulated data from the server apparatus 2 through the input/output terminal 14b and the external interface 14a and transmits the request for new accumulated data to the mobile apparatus 4 through the radio communication section 15a and the transmission/reception antenna 15b (step S109).

Thereafter, the transmission/reception control section 17 receives new accumulated data from the mobile apparatus 4 through the transmission/reception antenna 15b and the radio communication section 15a and transmits the new accumulated data to the server apparatus 2 through the external interface 14a and the input/output terminal 14b (step S110). Then, the transmission/reception control section 17 receives a request for erasure of accumulated data from the server apparatus 2 through the input/output terminal 14b and the external interface 14a and transmits the request for accumulated data erasure to the mobile apparatus 4 through the radio communication section 15a and the transmission/reception antenna 15b (step S111).

Then, the transmission/reception control section 17 receives an erasure process completion report from the mobile apparatus 4 through the transmission/reception antenna 15b and the radio communication section 15a and transmits the erasure process completion report to the server apparatus 2 through the external interface 14a and the input/output terminal 14b (step S112). Then, the transmission/reception control section 17 receives writing back data from the server apparatus 2 through the input/output terminal 14b and the external interface 14a and transmits the writing back data to the mobile apparatus 4 through the radio communication section 15a and the transmission/reception antenna 15b (step S113).

Then, the transmission/reception control section 17 receives a writing data storage completion report from the mobile apparatus 4 through the transmission/reception antenna 15b and the radio communication section 15a and transmits the writing back data storage completion report to the server apparatus 2 through the external interface 14a and the input/output terminal 14b (step S14). In this manner, a series of relaying processes between the server apparatus 2 and the mobile apparatus 4 is carried out by the processes at steps S107 to S114.

It is to be noted that, in the relaying process of accumulated data at step S108 or in the relaying process of writing back data at step S13, a large number of accumulated data or writing back data to be relayed may exist, and a transfer process for such a large number of data may naturally be executed at step S13.

Then, the control section 11 of the cradle 1 controls the charging control section 19 to confirm the charging capacity of the battery of the mobile apparatus 4 (step S115) and confirms whether or not the charging of the mobile apparatus 4 is completed (step S116). If it is determined by the confirmation process at step S116 that the charging is not yet completed, then the processes beginning with step S115 are repeated to continue the charging process. If it is determined by the decision process at step S116 that the charging of the mobile apparatus 4 is completed, then a predetermined process for ending the charging of the mobile apparatus 4 is executed (step S117), thereby ending the process illustrated in FIG. 12.

It is to be noted that, while, in the example illustrated in FIG. 12, the charging capacity is confirmed at step S115 and it is determined at step S116 whether or not the charging is completed, such decision is not limited to this. In particular, since it is determined whether or not charging is required in the decision process at step S105 and the charging process is not carried out where charging is not required, it is otherwise possible to determine, before the conformation of the charging capacity at step S115, whether or not charging is being executed, that is, whether or not power is being supplied to the mobile apparatus 4, and end, when it is determined that charging is not being executed, the process illustrated in FIG. 12 without carrying out the processes at steps S115 to S117.

[Processing of the Cradle 1]

Figure 13:
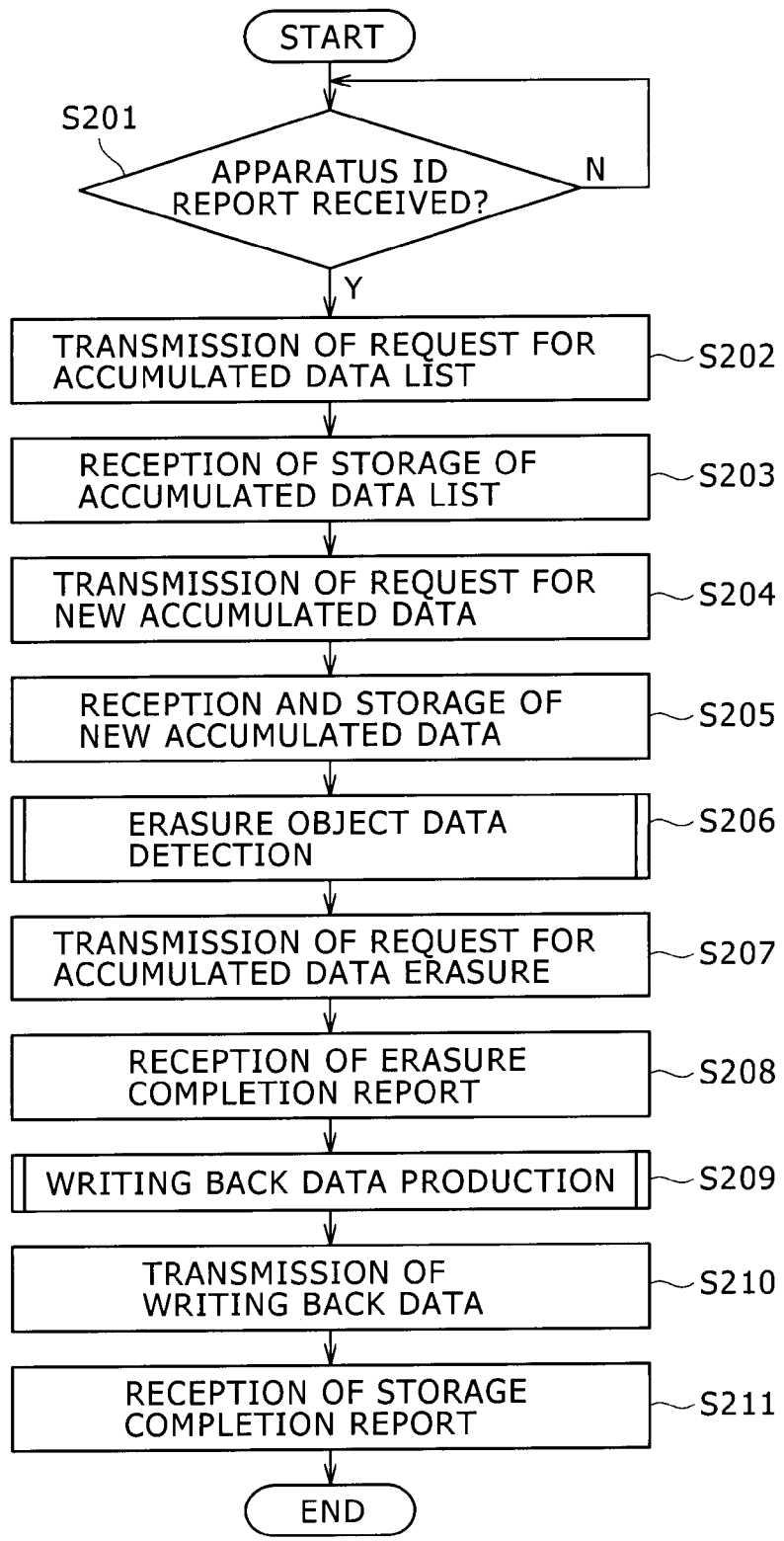
FIG. 13 is a flow chart illustrating a process carried out by the server apparatus.

FIG. 13 illustrates a process executed by the server apparatus 2 of the data communication system. The process illustrated in FIG. 13 is executed principally by the control section 21 and the transmission/reception control section 27 when the server apparatus 2 is in a state wherein the power supply is on.

If the power supply is connected, then the transmission/reception control section 27 of the server apparatus 2 determines whether or not an apparatus ID of a mobile apparatus 4 placed on the cradle 1 is received from the cradle 1 through the input/output terminal 26b and the external interface 26a (step S201). If it is determined by the decision process at step S201 that no apparatus ID is received as yet, then the process at step S201 is repeated to wait that an apparatus ID of a mobile apparatus 4 placed on the cradle 1 is received.

If it is determined by the decision process at step S201 that an apparatus ID is received from the cradle 1, then since it can be recognized that a mobile apparatus 4 is placed newly on the cradle 1, the control section 11 produces a request for an accumulated data list. Thus, the transmission/reception control section 27 transmits the request for an accumulated data list through the external interface 26a and the input/output terminal 26b so as to be transmitted to the mobile apparatus 4 newly placed on the cradle 1 through the cradle 1 (step S202).

Thereafter, the transmission/reception control section 27 receives an accumulated data list transmitted through the cradle 1 through the input/output terminal 26b and the external interface 26a and stores the accumulated data list, for example, into a predetermined area of the HDD 30 (step S203). Then, the control section 21 specifies those accumulated data which are not provided from the mobile apparatus 4 as yet based on the accumulated data list stored at step S203 and the accumulated data provided from the mobile apparatus 4 in the past and stored therein. Then, the control section 21 forms a request for provision of the specified accumulated data. Thus, the transmission/reception control section 27 transmits the request for new accumulated data through the external interface 26a so as to be transmitted to the mobile apparatus 4 placed on the cradle 1 through the cradle 1 (step S204).

Then, the transmission/reception control section 27 receives new accumulated data transmitted through the cradle 1 through the input/output terminal 26b and the external interface 26a and stores the new accumulated data, for example, into a predetermined area of the HDD 30 (step S205). It is to be noted that a plurality of new accumulated data may be transmitted from the mobile apparatus 4, and at step S205, such new accumulated data from the mobile apparatus 4 can be successively received and stored into the predetermined region of the HDD 30.

Then, the control section 21 of the server apparatus 2 executes a process of detecting erasure object data which are accumulated data which can be erased from the mobile apparatus 4 from among the accumulated data from the mobile apparatus 4 stored in the predetermined region of the HDD 30 (step S206). Although the erasure object data detection process at step S206 is hereinafter described in detail, it is carried out such that it is estimated based on information added to the stored accumulated data of an object of detection or through an analysis of the accumulated data whether or not the accumulated data of the object of detection is important accumulated data. Then, if the accumulated data is estimated as important data, then it is not determined as an object of erasure, but if the accumulated data is not estimated as important data, then it is determined as an object of erasure.

Then, the control section 21 of the server apparatus 2 forms a request for accumulated data erasure for erasing the erasure object data detected at step S205 from the image storage section 44 of the mobile apparatus 4. Then, the control section 21 transmits the request for accumulated data erasure through the external interface 26a and the input/output terminal 26b under the control of the transmission/reception control section 27 so as to be transmitted to the mobile apparatus 4 through the cradle 1 (step S207).

Then, the transmission/reception control section 27 of the server apparatus 2 receives an erasure completion report transmitted from the mobile apparatus 4 of the opposite part, to which the request for accumulated data erasure has been transmitted, through the input/output terminal 26b and the external interface 26a (step S208). Thereafter, although details are hereinafter described, the control section 21 of the server apparatus 2 produces, from the accumulated data provided from the mobile apparatus 4 and stored in the HDD 30 and then erased from the mobile apparatus 4, writing back data to be written back in an arranged format into the mobile apparatus 4 (step S209).

Then, the transmission/reception control section 27 of the server apparatus 2 transmits the writing back data produced at step S209 through the external interface 26a and the input/output terminal 26b so as to be transmitted to the mobile apparatus 4 through the cradle 1 (step S210). Thereafter, the transmission/reception control section 27 of the server apparatus 2 receives a storage completion request of the writing back data transmitted from the mobile apparatus 4 through the cradle 1 through the input/output terminal 26b and the external interface 26a (step S211). The process illustrated in FIG. 13 ends therewith.

It is to be noted here that, although the process described above is an example wherein a communication process is carried out without a trouble, for example, in such an instance that no response is received when some request is transmitted from the server apparatus 2 to the mobile apparatus 4, transmission of the request may be carried out again or a request for response may be transmitted.

For example, if an erasure completion report is not received within a predetermined period of time at step S208, then a request for confirmation regarding whether or not an erasure process for accumulated data has been carried out may be transmitted. Alternatively, if a storage completion report is not received within a predetermined period of time at step S211, then a request for confirmation regarding whether or not writing back data is stored may be transmitted. Then, in response to the request, a suitable process may be carried out such as to transmit the original request again.

Further, if there exists no accumulated data to be backed up, then the series of processes may be ended, or content data which has newly become available may be provided, whereafter the series of processes is ended.

[Erasure Object Data Detection Process]

Figure 14:
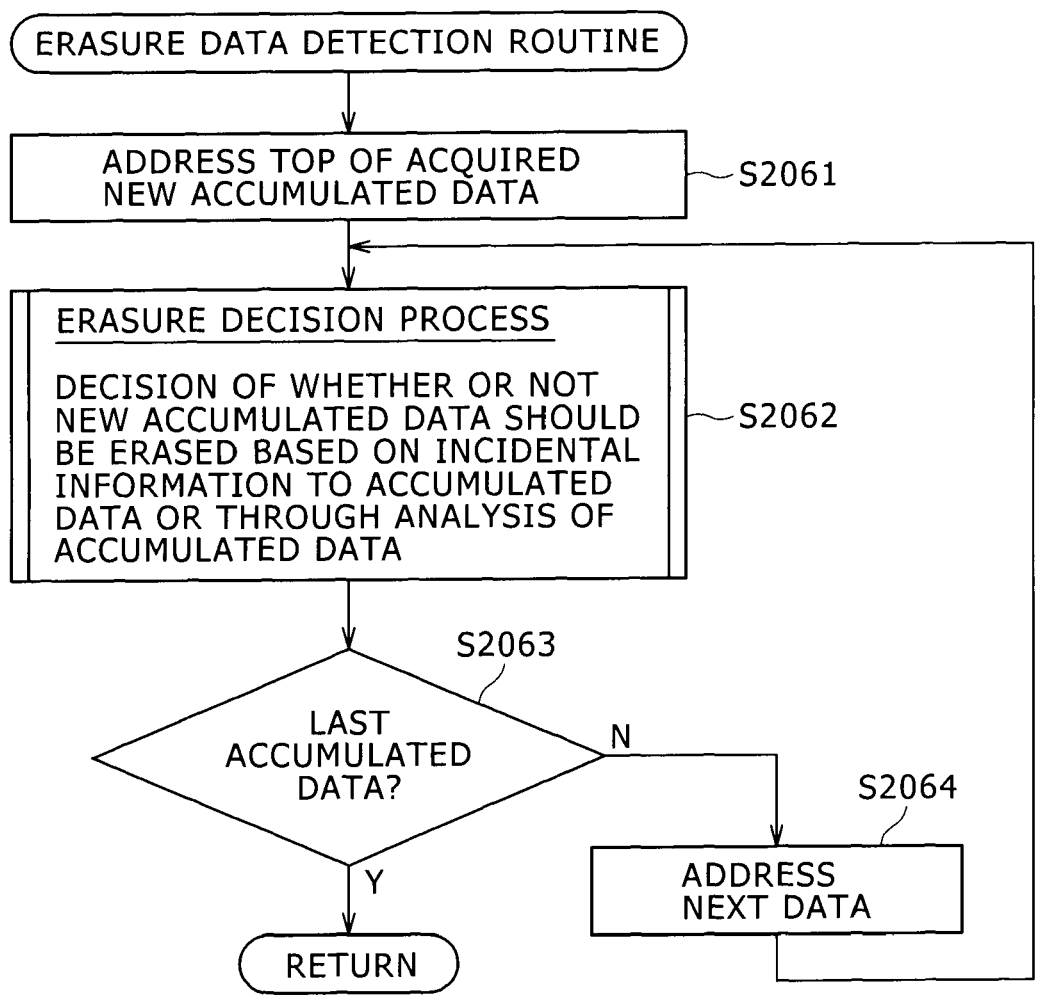
FIG. 14 is a flow chart illustrating an erasure data detection routine carried out in the process illustrated in FIG. 13.

Now, the detection process of erasure object data carried out at step S206 in the process illustrated in FIG. 13 is described. FIG. 14 illustrates the detection process of erasure object data carried out at step S206 of FIG. 13. The process illustrated in FIG. 14 executed by the control section 21 of the server apparatus 2.

First, the control section 21 addresses the top of a series of new accumulated data acquired at step S205 described hereinabove with reference to FIG. 13 (step S2061). Then, the control section 21 carries out a decision process of whether or not the addressed new accumulated data becomes an erasure object (step S2062). Although the process at step S2062 is hereinafter described in detail, it is a process of deciding it based on incidental information to each of new accumulated data or through an analysis of the new accumulated data whether or not the new accumulated data becomes an erasure object.

Thereafter, the control section 21 determines whether or not the new accumulated data determined as an object of an erasure decision process in the present cycle is the last one of the new accumulated data acquired and stored at step S205 (step S2063). In other words, the decision process at step S2063 is a process of deciding whether or not the erasure decision process is completed for all of the new accumulated data acquired at step S205.

If it is determined in the decision process at step S2063 that the erasure decision process is not completed for all of the new accumulated data as yet, then the control section 21 addresses next one of the new accumulated data, that is, determines the next new accumulated data as a processing object (step S2064). Then, the processes at the steps beginning with step S2602 are repeated. However, if it is determined in the decision process at step S2063 that the erasure decision process is completed for all of the new accumulated data, then the control section 21 ends the process illustrated in FIG. 14 and returns the processing to the process illustrated in FIG. 13 and executes the processes at the steps beginning with step S207.

Figure 15:
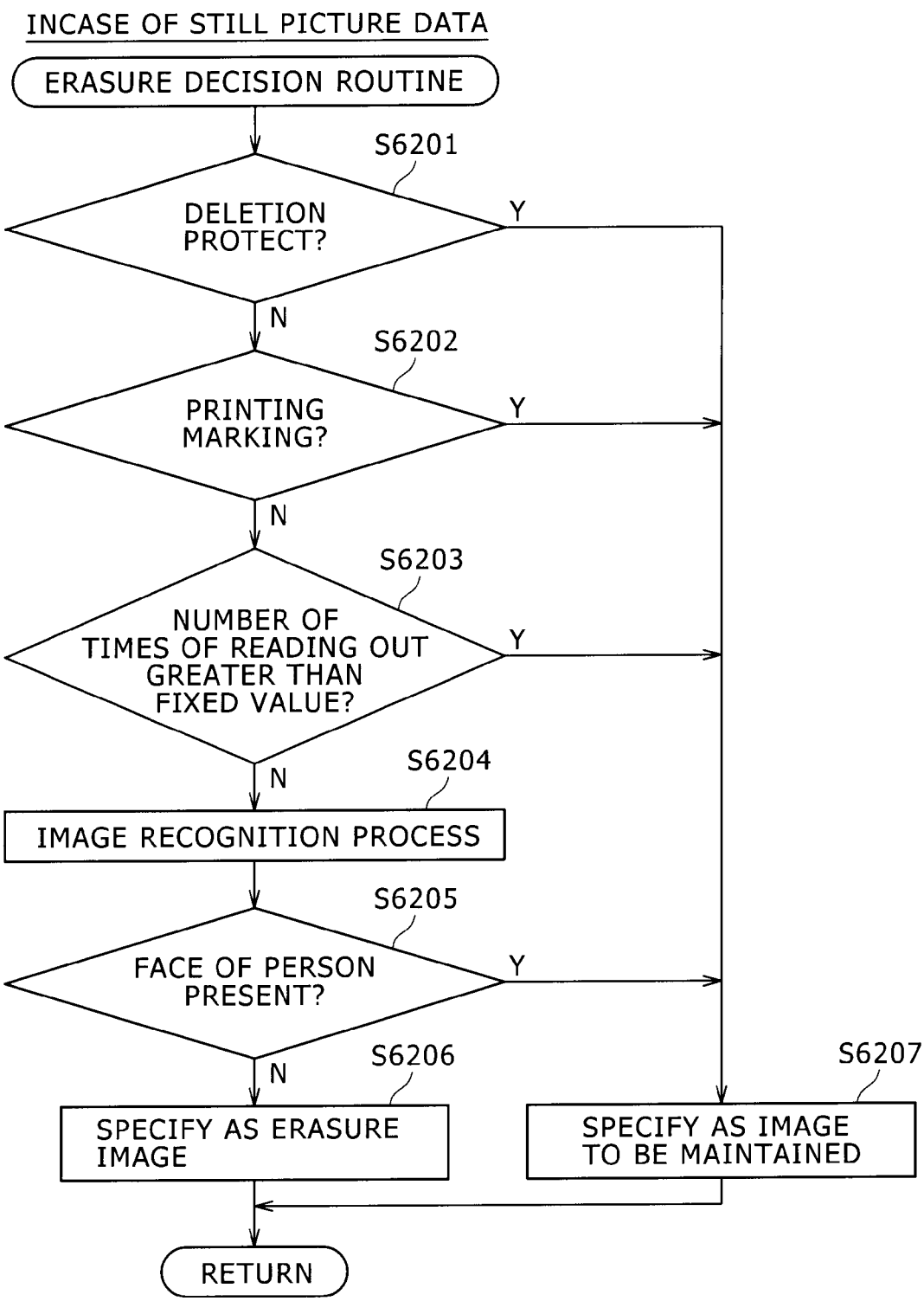
FIG. 15 is a flow chart illustrating an erasure decision routine for new accumulated data carried out in the erasure data detection routine illustrated in FIG. 14.

Now, the erasure decision process carried out at step S2062 of FIG. 14 is described in detail. FIG. 15 illustrates the erasure decision process for each new accumulated data carried out at step S2062 illustrated in FIG. 14. Also as described above, in the following description, it is assumed that a mobile apparatus 4 placed on the cradle 1 is a digital still camera as described above and accumulated data provided from the mobile apparatus 4 to the server apparatus 2 is still image data.

The control section 21 of the server apparatus 2 carries out a process of confirming information of the header part of new accumulated data of a decision object. In particular, accumulated data in the form of still image data supplied from the mobile apparatus 4 to the server apparatus 2 is data of the layout described hereinabove with reference to FIG. 9. Thus, the control section 21 confirms protect information of the header part and determines whether or not the accumulated data is protected against deletion, that is, whether or not the protect information is on (step S6201).

If it is determined by the decision process at step S6201 that the accumulated data is not protected against deletion, then the control section 21 confirms a print mark of the header part to determine whether or not the header part has printing marking (step S6202). If it is determined by the decision process at step S6202 that the header part does not include header marking, then the control section 21 confirms the number of times of use of the header part to determine whether or not the number of times of reading out, that is, the number of times of use, is greater than a fixed number of times determined in advance (step S6203).

If it is determined by the decision process at step S6203 that the number of times of reading out is not greater than the fixed number of times, the control section 21 carries out an image recognition process for the still image data of the accumulated data (step S6204). The image recognition process at step S6204 is a process of carrying out contour recognition, color recognition and so forth with regard to the still image data of the processing object such that it can be determined whether or not an image of a person is included in the still image data.

Then, the control section 21 determines based on a result of the image recognition at step S6204 whether or not the still image data of the processing object is still image data which includes the face of a person (step S6205). If it is determined by the decision process at step S6205 that the accumulated data or still image data of the processing object does not include the face of a person, then the control section 21 estimates that the accumulated data or still image data is not important information and specifies the still image data as an erasure image (step S6206). Thereafter, the control section 21 ends the process illustrated in FIG. 15 and then executes the process described hereinabove with reference to FIG. 14 beginning with the process at step S2063.

In addition, the new accumulated data of the processing object is estimated as important data in the cases that the decision process at step S6201 determines the processing object is protected against erasure, the decision process at step S6202 determines the processing object has a printing marking, the decision process at step S6203 determines the number of times of reading out indicates more than a fixed number, and the decision process at step S6205 determines the accumulated data or still image data includes a face of a person. Then the new accumulated data is specified as the data to be maintained (step S6207), and the procedure shown in FIG. 15 is ended to execute the procedure shown in FIG. 14 from the step S2063.

In short, if the new accumulated data of the processing object is protected against erasure, then it can be determined that the accumulated data is so important that it is not desirable to delete the same. Further, it can be determined that also new accumulated data to which printing marking is applied so that the accumulated data may be printed without fail is so important that it is necessary to print the same without fail.

Further, if the number of times of use indicates that the accumulated data has been used by more than a fixed number of times determined in advance, then it can be determined that the accumulated data is used in a high frequency and is important accumulated data. In the case of still image data, such data are in most cases obtained by picking up an image of a person for the object of keeping the image for remembrance. Therefore, it can be determined that, if it is determined that, when an image recognition process is carried out for still image data as accumulated data, the still image data includes the face of a person, then also the still image data is important data.

Therefore, if it can be estimated that the accumulated data of the processing object is important in any of the decision processes illustrated in FIG. 15, then the accumulated data is specified as data to be maintained. However, if it cannot be estimated that the accumulated data of the processing object is important in all of the decision processes illustrated in FIG. 15, then the accumulated data is specified as data to be erased.

In this manner, at step S206 of FIG. 13, erasure object data is detected through the process described hereinabove with reference to the flow charts of FIGS. 14 and 15, and the detected erasure object data can be deleted from the mobile apparatus 4 to use the storage capacity of the image storage section 44 of the mobile apparatus 4 efficiently.

[Writing Back Data Production Process]

Figure 16:
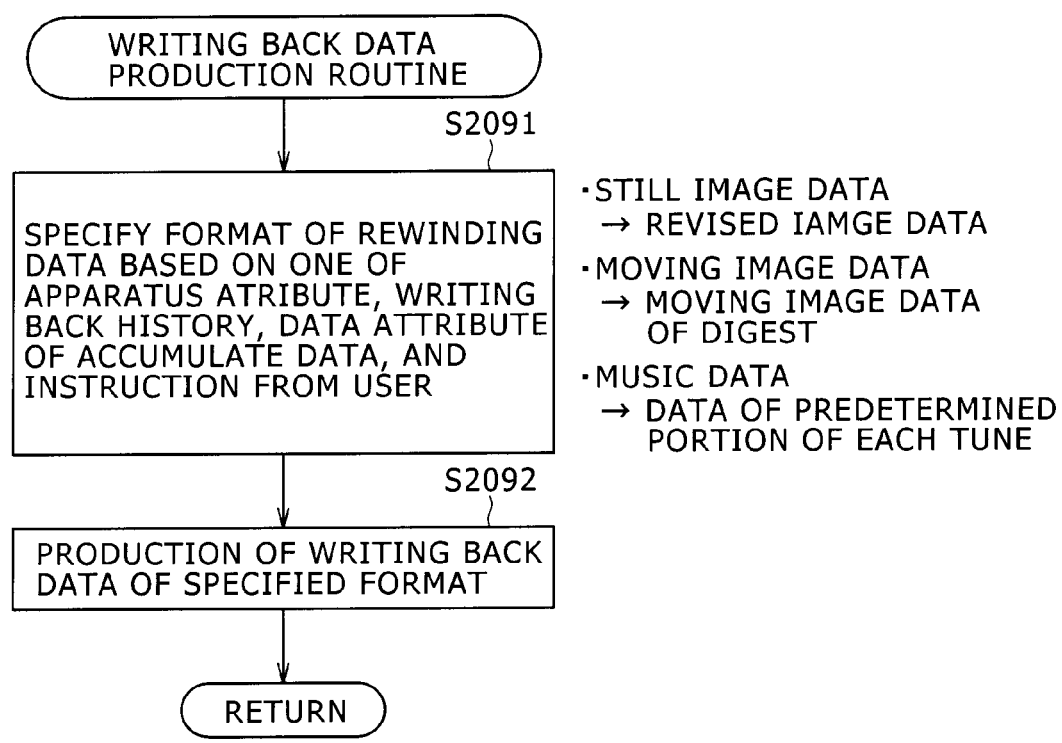
FIG. 16 is a flow chart illustrating a writing back data production routine carried out in the process illustrated in FIG. 13.

Now, the writing back data production process carried out at step S209 of the process described hereinabove with reference to FIG. 13 is described. FIG. 16 illustrates the production process of writing back data executed at step S209 of FIG. 13.

As described hereinabove, at step S209 illustrated in FIG. 13, it must be determined of what format writing back data should be produced. Therefore, at step S209 illustrated in FIG. 13, the control section 21 of the server apparatus 2 executes the process illustrated in FIG. 16 and first executes a process of specifying the format of writing back data (step S2091).

Here, as shown in FIG. 16, the control section 21 of the server apparatus 2 specifies the format of the data to be writing back based on the apparatus attribute included in the apparatus ID response transmitted through the cradle 1, based on the writing back history formed as shown in FIG. 11, based on the data attribute of the provided new accumulated data, or based on the instruction input from a user.

In particular, the apparatus attribute is information representative of the type of the mobile apparatus 4, that is, representative of whether the mobile apparatus 4 placed on the cradle 1 is a digital still camera, a digital video camera, a portable music reproduction apparatus or the like as described hereinabove. Therefore, where the apparatus attribute of the mobile apparatus 4 indicates that the mobile apparatus 4 is a digital still camera, then the format of the writing back data can be specified such that a reduced image of still image data is determined as the writing back data.

Meanwhile, where the apparatus attribute of the mobile apparatus 4 represents that the mobile apparatus 4 is a digital video camera, the format of the writing back data can be specified such that data of a digest version of moving picture data is determined as the writing back data. On the other hand, where the apparatus attribute of the mobile apparatus 4 represents that the mobile apparatus 4 is a portable music reproduction apparatus, the format of the writing back data can be specified such that data extracted from music data is determined as the writing back data.

Naturally, such an apparatus as a portable telephone terminal which can store and retain all of still image data, moving image data and sound data as accumulated data is available, and also an apparatus which is a digital still camera but can handle moving image data and an apparatus which is a digital video camera but can handle still image data are available.

Therefore, where writing back data is transferred already to and rewritten in a mobile apparatus 4 of the destination to which the writing back data is to be provided, since a writing back history is produced already as seen in FIG. 11, it is possible to specify the format of the writing back data based on the data attribute of the writing back history.

In particular, since the writing back history information is information which represents writing back data and a destination mobile apparatus of the writing back, if the mobile apparatus of the writing back destination is specified, then also it is possible to specify the format of the writing back data based on the data attribute of the writing back history.

Accordingly, if the data attribute of the writing back history indicates that the writing back data is still image data, then the format of the writing back data can be specified such that a reduced image of still image data is determined as the writing back data. Meanwhile, if the data attribute of the writing back data is moving picture data, then the format of the writing back data can be specified such that data of a digest version of the moving picture data is determined as the moving picture data. However, where the data attribute of the writing back history indicates that the writing back data is music data, the format of the writing back data can be specified such that partial data extracted from the music data is determined as the writing back data.

Also it is possible to specify the format of the writing back data from the data attribute of accumulated data accumulated in the mobile apparatus 4. In particular, where the accumulated data attribute indicates still image data, the format of the writing back data can be specified such that a reduced image of still image data is determined as the writing back data. Meanwhile, where the accumulated data attribute indicates moving image data, the format of the writing back data can be specified such that data of a digest version of moving image data is determined as the writing back data. Further, where the accumulated data attribute indicates music data, the format of the writing back data can be specified such that partial data extracted from music data is determined as the writing back data.

In this instance, the data attribute of accumulated data accumulated in the mobile apparatus 4 may be acquired through inquiry from the server apparatus 2 to the mobile apparatus 4 through the cradle 1, or the data attribute of new accumulated data provided already from the mobile apparatus 4 may be used.

Also it is possible to specify the format of the writing back data based on an operation input from the user accepted by the server apparatus 2 through the operation section 23 or the remote controller 25. In particular, the operation section 23 or the remote controller 25 is operated so that a selective input screen image for the format of writing back data is displayed on a monitor receiver connected to the server apparatus 2 such that a format of writing back data is selectively inputted through the selective input screen image for the format of writing back data and the operation section 23 or the remote controller 25. Based on the format of writing back data inputted in this manner, the control section 21 may specify the format of the writing back data.

Then, after the format of the writing back data is specified at step S2091, the control section 21 produces writing back data of the format specified at step S2091 (step S2092). In the present embodiment, the writing back data is produced by changing the format of accumulated data supplied from the mobile apparatus 4 and stored in the HDD 30 and then erased from the mobile apparatus 4 as described hereinabove.

[Other Example of Writing Back Data]

It is to be noted that, in the foregoing description, it is described that writing back data is formed from accumulated data supplied from the mobile apparatus 4, stored in the HDD 30 and then removed from the mobile apparatus 4. However, the formation of writing back data is not limited to this. The mobile apparatus 4 may include no accumulated data at all therein, or where the mobile apparatus is a portable music reproduction apparatus or the like, since the accumulated data originally exists in the server apparatus, no backup data of the accumulated data may be stored.

In such instances, the writing back data cannot be formed from the accumulated data provided from the mobile apparatus 4 to the server apparatus 2. Therefore, for example, a thumbnail image of content data, moving image data of a digest version, music data of a trial version or the like which newly becomes available in the mobile apparatus 4 may be provided as writing back data.

In particular, where the server apparatus 2 does not receive provision of accumulated data from the mobile apparatus 4, it is possible to specify the format of provision data to be provided to the mobile apparatus 4 in accordance with the format of the writing back data specified at step S2091 and then provide the provision data of the specified format as writing back data.

For example, if the format of writing back data to be provided to the mobile apparatus 4 is specified as resized image data by the process at step S2091, then it is possible to form a reduced image of still image data acquired newly through the Internet or the like and provide the reduced image to the mobile apparatus 4. On the other hand, where the format of the writing back data to be provided to the mobile apparatus 4 is moving image data of a digest version, it is possible to form a digest version of the moving image data acquired newly through the Internet or the like and provide the digest version of the moving image data to the mobile apparatus 4. Further, where the format of the writing back data to be provided to the mobile apparatus 4 is a part of music data, that is, music data of a trial version, it is possible to provide music data of a trial version acquired newly through the Internet or the like to the mobile apparatus 4.

In this manner, writing back data from the server apparatus 2 to the mobile apparatus 4 may not only be formed based on accumulated data provided from the mobile apparatus 4, but data which can be provided, data formed from such data which can be provided or like data may be provided as writing back data to the mobile apparatus 4.

[Processing of the Mobile Apparatus 4]

Figure 17:
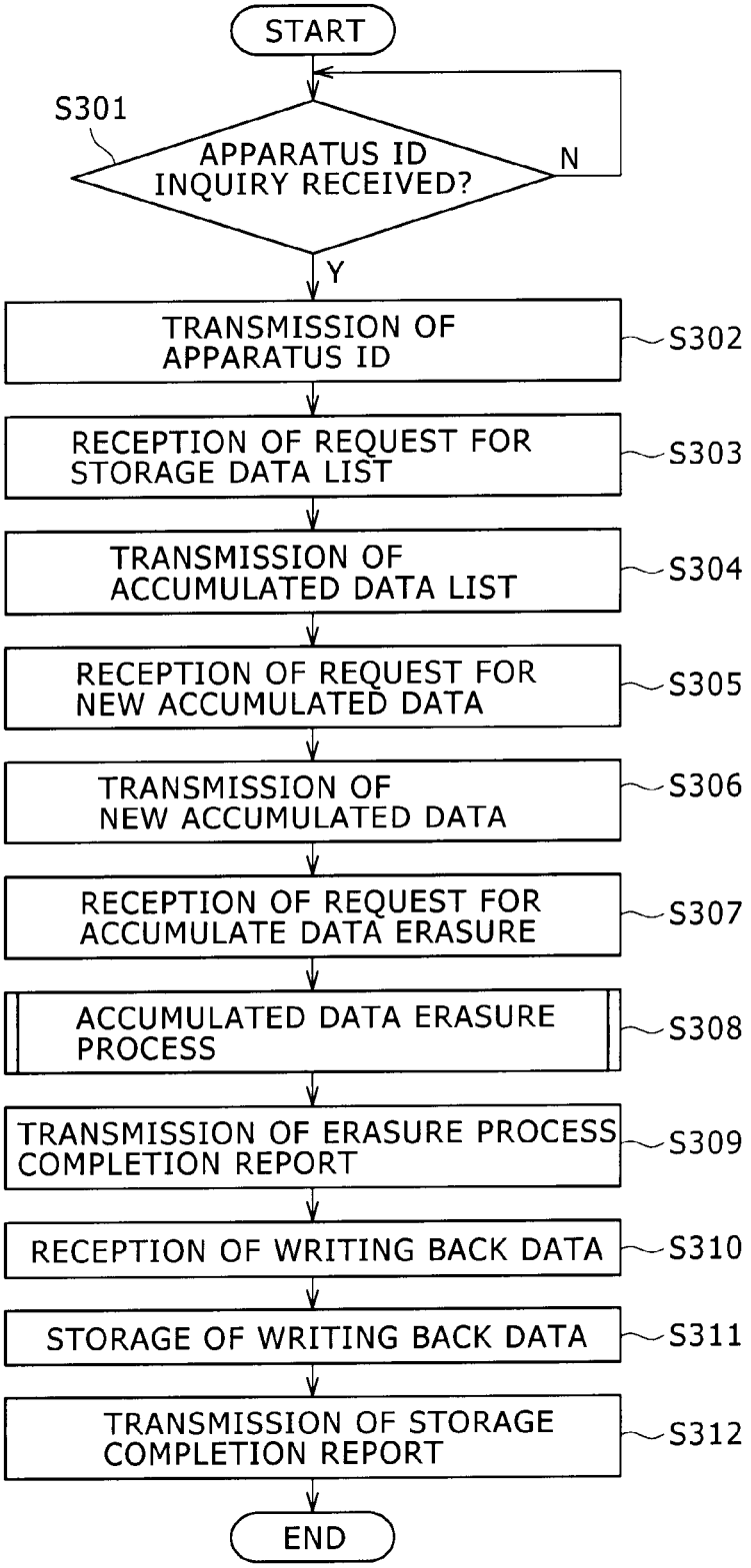
FIG. 17 is a flow chart illustrating a process carried out by the mobile apparatus.

FIG. 17 illustrates a process executed by the mobile apparatus 4 of the data communication system. The process illustrated in FIG. 17 is executed principally by the control section 41, transmission/reception control section 47 and image erasure control section 48 of a mobile apparatus 4 when the mobile apparatus 4 is placed into a predetermined mode in which it is placed on and cooperates with the cradle 1 to carry out data communication and a charging process such as, for example, a charging mode.

First, if the mobile apparatus 4 is placed into the predetermined mode, then the transmission/reception control section 47 thereof determines whether or not an inquiry about an apparatus ID is received from the cradle 1 through the transmission/reception antenna 45*b* and the radio communication section 45*a* (step S301). If it is determined by the decision process at step S301 that an inquiry about an apparatus ID is not received, then the process at step S301 is repeated to wait that an inquiry about an apparatus ID is received.

If it is determined by the decision process at step S301 that an inquiry about an apparatus ID is received from the cradle 1, then the control section 41 acquires necessary information such as an apparatus ID and an apparatus attribute stored and retained, for example, in the ROM 412 of the mobile apparatus 4. Then, the control section 41 forms such an apparatus ID response as illustrated in FIG. 7C based on the acquired information, and the transmission/reception control section 47 transmits the apparatus ID response to the cradle 1 through the radio communication section 45*a* and the transmission/reception antenna 45*b* (step S302).

Then, the transmission/reception control section 47 receives a request for an accumulated data list transmitted thereto from the server apparatus 2 through the cradle 1 through the transmission/reception antenna 45*b* and the transmission/reception antenna 45*b* (step S303). Then, the control section 41 forms such an accumulated data list as described hereinabove with reference to FIG. 8, and the transmission/reception control section 47 transmits the accumulated data list through the radio communication section 45*a* and the transmission/reception antenna 45*b* so as to be transmitted to the server apparatus 2 through the cradle 1 (step S304).

Thereafter, the transmission/reception control section 47 receives a request for new accumulated data transmitted thereto from the server apparatus 2 through the cradle 1 through the transmission/reception antenna 45*b* and the radio communication section 45*a* (step S305). Then, the control section 41 extracts new accumulated data of such a format as described hereinabove with reference to FIG. 8 from the image storage section 44 of the mobile apparatus 4 in accordance with the request for new accumulated data. Then, the transmission/reception control section 47 transmits the extracted new accumulated data through the radio communication section 45*a* and the transmission/reception antenna 45*b* so as to be transmitted to the server apparatus 2 through the cradle 1 (step S306).

Then, the transmission/reception control section 47 receives a request for erasure of accumulated data transmitted thereto from the server apparatus 2 through the cradle 1 through the transmission/reception antenna 45*b* and the radio communication section 45*a* (step S307). Then, the control section 41 executes a process of erasing accumulated data whose erasure is designated from among the accumulated data stored and retained in the image storage section 44 of the mobile apparatus 4 (step S308). Thereafter, the control section 41 forms an erasure process completion report, and the transmission/reception control section 47 transmits the erasure process completion report through the radio communication section 45a and the transmission/reception antenna 45b so as to be transmitted to the server apparatus 2 through the cradle 1 (step S309).

Then, the transmission/reception control section 47 receives writing back data transmitted from the server apparatus 2 through the cradle 1 through the transmission/reception antenna 45b and the radio communication section 45a (step S310) and stores the writing back data into the image storage section 44 of the mobile apparatus 4 (step S311). Thereafter, the control section 41 forms a storage completion report, and the transmission/reception control section 47 transmits the storage completion report through the radio communication section 45a and the transmission/reception antenna 45b so as to be transmitted to the server apparatus 2 through the cradle 1 (step S312), thereby ending the process illustrated in FIG. 17.

[Image Erasure Process]

Figure 18:
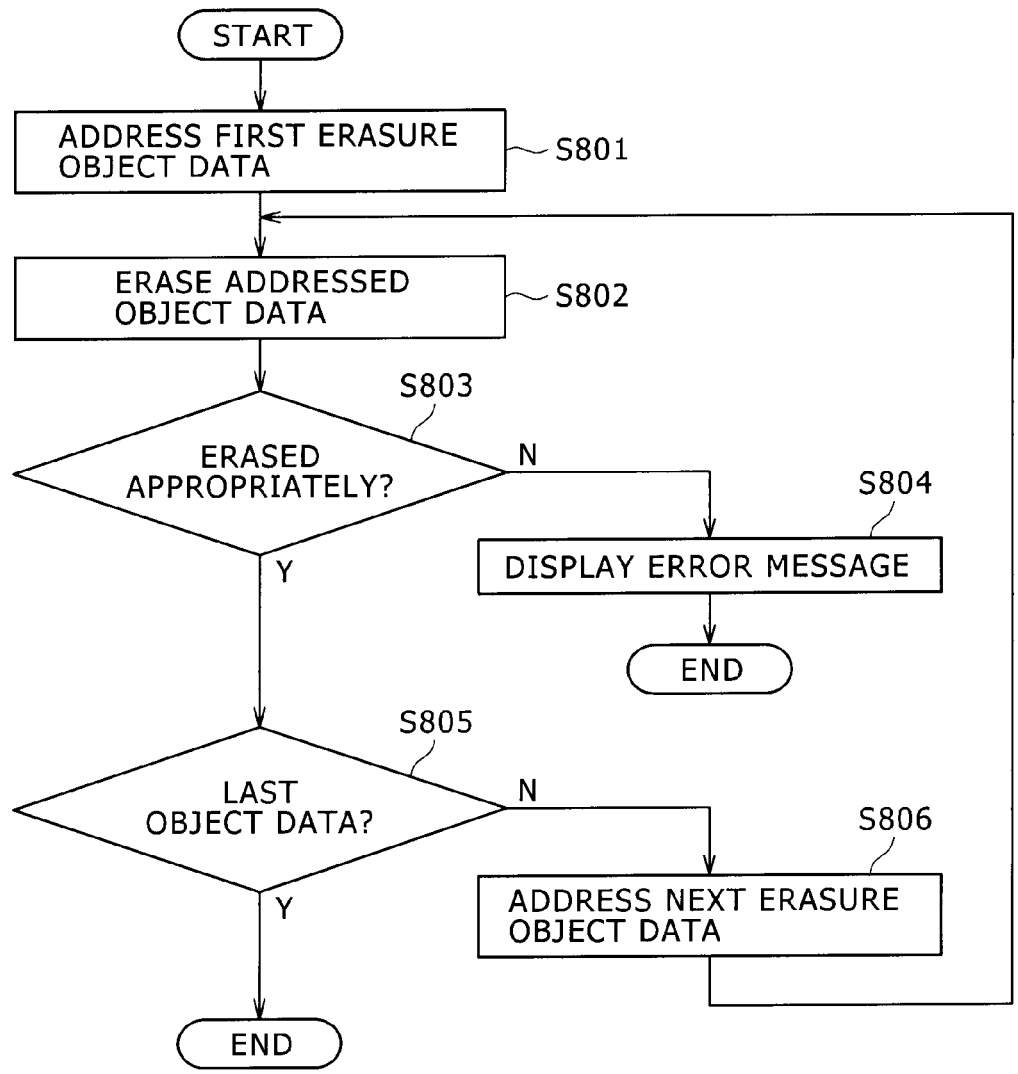
FIG. 18 is a flow chart illustrating an image data erasure process or accumulated data erasure process carried out in the process illustrated in FIG. 17.

FIG. 18 illustrates the image data erasure process or accumulated data erasure process executed at step S308 in the process described hereinabove with reference to FIG. 17. Since a request for accumulated data erasure may designate a plurality of accumulated data to be erased, the control section 41 addresses, from among image data or accumulated data stored in the image storage section 44, the first erasure object data designated by the request for accumulated data erasure (step S801). Then, the control section 41 erases the addressed erasure object data (step S802).

Then, the control section 41 determines whether or not the erasure object data determined to be erased at step S802 has been erased appropriately (step S803). This decision process can be made based on a status representative of a processing state which is updated in the RAN 413 of the control section 41.

If it is determined by the decision process at step S803 that the erasure object data has not been erased successfully because it is protected against deletion, then the control section 41 controls the display section 49 to display an error message representing such failure in erasure on the display screen of the display section 49 (step S804). Thereafter, the process illustrated in FIG. 18 is ended.

On the other hand, if it is determined by the decision process at step S803 that the erasure object data has been erased appropriately, then the control section 41 determines whether or not the erased erasure object data is the last erasure object data (step S805). If it is determined by the decision process at step S805 that the erasure object data erased in the present cycle is not the last erasure object data, the control section 41 addresses the next erasure object data so as to determine the same as an erasure object in response to the request for accumulated data erasure (step S806). Thereafter, the processes at the steps beginning with step S802 are repeated.

On the other hand, if it is determined by the decision process at step S805 that the erasure object data erased in the present cycle is the last erasure object data, then the control section 41 ends the process illustrated in FIG. 18 and returns the processing to the process illustrated in FIG. 17 so that the processes at the steps beginning with the step S308 are carried out subsequently.

[Summary of the Embodiment]

In the data communication system described above with reference to FIGS. 1 to 18, only if a mobile apparatus 4 is placed on the cradle 1 connected to the server apparatus 2, then the server apparatus 2 accesses the mobile apparatus 4 through the cradle 1 and stores accumulated data accumulated in the mobile apparatus 4 as backup data into the server apparatus 2. Further, the server apparatus 2 specifies, from among the backed up accumulated data, those accumulated data which can be erased from the storage section of the mobile apparatus 4 and then erases the specified erasable accumulated data from the storage section of the mobile apparatus 4. Consequently, effective utilization of the storage section can be achieved, and besides the server apparatus 2 can automatically provide information required by the mobile apparatus 4.

In particular, only if the mobile apparatus 4 is placed on the cradle 1, then the cradle 1 and the server apparatus 2 cooperate with each other to act upon the mobile apparatus 4 placed on the mobile apparatus 4 and automatically carry out data backup of the mobile apparatus 4, arrangement of the storage section or memory of the mobile apparatus 4 and provision of necessary information to the mobile apparatus 4. Accordingly, there is no necessity to use time and labor for backing up accumulated data accumulated in the mobile apparatus 4, but necessary data can be maintained in the mobile apparatus 4 or provided newly so that the mobile apparatus 4 can be used sufficiently or flexibly.

It is to be noted that provision of necessary information to the mobile apparatus 4 in the data communication system described above is carried out such that reduced image data formed from still image data backed up from the mobile apparatus 4 into the server apparatus 2 and then erased from the image storage section 44 of the mobile apparatus 4 is produced as writing back data and written back. However, the provision is not limited to this.

As described hereinabove, accumulated data to be backed up from the mobile apparatus 4 to the server apparatus 2 may not exist, or music data accumulated in a portable music reproduction apparatus may not necessarily be backed up because it already exists at the server apparatus 2.

Therefore, as described hereinabove in the [Other Example of Writing Back Data], it is possible to provide, for example, a thumbnail image of content data which has newly become available in the mobile apparatus 4, moving image data of a digest version, music data of a trial version or the like as writing back data to the mobile apparatus 4 so as to be stored into the storage section of the mobile apparatus 4 such that it can be utilized on the mobile apparatus 4.

Further, a type of data to be provided to the mobile apparatus 4 may be determined in the following manner. In particular, a format of data which can be utilized in the mobile apparatus 4 is specified in response to an apparatus attribute of the mobile apparatus 4, a writing back history of writing back data of the mobile apparatus 4, a data attribute of data accumulated in the mobile apparatus 4 or an instruction from the user as described hereinabove in the writing back data production process with reference to FIG. 16. Then, data of the specified format may be provided.

[Modifications to the Data Communication System]

In the data communication system of the embodiment described above, the decision of whether or not accumulated data to be backed up exists in the mobile apparatus 4 placed on the cradle 1 is carried out by the server apparatus 2 side based on an accumulated data list provided from the mobile apparatus 4 in response to a request from the server apparatus 2 as described hereinabove with reference to FIGS. 5 and 6. However, the decision is not limited to this. Also it is possible for the cradle 1 to carry out the decision of whether or not accumulated data to be back up exists in the mobile apparatus 4 placed on the cradle 1 thereby to reduce the load to the server apparatus 2 and achieve speeding up of processing.

Also the modified data communication system has the configuration described hereinabove with reference to FIG. 1 similarly to the data communication system described hereinabove, and the cradle 1, server apparatus 2 and mobile apparatus 4 have the configurations described hereinabove with reference to FIGS. 2, 3 and 4, respectively. Accordingly, it is assumed that, also in the present modification, the mobile apparatus 4 placed on the cradle 1 is a digital still camera. However the functions of the apparatus in the present modification are somewhat different from those in the embodiment described hereinabove.

Figure 19:
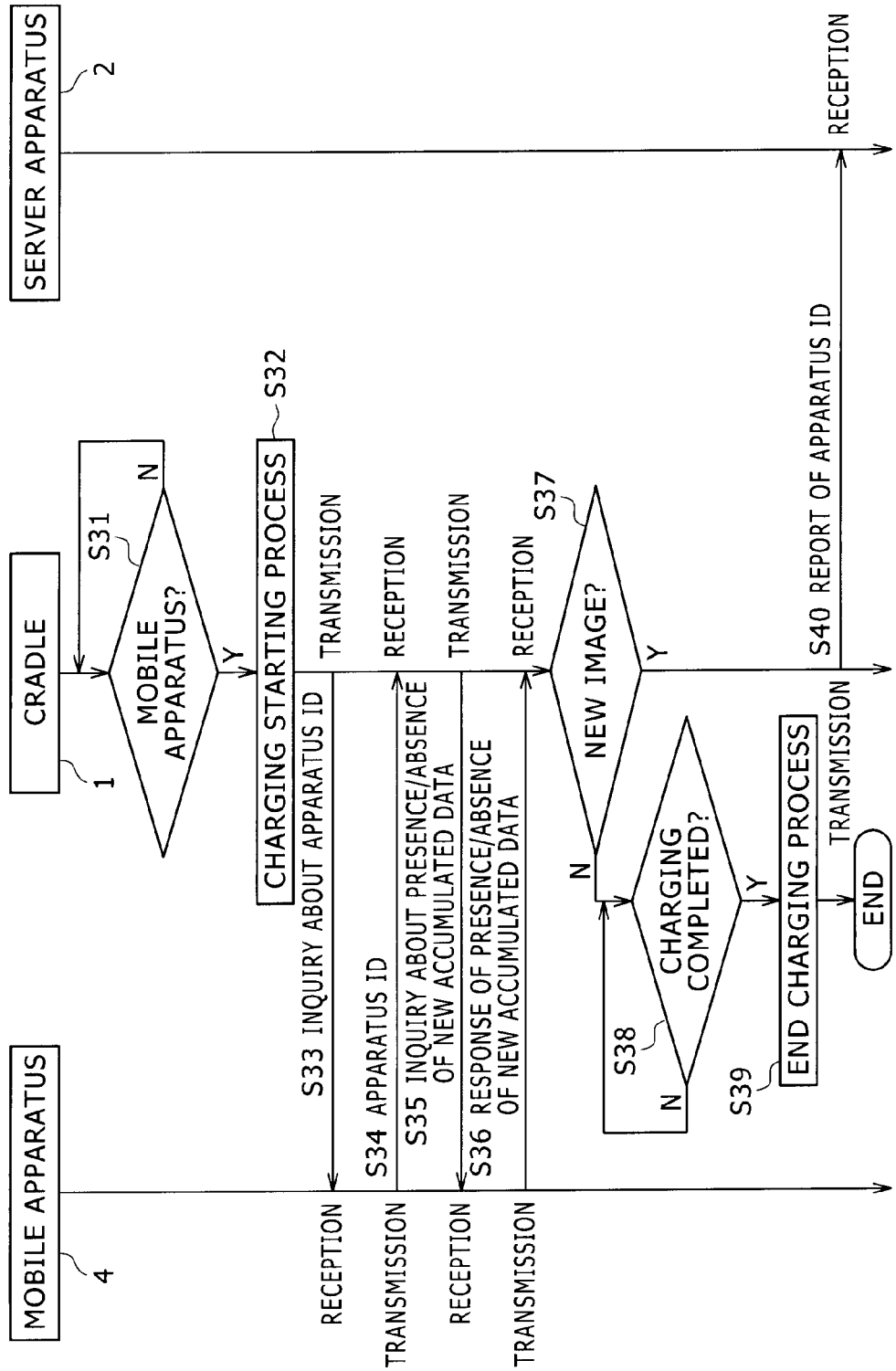
FIG. 19 is a sequence diagram illustrating operation of a modification to the data communication system of the first embodiment.

FIG. 19 illustrates operation of the modified data communication system. Also in the operation of the modified data communication system, when the cradle 1 is in a state wherein the power supply thereto is on, the cradle 1 uses the function of the placement detection section 16 to determine after every interval of time whether or not a mobile apparatus 4 is placed thereon (step S31). Also in the modified data communication system, the cradle 1 is configured such that a plurality of mobile apparatus can be placed thereon and can detect that a mobile apparatus is placed thereon every time a new mobile apparatus is placed thereon.

Then, if it is determined by the decision process at step S31 that a mobile apparatus 4 is not placed on the cradle 1, then the decision process at step S31 is repeated to wait that a mobile apparatus 4 is placed on the cradle 1. However, if it is determined by the decision process at step S31 that a mobile apparatus 4 is placed on the cradle 1, then the cradle 1 carries out a process for starting charging of the mobile apparatus 4 placed newly (step S32).

Thereafter, the transmission/reception control section 17 in the cradle 1 controls the radio communication section 15*a* to transmit a request for inquiry about an apparatus ID to the mobile apparatus 4 placed newly on the cradle 1 (step S33). The mobile apparatus 4 receives the request for inquiry about an apparatus ID from the cradle 1 through the transmission/reception antenna 45*b* and the radio communication section 45*a*. Then, the transmission/reception control section 47 of the mobile apparatus 4 controls the radio communication section 45*a* to transmit the apparatus ID of the mobile apparatus 4 to the cradle 1 (step S34).

The cradle 1 receives the apparatus ID from the mobile apparatus 4 placed newly through the transmission/reception antenna 15*b* and the radio communication section 15*a*, and the control section 11 thereof forms an inquiry about presence or absence of new accumulated data. Then, the inquiry about presence or absence of new accumulated data is transmitted to the mobile apparatus 4 through the radio communication section 15*a* and the transmission/reception antenna 15*b* under the control of the transmission/reception control section 17 (step S35).

The mobile apparatus 4 receives the inquiry about presence or absence of new accumulated data from the cradle 1 through the transmission/reception antenna 45*b* and the radio communication section 45*a*, and the control section 41 thereof confirms data stored and retained in the image storage section 44 to confirm whether or not new accumulated data which has not been backed up as yet exists. Then, the control section 41 forms a response about presence or absence of new accumulated data in accordance with a result of the confirmation, and the transmission/reception control section 47 controls the radio communication section 45*a* through the control section 41 to transmit the response about presence or absence of new accumulated data to the cradle 1 (step S36).

It is to be noted that, as described hereinabove, even if accumulated data is backed up, if it is important data, then it is maintained. Therefore, for still image data which is backed up already but is determined to be maintained, a backup flag is prepared in the header part such that the still image data can be distinguished from new accumulated data depending upon whether the backup flag is on.

Then, the control section 11 of the cradle 1 determines based on the received response about presence or absence of new accumulated data from the mobile apparatus 4 whether or not new accumulated data to be backed up, that is, new still image data, exists in the mobile apparatus 4 (step S37). If it is determined at step S37 that new accumulated data does not exist, then the cradle 1 places itself into and remains in a waiting state until the charging of the mobile apparatus 4 is completed without communicating with the server apparatus 2 (step S38). Then, if it is determined by the decision process at step S38 that the charging is completed, then the charging process for the mobile apparatus 4 is ended (step S39), thereby ending the series of data communication processes.

On the other hand, if it is determined by the decision process at step S37 that new accumulated data exists, then the transmission/reception control section 17 of the cradle 1 controls the external interface 14*a* to report the apparatus ID received from the mobile apparatus 4 placed newly on the cradle 1 through the transmission/reception antenna 15*b* and the radio communication section 15*a* to the mobile apparatus 4 (step S40). Consequently, the server apparatus 2 recognizes that a new mobile apparatus having accumulated data has been placed on the cradle 1.

After the reporting of the apparatus ID to the server apparatus 2 at step S40, the processes at steps S9 to S20 illustrated in FIGS. 5 and 6 are successively carried out. In this instance, if new accumulated data does not exist in the mobile apparatus 4 placed on the cradle 1, then since no communication is carried out between the cradle 1 and the server apparatus 2, the load to the server apparatus 2 can be moderated.

[Operation of the Component Apparatus of the Modified Data Communication System]

Now, operation of the individual component apparatus of the modified data communication system described above with reference to FIG. 19 is described. Also in this instance, operation of the cradle 1 positioned at the center of the modified data communication system, server apparatus 2 which carries out data management and mobile apparatus 4 placed on the cradle 1 is described particularly in order.

[Processing of the Cradle 1]

Figure 20:
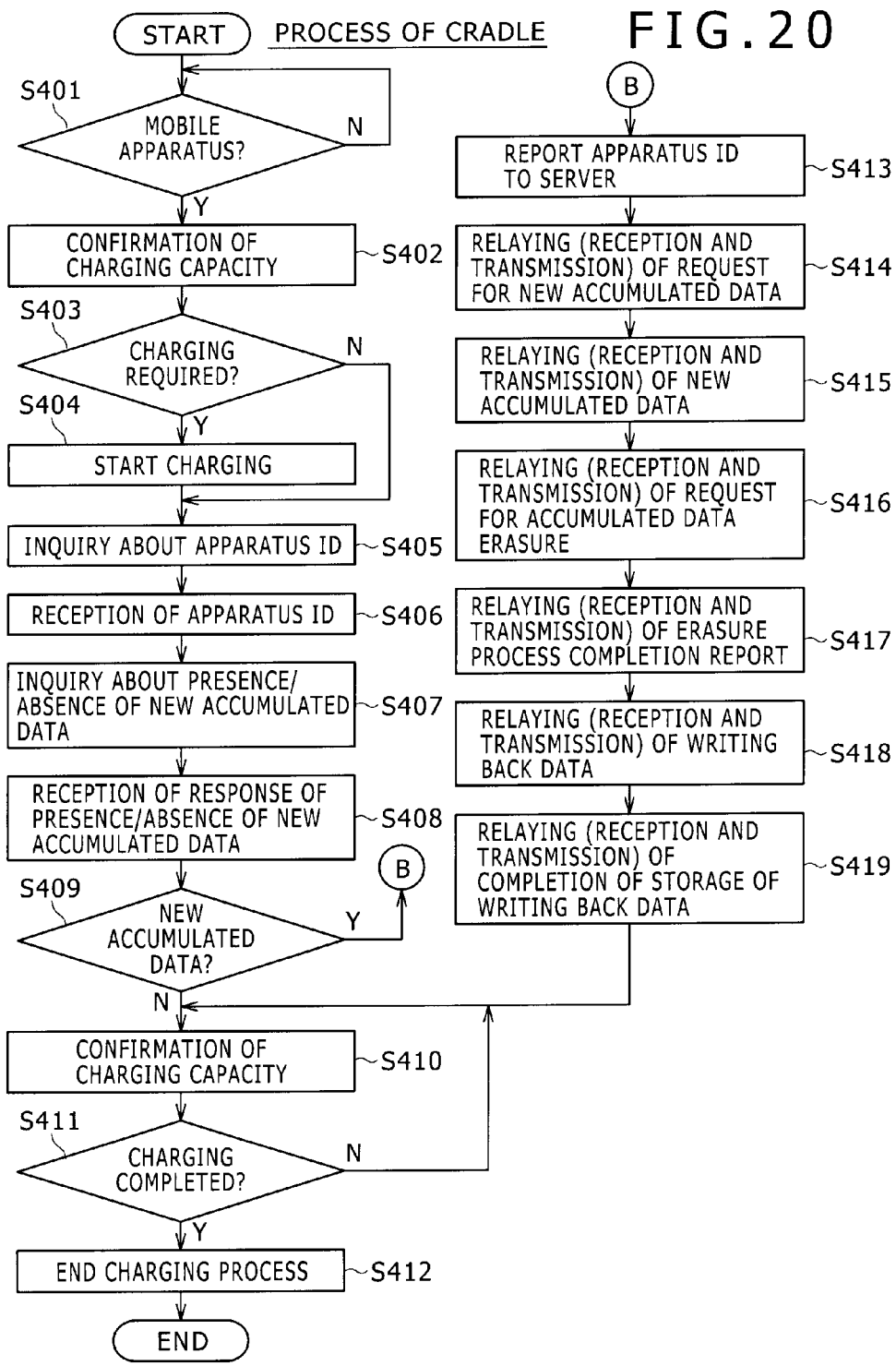
FIG. 20 is a flow chart illustrating a process carried out by the cradle of the modified data communication system.

FIG. 20 illustrates a process carried out by the cradle 1 of the modified data communication system. The process illustrated in FIG. 20 is executed principally by the control section 11 and the transmission/reception control section 17 when the cradle 1 is in a state wherein the power supply thereto is on. It is to be noted that, also in the present modification, a plurality of mobile apparatus can be placed at a time on the cradle 1 and the cradle 1 can execute the process illustrated in FIG. 20 in a multi-task fashion for a maximum number of mobile apparatus which can be placed on the cradle 1.

If the power supply to the cradle 1 is turned on, then the control section 11 of the cradle 1 controls the placement detection section 16 to start placement detection of a mobile apparatus to determine whether or not a mobile apparatus is placed on the cradle 1 (step S401). If it is determined by the decision process at step S401 that a mobile apparatus is not placed on the cradle 1, then the placement detection of a mobile apparatus is repeated to wait that a mobile apparatus is placed on the cradle 1.

If it is determined by the decision process at step S401 that a mobile apparatus is placed on the cradle 1, then the control section 11 controls the charging control section 19 to confirm the charging capacity of the mobile apparatus 4 placed newly (step S402). The process at step S402 may be carried out as an electric detection process such as to detect a voltage of the battery of the mobile apparatus 4 or the like.

Then, the control section 11 determines whether or not the mobile apparatus 4 placed newly requires charging (step S403). If it is determined that the mobile apparatus 4 requires charging, then the control section 11 controls the charging control section 19 to start charging of the battery of the mobile apparatus 4 placed newly (step S404). On the other hand, if it is determined by the decision process at step S403 that the mobile apparatus 4 does not require charging, then the processing advances to step S405.

After the process at step S404 or when if it is determined by the decision process at step S403 that the mobile apparatus 4 does not require charging, the following series of relaying process is executed. In particular, the control section 11 of the cradle 1 forms command data for inquiry about an apparatus ID described hereinabove with reference to FIG. 7B. Then, the transmission/reception control section 17 controls the radio communication section 15a and the transmission/reception antenna 15b to transmit the command data for inquiry about an apparatus ID to the mobile apparatus 4 placed newly (step S405).

Thereafter, the transmission/reception control section 17 of the cradle 1 receives an apparatus ID response described hereinabove with reference to FIG. 7C from the mobile apparatus 4 through the transmission/reception antenna 15b and the radio communication section 15a (step S406). Thereafter, the control section 11 of the cradle 1 forms an inquiry about presence or absence of new accumulated data, and the transmission/reception control section 17 controls the radio communication section 15a to transmit the inquiry about presence or absence of new accumulated data to the mobile apparatus 4 (step S407).

Then, the transmission/reception control section 17 of the cradle 1 receives a response about presence or absence of new accumulated data transmitted from the mobile apparatus 4 in response to the inquiry about presence or absence of new accumulated data transmitted at step S407 through the transmission/reception antenna 15b and the radio communication section 15a (step S408). Thereafter, the control section 11 of the cradle 1 determines based on the response about presence or absence of new accumulated data received at step S408 whether or not new accumulated data exists in the mobile apparatus 4 placed newly on the cradle 1 (step S409).

If it is determined by the decision process at step S409 that new accumulated data does not exist, then since the cradle 1 need not carry out communication with the server apparatus 2, the control section 11 of the cradle 1 controls the charging control section 19 to confirm the charging capacity of the battery of the mobile apparatus 4 (step S410). Then, the control section 11 of the cradle 1 determines whether or not the charging of the mobile apparatus 4 is completed (step S411).

If it is determined by the decision process at step S411 that the charging is not completed as yet, then the processes at the steps beginning with step S410 are repeated to continue the charging process. On the other hand, if it is determined by the decision process at step S411 that the charging for the mobile apparatus 4 is completed, then the cradle 1 executes a predetermined process for ending the charging of the mobile apparatus 4 (step S412), thereby ending the process illustrated in FIG. 20.

On the other hand, if it is determined by the decision process at step S409 that new accumulated data does not exist, then the transmission/reception control section 17 of the cradle 1 reports the apparatus ID acquired from the mobile apparatus 4 to the server apparatus 2 through the external interface 14a and the input/output terminal 14b (step S413).

Thereafter, the transmission/reception control section 17 of the cradle 1 receives a request of new accumulated data from the server apparatus 2 through the external interface 14a and the input/output terminal 14b, and transmits the received request to the mobile apparatus 4 through the radio communication section 15a and the transmission/reception antenna 15b (step S414).

Then, the transmission/reception control section 17 receives the new accumulated data from the mobile apparatus 4 through the transmission/reception antenna 15b and the radio communication section 15a and transmits the received new accumulated data to the server apparatus 2 through the external interface 14a and the input/output terminal 14b (step S415). Next, the transmission/reception control section 17 receives a request for erasure of accumulated data from the server apparatus 2 through the input/output terminal 14b and the external interface 14a and transmits the received request for erasure of accumulated data to the mobile apparatus 4 through the radio communication section 15a and the transmission/reception antenna 15b (step S416).

Then, the transmission/reception control section 17 of the cradle 1 receives a report of erasure process completion from the mobile apparatus 4 through the transmission/reception antenna 15b and the radio communication section 15a and transmits the erasure process completion report to the server apparatus 2 through the external interface 14a and the input/output terminal 14b (step S417). Then, the transmission/reception control section 17 receives writing back data from the server apparatus 2 through the input/output terminal 14b and the external interface 14a and transmits the writing back data to the mobile apparatus 4 through the radio communication section 15a and the transmission/reception antenna 15b (step S418).

Then, the transmission/reception control section 17 of the cradle 1 receives a writing back data storage completion report from the mobile apparatus 4 through the transmission/reception antenna 15b and the radio communication section 15a and transmits the writing back data storage completion report to the server apparatus 2 through the external interface 14a and the input/output terminal 14b (step S419). In this manner, also in the present modified data communication system, the series of relaying processes between the server apparatus 2 and the mobile apparatus 4 is executed by the processes at steps S414 to S419.

It is to be noted that, in the relaying process of accumulated data at step S415 or in the relaying process of writing back data at step S418, a large number of accumulated data or writing back data to be relayed may exist, and at step S415 or S418, a transfer process of a large number of data may naturally be carried out.

Then, after the process at step S419, the control section 11 of the cradle 1 executes the processes at steps S410 to S412, and when the charging of the battery of the mobile apparatus 4 is completed, the predetermined process for ending the charging of the mobile apparatus 4 is executed, thereby ending the process illustrated in FIG. 20.

It is to be noted that, while, also in the example illustrated in FIG. 20, the charging capacity is confirmed at step S410 and it is determined at step S411 whether or not the charging is completed, the execution of the charging is not limited to this. As described above, it is determined by the decision process at step S403 whether or not charging is required, and when charging is not required, the charging process is not carried out. Therefore, it is possible to determine, before the confirmation of the charging capacity at step S410, whether or not the charging is being executed, that is, whether or not power is supplied to the mobile apparatus 4 and end, when it is determined that the charging is not being executed, the process illustrated in FIG. 20 without executing the processes at steps S410 to S412.

[Processing of the Server Apparatus 2]

Figure 21:
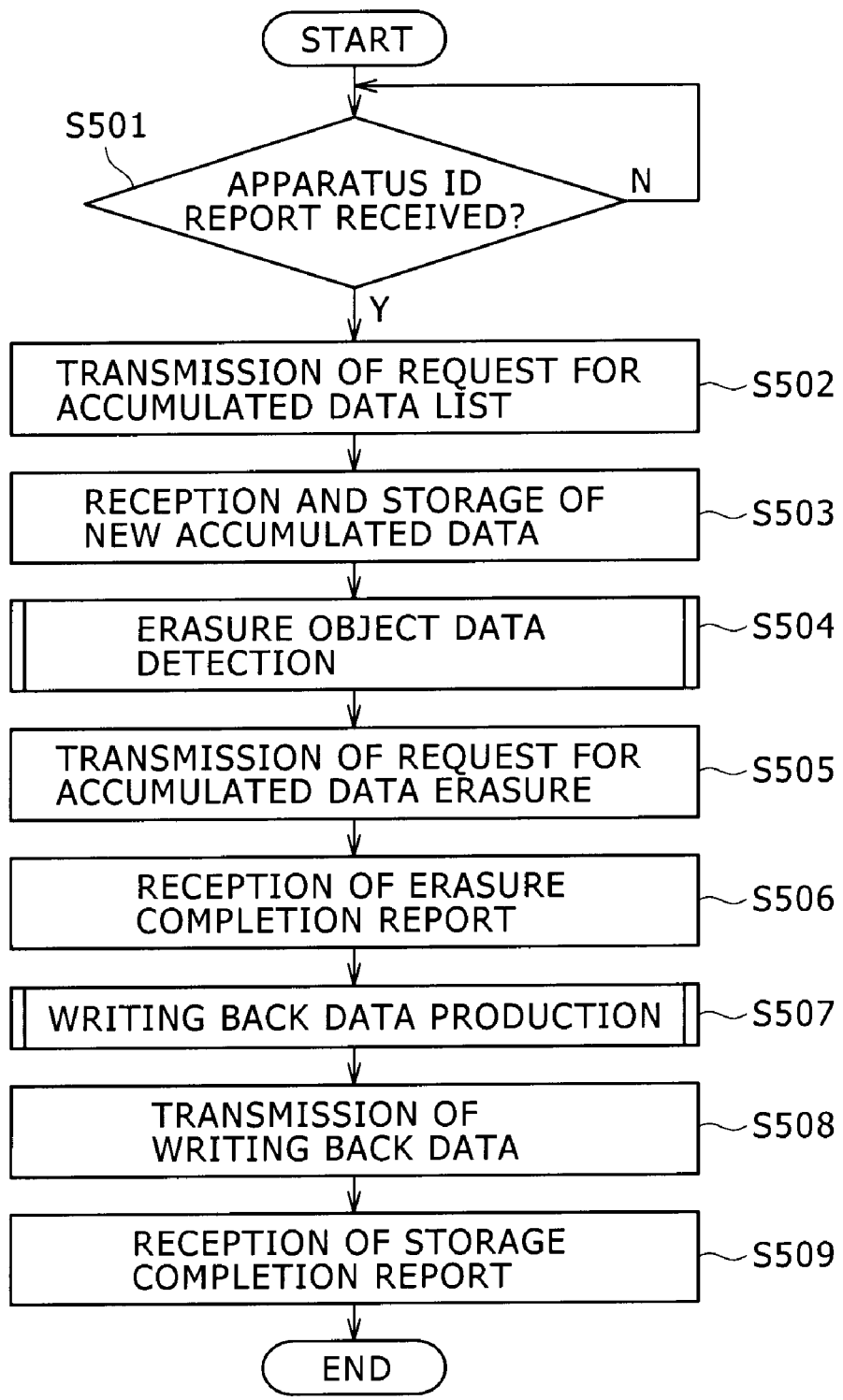
FIG. 21 is a flow chart illustrating a process carried out by the server of the modified data communication system.

FIG. 21 illustrates a process carried out by the server apparatus 2 of the modified data communication system. The process illustrated in FIG. 21 is executed principally by the control section 21 and the transmission/reception control section 27 when the server apparatus 2 is in a state wherein the power supply thereto is on.

If the power supply is turned on, then the transmission/reception control section 27 of the server apparatus 2 determines whether or not an apparatus ID of a mobile apparatus placed on the cradle 1 from the cradle 1 is received through the input/output terminal 26b and the external interface 26a (step S501). If it is determined by the decision process at step S501 that an apparatus ID is not received as yet, then the process at step S501 is repeated to wait that an apparatus ID of the mobile apparatus 4 placed on the cradle 1 is received.

If it is determined by the decision process at step S501 that an apparatus ID from the cradle 1 is received, then since it can be recognized that a new mobile apparatus 4 is placed on the cradle 1, the control section 11 forms a request for new accumulated data for requesting provision of new accumulated data. Then, the transmission/reception control section 27 transmits the request for new accumulate data through the external interface 26a so as to be transmitted to the mobile apparatus 4 placed on the cradle 1 through the cradle 1 (step S502).

Then, the transmission/reception control section 27 receives new accumulated data transmitted through the cradle 1 through the input/output terminal 26b and the external interface 26a and stores the new accumulated data, for example, into a predetermined region of the HDD 30 (step S503). It is to be noted that a plurality of new accumulated data may be transmitted from the mobile apparatus 4, and at step S503, such new accumulated data from the mobile apparatus 4 can be successively received and stored into the predetermined region of the HDD 30.

Then, the control section 21 of the server apparatus 2 executes a process of detecting erasure object data which are accumulated data which can be erased from the mobile apparatus 4 from among the accumulated data from the mobile apparatus 4 stored in the predetermined region of the HDD 30 (step S504). The erasure object data detection process at step S206 is same as the erasure data detection process described hereinabove with reference to FIGS. 14 and 15.

In particular, the control section 21 estimates, based on information added to the stored accumulated data of the detection object or through an analysis of the accumulated data, whether or not each accumulated data is important accumulated data. Then, if the accumulated data is estimated as important accumulated data, then it is not determined as an object of erasure, but if the accumulated data is not estimated as important accumulated data, then it is determined as an object of erasure.

Then, the control section 21 forms a request for erasure of accumulated data for erasing the erasure object data detected at step S504 from the image storage section 44 of the mobile apparatus 4. Then, the request for accumulated data erasure is transmitted through the external interface 26a and the input/output terminal 26b under the control of the transmission/reception control section 27 so as to be transmitted to the mobile apparatus 4 through the cradle 1 (step S505).

Thereafter, the transmission/reception control section 27 of the server apparatus 2 receives an erasure completion report transmitted from the mobile apparatus 4 of the opposite party, to which the request for accumulated data erasure has been transmitted, through the input/output terminal 26b and the external interface 26a (step S506). Thereafter, the control section 21 of the server apparatus 2 produces writing back data to be written back in a changed format into the mobile apparatus 4 from the accumulated data received from the mobile apparatus 4, stored in the HDD 30 and erased from the mobile apparatus 4 (step S507).

The production process of writing back data carried out at step S507 is same as the writing back data production process described hereinabove in detail with reference to FIG. 16. In particular, writing back data is produced after the format of the writing back data to be produced is specified. In the present modification, since the accumulated data backed up in the server apparatus 2 are still image data, it is specified that the format of the writing back data is reduced image data. Thus, reduced image data is formed from the backed up accumulated data and returned to the mobile apparatus 4.

Then, the transmission/reception control section 27 of the server apparatus 2 transmits the writing back data produced at step S507 through the external interface 26a and the input/output terminal 26b so as to be transmitted to the mobile apparatus 4 through the cradle 1 (step S508). Thereafter, the transmission/reception control section 27 of the server apparatus 2 receives a storage completion report of the writing back data transmitted from the mobile apparatus 4 through the cradle 1 and through the input/output terminal 26b and the external interface 26a (step S509), thereby ending the process illustrated in FIG. 21.

It is to be noted here that, although the process described above is an example wherein a communication process is carried out without a trouble, for example, in such an instance that no response is received when some request is transmitted from the server apparatus 2 to the mobile apparatus 4, transmission of the request may be carried out again or a request for response may be transmitted.

For example, if an erasure completion report is not received within a predetermined period of time at step S506, then a request for confirmation regarding whether or not an erasure process for accumulated data has been carried out may be transmitted. Alternatively, if a storage completion report is not received within a predetermined period of time at step S509, then a request for confirmation regarding whether or not writing back data is stored may be transmitted. Then, in response to the response, a suitable process may be carried out such as to transmit the original request again.

[Processing of the Mobile Apparatus 4]

Figure 22:
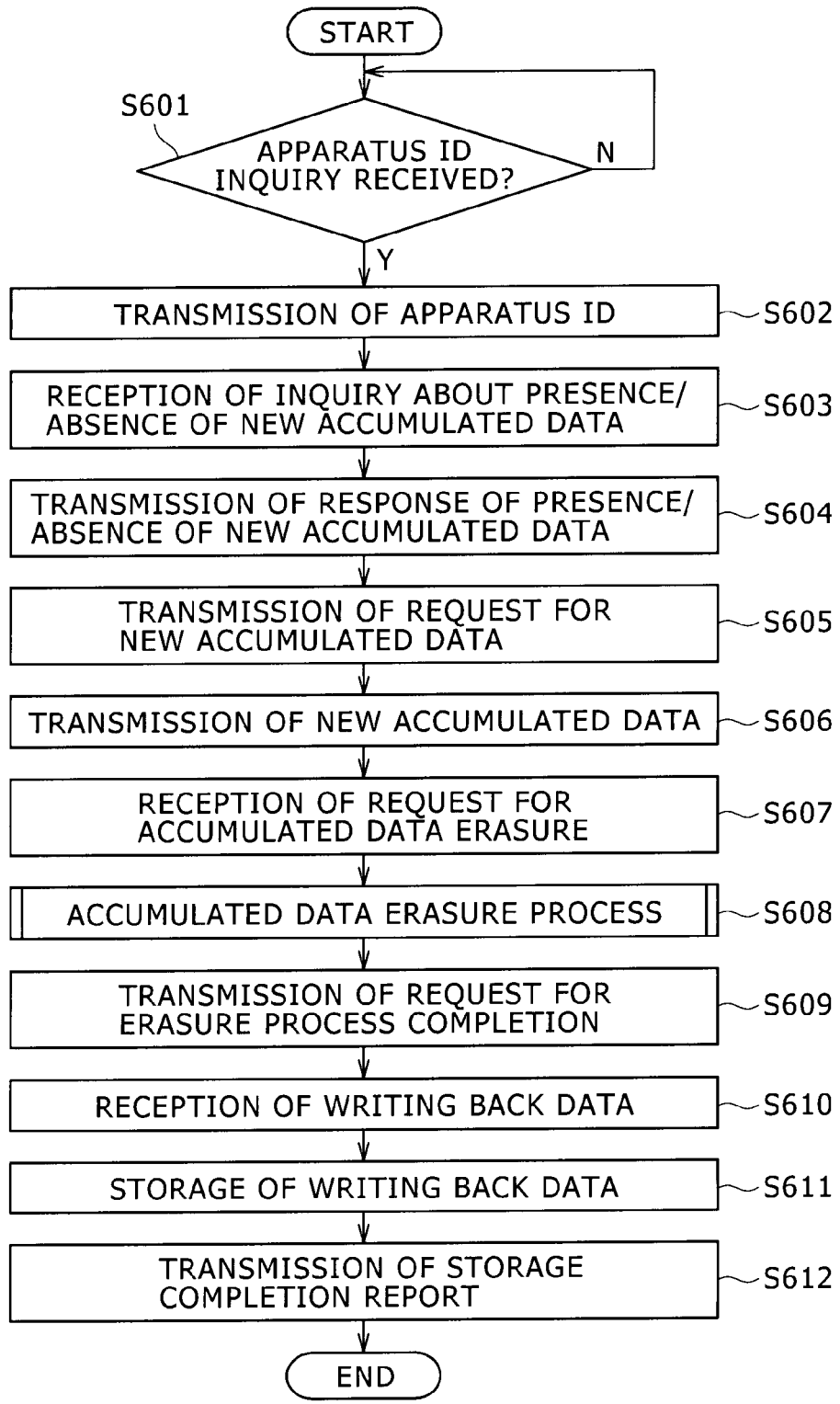
FIG. 22 is a flow chart illustrating a process carried out by the mobile apparatus of the modified data communication system.

FIG. 22 illustrates a process carried out by a mobile apparatus 4 of the modified data communication system. The process illustrated in FIG. 22 is executed principally by the control section 41, transmission/reception control section 47 and image erasure control section 48 of the mobile apparatus 4 when, while the mobile apparatus 4 is, for example, in the charging mode, it is placed on the cradle 1 and placed into a predetermined mode wherein data communication and a charging process are executed.

First, if the mobile apparatus 4 is placed into the predetermined mode, then the transmission/reception control section 47 determines whether or not an inquiry about an apparatus ID is received from the cradle 1 through the transmission/reception antenna 45b and the radio communication section

45a (step S601). If it is determined by the decision process at step S601 that an inquiry about an apparatus ID is not received, then the process at step S601 is repeated to wait that an inquiry abound an apparatus ID is received.

If it is determined by the decision process at step S601 that an inquiry about an apparatus ID is received from the cradle 1, then the control section 41 acquires necessary information such as an apparatus ID and an apparatus attribute stored and retained, for example, in the ROM 412 of the mobile apparatus 4 and forms such an apparatus ID response as described hereinabove with reference to FIG. 7C. Then, the transmission/reception control section 47 transmits the apparatus ID response to the cradle 1 through the radio communication section 45a and the transmission/reception antenna 45b (step S602).

Then, the transmission/reception control section 47 receives an inquiry about presence or absence of new accumulated data transmitted from the cradle 1 through the transmission/reception antenna 45b and the radio communication section 45a (step S603). Then, the control section 41 confirms stored data of the image storage section 44 of the mobile apparatus 4 and forms a response about presence or absence of new accumulated data. Then, the transmission/reception control section 47 transmits the response about presence or absence of new accumulated data through the radio communication section 45a and the transmission/reception antenna 45b so as to be transmitted to the server apparatus 2 through the cradle 1 (step S604).

Thereafter, the transmission/reception control section 47 receives a request for new accumulated data transmitted from the server apparatus 2 through the cradle 1 through the transmission/reception antenna 45b and the radio communication section 45a (step S605). The transmission/reception control section 47 extracts new accumulated data of such a format as described hereinabove with reference to FIG. 8 from the image storage section 44 of the mobile apparatus 4 in accordance with the received request for new accumulated data. Then, the transmission/reception control section 47 transmits the extracted new accumulated data through the radio communication section 45a and the transmission/reception antenna 45b so as to be transmitted to the server apparatus 2 through the cradle 1 (step S606).

Then, the transmission/reception control section 47 receives a request for erasure of accumulated data transmitted from the server apparatus 2 through the cradle 1 through the transmission/reception antenna 45b and the radio communication section 45a (step S607). Then, the control section 41 executes a process of erasing accumulated data whose erasure is designated from among the accumulated data stored and retained in the image storage section 44 of the mobile apparatus 4 in accordance with the received request for accumulated data erasure (step S608). The erasure process of accumulated data carried out at step S608 is same as the process described hereinabove with reference to FIG. 18.

Thereafter, the control section 41 forms an erasure process completion report, and the transmission/reception control section 47 transmits the erasure process completion report through the radio communication section 45a and the transmission/reception antenna 45b so as to be transmitted to the server apparatus 2 through the cradle 1 (step S609).

Then, the transmission/reception control section 47 receives writing back data transmitted from the server apparatus 2 through the cradle 1 and through the transmission/reception antenna 45b and the radio communication section 45a (step S610) and stores the writing back data into the image storage section 44 of the mobile apparatus 4 (step s611). Thereafter, the control section 41 forms a storage completion report, and the transmission/reception control section 47 transmits the storage completion report through the radio communication section 45a and the transmission/reception antenna 45b so as to be transmitted to the server apparatus 2 through the cradle 1 (step S612). The process illustrated in FIG. 22 is completed therewith.

In this manner, in the present modification, the cradle 1 confirms whether or not accumulated data which need be backed up into the server apparatus 2 exists in a mobile apparatus placed on the cradle 1. Then, if such accumulated data does not exist, then only a charging process is carried out for the mobile apparatus 4 without carrying out a communication process with the server apparatus 2.

[Others]

It is to be noted that, while, in the embodiment described above, one server apparatus 2 is connected to the cradle 1, the connection to the cradle 1 is not limited to this. For example, it is possible to connect the cradle 1 to a LAN (Local Area Network) or configure the cradle 1 so as to allow a plurality of server apparatus to be connected thereto such that the supplying destination of accumulated data can be changed in response to a mobile apparatus placed on the cradle 1.

In this instance, which one of the server apparatus should be used may be determined in response to the apparatus attribute or the like of the mobile apparatus by the cradle 1 or may be specified through an inquiry issued from the cradle 1 to the server apparatus to specify that one of the server apparatus into which accumulated data of the mobile apparatus was backed up using the apparatus ID or specified from an instruction inputted directly to the cradle 1 by the user.

Further, as a function of the cradle 1, setting of the time of the clock circuit of the mobile apparatus 4 or the server apparatus 2 may be carried out. For example, a radio-controlled clock or a clock circuit of a high performance may be used as the clock circuit 22 of the cradle 1 such that the time of the clock circuit 42 of the mobile apparatus 4 placed on the cradle 1 is set with reference to the time of the clock circuit 22 of the cradle 1 or the time of the clock circuit 22 of the server apparatus 2 is set. Further, also it is naturally possible for the reference time to be provided from the server apparatus 2 or some other apparatus.

Further, not only where a plurality of server apparatus are connected to the cradle 1 but also where only one server apparatus is connected to the cradle 1 as in the embodiment described hereinabove, since accumulated data are provided from various mobile apparatus to the server apparatus, the server apparatus may merge and manage such accumulated data from the various mobile apparatus in accordance with various conditions.

For example, it is possible to collectively manage accumulated data having the same production date and time although they are derived from different providing sources or collectively manage accumulated data for different types of data such as still images or moving images.

Further, the mobile apparatus is not limited to a portable telephone terminal, a digital still camera, a digital video camera or a portable music reproduction apparatus mentioned as an example hereinabove. For example, if the mobile apparatus 4 is an apparatus which picks up still image data such as a digital still camera or a portable telephone set with a camera as described above, then it is possible to supply still image data picked up and accumulated to the server apparatus 2 through the cradle 1 so as to be backed up into the server apparatus 2 and produce reduced image data formed from the backed up still image data as writing back data and then return the writing back data to the mobile apparatus 4 as described hereinabove.

On the other hand, where the mobile apparatus 4 is an apparatus which picks up moving image data such as a digital video camera or a camera-equipped portable telephone terminal, it is possible to supply moving image data picked up and accumulated to the server apparatus 2 through the cradle 1 so as to be backed up into the server apparatus 2 and produce moving picture data of a digest version formed from the backed up moving image data as writing back data and then return the writing back data to the mobile apparatus 4 as described hereinabove.

Further, where the mobile apparatus 4 has a reproduction function of music, it is possible for the server apparatus 2 to collect reproduction history information of music data by the apparatus through the cradle 1, analyze the liking of music of the user of the mobile apparatus and provide recommendable music data conforming to the music liking of the user to the mobile apparatus through the cradle 1. Naturally, it is possible to provide only music data designated to the server apparatus 2 by the user to the mobile apparatus.

Further, where the mobile apparatus 4 is an apparatus which can record and access individual pieces of information like an electronic notebook, it is possible to provide various kinds of information such as a schedule or a memorandum registered newly in the mobile apparatus to the server apparatus 2 so as to be stored into the server apparatus 2 and return only that data designated by the user. The designation in this instance may be provided in advance to the server apparatus 2 or may be selected by the user who observes data backed up in the server apparatus 2 at a point of time at which the data is backed up into the server apparatus 2.

Further, where the mobile apparatus 4 is of the type which has a function of carrying out communication such as a portable telephone terminal, it is possible to automatically back up address book data or the like into the server apparatus 2 through the cradle 1. Naturally, also it is possible to back up other communication information into the server apparatus 2 through the cradle 1. Also it is possible to provide new address book data registered in the server apparatus 2 to a mobile apparatus through the cradle 1 so as to be recorded into the mobile apparatus such that the address book data can be utilized on the mobile apparatus. Also the data communication between the server apparatus 2 and the mobile apparatus in this instance can be automatically carried out basically by placing the mobile apparatus 4 on the cradle 1.

Further, it is possible for the server apparatus 2 to provide the same information to a plurality of mobile apparatus determined in advance through the cradle 1 or provide the same information to those mobile apparatus which have the same apparatus attribute. In this instance, the plural mobile apparatus may be placed simultaneously on the cradle 1 or may be placed at different timings from each other.

Further, it is possible for the server apparatus 2 to lay various data acquired from the mobile apparatus 4 open through the cradle 1 or provide various data acquired from the mobile apparatus 4 to a different apparatus in the home or a recording and reproduction apparatus through the cradle 1 so as to be reproduced or recorded.

Furthermore, where the server apparatus 2 collects information from the mobile apparatus 4 or provides information to the mobile apparatus 4 through the cradle 1, it is possible for the server apparatus 2 to issue a notification of the collection or provision to a different server apparatus connected to the network so as to notify the user that such collection or provision is carried out through the different server apparatus.

Further, while, in the embodiment described above, the cradle 1 controls charging of the mobile apparatus 4, the charging control is not limited to this. For example, the mobile apparatus 4 may control the charging process.

Further, while, in the embodiment described above, it is described that the cradle 1 and the server apparatus 2 are separate from each other, they may otherwise be formed as a unitary apparatus. Further, while, in the embodiment described above, the server apparatus 2 can be implemented, for example, as a personal computer or a server apparatus of a home network system, also it is possible to configure the server apparatus 2 as a control apparatus for the cradle 1.

Further, a program for executing the process of the flow chart illustrated in FIG. 12 is a transfer control program. The program is formed and recorded in the ROM 112 of the cradle 1 having the configuration described hereinabove with reference to FIG. 2 such that it can be executed by the CPU 111 of the control section 11.

Furthermore, a program for executing the processes of the flow charts illustrated in FIGS. 13 to 16 is a communication control program. The program is formed and recorded in the ROM 212 of the server apparatus 2 having the configuration described hereinabove with reference to FIG. 3 such that it can be executed by the CPU 211 of the control section 21.

Second Embodiment

Figure 23:
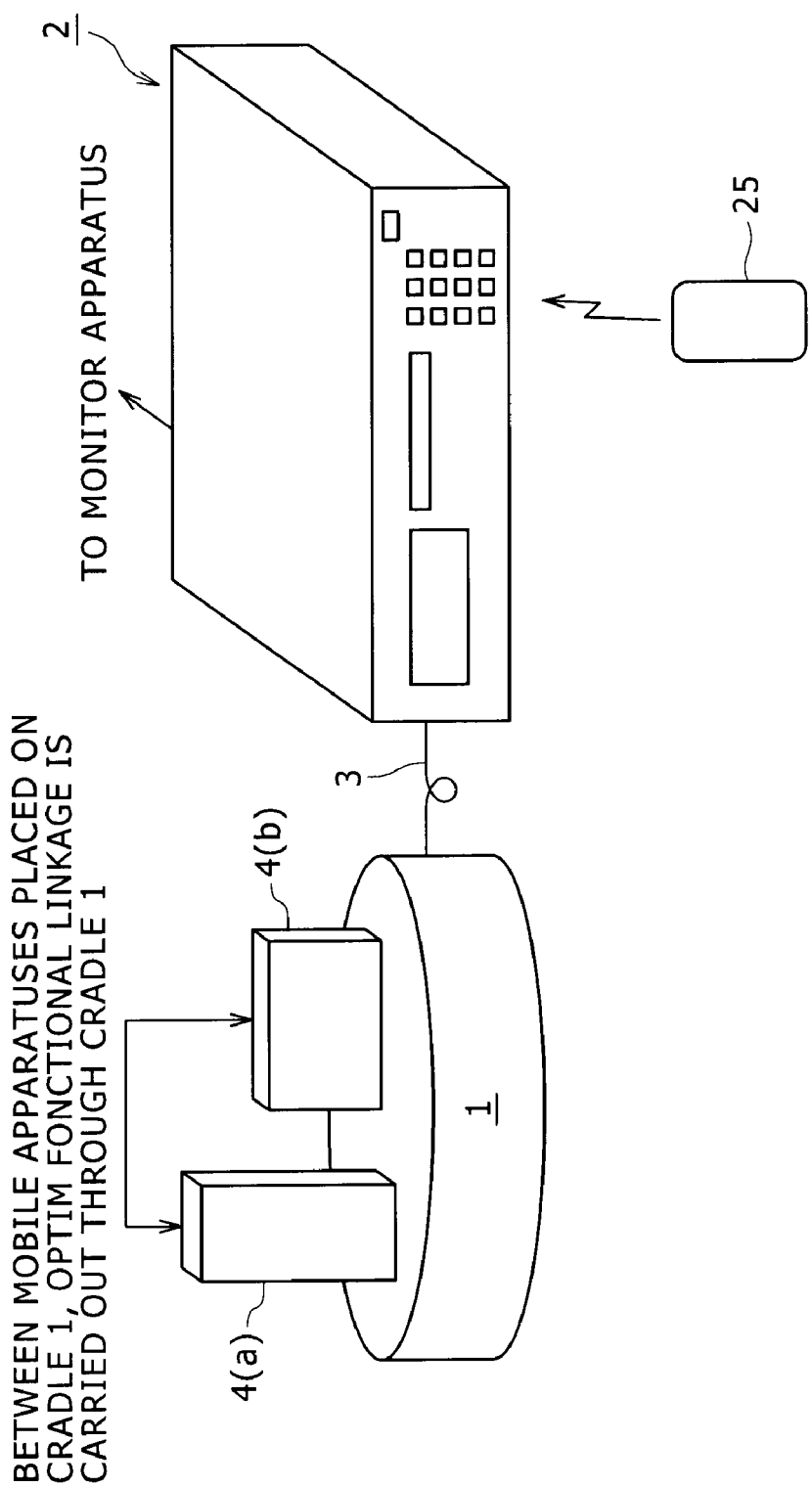
FIG. 23 is a schematic view showing a general configuration of a data communication system according to a second embodiment of the present invention.

Now, a data communication system according to a second embodiment of the present invention is described. FIG. 23 shows an example of a configuration of the data communication system of the second embodiment. As seen in FIG. 23, also the data communication system of the second embodiment is configured similarly to the data communication system of the first embodiment described hereinabove with reference to FIG. 1.

In particular, referring to FIG. 23, the data communication system of the second embodiment includes various mobile apparatus 4(a), 4(b), . . . , a cradle 1 and a server apparatus 2. The cradle 1 and the server apparatus 2 are connected by wire connection to each other by an interface cable 3.

Here, the cradle 1 has a configuration same as that described hereinabove with reference to FIG. 2. Meanwhile, the server apparatus 2 has a configuration same as that described hereinabove with reference to FIG. 3. Meanwhile, the mobile apparatus 4(a), 4(b), . . . may be formed from various image pickup apparatus such as, for example, an image pickup apparatus such as a digital still camera or a digital video camera described hereinabove with reference to FIG. 4 or a portable telephone terminal hereinafter described.

The cradle 1 is connected to any mobile apparatus 4 placed thereon by wireless connection using a short-distance wireless communication technique. As hereinafter described, communication between any mobile apparatus placed on the cradle 1 and the server apparatus 2 connected by wire connection to the cradle 1 is carried out through the cradle 1.

Also in the data communication system of the second embodiment, inquiries, responses, requests, reports and so forth to be transmitted and received are formed in accordance with the layout described hereinabove with reference to FIG. 7A.

As described hereinabove, in the first embodiment, data accumulated in a mobile apparatus can be backed up into the server apparatus 2 through the cradle 1, and an instruction to delete backed up data can be transmitted from the server apparatus 2 to a mobile apparatus such that accumulated data in the mobile apparatus are arranged. Further, backed up data can be subjected to such process as resizing and then returned from the server apparatus 2 to the mobile apparatus.

In contrast, the data communication system of the second embodiment described below makes it possible to reinforce linkage between different mobile apparatus placed on the cradle 1 by the cradle 1 and the server apparatus 2. In particular, transmission and reception of necessary data can be carried out between the mobile apparatus 4(a) and the mobile apparatus 4(b) placed on the cradle 1 through the cradle 1 such that optimum apparatus linkage can be anticipated.

As linkage between mobile apparatus which can be implemented through the cradle 1, (1) linkage as a first example which uses image data implemented between an image pickup apparatus and a portable telephone terminal, (2) linkage as a second example which uses music data implemented between a portable music reproduction machine and an image pickup apparatus, (3) linkage as a third example which uses text data implemented between an image pickup apparatus and a portable telephone terminal, and (4) linkage as a fourth example which uses image data or information relating to such image data implemented between an image pickup apparatus and a portable telephone terminal are available. In the following, the linkage of each of the first to fourth examples is described in detail.

[(1) Linkage of the First Example which Uses Image Data Between an Image Pickup Apparatus and a Portable Telephone Terminal]

Figure 24:
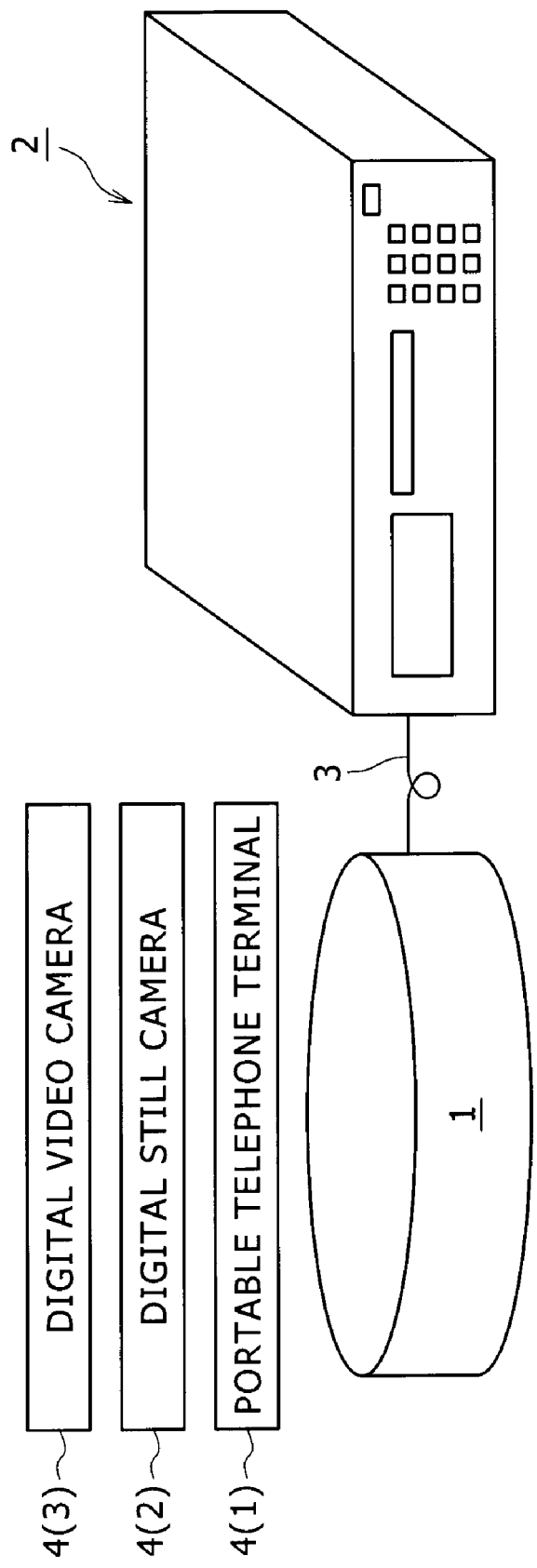
FIG. 24 is a schematic view showing a general configuration of a data communication system according to a first example of the second embodiment of the present invention.

FIG. 24 illustrates an outline of the linkage of the first example which uses image data between an image pickup apparatus and a portable telephone terminal. As described hereinabove, a plurality of various mobile apparatus can be placed simultaneously on the cradle 1. Therefore, for example, a portable telephone terminal 4(1) and an image pickup apparatus such as a digital still camera 4(2) or a digital video camera 4(3) may be placed on the cradle 1 as seen in FIG. 24.

What is significant here is that, although the portable telephone terminal 4(1) and an image pickup apparatus are placed on the cradle 1, the timings at which they are placed on the cradle 1 may be different from each other. For example, the portable telephone terminal 4(1) may be placed first on the cradle 1, then an image pickup apparatus is placed on the cradle 1 after lapse of several hours. On the contrary, an image pickup apparatus may be placed first on the cradle 1, then the portable telephone terminal 4(1) is placed. The point is that the portable telephone terminal 4(1) and an image pickup apparatus are in a situation wherein both are placed on the cradle 1.

After such a situation as just described is established, image data are automatically transferred from the image pickup apparatus placed on the cradle 1 to the portable telephone terminal 4(1). In this instance, the image data are not merely transferred.

For example, if the portable telephone terminal 4(1) and the digital still camera 4(2) are placed on the cradle 1, then the function of the server apparatus 2 is used to reduce still image data stored and retained in the cradle 1 to form image data resized for the portable telephone terminal 4(1), and the thus formed image data is transferred to the portable telephone terminal 4(1) so as to be utilized on the portable telephone terminal 4(1).

On the other hand, if the portable telephone terminal 4(1) and the digital video camera 4(3) are placed on the cradle 1, then the function of the server apparatus 2 is used to produce moving image data of a digest version from moving image data stored and retained in the digital video camera 4(3), and the moving picture data of the digest version is transferred to the portable telephone terminal 4(1) so as to be utilized on the portable telephone terminal 4(1).

By this, the linkage in function between the portable telephone terminal 4(1) and the image pickup apparatus such as the digital still camera 4(2) or the digital video camera 4(3) is reinforced such that still image data or moving image data obtained by image pickup by the image pickup apparatus can be transferred in a changed form to and utilized on the portable telephone terminal 4(1).

In the following description of the linkage of the first example, it is assumed that the portable telephone terminal 4(1) and the digital still camera 4(2) are placed on the cradle 1.

[Example of a Configuration of the Portable Telephone Terminal 4(1) as a Mobile Apparatus]

Figure 25:
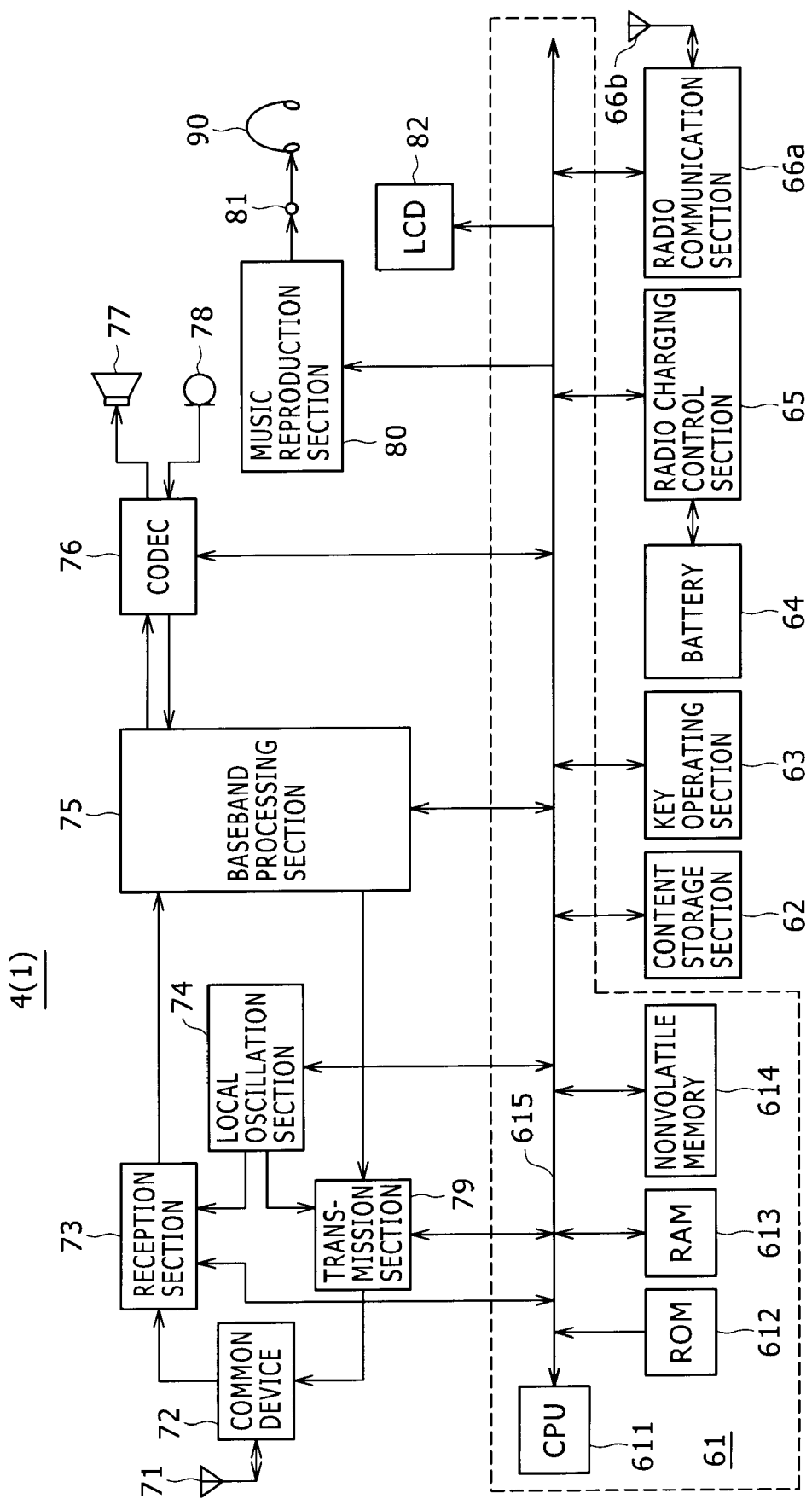
FIG. 25 is a block diagram showing an example of a configuration of the portable telephone terminal used in the data communication system of the second embodiment.

FIG. 25 shows an example of a configuration of the portable telephone terminal 4(1) which is one of mobile apparatus used in the data communication system of the second embodiment. Referring to FIG. 25, the portable telephone terminal 4(1) used in the data communication system of the second embodiment includes a control section 61, a content storage section 62, a key operation section 63, a battery 64, a radio charging control section 65, a radio communication section 66a, and a transmission/reception antenna 66b. The portable telephone terminal 4(1) further includes a transmission/reception antenna 71, an antenna common device 72, a reception section 73, a local oscillation section 74, a baseband processing section 75, a codec 76, an earpiece (speaker) 77, a transmitter (microphone) 78, a transmission section 79, a music reproduction section 80, a sound output terminal 81, and an LCD apparatus 82.

First, the control section 61 and the content storage section 62, key operation section 63, battery 64, radio charging control section 65, radio communication section 66a, transmission/reception antenna 66b, music reproduction section 80 and LCD apparatus 82 connected to the control section 61 are described.

The control section 61 controls the components of the portable telephone terminal 4(1) which is one of mobile apparatus used in the present second embodiment, and is a microcomputer formed from a CPU 611, a ROM 612, a RAM 613 and a nonvolatile memory 614 connected to each other through a CPU bus 615.

The CPU 611 serves as a core of control and executes a program stored and retained in the ROM 612 or the like to form control signals to be supplied to the components of the portable telephone terminal 4(1) and supply the produced control signals to the components or accept signals from the components and process the signals. The ROM 612 stores and retains various programs to be executed by the CPU 611 and various data necessary for the processes such as font data as described hereinabove.

The RAM 613 is used principally as a working area for temporarily storing midway results in the various processes. The nonvolatile memory 614 is formed from an EEPROM or a flash memory and stores and retains information to be maintained even if the power supply to the portable telephone terminal 4(1) is turned off such as, for example, various setting parameters, telephone directly data, electronic mail data, programs provided newly for addition of a function and so forth.

To the control section 61 configured in such a manner as described above, the content storage section 62 is connected as seen in FIG. 25. The content storage section 62 includes a semiconductor memory as a recording medium, and a memory controller for writing and reading out data into and from the semiconductor memory.

Into and in the storage medium of the content storage section 62, music data or AV (Audio/Visual) data downloaded from a server apparatus on a wide area network such as the Internet or still image data or moving image data from the server apparatus 2 through the cradle 1 or from a mobile apparatus such as a digital still camera or a digital video camera are stored and retained so as to be utilized later.

It is to be noted that the semiconductor memory of the content storage section 62 may be a card memory removably loadable into the portable telephone terminal 4(1) in the second embodiment. Alternatively, not the semiconductor memory but some other recording medium such as a small-sized hard disk may be used.

The key operation section 63 is connected to the control section 61 as seen in FIG. 25. Though not shown, the key operation section 63 includes a plurality of keys such as ten keys or numeral keys, various function keys and a jog dial key which allows turning operation and depression operation such that various operation inputs from the user are accepted.

An operation input from the user accepted through the key operation section 63 is converted into an electric signal and supplied to the control section 61. Consequently, the control section 61 controls the components of the portable telephone terminal 4(1) in response to an instruction from the user so that a process in accordance with the instruction of the user can be carried out.

Further, the radio charging control section 65 is connected to the control section 61. The radio charging control section 65 controls a charging process of the battery 64 such as to supply power, which is supplied thereto through the charging control section 19 of the cradle 1, to the battery 64 connected to the radio charging control section 65. The battery 64 is charged by the radio charging control section 65 and supplies power necessary for the components of the portable telephone terminal 4(1).

Further, the radio communication section 66a is connected to the control section 61. The radio communication section 66a includes the transmission/reception antenna 66b. The radio communication section 66a and the transmission/reception antenna 66b carry out data communication with the cradle 1 by short distance wireless communication.

Accordingly, the radio communication section 66a and the transmission/reception antenna 66b can carry out wireless communication with the cradle 1 using a radio communication technique such as the UWB (Ultra WideBand) or the Bluetooth or other various short distance wireless communication techniques or short distance wireless communication techniques similarly to the radio communication section 15a and the transmission/reception antenna 15b of the cradle 1 described hereinabove.

Further, as seen in FIG. 25, in the portable telephone terminal 4(1), the music reproduction section 80 is connected to the control section 61. To the music reproduction section 80, compressed music data read out from the content storage section 62 by the control section 61 is supplied. The music reproduction section 80 decompresses the compressed music data supplied thereto to restore original uncompressed music data, produces an analog music signal to be outputted from the restored music data and outputs the analog music signal through the sound output terminal 81. A headphone 90 or the like is connected to the sound output terminal 81 as seen in FIG. 25 such that the user can enjoy reproduction sound through the headphone 90 or the like.

It is to be noted here that, while it is described that the music reproduction section 80 carries out a reproduction process of music data, it can carry out a reproduction process not only of music data but also of various sound data such as voice. Further, the music reproduction section 80 carries out also various adjustment processes for music data or an analog music signal, an amplification process for an analog sound signal and so forth.

Further, the LCD apparatus 82 is connected to the control section 61 as seen in FIG. 25. The LCD apparatus 82 includes an LCD controller and can cause various display information to be displayed on the display screen of the LCD apparatus 82 under the control of a control signal from the control section 61. It is to be noted that AV data are demultiplexed into audio data and video data by the control section 61, and the audio data is supplied to the music reproduction section 80 while the video data is supplied to the LCD apparatus 82 such that they can be reproduced in a synchronized relationship with each other.

Further, also still image data or moving image data provided through the cradle 1 and stored and retained in the content storage section 62 can be read out and subjected to a predetermined process such as a decompression process by the control section 61 and resulting data is supplied to the LCD apparatus 82. Consequently, an image based on the thus supplied still image data or moving image data is displayed on the display screen of the LCD apparatus 82 so that it can be provided to the user. In other words, the present portable telephone terminal 4(1) has also a reproduction function of still image data or moving image data.

Further, though not shown in FIG. 25, also a ringer, a vibrator, a clock circuit and so forth are connected to the control section 61 such that the arrival of a signal or a warning can be conveyed in the form of sound or vibration to the user or it is possible to implement a calendar function, notify the user of the time at present or implement an alarm clock function.

Now, a reception system of the mobile apparatus 4 shown in FIG. 25 is described. A reception signal received through the transmission/reception antenna 71 is supplied to the reception section 73 through the antenna common device 72. The reception section 73 carries out necessary bandwidth limitation and AGC (Automatic Gain Control) so that the reception signal may have an appropriate level. The reception section 73 further carries out a process of adjusting the frequency of the reception signal to a fixed frequency based on a signal from the local oscillation section (or frequency synthesizer) 74 and supplies a signal after the process to the baseband processing section 75.

The baseband processing section 75 carries out A/D (Analog/Digital) conversion of the signal from the reception section 73 and further carries out removal of influence of fading and so forth, decision of the type of the received signal, deinterleave and error correction. Further, the baseband processing section 75 carries out an appropriate decoding process to separate conversation voice data and other communication data. Then, the conversation voice data is supplied to the codec 76 having a configuration of a DSP (Digital Signal Processor). Meanwhile, the other communication data such as, for example, various control information, character data, Web page data and music data (music content) are provided to the control section 61.

The codec 76 D/A converts sound data from the baseband processing section 75 to form an analog sound signal and supplies the analog sound signal to the earpiece 77. The earpiece 77 is driven by the analog sound signal from the codec 76 to emit sound corresponding to the reception signal.

Meanwhile, the communication data supplied from the baseband processing section 75 to the control section 61 are temporarily stored, where they are control data or character data for a portable telephone terminal, for example, into the RAM 613 of the control section 61 and used in the portable telephone terminal 4(1). Further, the other content data such as music data are supplied to and stored and retained into the content storage section 62 such that they can be read out and utilized as occasion demands.

Now, a transmission system of the portable telephone terminal 4(1) shown in FIG. 25 is described. The microphone 78 converts collected sound into an analog sound signal and supplies the analog sound signal to the codec 76. The codec 76 A/D converts the analog sound signal received from the microphone 78 to form a digital sound signal and supplies the digital sound signal to the baseband processing section 75.

The baseband processing section 75 encodes and compresses the digital sound signal from the codec 76 in accordance with a predetermined encoding method and collects the resulting signal into predetermined blocks. Further, the baseband processing section 75 can collect also digital data for transmission and so forth supplied through the control section 61 and accepted through the key operation section 63 into predetermined blocks. The baseband processing section 75 collects the compressed digital sound signal and the digital data for transmission and supplies resulting data to the transmission section 79.

The transmission section 79 forms a modulation signal from the digital data received from the baseband processing section 75 and mixes the modulation signal and the signal for conversion from the local oscillation section 74 to form a transmission modulation signal in order to convert the frequency of the modulation signal into a predetermined transmission frequency. The transmission modulation signal formed by the transmission section 79 is transmitted from the transmission/reception antenna 71 past the antenna common device 72.

In the portable telephone terminal having such a reception system and a transmission system as described above, upon waiting reception or upon waiting, the control section 61 supervises the reception signal from the baseband processing section 75 to detect the arrival of a signal at the portable telephone terminal. Then, if the arrival of a signal is detected, then the control section 61 controls the ringer not shown to generate a ring or ringer sound or controls the vibrator not shown to generate vibration to notify the user of the portable telephone terminal 4(1) of the arrival of a signal at the portable telephone terminal 4(1).

Then, if the user of the portable telephone terminal 4(1) carries out an off-hook operation such as to depress a conversation starting key provided on the key operation section 63 provided on the portable telephone terminal 4(1) and having ten keys, various function keys and so forth to respond to the arrival of the signal, then the control section 61 may signal a connection response or the like through the transmission system to connect a communication circuit so that conversion can be carried out by operation of the reception system and the transmission system as described above.

Further, when a telephone call is to be originated, an off-hook operation such as to depress the conversion starting key of the key operation section 63 described above is carried out, then a telephone number of the other party is selected through the ten keys or dial key of the key operation section 63 or from telephone number data registered in advance to carry out a dialing operation.

Consequently, the control section 61 forms and transmits a call origination request through the transmission system to connect a communication circuit to a telephone terminal of the other opposite party. Then, if a call termination response from the opposite party is sent back and the connection of the communication circuit is confirmed, then telephone conversation can be carried out by operation of the reception system and the transmission system as described above.

Further, the portable telephone terminal 4(1) can connect to the Internet. Consequently, by inputting and transmitting a URL (Uniform Resource Locator) through a provider function provided, for example, from a telephone company, it is possible to acquire information of a Web page or the like and display the information on the LCD apparatus 82 through the control section 61 or to download music data, that is, a music content, from an object server on the Internet and store and retain the music data into the content storage section 62 so that it can be utilized later.

Further, the portable telephone terminal 4(1) can produce electronic mail data for transmission in the nonvolatile memory 614 based on information inputted through the key operation section 63 and/or the LCD apparatus 82 and transmit the electronic mail data to a mail server of the object opposite party through the Internet. Further, the portable telephone terminal 4(1) can receive an electronic mail destined from the mail server, store the electronic mail into the nonvolatile memory 614 and display and utilize the electronic mail on the LCD apparatus 82.

In this manner, the portable telephone terminal 4(1) used as one of mobile apparatus in the data communication system of the second embodiment can carry out telephone communication or data communication through a wide area network such as a portable telephone network or the Internet.

[Example of a Configuration of an Apparatus Linkage Table]

Now, an example of a configuration of an apparatus linkage table produced, for example, in the nonvolatile memory 214 of the server apparatus 2 in the data communication system of the second embodiment is described. Where certain mobile apparatus are placed on the cradle 1, if it is not determined precisely what processes should be carried out between the mobile apparatus in order to achieve functional linkage between the apparatus placed on the cradle 1, then an appropriate process cannot be carried out as described hereinabove.

Therefore, an apparatus linkage table which makes it possible to specify what processes should be carried out between two arbitrary mobile apparatus where the two arbitrary mobile apparatus are placed on the cradle 1 is produced in the nonvolatile memory 214 of the server apparatus 2. FIG. 26 illustrates an example of a configuration of the apparatus linkage table.

Referring to FIG. 26, the apparatus linkage table includes a sequence number (No.), an apparatus 1 and an apparatus 2 which are linkage apparatus, the linkage process substance and a program ID. The sequence number indicates information of the registration order number in the apparatus linkage table. The apparatus 1 and the apparatus 2 as linkage apparatus are information representative of apparatus which are linked to each other, and, for example, an apparatus ID is used to represent each of the apparatus 1 and the apparatus 2. The linkage process substance represents what process should be carried out between the apparatus 1 and the apparatus 2 of the linkage apparatus. The program ID indicates program ID of a program to be executed by the server apparatus 2 when such process is executed through the server apparatus 2.

In the apparatus linkage table of the example shown in FIG. 26, the first set of registration information represents that, as the linkage apparatus, the apparatus 1 is a "digital still camera" and the apparatus 2 is a "portable telephone terminal"; the substance of the linkage process is a process of "resizing still image data of the digital still camera (apparatus 1) and copying the resized still image data into the portable telephone terminal (apparatus 2) so that the resized still image data can be utilized on the portable telephone terminal". Then, the program ID of a program executed by the server apparatus 2 in order to carry out the linkage process described is "PG1".

In the apparatus linkage table of the example shown in FIG. 26, the second set of registration information represents that, as the linkage apparatus, the apparatus 1 is a "digital video camera" and the apparatus 2 is a "portable telephone terminal"; the substance of the linkage process is a process of "producing moving image data of a digest from moving image data of the digital video camera (apparatus 2) and copying the produced digest moving image data into the portable telephone terminal (apparatus 2) so that the digest moving image data can be utilized on the portable telephone terminal". Then, the program ID of a program executed by the server apparatus 2 in order to carry out the linkage process described is "PG2".

Then, while details are hereinafter described, if a plurality of mobile apparatus are placed on the cradle 1, then the server apparatus 2 receives a notification regarding what mobile apparatus are placed on the cradle 1 from the cradle 1 and refers to the apparatus linkage table illustrated in FIG. 26 based on the notification to specify a process to be carried out and then carries out the process.

[Operation of the System where Linkage which Uses Image Data is Carried Out]

Now, operation of the data communication system for carrying out linkage using image data between mobile apparatus where the portable telephone terminal 4(1) and the digital still camera 4(2) are used as the mobile apparatus is described. FIGS. 27 and 28 are timing charts each illustrates operation of the data communication system for carrying out linkage using image data between the mobile apparatus.

It is to be noted that, while the timings at which the portable telephone terminal 4(1) and the digital still camera 4(2) are placed on the cradle 1 do not particularly matter as described hereinabove, it is assumed here that, in the following description, the portable telephone terminal 4(1) is placed first on the cradle 1 and then the digital still camera 4(2) is placed on the cradle 1 for simplified description.

In this first example, such an accumulated data list as described hereinabove with reference to FIG. 8 and accumulated data described hereinabove with reference to FIG. 9 are stored and retained in the image storage section 44 of the digital still camera 4(2). Further, resized image data, for example, of the configuration described hereinabove with reference to FIG. 10 provided through the cradle 1 are stored in the content storage section 62 of the portable telephone terminal 4(1).

Referring to FIG. 27, while the cradle 1 remains in a state wherein the power supply thereto is on, it uses the function of the placement detection section 16 to determine after every predetermined interval of time whether or not a mobile apparatus 4 is placed. Then, if it is detected that a mobile apparatus 4 is placed on the cradle 1, then the cradle 1 executes a charging starting process (step S51).

It is to be noted that also the cradle 1 in the present second embodiment allows a plurality of mobile apparatus to be placed at a time thereon and can detect that a mobile apparatus is placed thereon every time a new mobile apparatus is placed thereon. As hereinafter described, the charging starting process is applied such that charging is carried out only for the battery of a mobile apparatus which has a small charging capacity and requires charging, but it is not carried out for the battery of any mobile apparatus which has a sufficient charging capacity and does not require charging.

After the process at step S51, the cradle 1 issues an inquiry about an apparatus ID to the mobile apparatus whose placement on the cradle 1 is detected. Then, the cradle 1 carries out a relaying process of receiving an apparatus ID response transmitted from the mobile apparatus in response to the inquiry about an apparatus ID and transmitting the apparatus ID response to the server apparatus 2. In the present example, since the portable telephone terminal 4(1) is placed first on the cradle 1 as described hereinabove, the cradle 1 first forms an inquiry about an apparatus ID described hereinabove with reference to FIG. 7B to the portable telephone terminal 4(1) and transmits the inquiry about an apparatus ID to the portable telephone terminal 4(1) through the radio communication section 15a and the transmission/reception antenna 15b (step S52).

The portable telephone terminal 4(1) receives the inquiry about an apparatus ID from the cradle 1 through the transmission/reception antenna 66b and the radio communication section 66a and forms an apparatus ID response described hereinabove with reference to FIG. 7C. Then, the portable telephone terminal 4(1) transmits the apparatus ID response through the radio communication section 66a and the transmission/reception antenna 66b (step S53). The cradle 1 receives the apparatus ID response from the portable telephone terminal 4(1) through the transmission/reception antenna 15b and the radio communication section 15a and transmits the apparatus ID response to the server apparatus 2 through the external interface 14a and the input/output terminal 14b.

The server apparatus 2 receives the apparatus ID response from the cradle 1 through the input/output terminal 26b and the external interface 26a. From the apparatus ID response or apparatus ID report transmitted through the cradle 1 in this manner, the server apparatus 2 can recognize that the portable telephone terminal 4(1) is placed on the cradle 1.

Then, in the present case, the digital still camera 4(2) is placed on the cradle 1 subsequently to the portable telephone terminal 4(1). Therefore, after the charging starting process for the digital still camera 4(2) is started, the cradle 1 forms an apparatus ID inquiry described hereinabove with reference to FIG. 7B for the digital still camera 4(2) and transmits the apparatus ID inquiry to the digital still camera 4(2) through the radio communication section 15a and the transmission/reception antenna 15b (step S54).

The digital still camera 4(2) receives the apparatus ID inquiry from the cradle 1 through the transmission/reception antenna 45b and the radio communication section 45a and forms an apparatus ID response described hereinabove with reference to FIG. 7C. Then, the digital still camera 4(2) transmits the apparatus ID response through the radio communication section 45a and the transmission/reception antenna 45b (step S55). Consequently, the cradle 1 receives the apparatus ID response from the digital still camera 4(2) through the transmission/reception antenna 15b and the radio communication section 15a and transmits the apparatus ID response to the server apparatus 2 through the external interface 14a and the input/output terminal 14b.

The server apparatus 2 receives the apparatus ID response from the cradle 1 through the input/output terminal 26b and the external interface 26a. From the apparatus ID response or apparatus ID report transmitted from the cradle 1 in this manner, the server apparatus 2 can recognize that the digital still camera 4(2) is placed on the cradle 1.

Then, every time the server apparatus 2 recognizes that a new mobile apparatus is placed on the cradle 1, the control section 21 determines whether or not the cradle 1 is in a state wherein a plurality of mobile apparatus are placed thereon.

Then, if the cradle 1 is in a state wherein a plurality of mobile apparatus are placed thereon, then the control section 21 refers to the apparatus linkage table described hereinabove with reference to FIG. 26 produced in the nonvolatile memory 214 of the server apparatus 2 to determine a linkage process of the apparatus to be carried out and then registers the apparatus to be linked to each other (step S56).

More particularly, the control section 21 of the server apparatus 2 confirms whether or not the combination of the mobile apparatus newly placed on the cradle 1 and the mobile apparatus placed already on the cradle 1 is same as one of the registered combinations of the apparatus 1 and the apparatus 2 in the column of the linkage apparatus of the apparatus linkage table referred to. Then, if the same combination is found, then the control section 21 specifies a linkage process of the apparatus to be executed and registers the apparatus to be linked to each other into the nonvolatile memory 214.

It is to be noted that the determination regarding the combination of the mobile apparatus newly placed on the cradle 1 and the mobile apparatus placed already on the cradle 1 is carried out to determine whether or not the same combination is found in regard to both of a case wherein the mobile apparatus placed newly on the cradle 1 is the apparatus 1 and the mobile apparatus placed already on the cradle 1 is the apparatus 2 and another case wherein the mobile apparatus placed newly on the cradle 1 is the apparatus 2 and the mobile apparatus placed already on the cradle 1 is the apparatus 1 However, if the same combination is not found, then since there is no linkage process of the apparatus to be carried out, later processes for the linkage are not carried out.

In the present example, the mobile apparatus placed on the cradle 1 are the portable telephone terminal 4(1) and the digital still camera 4(2), and this combination is same as the combination registered first in the apparatus linkage table illustrated in FIG. 26. In this instance, the digital still camera 4(2) is the apparatus 1 and the portable telephone terminal 4(1) is the apparatus 2, and this combination is registered into the nonvolatile memory 214 of the server apparatus 2. Further, it is specified to carry out a process of resizing still image data stored and retained in the digital still camera 4(2) and copying the resized still image data into the portable telephone terminal 4(1).

Then, the server apparatus 2 forms a request for an accumulated data list for requesting provision of an accumulated data list to the digital still camera 4(2) and outputs the request for an accumulated data list through the external interface 26*a* and the input/output terminal 26*b* so as to be transmitted to the digital still camera 4(2) through the cradle 1 (step S57). In this instance, the cradle 1 receives the request for an accumulated data list from the server apparatus 2 through the input/output terminal 14*b* and the external interface 14*a* and transmits the request for an accumulated data list to the digital still camera 4(2) through the radio communication section 15*a* and the transmission/reception antenna 15*b*.

The digital still camera 4(2) receives the request for an accumulated data list from the server apparatus 2 transmitted through the cradle 1 through the transmission/reception antenna 45*b* and the radio communication section 45*a*. Then, the digital still camera 4(2) transmits the accumulated data list described hereinabove with reference to FIG. 8 to the server apparatus 2 through the radio communication section 45*a* and the transmission/reception antenna 45*b* in accordance with the received request for an accumulated data list (step S58). In this instance, the cradle 1 receives the accumulated data list from the digital still camera 4(2) through the transmission/reception antenna 15*b* and the radio communication section 15*a* and transmits the accumulated data list to the server apparatus 2 through the external interface 14*a* and the input/output terminal 14*b*.

The server apparatus 2 receives the accumulated data list from the digital still camera 4(2) transmitted thereto through the cradle 1 through the input/output terminal 26*b* and the external interface 26*a* and stores the accumulated data list into a predetermined region of the HDD 30 of the server apparatus 2 (step S59). Then, the processing advances to the process illustrated in FIG. 28.

Referring to FIG. 28, the server apparatus 2 specifies image data which have not been provided as yet from the difference between the accumulated data list stored into the HDD 30 of the server apparatus 2 at step S59 of FIG. 27 and the accumulated data list received, stored and retained already. Then, the server apparatus 2 forms a request for an accumulated data list for requesting provision of new accumulated data for the digital still camera 4(2) and outputs the request for an accumulated data list through the external interface 14*a* and the input/output terminal 14*b* so as to be transmitted to the digital still camera 4(2) through the cradle 1 (step S60). In this instance, the cradle 1 receives the request for an accumulated data list from the server apparatus 2 through the input/output terminal 14*b* and the external interface 14*a* and transmits the request for an accumulated data list to the digital still camera 4(2) through the radio communication section 15*a* and the transmission/reception antenna 15*b*.

The control section 41 of the digital still camera 4(2) receives the request for an accumulated data list from the server apparatus 2 transmitted through the cradle 1 and through the transmission/reception antenna 45*b* and the radio communication section 45*a*. Then, the control section 41 extracts new accumulated data which has not been transmitted to the server apparatus 2 as yet from the image storage section 44 of the mobile apparatus 4. Then, the control section 41 transmits the new accumulated data to the server apparatus 2 through the radio communication section 45*a* and the transmission/reception antenna 45*b* (step S61). In this instance, the cradle 1 receives the accumulated data from the digital still camera 4(2) through the radio communication section 15*a* and the transmission/reception antenna 15*b* and transmits the accumulated data to the server apparatus 2 through the external interface 14*a* and the input/output terminal 14*b*. Here, the accumulated data provided from the digital still camera 4(2) to the server apparatus 2 is image data of the configuration described hereinabove with reference to FIG. 9.

The server apparatus 2 receives the accumulated data from the digital still camera 4(2) transmitted through the cradle 1 and through the input/output terminal 26*b* and the external interface 26*a* and stores the accumulated data into a predetermined region of the HDD 30 of the server apparatus 2 (step S62). Then, the control section 21 of the server apparatus 2 carries out a resizing process for the image data of the accumulated data from the digital still camera 4(2) stored in the HDD 30 at step S62 to produce image data of a size suitable for utilization on the portable telephone terminal 4(1) (step S63).

Thereafter, the server apparatus 2 outputs the resized image data produced at step S63 through the external interface 14*a* and the input/output terminal 14*b* so as to be transmitted to the portable telephone terminal 4(1) through the cradle 1 (step S64). The resized image data transmitted from the server apparatus 2 here is similar to that described hereinabove with reference to, for example, FIG. 10.

In this instance, the cradle 1 receives the resized image data from the server apparatus 2 through the input/output terminal 14*b* and the external interface 14*a* and transmits the resized image data to the portable telephone terminal 4(1) through the radio communication section 15a and the transmission/reception antenna 15b.

The control section 61 of the portable telephone terminal 4(1) receives the resized image data from the server apparatus 2 transmitted through the cradle 1 and through the transmission/reception antenna 66b and the radio communication section 66a. Then, the control section 61 stores the image data into the content storage section 62 of the portable telephone terminal 4(1) so that it can be utilized on the portable telephone terminal 4(1).

Thereafter, the cradle 1 confirms the charging capacity of the batteries of the portable telephone terminal 4(1) and the digital still camera 4(2) placed on the cradle 1 using the function of the charging control section 19 and places itself into and remains in a waiting state until the charging is completed (step S66). Then, if it is determined at step S66 that the charging is completed, then the cradle 1 ends the charging process for the batteries of the portable telephone terminal 4(1) and the digital still camera 4(2) placed on the cradle 1 (step S67). The processes at steps S66 and S67 are carried out for each of the mobile apparatus placed on the cradle 1.

Thereafter, the cradle 1 forms an end confirmation to the portable telephone terminal 4(1) and transmits the end confirmation to the portable telephone terminal 4(1) through the radio communication section 15a and the transmission/reception antenna 15b (step S68).

The portable telephone terminal 4(1) receives the end confirmation from the cradle 1 through the transmission/reception antenna 66b and the radio communication section 66a and confirms the operation state of the control section 41. Then, if the process to be executed is completed, that is, if the reception and storage processes of the resized image data are completed, then the portable telephone terminal 4(1) forms an end response and transmits the end response through the radio communication section 66a and the transmission/reception antenna 66b (step S69). Consequently, the cradle 1 receives the end response from the portable telephone terminal 4(1) through the transmission/reception antenna 15b and the radio communication section 15a and transmits the end response to the server apparatus 2 through the external interface 14a and the input/output terminal 14b.

The server apparatus 2 receives the end response from the cradle 1 through the input/output terminal 26b and the external interface 26a. From the end response from the portable telephone terminal 4(1) transmitted through the cradle 1 in this manner, the server apparatus 2 can recognize that the series of processes by the portable telephone terminal 4(1) is completed.

Thereafter, the cradle 1 forms an end confirmation to the digital still camera 4(2) and transmits the end confirmation to the digital still camera 4(2) through the radio communication section 15a and the transmission/reception antenna 15b (step S70).

The digital still camera 4(2) receives the end confirmation from the cradle 1 through the transmission/reception antenna 45b and the radio communication section 45a and conforms an operation state of the mobile apparatus 4. Then, if the process to be executed is completed, that is, if the processes such as transmission of the request data and so forth are completed, then the digital still camera 4(2) forms and transmits an end response through the radio communication section 45a and the transmission/reception antenna 45b (step S71). Consequently, the cradle 1 receives the end response from the digital still camera 4(2) through the transmission/reception antenna 15b and the radio communication section 15a and transmits the end response to the server apparatus 2 through the external interface 14a and the input/output terminal 14b.

The server apparatus 2 receives the end response from the cradle 1 through the input/output terminal 26b and the external interface 26a. From the end response from the digital still camera 4(2) transmitted through the cradle 1 in this manner, the server apparatus 2 can recognize that the series of processes of the digital still camera 4(2) is completed.

Then, in the present example, in the server apparatus 2 receiving the end responses from the portable telephone terminal 4(1) and the digital still camera 4(2), the control section 21 erases the registration of the mobile apparatus linked to each other registered in the nonvolatile memory 214 of server apparatus 2, that is, the registration that a process of linking the digital still camera 4(2) and the portable telephone terminal 4(1) to each other is carried out (step S72). Consequently, the linkage process of the digital still camera 4(2) and the portable telephone terminal 4(1) illustrated in FIGS. 27 and 28 is ended.

As a result, the portable telephone terminal 4(1) can receive provision of image data picked up by the digital still camera 4(2) and resized for the portable telephone terminal 4(1) by the server apparatus 2 and store the received image data into the content storage section 62 such that the image data can be displayed on the LCD apparatus 82 of the portable telephone terminal 4(1) so as to be confirmed by the user. In other words, the portable telephone terminal 4(1) and the digital still camera 4(2) placed on the cradle 1 can be linked to each other.

It is to be noted that the reason why mobile apparatus to be linked to each other are registered and then the registration is canceled after the process is completed as described above is that, since various mobile apparatus can be placed on the cradle 1, the cradle 1 can recognize mobile apparatus, between which a linkage process is being carried out, with certainty and can carry out the linkage process appropriately.

[Processing of the Cradle 1 where an Image Pickup Apparatus and a Portable Telephone Terminal Link to Each Other]

Figure 29:
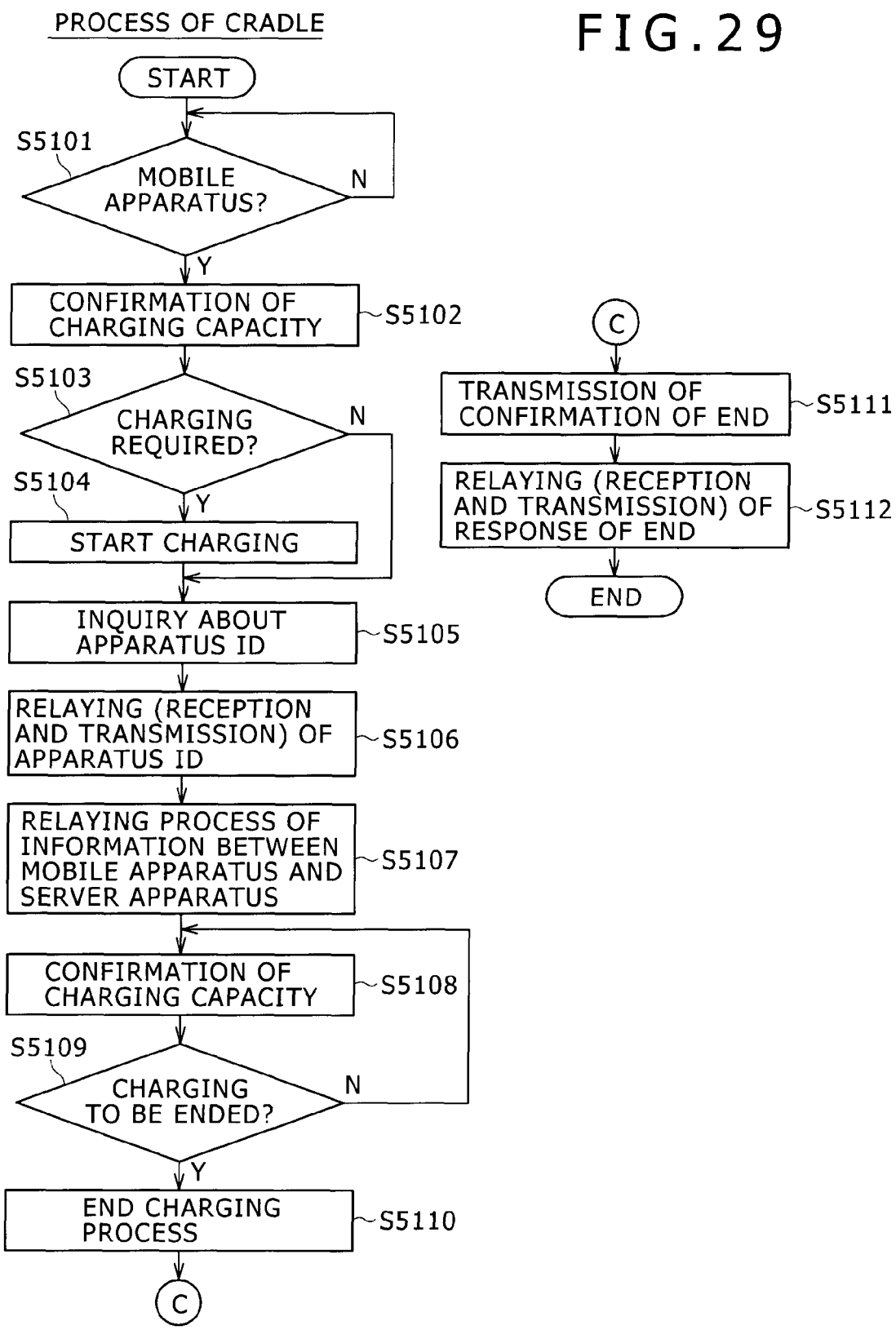
FIG. 29 is a flow chart illustrating a process carried out by the cradle in the first example of the second embodiment.

FIG. 29 illustrates a process carried out by the cradle 1 when the digital still camera 4(2) as an image pickup apparatus and the portable telephone terminal 4(1) link to each other such that still image data obtained by image pickup by the digital still camera 4(2) can be utilized also on the portable telephone terminal 4(1) as described hereinabove with reference to FIGS. 27 and 28.

The operation illustrated in FIG. 29 is executed principally by the control section 11 and the transmission/reception control section 17 when the cradle 1 is in a state wherein the power supply thereto is on.

It is to be noted that, as described hereinabove, the cradle 1 allows placement of a plurality of mobile apparatus at a time thereon and can execute the process illustrated in FIG. 29 in a multi-task fashion for a maximum number of mobile apparatus which can be placed on the cradle 1.

Referring to FIG. 29, if the power supply is switched on, then the control section 11 of the cradle 1 controls the placement detection section 16 to start placement detection of a mobile apparatus to determine whether or not a mobile apparatus is placed on the cradle 1 (step S5101). If it is determined by the decision process at step S5101 that a mobile apparatus is not placed on the cradle 1, then the placement detection of a mobile apparatus at step S5101 is repeated until a mobile apparatus is placed on the cradle 1.

If it is determined by the decision process at step S5101 that a mobile apparatus is placed on the cradle 1, then the control section 11 controls the charging control section 19 to confirm the charging capacity of the battery of the mobile apparatus 4 placed newly (step S5102). The process at step S5102 can be implemented by an electric detection process such as detection of a voltage of the battery of the mobile apparatus 4.

Then, the control section 11 determines based on a result of the decision at step S5102 whether or not the mobile apparatus 4 placed newly requires charging (step S5103). If it is determined that the mobile apparatus 4 requires charging, then the control section 11 controls the charging control section 19 to start charging of the battery of the mobile apparatus 4 placed newly (step S5104). On the other hand, if it is determined by the decision process at step S5103 that the mobile apparatus 4 does not require charging, then the processing advances to step S5105.

Then, the control section 11 forms apparatus ID inquiry command data described hereinabove with reference to FIG. 7B. Then, the transmission/reception control section 17 controls the radio communication section 15a and the transmission/reception antenna 15b to transmit the apparatus ID inquiry command data to the mobile apparatus 4 newly placed (step S5105). An apparatus ID response is transmitted from the mobile apparatus 4 in response to the apparatus ID inquiry command data, and therefore, the transmission/reception control section 17 of the cradle 1 carries out a relaying process of the apparatus ID response (step S5106). In particular, the transmission/reception control section 17 receives the apparatus ID response described hereinabove with reference to FIG. 7C from the mobile apparatus 4 through the transmission/reception antenna 15b and the radio communication section 15a. Then, the transmission/reception control section 17 transmits the received apparatus ID response to the server apparatus 2 through the external interface 14a and the input/output terminal 14b.

Thereafter, the cradle 1 carries out a relaying process of information between the server apparatus 2 and the mobile apparatus placed on the cradle 1 such as the portable telephone terminal 4(1) or the digital still camera 4(2) (step S5107). In particular, at step S5107, a relaying process of information of requests, data and so forth such as a request for an accumulated data list, an accumulated data list, a request for new accumulated data, new accumulated data and resized image data transmitted and received between the server apparatus 2 and the portable telephone terminal 4(1) or/and the digital still camera 4(2) is carried out.

Then, after the series of relaying processes of information ends, the control section 11 of the cradle 1 controls the charging control section 19 to confirm the charging capacity of the battery of the mobile apparatus 4 (step S5108) and determines based on a result of the conformation at step S5108 whether or not the charging is completed (step S5109). If it is determined by the decision process at step S5109 that the charging is not completed as yet, then the processes at the steps beginning with step S5108 are repeated.

However, if it is determined by the decision process at step S5109 that the charging is completed, then the control section 11 of the cradle 1 controls the charging control section 19 to end the charging process for the mobile apparatus 4 for which the charging is completed (step S5110). Then, the control section 11 of the cradle 1 forms an end confirmation for the mobile apparatus 4 with regard to which it is determined that the charging is completed and transmits the end confirmation to the pertaining mobile apparatus 4 through the radio communication section 15a and the transmission/reception antenna 15b (step S5111).

In response to the end confirmation, an end response is transmitted from the mobile apparatus 4 of the transmission destination of the end conformation if a process relating to linkage to the different apparatus is completed. Therefore, the transmission/reception control section 17 of the cradle 1 carries out a relaying process of the end response of receiving the end response from the mobile apparatus 4 through the transmission/reception antenna 15b and the radio communication section 15a and transmitting the end response to the server apparatus 2 through the external interface 14a and the input/output terminal 14b (step S5112). The process illustrated in FIG. 29 ends therewith.

It is to be noted that, if it is determined at step S5103 that the mobile apparatus 4 does not require charging and charging is not started at step S5104, then it can be determined that no charging is required through the processes at steps S5108 and S5109, and the process at step S5110 can be skipped to directly carry out the end conformation process at steps S5111 and S5112.

In this manner, if the cradle 1 detects that a mobile apparatus 4 is placed on the cradle 1 itself, then it can acquire the apparatus ID from the mobile apparatus 4 and notify the server apparatus 2 of the apparatus ID to provide an opportunity of starting of processing in the server apparatus 2.

[Processing of the Server Apparatus 2 where an Image Pickup Apparatus and a Portable Telephone Terminal Link to Each Other]

Figure 30:
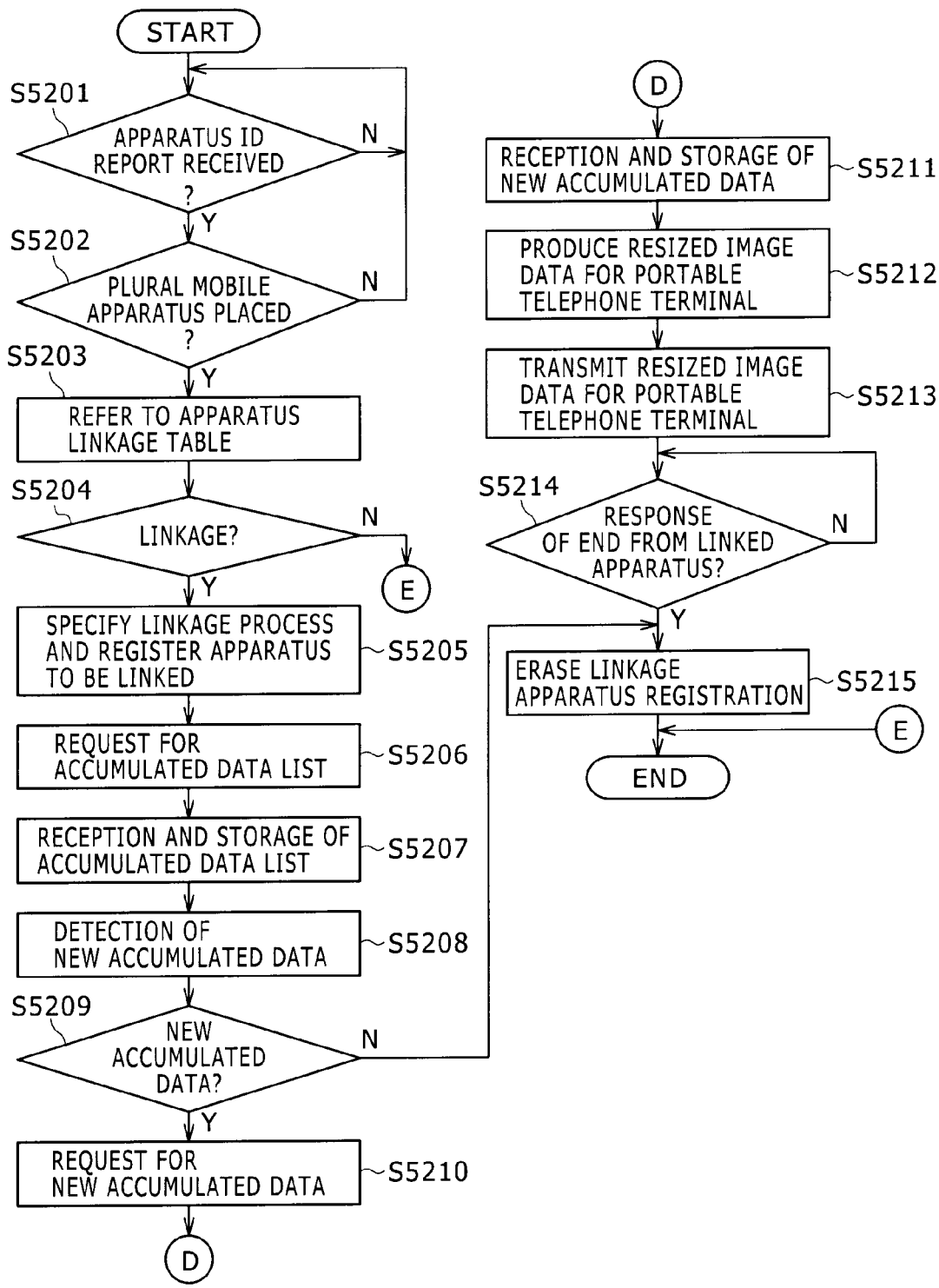
FIG. 30 is a flow chart illustrating a process carried out by the cradle in the first example of the second embodiment.

FIG. 30 illustrates a process carried out by the server apparatus 2 where the digital still camera 4(2) which is an image pickup apparatus and the portable telephone terminal 4(1) link to each other such that still image data obtained by image pickup by the digital still camera 4(2) can be utilized also on the portable telephone terminal 4(1) as described hereinabove with reference to FIGS. 27 and 28. The process illustrated in FIG. 30 is carried out principally by the control section 21 and the transmission/reception control section 27 when the server apparatus 2 is in a state wherein the power supply thereto is on.

If the power supply is switched on, then the transmission/reception control section 27 of the server apparatus 2 determines whether or not an apparatus ID report of a mobile apparatus placed on the cradle 1 is received from the cradle 1 through the input/output terminal 26b and the external interface 26a (step S5201). If it is determined by the decision process at step S5201 that an apparatus ID report is not received as yet, then the process at step S5201 is repeated to wait for reception of an apparatus ID report of a mobile apparatus placed on the cradle 1.

If it is determined by the decision process at step S5201 that an apparatus ID report from the cradle 1 is received, then since the control section 21 recognizes the apparatus ID received already, it determines whether or not a plurality of mobile apparatus are placed on the cradle 1 (step S5202). If it is determined by the decision process at step S5202 that a plurality of mobile apparatus are not placed on the cradle 1, that is, that only one mobile apparatus is placed, then the processes at the steps beginning with step S5210 are repeated.

If it is determined by the decision process at step S5202 that a plurality of mobile apparatus are placed on the cradle 1, then the control section 21 refers to the apparatus linkage table formed in the nonvolatile memory 214 as described hereinabove with reference to FIG. 26 (step S5203). Then, the control section 21 determines whether or not the combination of the two mobile apparatus placed on the cradle 1 is registered as a combination of apparatus to be linked in the apparatus linkage table (step S5204).

If it is determined by the decision process at step S5204 that the combination of the two mobile apparatus placed on the cradle 1 is not registered as a combination of apparatus to be linked in the apparatus linkage table, then since there is no process for linking the two mobile apparatus, the process illustrated in FIG. 30 is ended.

On the other hand, if it is determined by the decision process at step S5204 that the combination of the two mobile apparatus placed on the cradle 1 is registered as a combination of apparatus to be linked in the apparatus linkage table, then the control section 21 specifies a linkage process to be carried out between the mobile apparatus placed on the cradle 1 based on the information of the apparatus linkage table referred to and then registers the two mobile apparatus as apparatus to be linked to each other into the nonvolatile memory 214 of the server apparatus 2 (step S5205).

In the present example, since the apparatus 1 is the digital still camera 4(2) and the apparatus 2 is the portable telephone terminal 4(1) as described hereinabove with reference to FIGS. 24 to 28, the "process of resizing still image data of the apparatus 1 and copying the resized still image data into the apparatus 2" registered first in the apparatus linkage table illustrated in FIG. 26 is specified as the linkage process to be executed. Thus, the digital still camera 4(2) of the apparatus 1 and the portable telephone terminal 4(1) of the apparatus 2 are registered as apparatus to be linked to each other into the nonvolatile memory 214.

Then, the processes at the steps beginning with step S5206 in the process illustrated in FIG. 30 are processes according to the linkage process specified at step S5205 and are a process by a program specified by the program ID of the apparatus linkage table illustrated in FIG. 26. In this instance, the control section 21 forms a request for an accumulated data list for the digital still camera 4(2), and the transmission/reception control section 27 transmits the request for an accumulated data list through the external interface 26a and the input/output terminal 26b (step S5206). The request for an accumulated data list is transmitted to the digital still camera 4(2) through the cradle 1 as described hereinabove.

In response to the request for an accumulated data list, an accumulated data list is transmitted from the digital still camera 4(2) through the cradle 1. Therefore, the transmission/reception control section 27 controls the external interface 26a to receive the accumulated data list from the digital still camera 4(2) and store the accumulated data list into a predetermined region of the HDD 30 (step S5207).

Then, the control section 21 detects new accumulated data in the digital still camera 4(2) which are not provided to the server apparatus 2 as yet based on the accumulated data list stored in the HDD 30 (step S5208). In the detection process at step S5208 in the present embodiment, new accumulated data is recognized simply as the difference between the accumulated data list provided in the past and the accumulated data list provided in the present cycle.

Then, the control section 21 determines based on a result of the detection at step S5208 whether or not new accumulated data exists in the digital still camera 4(2) (step S5209). If it is determined by the decision process at step S5209 that new accumulated data does not exist, then since there exists no data to be supplied to the portable telephone terminal 4(1), the processing advances to step S5215. Thus, the control section 21 erases the link apparatus registration carried out for the nonvolatile memory 214 at step S5205 (step S5215), thereby ending the process of FIG. 30.

On the other hand, if it is determined by the decision process at step S5209 that new accumulated data exists in the digital still camera 4(2), then the control section 21 of the server apparatus 2 forms a request for new accumulated data to the digital still camera 4(2). Then, the transmission/reception control section 27 transmits the request for new accumulated data through the external interface 26a and the input/output terminal 26b (step S5210). The request for new accumulated data is transmitted to the digital still camera 4(2) through the cradle 1 as described hereinabove.

In response to the request for new accumulated data, new accumulated data is transmitted from the digital still camera 4(2) through the cradle 1. Therefore, the transmission/reception control section 27 controls the external interface 26a to receive the new accumulated data from the digital still camera 4(2) and stores the new accumulated data into a predetermined region of the HDD 30 (step S5211).

Then, the control section 21 of the server apparatus 2 uses the function of the writing back data production section 29 to produce, from the new accumulated data in the form of still image data provided from the digital still camera 4(2), resized still image data for the portable telephone terminal 4(1) (step S5212). Then, the transmission/reception control section 27 controls the external interface 26a to transmit the resized still image data for the portable telephone terminal 4(1) to the portable telephone terminal 4(1) (step S5213). The resized still image data for the portable telephone terminal 4(1) is transmitted to the portable telephone terminal 4(1) through the cradle 1 as described hereinabove.

Thereafter, the control section 21 enters and remains in a waiting state until after it receives an end response from both of the portable telephone terminal 4(1) and the digital still camera 4(2) which are linkage apparatus (step S5214). Then, if the control section 21 receives an end response from both of the portable telephone terminal 4(1) and the digital still camera 4(2), then it erases the linkage apparatus registration carried out for the nonvolatile memory 214 at step S5205 (step S5215), thereby ending the process of FIG. 30.

[Processing of the Server Apparatus 2 where an Image Pickup Apparatus and a Portable Telephone Terminal Link to Each Other]

Figure 31:
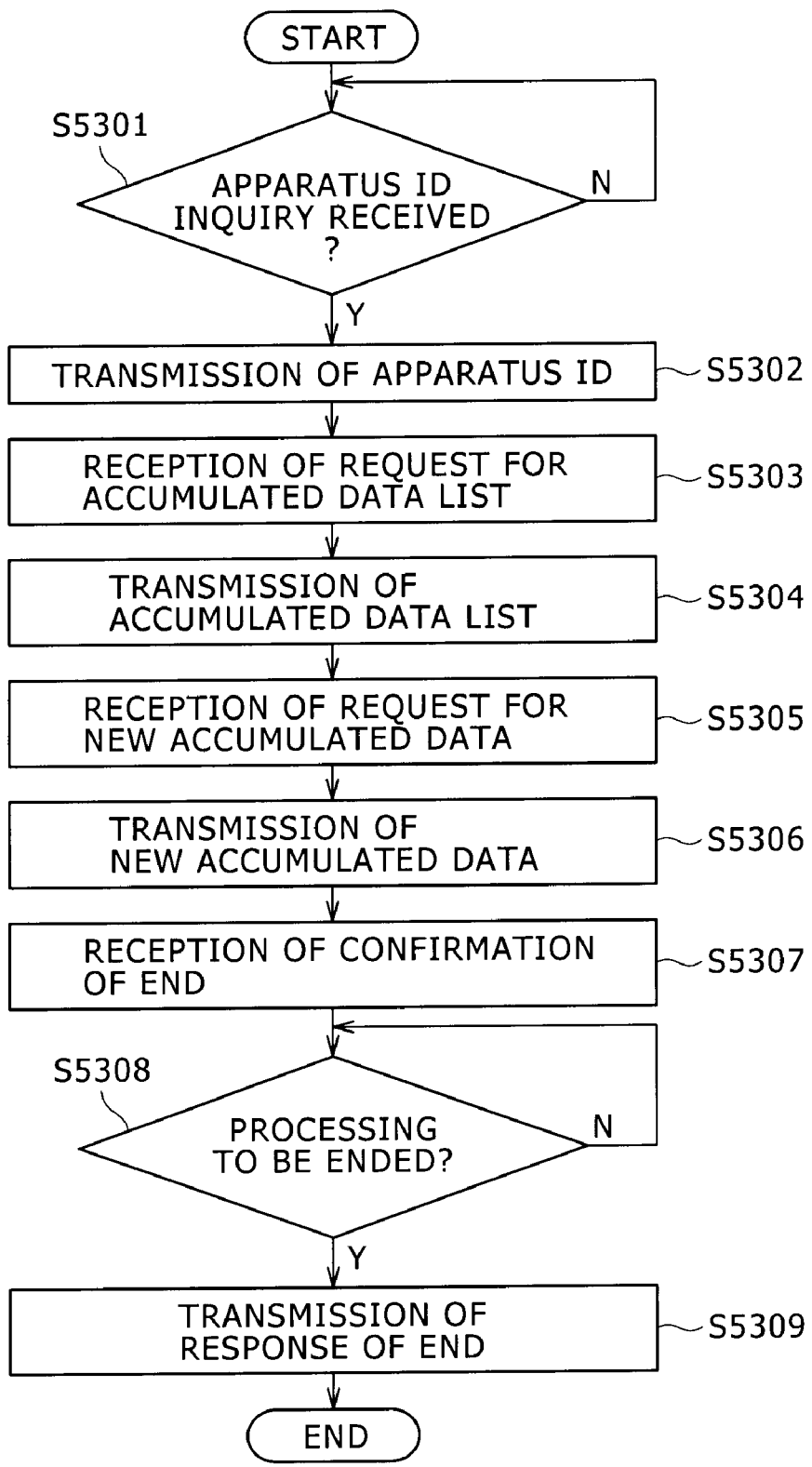
FIG. 31 is a flow chart illustrating a process carried out by the digital still camera in the first example of the second embodiment.

FIG. 31 illustrates a process carried out by the digital still camera 4(2) where the digital still camera 4(2) which is an image pickup apparatus and the portable telephone terminal 4(1) link to each other such that still image data obtained by image pickup by the digital still camera 4(2) can be utilized also on the portable telephone terminal 4(1) as described hereinabove with reference to FIGS. 27 and 28.

The process illustrated in FIG. 31 is executed principally by the control section 41 and the transmission/reception control section 47 of the digital still camera 4(2) where the digital still camera 4(2) as a mobile apparatus is placed into a predetermined mode such as, for example, a charging mode wherein the digital still camera 4(2) is placed on the cradle 1 and carries out a data communication process and a charging process.

First, if the mode of the digital still camera 4(2) is changed over to the predetermined mode, then the transmission/reception control section 47 determines whether or not an inquiry about an apparatus ID from the cradle 1 is received through the transmission/reception antenna 45b and the radio communication section 45a (step S5301). If it is determined by the decision process at step S5301 that an inquiry about an apparatus ID is not received, then the process at step S5301 is repeated to wait for reception of an inquiry about an apparatus ID.

However, if it is determined by the decision process at step S5301 that an inquiry about an apparatus ID from the cradle 1 is received, then the control section 41 acquires necessary information such as an apparatus ID and an apparatus attribute stored and retained, for example, in the ROM 412 of the digital still camera 4(2). Then, the control section 41 forms such an apparatus ID response as described hereinabove with reference to FIG. 7c based on the acquired information and transmits the apparatus ID response to through the radio communication section 45*a* and the transmission/reception antenna 45*b* (step S5302). This apparatus ID response is transmitted to the server apparatus 2 through the cradle 1.

Then, the transmission/reception control section 47 receives a request for an accumulated data list from the server apparatus 2 transmitted through the cradle 1 through the transmission/reception antenna 45*b* and the radio communication section 45*a* (step S5303). Then, if a request for an accumulated data list is received, then the control section 41 forms an accumulated data list described hereinabove with reference to FIG. 8 for the server apparatus 2. Then, the transmission/reception control section 47 controls the radio communication section 45*a* to transmit the accumulated data list (step S5304). Also this accumulated data list is transmitted to the server apparatus 2 through the cradle 1.

Then, the transmission/reception control section 47 receives a request for new accumulated data from the server apparatus 2 transmitted through the cradle 1 through the transmission/reception antenna 45*b* and the radio communication section 45*a* (step S5306). Then, if a request for new accumulated data is received, then the control section 41 reads out the requested new accumulated data in the form of still image data from the image storage section 44. Then, the transmission/reception control section 47 controls the radio communication section 45*a* to transmit the new accumulated data (step S5306). Also this new accumulated data is transmitted to the server apparatus 2 through the cradle 1.

Thereafter, the transmission/reception control section 47 receives an end confirmation transmitted from the cradle 1 through the transmission/reception antenna 45*b* and the radio communication section 45*a* (step S5307). Then, if an end confirmation is received, then the digital still camera 4(2) enters and remains in a waiting state until the linkage process comes to an end (step S5308). Then, if the series of linkage processes is completed, then the control section 41 forms an end response, and the transmission/reception control section 47 controls the radio communication section 45*a* to transmit the end response (step S5309), thereby ending the process of FIG. 31.

[Processing of the Portable Telephone Terminal 4(1) Where an Image Pickup Apparatus and a Portable Telephone Terminal Links to Each Other]

Figure 32:
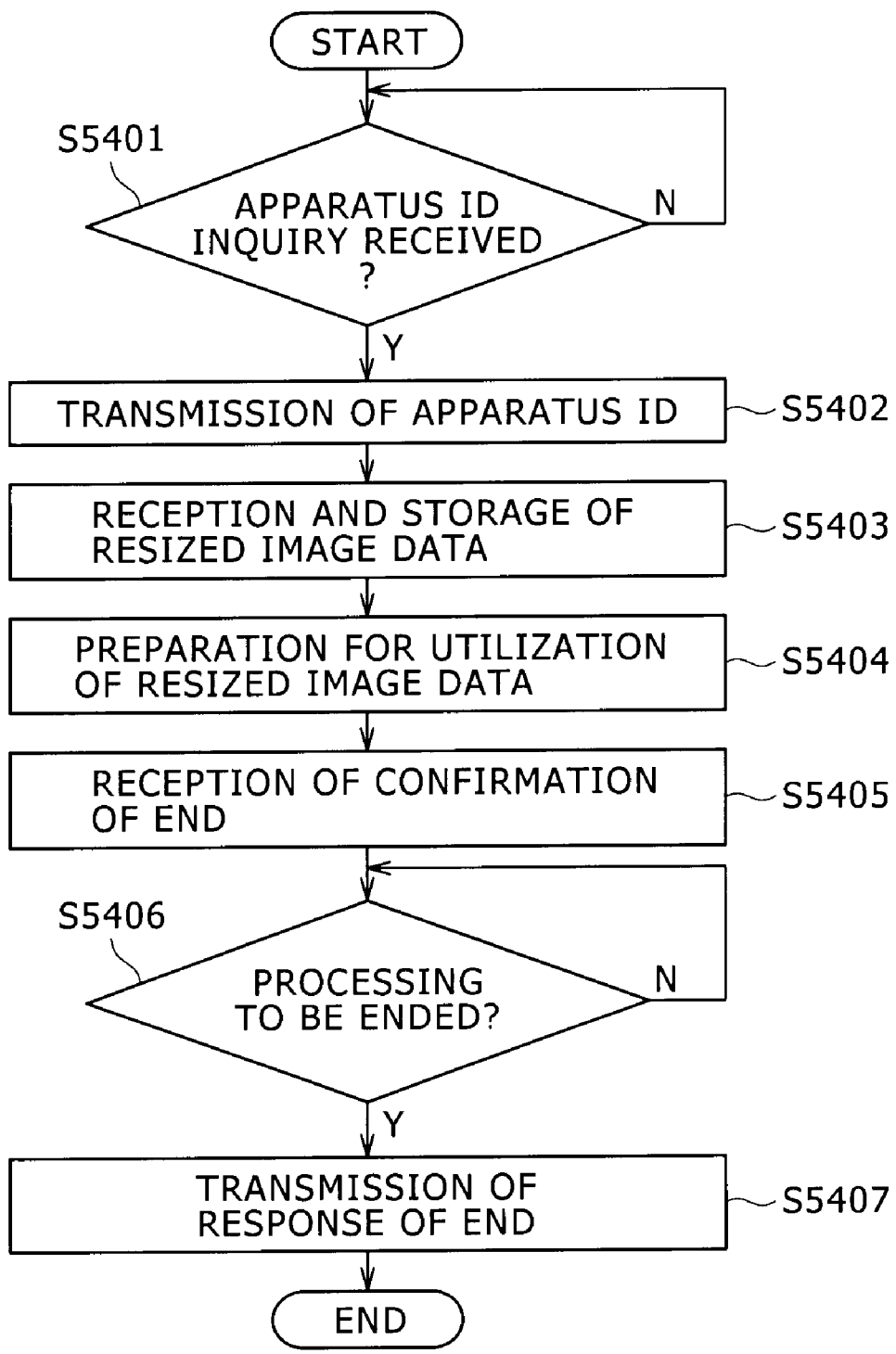
FIG. 32 is a flow chart illustrating a process carried out by the portable telephone terminal in the first example of the second embodiment.

FIG. 32 illustrates a process carried out by the portable telephone terminal 4(1) where the digital still camera 4(2) which is an image pickup apparatus and the portable telephone terminal 4(1) link to each other such that still image data obtained by image pickup by the digital still camera 4(2) can be utilized also on the portable telephone terminal 4(1) as described hereinabove with reference to FIGS. 27 and 28.

The process illustrated in FIG. 32 is executed principally by the control section 61 of the portable telephone terminal 4(1) when the portable telephone terminal 4(1) as a mobile apparatus is placed into a predetermined mode wherein it is placed on the cradle 1 and carries out a data communication process and a charging process such as, for example, the charging mode.

First, if the mode of the portable telephone terminal 4(1) is changed over to the predetermined mode, then the control section 61 determines whether or not an inquiry about an apparatus ID from the cradle 1 is received through the transmission/reception antenna 66*b* and the radio communication section 66*a* (step S5401). If it is determined by the decision process at step S5401 that an inquiry about an apparatus ID is not received, then the process at step S5401 is repeated to wait for reception of an inquiry about an apparatus ID.

However, if it is determined by the decision process at step S5401 that an inquiry about an apparatus ID from the cradle 1 is received, then the control section 61 acquires necessary information such as an apparatus ID and an apparatus attribute stored and retained, for example, in the ROM 612 of the portable telephone terminal 4(1). Then, the control section 61 forms such an apparatus ID response as described hereinabove with reference to FIG. 7C based on the acquired information and transmits the apparatus ID response through the radio communication section 66*a* and the transmission/reception antenna 66*b* (step S5402). This apparatus ID response is transmitted to the server apparatus 2 through the cradle 1.

Then, the control section 61 receives still image data resized for the portable telephone terminal 4(1) from the server apparatus 2 transmitted through the cradle 1 through the transmission/reception antenna 66*b* and the radio communication section 66*a* and stores the resized still image data into the content storage section 62 (step S5403). Then, the control section 61 reads out the still image data resized for the portable telephone terminal 4(1) and stored in the content storage section 62 and makes such preparations as to change the format of the data so that the data can be utilized under the control of the control section 61 (step S5404).

Thereafter, the control section 61 receives an end confirmation transmitted from the cradle 1 through the transmission/reception antenna 66*b* and the radio communication section 66*a* (step S5405). Then, when an end conformation is received, the control section 61 places itself into and remains in a waiting state until the linkage process comes to an end (step S5406). Then, if the series of linkage processes comes to an end, then the control section 61 forms an end response and controls the radio communication section 66*a* to transmit the end response (step S5407), thereby ending the process of FIG. 32.

In this manner, in the present example, the digital still camera 4(2) which is an image pickup apparatus and the portable telephone terminal 4(1) link to each other, and still image data obtained by image pickup by the digital still camera 4(2) is resized for the portable telephone terminal 4(1) by the server apparatus 2. Then, the resized still image data is transferred to and copied into the portable telephone terminal 4(1) so that it can be utilized also on the portable telephone terminal 4(1).

[Other Example of Extraction of an Image to Be Resized and Copied]

In a case wherein still image data obtained by image pickup by the digital still camera 4(2) is resized for the portable telephone terminal 4(1) by the server apparatus 2 and the resized still image data is transferred to and copied into the portable telephone terminal 4(1) so that the resized still image data can be utilized also in the portable telephone terminal 4(1) as described hereinabove with reference to FIGS. 24 to 32, the still image data to be resized is produced using new accumulated data, which has not been provided to the server apparatus 2 as yet, as a processing object.

However, the processing object is not limited to this. In particular, since also information representative of the date of production of still image data as accumulated data is added to the accumulated data list as described hereinabove with reference to FIG. 8, accumulated data may be transferred to the portable telephone terminal 4(1) in order beginning with that which has the latest date of production until an amount of still image data corresponding to a capacity which can be copied is extracted such that the still image data is resized and transferred to the portable telephone terminal 4(1).

In this instance, if the portable telephone terminal 4(1) does not have the capacity for storing all of the resized still image data, then the resized still image data may be overwritten on old resized still image data. Alternatively, an inquiry about the free capacity of the content storage section 62 of the portable telephone terminal 4(1) may be issued in advance from the server apparatus 2 to the cradle 1 such that an amount of resized still image data corresponding to the actual free capacity is produced and transferred.

Further, in such a case that still image data obtained by image pickup by the digital still camera 4(2) are classified, for example, for different events and collected in folders, it is possible to determine still image data stored in the folder produced latest as an object of resizing. Where still image data are classified for individual events, it is possible to determine still image data of a group corresponding to a selective instruction of the user as an object of resizing as occasion demands.

Further, since also protect information, a print mark and so forth are added to still image data, it is possible to extract still image data of an object of resizing in response to the priority degree based on such added information. For example, it is possible to determine only those still image data to which the protect information is added as an object of resizing, to determine those still image data to which a print mark is applied as an object of resizing or to determine only those still image data to which both of protect information and a print mark are applied as an object of resizing.

As regards under what conditions still image data to be resized should be extracted, it is possible to record such conditions in the linkage process substance of the apparatus linkage table described hereinabove with reference to FIG. 26 such that such extraction process is carried out based on the recorded conditions.

Further, as regards to what size still image data should be resized, it is possible to specify the same in response to the portable telephone terminal 4(1), or also it is possible to resize still image data to a size, for example, in accordance with an instruction of the user registered in the server apparatus 2. Also it is possible to provide image data, which is to be provided from the digital still camera 4(2) to the portable telephone terminal 4(1), as it is without being resized by the server apparatus 2. In other words, in what size a certain amount of still image data should be transferred can be determined in various manners.

[Linkage between a Digital Video Camera and a Portable Telephone Terminal]

In the example described above with reference to FIGS. 24 to 32, image data or still image data obtained by image pickup by the digital still camera 4(2) is resized and provided to the portable telephone terminal 4(1) so that it can be utilized on the portable telephone terminal 4(1). Also it is possible similarly to resize moving image data obtained by image pickup by the digital video camera 4(3) to provide it to the portable telephone terminal 4(1) so that it can be utilized on the portable telephone terminal 4(1).

In this instance, since the moving image data has a data amount much greater than that of still image data, also it is possible not only to merely reduce the image size or screen size but also to form a digest version composed of scenes extracted from moving image data in accordance with a predetermined method and transfer the digest version to the portable telephone terminal 4(1) so that they can be utilized on the portable telephone terminal 4(1).

Here, as a method of forming a digest version, various methods can be used such as to extract scene change points of moving image data obtained by image pickup by the digital video camera 4(3) and connect the moving image data within intervals for a fixed period of time from the scene change points to form a digest version or to extract scene portions having a comparatively high sound level to form a digest version.

Then, even where the digital video camera 4(3) and the portable telephone terminal 4(1) are linked to each other to achieve utilization of moving image data, operation can be carried out substantially similarly to that described hereinabove with reference to FIGS. 27 to 32. In particular, operation for the linkage of the digital video camera 4(3) and the portable telephone terminal 4(1) can be carried out similarly to that of the digital still camera 4(2) and the portable telephone terminal 4(1) which is carried out for the utilization of still image data except that data handled at steps S61, S63, S64 and S64 illustrated in FIG. 28 changes from still image data to moving image data and that the resizing process of the server apparatus 2 carried out at step S63 includes a process of forming a digest version of moving image data.

It is to be noted that, also where moving image data is transferred, it is possible to transmit moving image data stored and retained in the digital video camera 4(3) by a predetermined amount beginning with the top thereof without carrying out the resizing process of changing the image size and the process of forming a digest version or to transfer moving image data by a predetermined amount from a predetermined position, for example, a position at which the sound level suddenly becomes higher than a predetermined level. The point is that a portion and an amount of moving picture to be transferred can be determined in various ways.

[(2) Linkage of the Second Example which Uses Music Data Between a Portable Music Reproduction Apparatus and an Image Pickup Apparatus]

Figure 33:
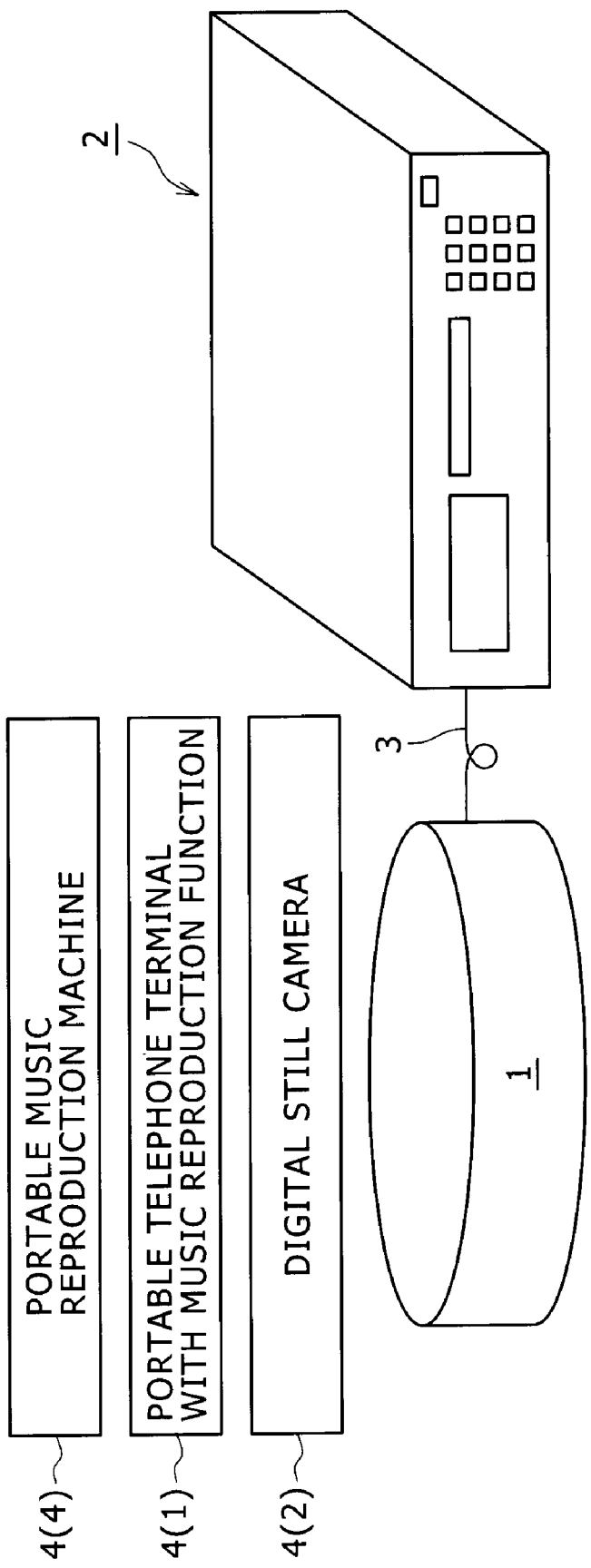
FIG. 33 is a schematic view showing a general configuration of a data communication system according to a second example of the second embodiment of the present invention.

FIG. 33 generally illustrates linkage of a second example which uses music data between a portable music reproduction apparatus and an image pickup apparatus. As described hereinabove, a plurality of various mobile apparatus can be placed at a time on the cradle 1. Therefore, a portable music reproduction apparatus such as, for example, a portable music reproduction apparatus 4(4) and a portable telephone terminal 4(1) with a music reproduction function and an image pickup apparatus such as a digital still camera 4(2) may be placed together on the cradle 1.

Also in the example illustrated in FIG. 33, what is significant is that the music reproduction apparatus and the image pickup apparatus are placed on the cradle 1, but the timings of the placement of them may be different from each other. For example, where the portable music reproduction apparatus 4(4) is placed first on the cradle 1, an image pickup apparatus may be placed on the cradle 1 after lapse of several hours. On the contrary, where an image pickup apparatus is placed first on the cradle 1, the portable music reproduction apparatus 4(4) may be placed later. The point is that a portable music reproduction apparatus and an image pickup apparatus are in a situation wherein both of them are placed on the cradle 1.

Some image pickup apparatus such as the digital still camera 4(2) has a music reproduction function such that, when, for example, a slide show is carried out using still image data obtained by image pickup, also music data can be reproduced and utilized simultaneously. Therefore, in the present example, where a music reproduction apparatus and an image pickup apparatus which has a music reproduction function are placed on the cradle 1, music data considered appropriate is transferred automatically from the music reproduction apparatus to the image pickup apparatus to update music data which can be reproduced on the image pickup apparatus.

By the configuration just described, the functional linkage between the portable music reproduction and the image pickup apparatus is reinforced such that music data reproduced frequently on the portable music reproduction apparatus can be utilized automatically on the image pickup apparatus with a music reproduction function without any direct participation by the user.

In the following, linkage between the portable telephone terminal 4(1) having a music reproduction function as a portable music reproduction apparatus and the digital still camera 4(2) having a music reproduction function where the portable telephone terminal 4(1) and the digital still camera 4(2) are placed on the cradle 1 is described in detail.

[Example of a Configuration of the Digital Still Camera 4(2) Having a Music Reproduction Function as a Mobile Apparatus]

Figure 34:
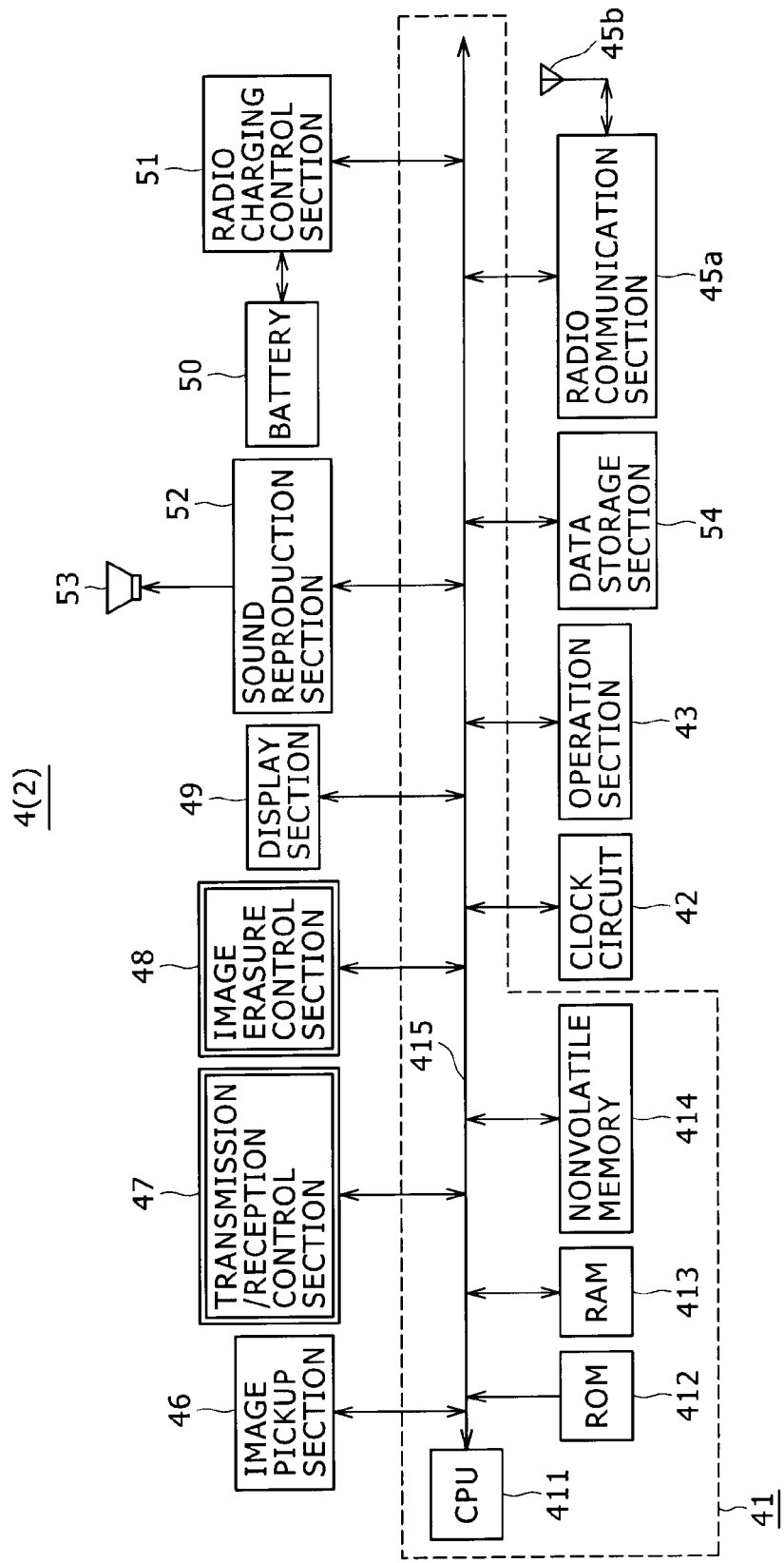
FIG. 34 is a block diagram showing an example of a configuration of the digital still camera used in the data communication system of the second example of the second embodiment.

FIG. 34 shows an example of a configuration of the digital still camera 4(2) with a music reproduction function which is one of mobile apparatus used in the data communication system of the second embodiment. Referring to FIG. 34, the digital still camera 4(2) shown is configured similarly to the digital still camera as a mobile apparatus shown in FIG. 4 except that it includes a sound reproduction section 52 and a speaker 53 and further includes a data storage section 54 for storing and retaining image data and music data.

Therefore, in the digital still camera 4(2) shown in FIG. 34, like components to those of the digital camera as a mobile apparatus shown in FIG. 4 are denoted by like reference characters, and overlapping description of them is omitted herein to avoid redundancy.

The digital still camera 4(2) shown in FIG. 34 includes a data storage section 54 in place of the image storage section 44 provided in the digital still camera described hereinabove with reference to FIG. 4. The data storage section 54 can store and retain still image data obtained by image pickup and music data and so forth, for example, provided from a server apparatus through the transmission/reception antenna 45b and the radio communication section 45a.

The sound reproduction section 52 receives supply of music data read out from the data storage section 54 by the control section 21 and converts the music data into an analog sound signal. Further, the sound reproduction section 52 carries out various music adjustment processes and an amplification process to form a sound signal to be supplied to the speaker 53 under the control of the control section 41, and supplies the formed sound signal to the speaker 53.

Consequently, music based on the music data read out from the data storage section 54 can be emitted as sound from the speaker 53 so that the user can enjoy the music. It is to be noted that, where the music data are in a compressed form, the sound reproduction section 52 may carry out a decompression process, or the control section 41 may carry out a decompression process.

The digital still camera 4(2) further has a function of reproducing, when it is used to carry out a slide show wherein the control section 41 successively reads out still image data stored and retained in the data storage section 54 and supplies the still image data to the display section 49 such that still images are successively displayed for a predetermined period of time on the display screen of the display section 49, also music simultaneously by reading out predetermined music data stored and retained in the data storage section 54 by the control section 41 and supplying the read out music data to the sound reproduction section 52 such that the music data are reproduced by the sound reproduction section 52.

It is to be noted that the portable telephone terminal 4(1) with a music reproduction function used in the present example is configured similarly to the portable telephone terminal described hereinabove with reference to FIG. 25.

[Example of a Layout of Music Data as Accumulated Data]

FIG. 35 illustrates an example of a layout of music data as accumulated data stored and retained in the content storage section 62 of the portable telephone terminal 4(1) with a music reproduction function used in the data communication system of the present example and having the configuration described hereinabove with reference to FIG. 25 or in the data storage section 54 of the digital still camera 4(2) used in the data communication system of the present example and having the configuration described hereinabove with reference to FIG. 34.

The music data as accumulated data are downloaded from a predetermined server apparatus on the Internet using a wideband communication function of the portable telephone terminal 4(1) in the present example or provided from the server apparatus 2 through the transmission/reception antenna 66b and the radio communication section 66a. As seen in FIG. 35, music data as accumulated data accumulated in a predetermined storage section of the portable telephone terminal 4(1) or the digital still camera 4(2) has header information added thereto.

Referring to FIG. 35, the header information includes an apparatus ID, a data ID, a data attribute, a production date and time, a data size, protect, the number of times of use, a reproduction history such as reproduction date and time 1, a reproduction date and time 2, . . . , and other information.

The apparatus ID is information for specifying the apparatus in which the accumulated data is accumulated. The data ID is used to uniquely specify the accumulated data. The data attribute is information representative of the type of data such as whether the accumulated data is still image data, moving image data or music data. The production date and time is information representative of the day and time at which the music data is acquired and recorded into the content storage section 62. The data size is information representative of the size of the music data.

The protect information exhibits, for example, an on state where protection is applied to the music data, but exhibits an off state where protection is not applied to the music data. Where protection is applied to the music, the music cannot be erased. The number of times of use is information whose value is incremented by one every time the music data is reproduced and is used to find by what number of times the music data has been reproduced. The reproduction history includes, in the example illustrated in FIG. 35, a date and time for five times of the latest reproduction.

Music data to which such header information is added in this manner is stored and retained in the content storage section 62 of the portable telephone terminal 4(1) with a music reproduction function or the data storage section 54 of the digital still camera 4(2) in the present example.

[Example of a Layout of Still Image Data as Accumulated Data]

FIG. 36 illustrates an example of a layout of still image data as accumulated data stored and retained in the data storage section 54 of the digital still camera 4(2) having the configuration described hereinabove with reference to FIG. 34. The still image data is acquired basically by image pickup by the digital still camera 4(2). Alternatively, the still image data may be provided from the server apparatus 2 through the transmission/reception antenna 66b and the radio communication section 66a.

The still image data as accumulated data accumulated in the data storage section 54 has header information added thereto as seen in FIG. 36. Referring to FIG. 36, the header information includes an apparatus ID, a data ID, a data attribute, a production date and time, protect, a print mark, a data size, the number of times of use, and other information.

The information items other than the print mark are similar to corresponding ones of the header information added to music data described hereinabove with reference to FIG. 35. The print mark is information for designating in advance that the still image data is information necessary to be printed. If this information is on, then the still image data may be printed automatically, for example, when it is taken into the server apparatus 2.

Image data to which such header information is added in this manner is stored and retained in the data storage section 54 of the digital still camera 4(2) in the present example.

In the digital still camera 4(2) of the present example, when slide show reproduction wherein still image data stored and retained in the data storage section 54 are successively read out and successively displayed for a fixed period of time on the display screen of the display section 49 is carried out, music data stored and retained in the data storage section 54 can be successively read out in an order determined in advance and reproduced for a fixed period of time.

It is to be noted that, upon slide show reproduction, the reproduction order of music data to be reproduced is controlled, for example, in accordance with a music reproduction order table registered in the nonvolatile memory 414 of the digital still camera 4(2). In the music reproduction order table, a data ID or music ID and reproduction time of pieces of music are registered. The reproduction time can be adjusted by the user.

The control section 41 reads out music data from the data storage section 54 in accordance with the order registered in the music reproduction order table and supplies the read out music data to the sound reproduction section 52. Then, if reproduction of music data for a reproduction time period designated in the music reproduction order table ends, then the control section 41 reads out next music data and supplies the music data to the sound reproduction section 52. As the control section 41 carries out such processes as described above, music can be reproduced upon slide reproduction.

Then, in the data communication system of the present example, where the portable telephone terminal 4(1) with a music reproduction function and the digital still camera 4(2) with a music reproduction function are placed on the cradle 1, music data utilized frequently on the portable telephone terminal 4(1) can be transferred to the digital still camera 4(2) so that it can be utilized also on the digital still camera 4(2).

[Example of a Configuration of an Apparatus Linkage Table]

Also where linkage described below wherein music data is used is carried out between different mobile apparatus, the linkage between the mobile apparatus can be implemented by control of the server apparatus 2 in accordance with information of an apparatus linkage table produced, for example, in the nonvolatile memory 214 of the server apparatus 2. Although the apparatus linkage table used in this instance is similar to that described hereinabove with reference to FIG. 26, it is different in information registered therein.

FIG. 37 illustrates the apparatus linkage table used in the present example. Referring to FIG. 37, the first and second sets of registered information are same as those illustrated in FIG. 26. However, in the present example, the third set of information registered in the apparatus linkage table illustrated in FIG. 37 is required.

In particular, referring to FIG. 37, in the third set of registered information of the apparatus linkage table illustrated, the apparatus 1 is a "portable music reproduction apparatus (including a portable telephone terminal with a music reproduction function)"; the apparatus 2 is a "digital still camera with a music reproduction function"; and the substance of linkage processes is "to copy those of music data of the portable music reproduction apparatus (apparatus 1) which satisfy predetermined condition into the apparatus 2". Further, the program ID of a program executed by the server apparatus 2 in order to carry out the linkage process described is "PG3".

Then, if the server apparatus 2 detects that the portable telephone terminal 4(1) with a music reproduction function which is a portable music reproduction apparatus and the digital still camera 4(2) with a music reproduction function are placed on the cradle 1, then the server apparatus 2 carries out a linkage process between the mobile apparatus in which music is used in accordance with the third set of registration information of the apparatus linkage data shown in FIG. 37 in the data communication system.

[Operation of the System Where Linkage Wherein Music Data is Used is Carried Out]

Figure 38:
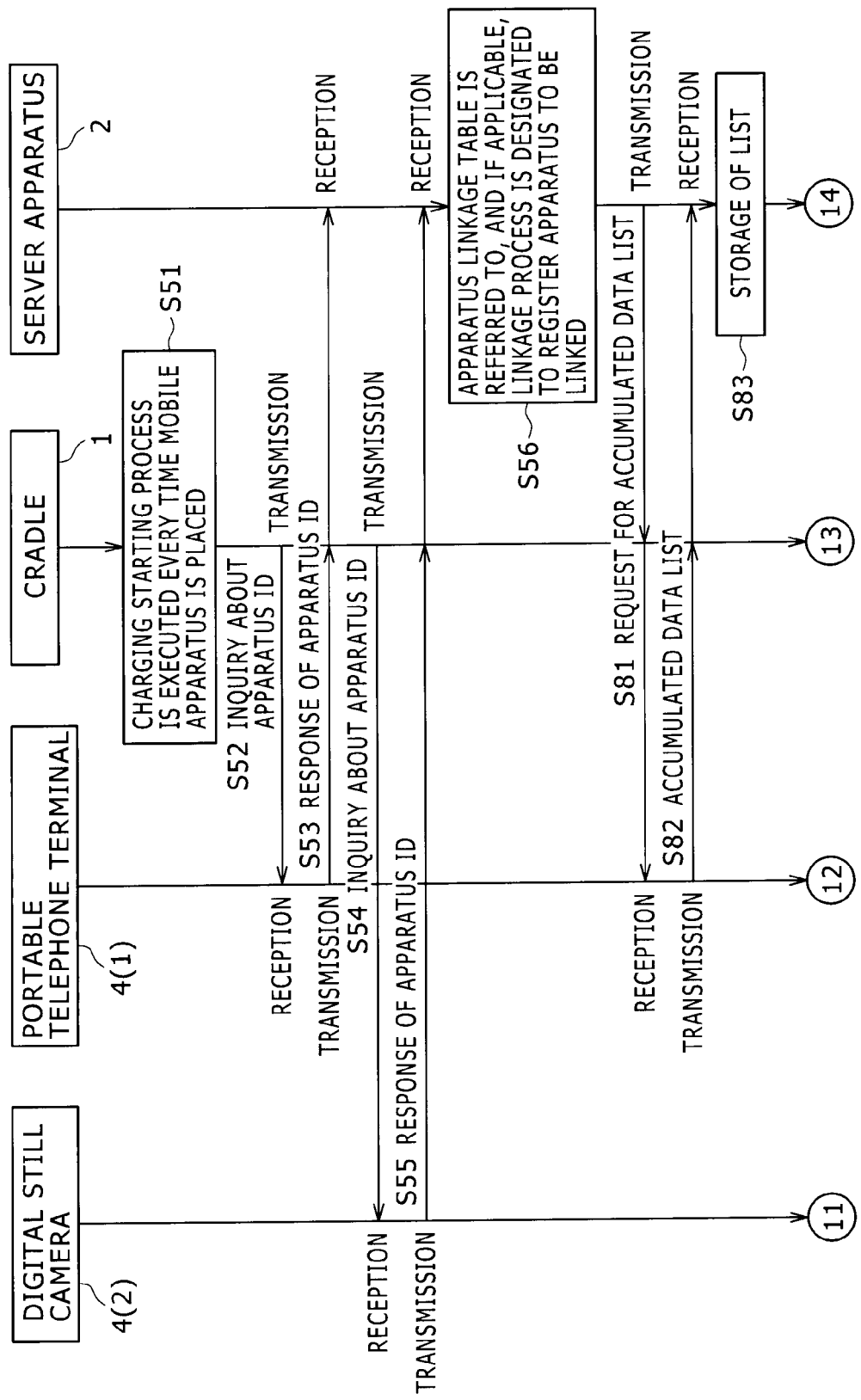
FIGS. 38, 39 and 40 are timing charts illustrating operation of the data communication system of the second example of the second embodiment.
Figure 39:
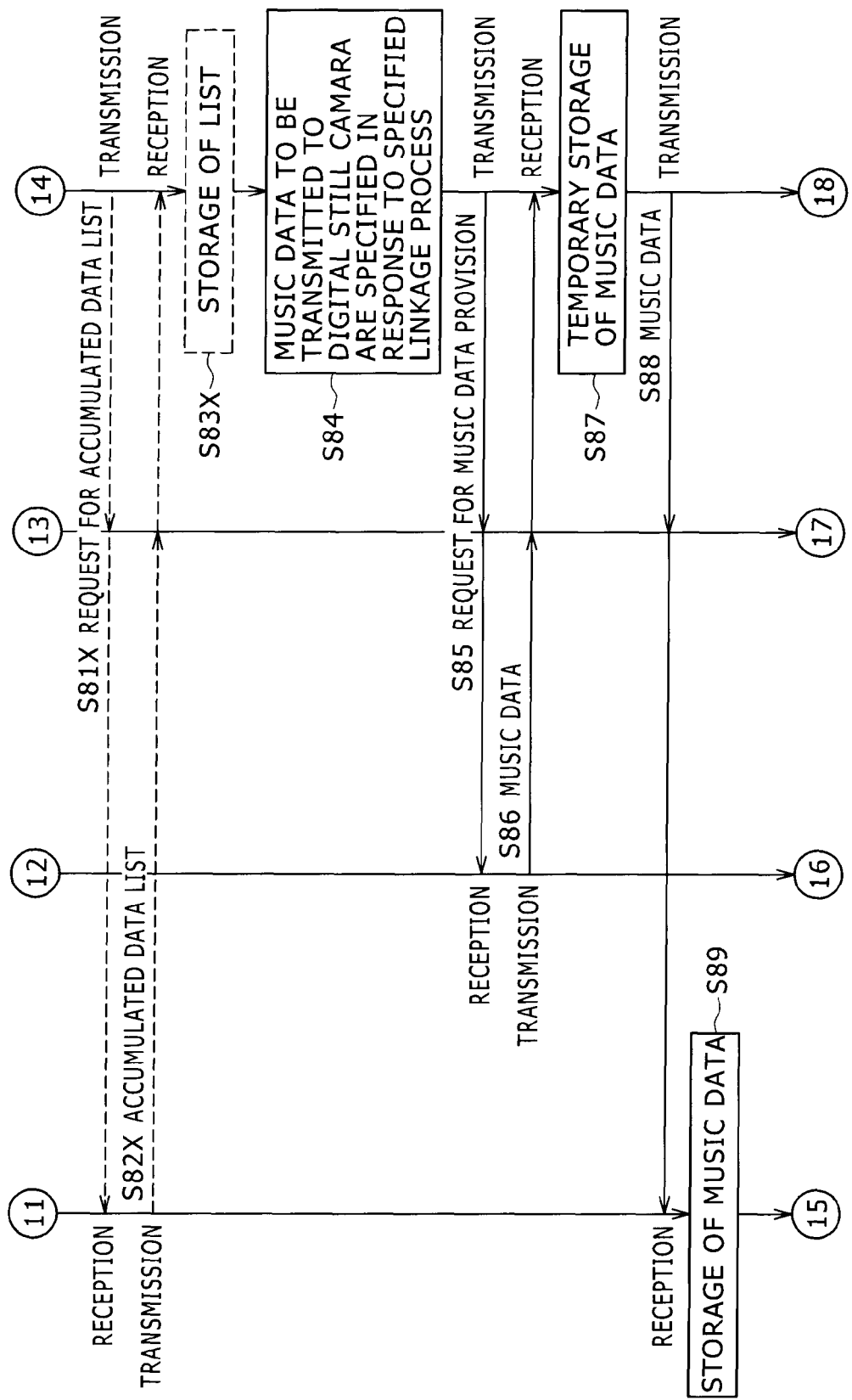
Figure 40:
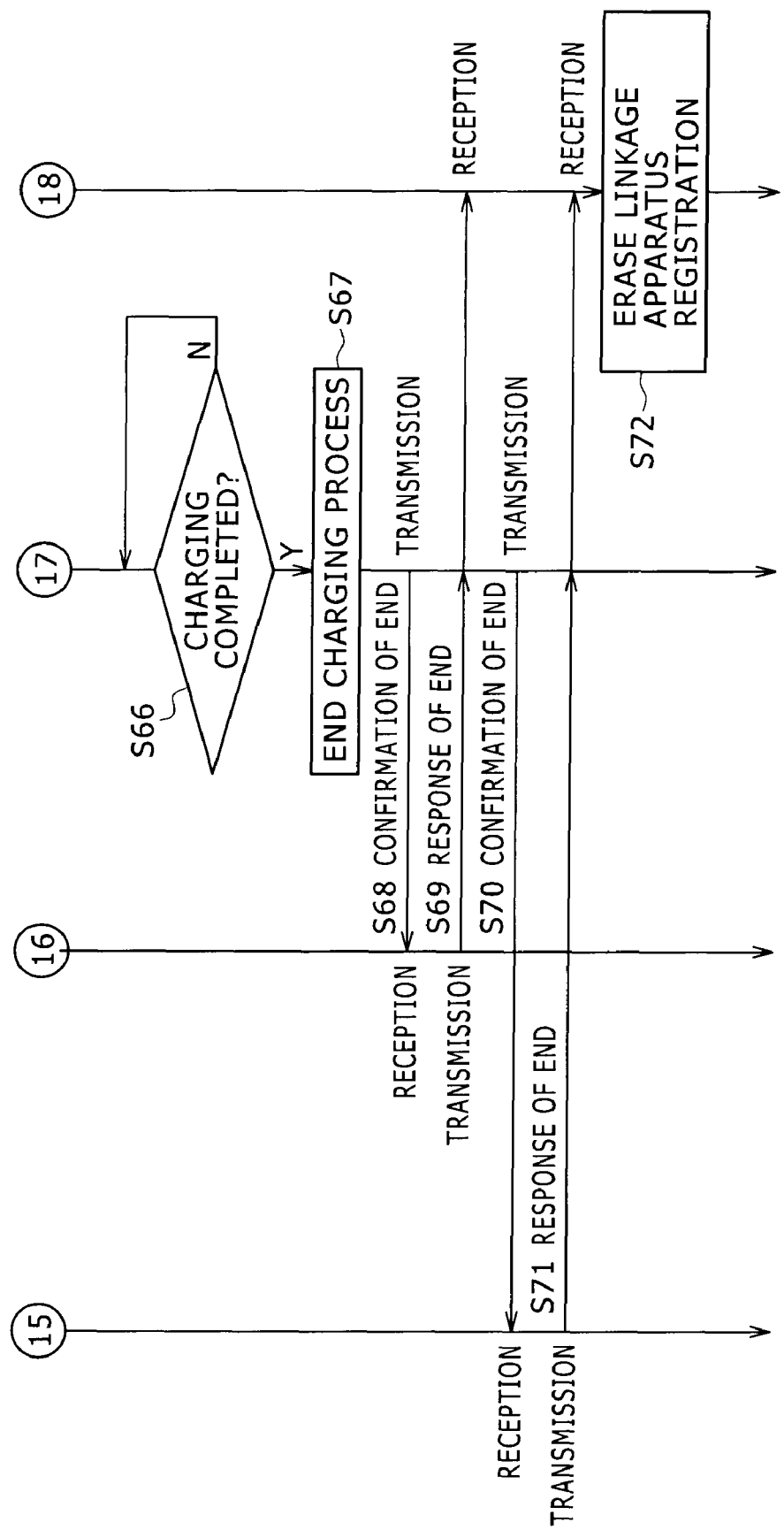

Now, operation of the data communication system of the present example wherein the portable telephone terminal 4(1) and the digital still camera 4(2) are used as mobile apparatus such that linkage wherein music data is used can be carried out between the mobile apparatus is described. FIGS. 38 to 40 illustrate operation of the data communication system of the present example wherein linkage in which music data is used can be carried out between the mobile apparatus.

Also in the present example, the different mobile apparatus transmit and receive information through the cradle 1 and the server apparatus 2 similarly as in the operation described hereinabove with reference to FIGS. 27 and 28. Therefore, in order to simplify the description, like items carried out similarly to those described hereinabove with reference to FIGS. 27 and 28 are denoted by like reference characters, and since detailed description of the items is same as that given hereinabove with reference to FIGS. 27 and 28, it is omitted herein to avoid redundancy.

It is to be noted that, in the following description, it is assumed that the portable telephone terminal 4(1) having the configuration described hereinabove with reference to FIG. 25 and having a music reproduction function and the digital still camera 4(2) having the configuration described hereinabove with reference to FIG. 34 and having a music reproduction function are used as the mobile apparatus as described above. Further, although the timings at which the portable telephone terminal 4(1) and the digital still camera 4(2) are placed on the cradle 1 do not particularly matter as described hereinabove, in order to simplify the description, it is assumed that the portable telephone terminal 4(1) is placed first on the cradle 1 and then the digital still camera 4(2) is placed on the cradle 1.

Further, in the present second example, it is assumed that at least music data described hereinabove with reference to FIG. 35 are stored in the content storage section 62 of the portable telephone terminal 4(1) and still image data described hereinabove with reference to FIG. 36 are stored in the data storage section 54 of the digital still camera 4(2).

Referring first to FIG. 38, processes at steps S51 to S56 are carried out similarly to those in the first example described hereinabove with reference to FIG. 27. In particular, the cradle 1 executes a process of carrying out charging, that is, a charging starting process, when it detects that a mobile apparatus is placed on the cradle 1 (step S51). Then, the cradle 1 carries out inquiry about an apparatus ID to the mobile apparatus placed thereon (steps S52 and S54).

An apparatus ID response is transmitted back from the mobile apparatus which receives the inquiry about an apparatus ID (steps S53 and S55). The cradle 1 receives and transmits the apparatus ID response to the server apparatus 2. Consequently, the server apparatus 2 can recognize based on the apparatus ID response or apparatus ID report transmitted through the cradle 1 what the mobile apparatus placed on the cradle 1 is.

Then, if a plurality of mobile apparatus are placed on the cradle 1 based on the apparatus ID response from each of the mobile apparatus placed on the cradle 1, then the server apparatus 2 refers to the apparatus linkage table produced in the nonvolatile memory 214 of the server apparatus 2 to specify a linkage process of the apparatus to be carried out and registers the apparatus to be linked to each other (step S56).

In the present second example, since the portable telephone terminal 4(1) with a music reproduction function and the digital still camera 4(2) with a music reproduction function are placed on the cradle 1, the third set of registration information of the apparatus linkage table illustrated in FIG. 37 is specified as information to be utilized at step S56.

Then, in the present second example, at step S56, the portable telephone terminal 4(1) with a music reproduction function serves as the apparatus 1 and the digital still camera 4(2) with a music reproduction function serves as the apparatus 2 Therefore, a process of copying those of music data of the apparatus 1 that is, the portable telephone terminal 4(1), which satisfy predetermined conditions into the apparatus 2 that is, the digital still camera 4(2), is specified as the substance of the linkage process to be executed. Further, the portable telephone terminal 4(1) is registered as the apparatus 1 and the digital still camera 4(2) is registered as the apparatus 2 in an associated relationship into the nonvolatile memory 214 of the server apparatus 2. It is to be noted that, in the present example, the condition determined in advance is that music data having a high reproduction frequency are an object of copying.

Further, in the present second example, since the providing destination of the music data, that is, the apparatus 1 is the portable telephone terminal 4(1), the server apparatus 2 forms a request for an accumulated data list for requesting provision of an accumulated data list to the portable telephone terminal 4(1). Then, the server apparatus 2 outputs the request for an accumulated data list through the external interface 26a and the input/output terminal 26b so as to be transmitted to the portable telephone terminal 4(1) through the cradle 1 (step S81). In this instance, the cradle 1 receives the request for an accumulated data list from the server apparatus 2 through the input/output terminal 14b and the external interface 14a and transmits the request for an accumulated data list to the portable telephone terminal 4(1) through the radio communication section 15a and the transmission/reception antenna 15b.

The portable telephone terminal 4(1) receives the request for an accumulated data list from the server apparatus 2 transmitted through the cradle 1 through the transmission/reception antenna 66b and the radio communication section 66a. Then, in response to the request for an accumulated data list, the portable telephone terminal 4(1) transmits the accumulated data list of music data stored and retained in the content storage section 62 to the server apparatus 2 through the radio communication section 66a and the transmission/reception antenna 66b (step S82).

In this instance, the cradle 1 receives the accumulated data list from the portable telephone terminal 4(1) through the transmission/reception antenna 15b and the radio communication section 15a and transmits the accumulated data list to the server apparatus 2 through the external interface 14a and the input/output terminal 14b. In the present second example, the accumulated data list of music data is formed by adding a "number of times of use" and a "history use" to the accumulated data list described hereinabove with reference to FIG. 8 based on the header information of the music data described hereinabove with reference to FIG. 35.

The server apparatus 2 receives the accumulated data list from the portable telephone terminal 4(1) transmitted through the cradle 1 through the input/output terminal 26b and the external interface 26a and stores the accumulated data list into a predetermined region of the HDD 30 (step S83). Thereafter, the processing advances to the process illustrated in FIG. 39.

Referring now to FIG. 39, in the present second example, the server apparatus 2 forms a request for an accumulated data list to the digital still camera 4(2). Then, the server apparatus 2 outputs the request for an accumulated data list through the external interface 26a and the input/output terminal 26b so as to be transmitted to the digital still camera 4(2) through the cradle 1 (step S81X). In this instance, the cradle 1 receives the request for an accumulated data list from the server apparatus 2 through the input/output terminal 14b and the external interface 14a and transmits the request for an accumulated data list to the digital still camera 4(2) through the radio communication section 15a and the transmission/reception antenna 15b.

The digital still camera 4(2) receives the request for an accumulated data list from the server apparatus 2 transmitted through the cradle 1 through the transmission/reception antenna 45b and the radio communication section 45a. Then, in response to the request for an accumulated data list, the digital still camera 4(2) transmits the accumulated data list of music data stored and retained in the data storage section 54 of the digital still camera 4(2) to the server apparatus 2 through the radio communication section 45a and the transmission/reception antenna 45b (step S82X).

In this instance, the cradle 1 receives the accumulated data list from the digital still camera 4(2) through the transmission/reception antenna 15b and the radio communication section 15a and transmits the accumulated data list to the server apparatus 2 through the external interface 14a and the input/output terminal 14b. Also the accumulated data list to be transmitted and received here is formed by adding a "number of times of use" and a "use history" to the accumulated data list described hereinabove with reference to FIG. 8 based on the header information of music data described hereinabove with reference to FIG. 35.

The server apparatus 2 receives the accumulated data list from the digital still camera 4(2) transmitted through the cradle 1 through the input/output terminal 26b and the external interface 26a and stores the accumulated data list into a predetermined region of the HDD 30 of the server apparatus 2 (step S83X).

Consequently, the server apparatus 2 can recognize what music data are retained in the portable telephone terminal 4(1) and what music data are retained in the digital still camera 4(2). Then, the server apparatus 2 specifies those music data which are used comparatively frequently in the portable telephone terminal 4(1) but are not retained in the digital still camera 4(2) as music data to be transmitted to the digital still camera 4(2) based on the accumulated data list of music data from the portable telephone terminal 4(1) stored at step S83 and the accumulated data list of music data from the digital still camera 4(2) stored at step 83X (step S84).

Then, the server apparatus 2 forms a request for provision of music data specified at step S84 to the portable telephone terminal 4(1) and outputs the request for provision of music data through the external interface 26a and the input/output terminal 26b so as to be transmitted to the portable telephone terminal 4(1) through the cradle 1 (step S85). In this instance, the cradle 1 receives the request for provision of music data from the server apparatus 2 through the input/output terminal 14b and the external interface 14a and transmits the request for provision of music data to the portable telephone terminal 4(1) through the radio communication section 15a and the transmission/reception antenna 15b.

The portable telephone terminal 4(1) receives the request for provision of music data from the server apparatus 2 transmitted through the cradle 1 through the transmission/reception antenna 66b and the radio communication section 66a. Then, the portable telephone terminal 4(1) extracts requested music data stored and retain in the content storage section 62 in response to the request for provision of music data and transmits the music data to the server apparatus 2 through the radio communication section 66a and the transmission/reception antenna 66b (step S86).

In this instance, the cradle 1 receives the music data from the digital still camera 4(2) through the transmission/reception antenna 15b and the radio communication section 15a and transmits the music data to the server apparatus 2 through the external interface 14a and the input/output terminal 14b.

Then, the server apparatus 2 receives the music data from the portable telephone terminal 4(1) transmitted through the cradle 1 through the input/output terminal 26b and the external interface 26a and stores the music data into a predetermined region of the HDD 30 of the server apparatus 2 (step S87). Then, the server apparatus 2 outputs the music data stored at step S87 as music data to be provided to the digital still camera 4(2) through the external interface 26a and the input/output terminal 26b so as to be transmitted to the digital still camera 4(2) through the cradle 1 (step S88).

In this instance, the cradle 1 receives the music data from the server apparatus 2 through the input/output terminal 14b and the external interface 14a and transmits the music data to the digital still camera 4(2) through the radio communication section 15a and the transmission/reception antenna 15b. The server apparatus 2 receives the music data from the server apparatus 2 transmitted through the cradle 1 through the transmission/reception antenna 45b and the radio communication section 45a and records the music data into the data storage section 54 so that the music data is placed into a state wherein it can be utilized also on the digital still camera 4(2) (step S89).

Thereafter, the processing advances to the process illustrated in FIG. 40. Referring to FIG. 40, processes similar to those at steps S66 to S72 of the first example described hereinabove with reference to FIG. 28 are carried out. In particular, the cradle 1 ends the charging process when the charging of the mobile apparatus placed on the cradle 1 is completed (steps S66 and S67). Then, the cradle 1 carries out confirmation of the end of the linkage process for the mobile apparatus (steps S68 and S70).

Since any mobile apparatus which receives the end confirmation confirms that the process to be carried out on the mobile apparatus is completed and transmits an end response (step S69 and S71), the cradle 1 receives the end response and transmits the end response to the server apparatus 2. When the server apparatus 2 receives the end response from the two mobile apparatus to be linked to each other, since it can be determined that the linkage process comes to an end, it erases the linkage apparatus registration carried out at step S56 of FIG. 38 (step S72), thereby ending the series of linkage processes in which music data is used.

It is to be noted that, in the present second example, the processes at steps S81X, S82X and S83X indicated by broken lines in FIG. 39 need not necessarily be carried out. In particular, music data which are used frequently in the portable telephone terminal 4(1) may be transferred from the portable telephone terminal 4(1) to the digital still camera 4(2) irrespective of whether or not music data is retained in the digital still camera 4(2).

[Processing of Component Apparatus of the Data Communication System Where a Portable Telephone Terminal as a Music Reproduction Apparatus and a Digital Still Camera Having a Music Reproduction Function Link to Each Other through Music Data]

[Processing of the Cradle 1]

In the present second example, the cradle 1 from among the portable telephone terminal 4(1), digital still camera 4(2), cradle 1 and server apparatus 2 which are components of the data communication system carries out processes similar to those carried out by the cradle 1 in the first example described hereinabove with reference to FIG. 29. Therefore, the processes of the cradle 1 in the present second example are summarized here with reference to FIG. 29.

In particular, also the cradle 1 in the present second embodiment detects placement of a mobile apparatus on the cradle 1 (step S5101) and carries out charging (steps S5102 to S5104). Then, the cradle 1 issues an inquiry about an apparatus ID to the mobile apparatus placed on the cradle 1 (step S5105) and transmits an apparatus ID response transmitted back in response to the inquiry about an apparatus ID to the server apparatus 2 (step S5106).

Thereafter, the cradle 1 carries out relaying of transmission and repetition of data between the server apparatus 2 and the mobile apparatus placed on the cradle 1 (step S5107). Then, after the series of relaying process comes to an end, the cradle 1 carries out confirmation of the end of charging (steps S5108 and S5109) and ends the charging process (step S5110). Thereafter, the cradle 1 carries out transmission of an end confirmation of the mobile apparatus (step S5111) and a relaying process of the end response from the mobile apparatus to the server apparatus 2 (step S5112), thereby ending the process for linkage through the cradle 1.

[Processing of the Server Apparatus 2]

Figure 41:
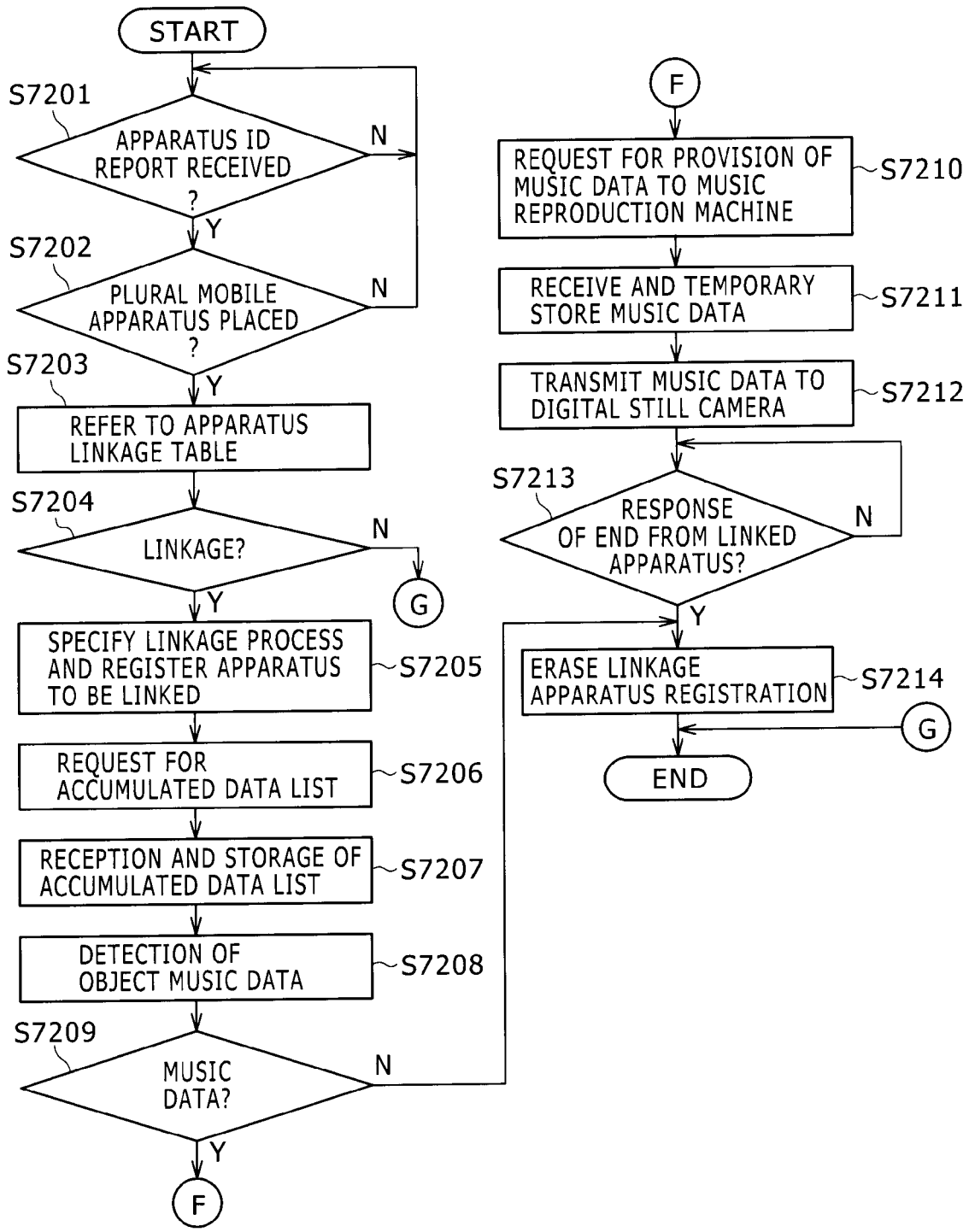
FIG. 41 is a flow chart illustrating a process carried out by the server apparatus used in the second example of the second embodiment.

FIG. 41 illustrates a process executed by the server apparatus 2 where the portable telephone terminal 4(1) with a music reproduction function and the digital still camera 4(2) with a music reproduction function described hereinabove with reference to FIGS. 38 to 40 in the data communication system of the second embodiment link to each other such that music data retained in the portable telephone terminal 4(1) can be utilized also on the digital still camera 4(2). The process illustrated in FIG. 41 is executed principally by the control section 21 and the transmission/reception control section 27 when the server apparatus 2 is in a state wherein the power supply thereto is on.

Referring to FIG. 41, if the power supply is turned on, then the transmission/reception control section 27 of the server apparatus 2 determines whether or not an apparatus ID report of the mobile apparatus placed on the cradle 1 is received from the cradle 1 through the input/output terminal 26b and the external interface 26a (step S7201). If it is determined by the decision process at step S7201 that an apparatus ID report is not received as yet, then the transmission/reception control section 27 repeats the process at step S7201 to wait for reception of an apparatus ID report of the mobile apparatus placed on the cradle 1.

If it is determined by the decision process at step S7201 that an apparatus ID report from the cradle 1 is received, then since the control section 21 recognizes the apparatus ID received already, then it determines whether or not a state wherein a plurality of mobile apparatus are placed on the cradle 1 is established (step S7202). If it is determined by the decision process at step S7202 that the state wherein a plurality of mobile apparatus are placed is not established as yet, that is, only one mobile apparatus is placed, then the transmission/reception control section 47 repeats the processes at the steps beginning with step S7201.

On the other hand, if it is determined by the decision process at step S7202 that a plurality of mobile apparatus are placed on the cradle 1, then the control section 21 refers to the apparatus linkage table formed in the nonvolatile memory 214 (step S7203) as described hereinabove with reference to FIG. 37. Then, the control section 21 determines whether or not the combination of the two mobile apparatus placed on the cradle 1 is registered as a combination of apparatus to be linked to each other in the apparatus linkage table (step S7204).

If it is determined by the decision process at step S7204 that the combination of the two mobile apparatus placed on the cradle 1 is not registered as a combination of apparatus to be linked to each other in the apparatus linkage table, then since there exists no process for linking the two mobile apparatus, the process illustrated in FIG. 41 is ended.

On the other hand, if it is determined by the decision process at step S7204 that the combination of the two mobile apparatus placed on the cradle 1 is registered as a combination of apparatus to be linked to each other in the apparatus linkage table, then the control section 21 specifies a linkage process to be carried out between the mobile apparatus placed on the cradle 1 based on the information of the apparatus linkage table referred to. Then, the control section 21 registers the two mobile apparatus as apparatus to be linked to each other into the nonvolatile memory 214 of the server apparatus 2 (step S7205).

In the present second example, since the apparatus 1 is the portable telephone terminal 4(1) with a music reproduction function and the apparatus 2 is the digital still camera 4(2) with a music reproduction function as described hereinabove with reference to FIGS. 33 to 40, a "process of copying those of music data of the apparatus 1 which satisfy a predetermined condition into the apparatus 2" is specified as a linkage process to be executed. Thus, the portable telephone terminal 4(1) as the apparatus 1 and the digital still camera 4(2) as the apparatus 2 are registered as apparatus to be linked to each other into the nonvolatile memory 214.

The processes at the steps beginning with step S7206 of the process illustrated in FIG. 41 correspond to the linkage process specified at step S7205 and are the process by a program specified by the program ID of the apparatus linkage table illustrated in FIG. 37. In the case of the present example, the control section 21 of the server 2 forms a request for an accumulated data list of music data destined for the portable telephone terminal 4(1), and the transmission/reception control section 27 transmits the request for an accumulated data list through the external interface 26a and the input/output terminal 26b (step S7206). The request for an accumulated data list is transmitted to the portable telephone terminal 4(1) through the cradle 1 as described hereinabove.

In response to the request for an accumulated data list, an accumulated data list of music data is transmitted back from the portable telephone terminal 4(1) through the cradle 1. Thus, the transmission/reception control section 27 controls the external interface 26a to receive the accumulated data list of music data from the portable telephone terminal 4(1) and stores the accumulated data list into a predetermined region of the HDD 30 (step S7207).

Though not shown in FIG. 1, also it is possible to issue a request for provision of an accumulated data list of music data to the digital still camera 4(2) so as to receive provision of the accumulated data list of the music data from the digital still camera 4(2) such that also the music data retained already in the digital still camera 4(2) are taken into consideration by processes corresponding to the processes at steps S81X to S83X indicated by broken lines in FIG. 39.

Then, the control section 21 detects data to be provided to the digital still camera 4(2), in the case of the second example, music data having a high frequency of use in the portable telephone terminal 4(1), based on the accumulated data list of the music data stored in the HDD 30 (step S7208).

Then, the control section 21 determines based on a result of the detection at step S7208 whether or not music data having a high frequency of use exists in the digital still camera 4(2) (step S7209). If it is determined by the decision process at step S7209 that, for example, reproduction of music data has not been carried out at all and music data having a high frequency of use does not exist in the digital still camera 4(2), then data to be supplied to the digital still camera 4(2) does not exist. Therefore, the processing advances to step S7214, at which the control section 21 erases the linkage apparatus registration carried out for the nonvolatile memory 214 at step S7205, thereby ending the process of FIG. 41.

On the other hand, if it is determined by the decision process at step S7209 that music data having a high frequency of use exists in the portable telephone terminal 4(1), then the control section 21 of the server apparatus 2 forms a request for provision of music data to the portable telephone terminal 4(1). Then, the transmission/reception control section 27 transmits the request for provision of music data through the external interface 26a and the input/output terminal 26b (step S7210). The request for provision of music data is transmitted to the portable telephone terminal 4(1) through the cradle 1 as described hereinabove.

In response to the request for provision of music data, music data is transmitted back from the portable telephone terminal 4(1) through the cradle 1. Consequently, the transmission/reception control section 27 controls the external interface 26a to receive the music data from the portable telephone terminal 4(1) and temporarily stores the music data into a predetermined region of the HDD 30 (step S7211).

Then, the transmission/reception control section 27 controls the external interface 26a to transmit the temporarily stored music data destined for the digital still camera 4(2) to the digital still camera 4(2) (step S7212). The music data destined for the digital still camera 4(2) is transmitted to the digital still camera 4(2) through the cradle 1 described hereinabove.

Thereafter, the control section 21 of the server apparatus 2 is placed into and remains in a waiting state until an end response is received from the portable telephone terminal 4(1) and the digital still camera 4(2) of the linkage apparatus (step S7213). Then, if end responses from both of the portable telephone terminal 4(1) and the digital still camera 4(2) are received, then the control section 21 erases the linkage apparatus registration carried out for the nonvolatile memory 214 at step S7205 (step S7214), thereby ending the process of FIG. 41.

It is to be noted here that, although it is described above that the music data from the portable telephone terminal 4(1) is transmitted as it is to the digital still camera 4(2), the transfer of the music data is not limited to this. For example, if the data format of music data which can be utilized on the portable telephone terminal 4(1) and the data format of music data which can be used on the digital still camera 4(2) are different from each other, then the music data of the server apparatus 2 may be supplied to the digital still camera 4(2) after the format of the music data of the digital still camera 4(2) is converted into a format which can be used in the digital still camera 4(2).

Here, the conversion of the data format of the music data includes, for example, conversion of PCM data into data compressed in accordance with a predetermined compression method or conversion of a data compression method to be used.

[Processing of the Portable Telephone Terminal 4(1)]

Figure 42:
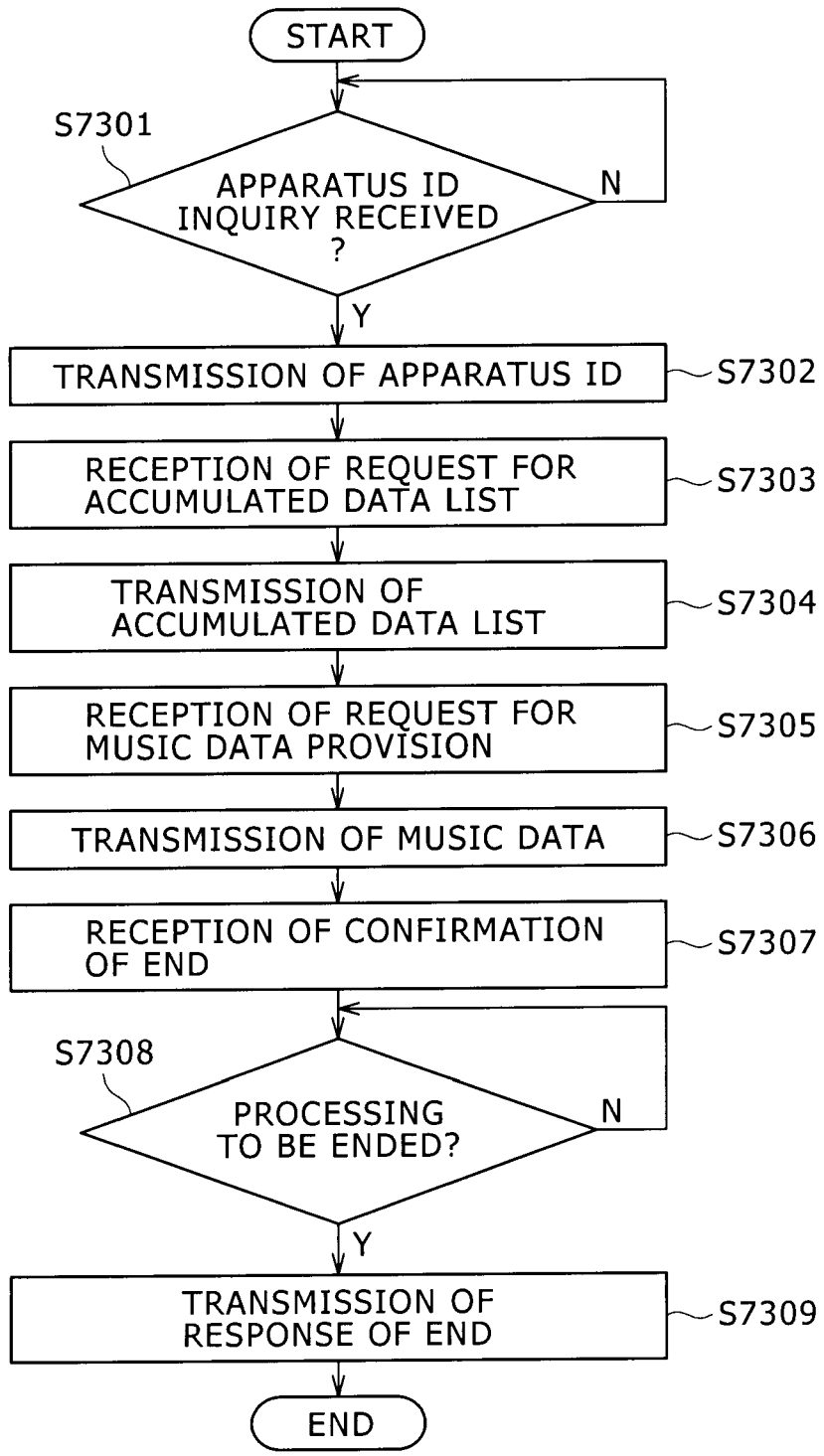
FIG. 42 is a flow chart illustrating a process carried out by the portable telephone terminal used in the second example of the second embodiment.

FIG. 42 illustrates a process executed by the portable telephone terminal 4(1) where the portable telephone terminal 4(1) with a music reproduction function and the digital still camera 4(2) with a music reproduction function described with reference to FIGS. 38 to 40 in the data communication system of the second embodiment link to each other such that music data retained in the portable telephone terminal 4(1) can be utilized also in the digital still camera 4(2).

The process illustrated in FIG. 42 is executed principally by the control section 61 of the portable telephone terminal 4(1) where the portable telephone terminal 4(1) which is a mobile apparatus is placed into a predetermined mode such as, for example, a charging mode wherein the portable telephone terminal 4(1) is placed on the cradle 1 and carries out a data communication process and a charging process.

First, if the mode of the portable telephone terminal 4(1) is placed into the predetermined mode, then the control section 61 determines whether or not an inquiry about an apparatus ID from the cradle 1 is received through the transmission/reception antenna 66*b* and the radio communication section 66*a* (step S7301). If it is determined by the decision process at step S7301 that an inquiry about an apparatus ID is not received, then the process at step S7301 is repeated to wait for reception of an inquiry about an apparatus ID.

If it is determined by the decision process at step S7301 that an inquiry about an apparatus ID is received, then the control section 61 acquires necessary information such as an apparatus ID and an apparatus attribute stored and retained, for example, in the ROM 612 of the portable telephone terminal 4(1). Then, the control section 61 forms such an apparatus ID response as described hereinabove with reference to FIG. 7C and transmits the apparatus ID response to the server apparatus 2 through the cradle 1.

Then, the control section 61 receives a request for an accumulated data list of music data from the server apparatus 2 transmitted through the cradle 1 through the transmission/reception antenna 66*b* and the radio communication section 66*a* (step S7303). After the request for an accumulated data list is received, the control section 61 forms a accumulated data list destined for the server apparatus 2, and the control section 61 controls the radio communication section 66*a* to transmit the accumulated data list (step S7304). Also the accumulated data list is transmitted to the server apparatus 2 through the cradle 1.

Thereafter, the control section 61 receives a request for provision of music data from the server apparatus 2 transmitted thereto through the cradle 1 through the transmission/reception antenna 66*b* and the radio communication section 66*a* (step S7305). Then, if a request for provision of music data is received, then the control section 61 reads out the requested music data from the content storage section 62, and the control section 61 controls the radio communication section 66*a* to transmit the music data (step S7306). Also this music data is transmitted to the server apparatus 2 through the cradle 1.

Thereafter, the control section 61 receives an end confirmation transmitted from the cradle 1 through the transmission/reception antenna 66*b* and the radio communication section 66*a* (step S7307). After the end confirmation is received, the control section 61 places itself into and remains in a waiting state until the linkage process comes to an end (step S7308). Then, if the series or linkage processes is completed, then the control section 61 forms an end response and controls the radio communication section 45*a* to transmit the end response (step S7309), thereby ending the process of FIG. 42.

[Processing of the Digital Still Camera 4(2)]

Figure 43:
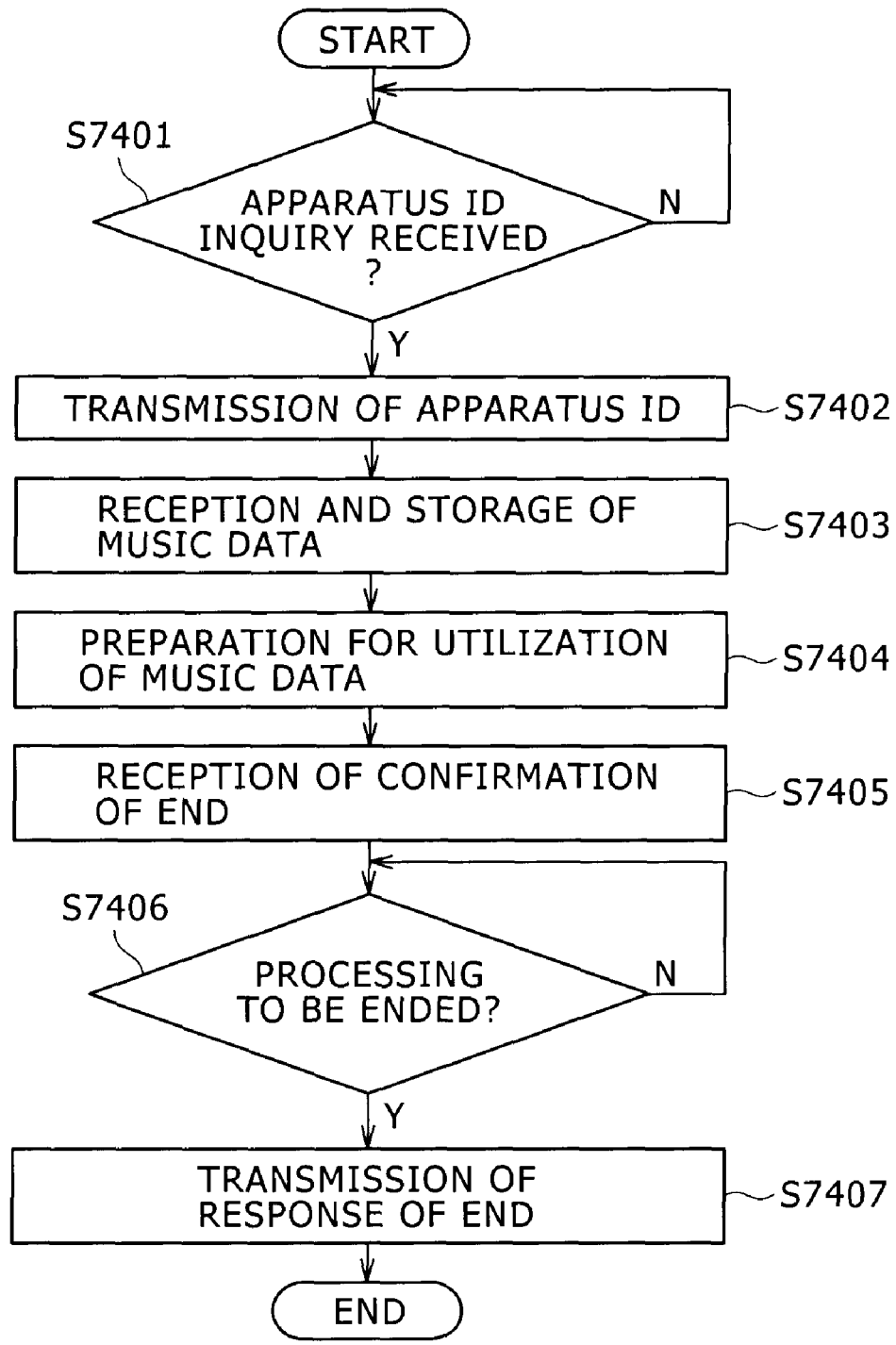
FIG. 43 is a flow chart illustrating a process carried out by the digital still camera used in the second example of the second embodiment.

FIG. 43 illustrates a process carried out by the digital still camera 4(2) where the portable telephone terminal 4(1) with a music reproduction function and the digital still camera 4(2) with a music reproduction function described hereinabove with reference to FIGS. 38 to 40 in the data communication system of the second embodiment link to each other such that music data retained in the portable telephone terminal 4(1) can be used also on the digital still camera 4(2).

The process illustrated in FIG. 43 is executed principally by the control section 41 and the transmission/reception control section 47 of the digital still camera 4(2) where the digital still camera 4(2) which is a mobile apparatus is placed into a predetermined such as, for example, a charging mode wherein the digital still camera 4(2) is placed on the cradle 1 such that data communication and a charging process are carried out.

First, if the mode of the digital still camera 4(2) is changed over to the predetermined mode, then the transmission/reception control section 47 determines whether or not an inquiry about an apparatus ID from the cradle 1 is received through the transmission/reception antenna 45*b* and the radio communication section 45*a* (step S7401). If it is determined by the decision process at step S7401 that an inquiry about an apparatus ID is not received, then the transmission/reception control section 47 repeats the process at step S7401 to wait for reception of an inquiry about an apparatus ID.

Then, if it is determined by the decision process at step S7401 that an inquiry about an apparatus ID from the cradle 1 is received, then the control section 41 acquires necessary information such as an apparatus ID and an apparatus attribute stored and retained, for example, in the ROM 412 of the digital still camera 4(2). Then, the control section 41 forms such an apparatus ID response as described hereinabove with reference to FIG. 7C, and the transmission/reception control section 47 transmits the apparatus ID response through the radio communication section 45*a* and the transmission/reception antenna 45*b* (step S7402). This apparatus ID response is transmitted to the server apparatus 2 through the cradle 1.

Then, the transmission/reception control section 47 receives music data from the server apparatus 2 transmitted through the cradle 1 through the transmission/reception antenna 45*b* and the radio communication section 45*a* and stores the music data into the data storage section 54 (step S7403). Then, the transmission/reception control section 47 reads out the music data stored in the data storage section 54 under the control of the control section 41 and carries out such preparations as to change the format of the data such that the music data can be utilized (step S7404).

Thereafter, the transmission/reception control section 47 receives an end confirmation transmitted from the cradle 1 through the transmission/reception antenna 45*b* and the radio communication section 45*a* (step S7405). Then, after the end confirmation is received, the transmission/reception control section 47 places itself into and remains in a waiting state until the linkage process comes to an end (step S7406). Then, if the series of linkage processes ends, then the control section 41 forms an end response, and the transmission/reception control section 47 controls the radio communication section 45a to transmit the end response (step S7407), thereby ending the process of FIG. 43.

In this manner, in the present second example, the portable telephone terminal 4(1) used as a music reproduction apparatus and the digital still camera 4(2) having a music reproduction function link to each other such that, from among music data used in the portable telephone terminal 4(1), those music data which satisfy a predetermined condition, in the case of the second example described above, those music data having a high frequency of use in the portable telephone terminal 4(1), are provided automatically to the digital still camera 4(2) having a music reproduction function without any participation of the user. Therefore, the music data provided from the portable telephone terminal 4(1) can be used in the digital still camera 4(2).

It is to be noted that, while, in the foregoing description, music data having a high frequency of use is transmitted from the portable telephone terminal 4(1) to the digital still camera 4(2), the transfer is not limited to this. In particular, also it is possible to transfer music data used latest to the digital still camera 4(2) based on a reproduction history of music data of the portable telephone terminal 4(1).

Further, where a plurality of music data exhibit a high frequency of use, it is possible for the server apparatus 2 to request the portable telephone terminal 4(1) for an amount of music data determined advance and provide music data transmitted thereto in response to the request to the digital still camera 4(2). In this instance, if the digital still camera 4(2) does not have a sufficient free capacity, then music data having a comparatively old production date and time may be erased or only an amount of music data which corresponds to the free capacity at present may be accepted.

Also it is possible for the server apparatus 2 to confirm the free capacity of the data storage section 54 of the digital still camera 4(2) and provide an appropriate amount of music data to the digital still camera 4(2). In this instance, the server apparatus 2 issues an inquiry about the free capacity of the data storage section 54 to the digital still camera 4(2) and prepares a table wherein free capacities of the data storage section of the digital still camera 4(2) and provision permissible amounts of music data are associated with each other. Thus, the server apparatus 2 can control the data amount of music data which can be provided to the digital still camera 4(2) with reference to the table.

Further, since music data accumulated in the portable telephone terminal 4(1) includes reproduction history information, an accumulated data list including such reproduction history information is provided from the portable telephone terminal 4(1) to the server apparatus 2 by the processes at steps S81 to 83 of FIG. 38.

Also it is possible for the server apparatus 2 to receive supply of a list of accumulated data accumulated in the digital still camera 4(2) and provide music data having a reproduction date and time coincident with the production date and time of image data preferentially to the digital still camera 4(2) by the processes at steps S81X to S83X. Also it is possible to determine music data to be transferred to the digital still camera 4(2) based on various kinds of information included in the accumulated data list.

Further, where the server apparatus 2 itself stores and retains music data, also the music data stored and retained in the server apparatus 2 may be provided from the portable telephone terminal 4(1) to the digital still camera 4(2) in accordance with conditions similar to those in the case wherein music data is transferred from the portable telephone terminal 4(1) to the digital still camera 4(2).

[(3) Linkage of the Third Example Which Uses Text Data between an Image Pickup Apparatus and a Portable Telephone Terminal]

Figure 44:
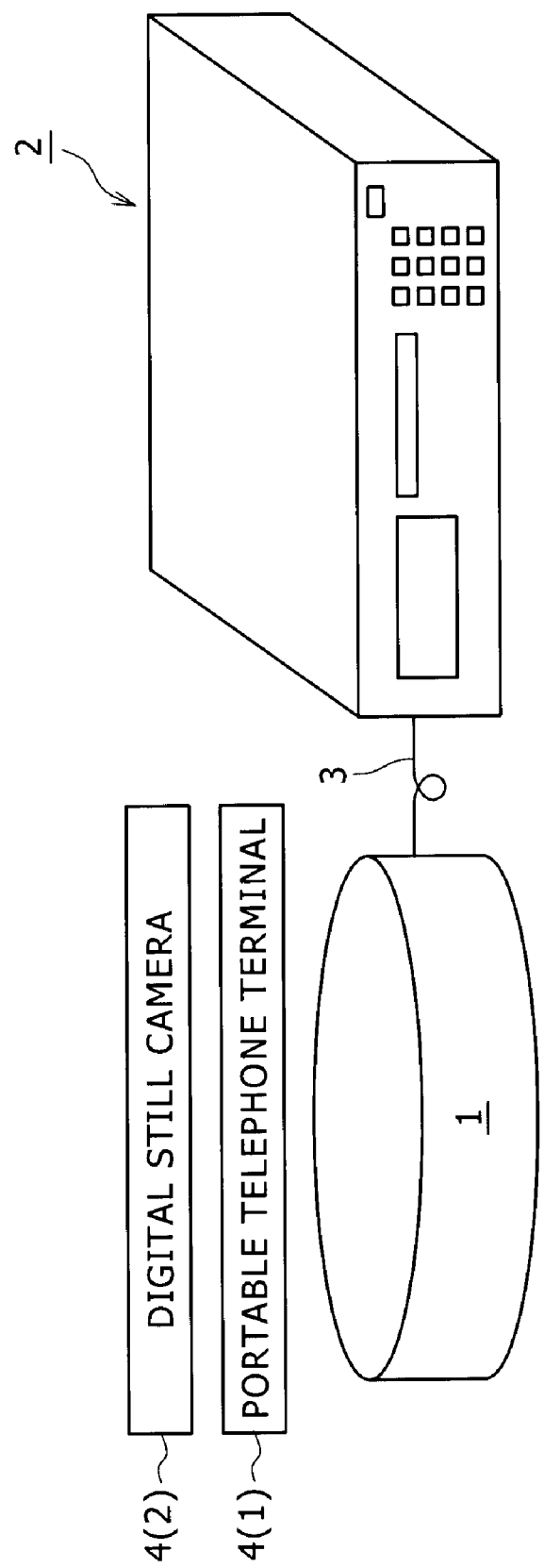
FIGS. 44 and 45 are schematic views showing a general configuration of a data communication system according to a third example of the second embodiment of the present invention.
Figure 45:
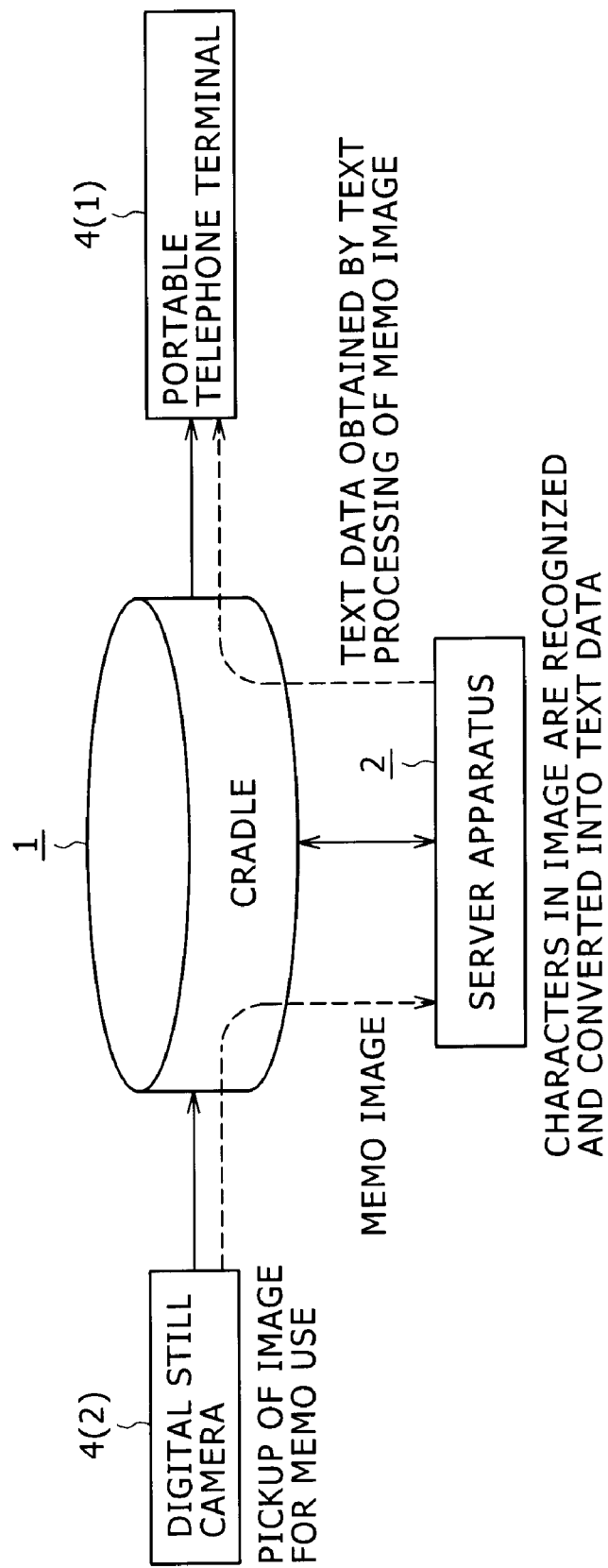

FIGS. 44 and 45 illustrate linkage of a third example which uses text data between an image pickup apparatus and a portable music reproduction apparatus. As described hereinabove, a plurality of various mobile apparatus can be placed at a time on the cradle 1. Therefore, for example, a portable music reproduction apparatus 4(4) and a digital still camera 4(2) may be placed together on the cradle 1.

Also in the example illustrated in FIGS. 44 and 45, what is significant is that the portable telephone terminal 4(1) and the digital still camera 4(2) are placed on the cradle 1, but the timings of the placement of them may be different from each other. For example, where the portable telephone terminal 4(1) is placed first on the cradle 1, the digital still camera 4(2) may be placed on the cradle 1 after lapse of several hours. On the contrary, where the digital still camera 4(2) is placed first on the cradle 1, the portable telephone terminal 4(1) may be placed later. The point is that the portable telephone terminal 4(1) and the digital still camera 4(2) are in a situation wherein both of them are placed on the cradle 1.

Some image pickup apparatus such as the digital still camera 4(2) has an image pickup mode wherein it picks up an image of character information written on a blackboard or a whiteboard, character information put up as a notice on a bulletin board or like character information as a monochromatic image and increases the contrast of the monochromatic image between black and white such that the monochromatic image is fetched as still image data which allows clear distinction of the character information.

Therefore, in the present example, where the portable telephone terminal 4(1) and the digital still camera 4(2) are placed on the cradle 1 as seen in FIG. 45, that still image data or memo image from among still image data stored and retained in the digital still camera 4(2) which has been obtained by image pickup in the memo mode is fetched into the server apparatus 2. Then, the server apparatus 2 recognizes characters in the memo image and converts the characters into text data thereby to convert the character information included in the memo images into text data. Then, the server apparatus 2 transfers the resulting text data to the portable telephone terminal 4(1).

This makes it possible to reinforce the functional linkage between the portable telephone terminal 4(1) and the digital still camera 4(2) such that character information of still image data obtained by image pickup in the memo mode by the digital still camera 4(2) can be utilized as text data in the portable telephone terminal 4(1). Further, since character information in still image data is converted into text data, the data amount can be reduced significantly and besides can be displayed clearly on the portable telephone terminal 4(1) so as to be provided to the user.

In the following, the linkage of the third example is described in detail taking a case wherein the portable telephone terminal 4(1) and the digital still camera 4(2) are placed on the cradle 1 as shown in FIGS. 45 and 45 as an example. It is to be noted that, in the present third example, the portable telephone terminal 4(1) has the configuration described hereinabove with reference to FIG. 25 and the digital still camera 4(2) has the configuration described hereinabove with reference to FIG. 4 or 34.

[Example of a Layout of Still Image Data as Accumulated Data]

FIG. 46 illustrates an example of a layout of still image data as accumulated data stored and retained in the image storage section 44 or the data storage section 54 of the digital still camera 4(2) having the configuration described hereinabove with reference to FIG. 4 or 34 and used in the data communication system of the present example.

The still image data as accumulated data is acquired principally by image pickup by the digital still camera 4(2). Alternatively, the still image data may be provided from the server apparatus 2 through the cradle 1 and through the transmission/reception antenna 45b and the radio communication section 45a. The still image data as accumulated data stored and retained in the image storage section 44 or the data storage section 54 of the digital still camera 4(2) has header information added thereto as seen in FIG. 46.

Referring to FIG. 46, the header information includes an apparatus ID, a data ID, a data attribute, a production date and time, protect, a print mark, a data size, the number of times of use, an image pickup mode and other information. The apparatus ID, data ID, data attribute, production date and time, protect, print mark, data size and the number of times of use individually have the same substances as those of the information described hereinabove in connection with the layout of accumulated data in the form of image data described hereinabove with reference to FIG. 9.

The image pickup mode is used in the present third example. As described hereinabove, the digital still camera 4(2) in the present third example has, as image pickup modes, for example, a normal mode, a memo mode and so forth, and the image pickup mode of the digital still camera 4(2) can be selectively changed over through the operation section 43 of the digital still camera 4(2) by the user. An image pickup process is carried out in response to the image pickup mode selected by the user in this manner, and as the header information of still image data formed by the image pickup, information representative of the image pickup mode is added, for example, by the control section 41.

Accordingly, from the information of the image pickup mode of the header information added to image data, it can be determined whether the image data was obtained by image pickup in the normal mode or in the memo mode. Still image data to which such header information is added is stored and retained in the image storage section 44 or the data storage section 54 of the digital still camera 4(2).

[Example of a Layout of Text Data as Accumulated Data]

FIG. 47 illustrates an example of a layout of text data as accumulated data stored and retained in the content storage section 62 of the portable telephone terminal 4(1) having the configuration described hereinabove with reference to FIG. 25. Here, the text data is obtained by conversion by the server apparatus 2 of character information included in a still image obtained by image pickup in the memory mode by the digital still camera 4(2) as described hereinabove.

The text data as accumulated data accumulated in the content storage section 62 has header information added thereto as seen in FIG. 47. Referring to FIG. 47, the heather information includes an apparatus ID, a data ID, a data attribute, a production date and time, protect, a print mark, a data size, the number of times of use, a providing source ID and other information.

The information items other than the providing source ID have the same substances as those of the information described hereinabove in connection with the layout of accumulated data in the form of image data described hereinabove with reference to FIG. 9. The providing source ID indicates the digital still camera 4(2) by which still image data from which the text data is derived was obtained by image pickup in the memo mode.

In the data communication system of the present example, if the portable telephone terminal 4(1) and the digital still camera 4(2) are placed on the cradle 1, then still image data obtained by image pickup in the memo mode and retained in the digital still camera 4(2) is drawn up into the server apparatus 2, in which character information included in the still image data is converted into text data. Then, the text data is stored into and retained in the content storage section 62 of the portable telephone terminal 4(1) in the layout illustrated in FIG. 47.

[Example of a Configuration of an Apparatus Linkage Table]

Also where linkage described below in which text data is used is carried out between different mobile apparatus, such linkage can be implemented by control of the server apparatus 2 in accordance with information of an apparatus linkage table produced, for example, in the nonvolatile memory 214 of the server apparatus 2. Although the apparatus linkage table used in this instance is similar to those described hereinabove with reference to FIGS. 26 and 37, it is different in information registered therein.

FIG. 48 illustrates the apparatus linkage table used in the present example. Referring to FIG. 48, the first, second and third sets of registered information are same as those illustrated in FIG. 37. However, in the present example, the fourth set of information registered in the apparatus linkage table illustrated in FIG. 48 is required.

In particular, referring to FIG. 48, in the fourth set of registered information of the apparatus linkage table illustrated, the apparatus 1 is a "digital still camera"; the apparatus 2 is a "portable telephone terminal"; and the substance of linkage processes is "to convert an image for a memo application of the digital still camera (apparatus 1) into text data and transfer the text data to a portable telephone terminal as the apparatus 2". Further, the program ID of a program executed by the server apparatus 2 in order to carry out the linkage process described is "PG4".

Then, if the server apparatus 2 detects that the portable telephone terminal 4(1) and the digital still camera 4(2) are placed on the cradle 1, then the server apparatus 2 carries out a linkage process between the mobile apparatus in which text data is used in accordance with the fourth set of registration information of the apparatus linkage data illustrated in FIG. 48 in the data communication system.

It is to be noted that, since information registered as the fifth set of information in FIG. 48 is used in the fourth example, details thereof are hereinafter described.

[Operation of the System where Linkage Wherein Text Data is Used is Carried Out]

Now, operation of the data communication system of the present example wherein the portable telephone terminal 4(1) and the digital still camera 4(2) are used as mobile apparatus such that linkage wherein text data is used can be carried out between the mobile apparatus is described. FIGS. 49 and 50 illustrate operation of the data communication system of the present example wherein linkage in which text data is used can be carried out between the mobile apparatus.

Also in the present example, the different mobile apparatus transmit and receive information through the cradle 1 and the server apparatus 2 similarly as in the operation described hereinabove with reference to FIGS. 27 and 28. Therefore, in order to simplify the description, like items carried out similarly to those described hereinabove with reference to FIGS. 27 and 28 are denoted by like reference characters, and since detailed description of the items is same as that given hereinabove with reference to FIGS. 27 and 28, it is omitted herein to avoid redundancy.

It is to be noted that, although the timings at which the portable telephone terminal 4(1) and the digital still camera 4(2) are placed on the cradle 1 do not particularly matter as described hereinabove, in order to simplify the description, it is assumed that the portable telephone terminal 4(1) is placed first on the cradle 1 and then the digital still camera 4(2) is placed on the cradle 1.

Further, in the present third example, it is assumed that image data obtained by image pickup in the memo mode described hereinabove with reference to FIG. 46 are stored in the image storage section 44 or the data storage section 54 of the digital still camera 4(2).

In the present third example, processes at steps S51 to S59 illustrated in FIG. 49 and steps S60 to S62 illustrated in FIG. 50 are carried out similarly to those in the first example described hereinabove with reference to FIGS. 27 and 28. In particular, the cradle 1 executes a process of carrying out charging, that is, a charging starting process, when it detects that a mobile apparatus is placed on the cradle 1 (step S51). Then, the cradle 1 carries out inquiry about an apparatus ID to the mobile apparatus placed thereon (steps S52 and S54).

An apparatus ID response is transmitted back from the mobile apparatus after it receives the inquiry about an apparatus ID (steps S53 and S55). The cradle 1 receives and transmits the apparatus ID response to the server apparatus 2. Consequently, the server apparatus 2 can recognize based on the apparatus ID response or apparatus ID report transmitted thereto through the cradle 1 what the mobile apparatus placed on the cradle 1 is.

Then, if a plurality of mobile apparatus are placed on the cradle 1 based on the apparatus ID response from each of the mobile apparatus placed on the cradle 1, then the server apparatus 2 refers to the apparatus linkage table produced in the EEPROM 214 of the server apparatus 2 to specify a linkage process of the apparatus to be carried out and registers the apparatus to be linked to each other (step S56).

In the present third example, since the portable telephone terminal 4(1) and the digital still camera 4(2) are placed on the cradle 1, the first and fourth sets of registration information of the apparatus linkage table illustrated in FIG. 48 coincide with the combination of mobile apparatus. The following methods are available to cope with such a case as just described.

(A) A plurality of linkage processes are carried out in accordance with the registration order. Accordingly, in the example described, a linkage process in accordance with the first set of registration operation illustrated in FIG. 48 is carried out first, and then a linkage process in accordance with the fourth set of registration operation is carried out. (B) A priority order is set in advance, and the linkage processes are carried out in accordance with the priority order. (C) A notification that a plurality of linkage processes are available is presented to the user through the server apparatus 2, and after it is selected by the user which linkage process should be carried out, the selected linkage process is carried out. (D) Specification of particular mobile apparatus to be linked to each other is permitted so that registration information may not overlap.

Therefore, in the present third example, it is assumed for simplified description that, for example, the method (C) described above is adopted and it is specified at step S56 of FIG. 49 that the fourth set of registration of the apparatus linkage table illustrated in FIG. 48 is specified as registration information to be used.

Accordingly, in the present third example, since the digital still camera 4(2) is the apparatus 1 and the portable telephone terminal 4(1) is the apparatus 2, a process of transferring text data obtained by conversion of character information from within still image data for application of a memo of the digital still camera 4(2) of the apparatus 1 to the portable telephone terminal 4(1) of the apparatus 2 is specified as the substance of a linkage process to be executed at step S56 of FIG. 49. Further, the digital still camera 4(2) is registered as the apparatus 1 and the portable telephone terminal 4(1) is registered as the apparatus 2 in an associated relationship into the nonvolatile memory 214 of the server apparatus 2.

In the present third example, since the providing source of still image data for memo applications, that is, the apparatus 1 is the digital still camera 4(2), the server apparatus 2 forms a request for an accumulated data list for requesting provision of an accumulated data list of still image data obtained by image pickup in the memo mode and transmits the request for an accumulated data list to the digital still camera 4(2) (step S57).

The digital still camera 4(2) receives the request for an accumulated data list of still image data obtained by image pickup in the memo mode from the server apparatus 2 transmitted through the cradle 1. In response to the request for an accumulated data list, the digital still camera 4(2) transmits the accumulated data list of still image data obtained by image pickup in the memo mode stored and retained in the image storage section 44 or the data storage section 54 to the server apparatus 2 through the radio communication section 45a and the transmission/reception antenna 45b (step S58).

In the present third example, since the accumulated data list of still image data obtained by image pickup in the memo mode is formed by addition of an "image pickup mode" to an accumulated data list described hereinabove with reference to FIG. 8 based on the header information of accumulated data, that is, still image data, described hereinabove with reference to FIG. 46.

The server apparatus 2 receives the accumulated data list from the digital still camera 4(2) transmitted through the cradle 1 and stores the accumulated data list into a predetermined region of the HDD 30 of the server apparatus 2 (step S59). Thereafter, the processing advances to the process illustrated in FIG. 50.

Referring to FIG. 50, in the present third example, the server apparatus 2 specifies those of the still image data obtained by image pickup in the memo mode, which have not been provided as yet, from the difference between the accumulated data list of still image data obtained by image pickup in the memo mode stored in the HDD 30 of the server apparatus 2 and the accumulated data list of still image data obtained by image pickup in the memo mode which have been provided and stored and retained already. Then, the server apparatus 2 forms a request for new accumulated data for requesting provision of new accumulated data for the digital still camera 4(2) and transmits the request for new accumulated data to the digital still camera 4(2) through the cradle 1 (step S60).

The digital still camera 4(2) receives the request for new accumulated data transmitted through the cradle 1, that is, the request for new accumulated data of still image data obtained by image pickup in the memo mode. Then, in response to the request for new accumulated data, the digital still camera 4(2) extracts those of the still image data obtained by image pickup in the memo mode which have not been transmitted to the server apparatus 2 as yet from the image storage section 44 or the data storage section 54 of the digital still camera 4(2), and transmits the still image data to the server apparatus 2 (step S61). Here, the accumulated data provided from the digital still camera 4(2) to the server apparatus 2 is still image data obtained by image pickup in the memo mode and having the configuration described hereinabove with reference to FIG. 46.

The server apparatus 2 receives the accumulated data from the digital still camera 4(2) transmitted through the cradle 1, that is, the still image data obtained by image pickup in the memo mode, and stores the accumulated data into a predetermined region of the HDD 30 of the server apparatus 2 (step S62).

Then, in the present third example, the control section 21 of the server apparatus 2 uses, for example, the function of the writing back data production section 29 to analyze the still image data obtained by image pickup in the memo mode and stored in the HDD 30 at step S62 to specify character information or character portions included in the still image data. Then, the control section 21 converts the specified character information into text data (step S91).

Thereafter, the control section 21 produces text data to be transferred to the portable telephone terminal 4(1) from the text data obtained by the conversion at step S91 and outputs the produced text data through the external interface 26a and the input/output terminal 26b (step S92). The text data destined for the portable telephone terminal 4(1) is received through the input/output terminal 14b and the external interface 14a of the cradle 1 and then transmitted to the portable telephone terminal 4(1) through the radio communication section 15a and the transmission/reception antenna 15b.

The portable telephone terminal 4(1) receives the text data from the server apparatus 2 transmitted through the cradle 1 through the transmission/reception antenna 66b and the radio communication section 66a and records the text data into the content storage section 62 of the portable telephone terminal 4(1) to place the text data into a state wherein it can be utilized on the portable telephone terminal 4(1) (step S93).

Thereafter, processes similar to those at steps S66 to S72 described hereinabove with reference to FIG. 28 in connection with the first example are carried out. In particular, the cradle 1 ends the reception process when the charging of all mobile apparatus placed on the cradle 1 is completed (steps S66 and S67). Then, the cradle 1 carries out end confirmation regarding the linkage process from the mobile apparatus (steps S68 and S70).

If the end confirmation is received by any mobile apparatus, then the mobile apparatus transmits an end response after it confirms that the process to be executed thereon is completed (steps S69 and S71). Therefore, the cradle 1 receives and transmits the end response to the server apparatus 2. If the server apparatus 2 receives the end response from the two mobile apparatus to be linked to each other, then since it can be determined that the linkage process ends, the server apparatus 2 erases the linkage apparatus registration carried out at step S56 of FIG. 49 (step S72), thereby ending the series of linkage processes in which text data is used.

[Processing of the Component Apparatus of the Data Communication System Where a Portable Telephone Terminal and a Digital Still Camera Link to Each Other through Text Data]

[Processing of the Cradle 1]

In the present third example, processes to be executed by the cradle 1 from among the portable telephone terminal 4(1), digital still camera 4(2), cradle 1 and server apparatus 2 which compose the data communication system are similar to those carried out by the cradle 1 in the first example described hereinabove with reference to FIG. 29. Therefore, processes of the cradle 1 in the present third example are described below with reference to FIG. 29.

In particular, also the cradle 1 in the present third example detects placement of a mobile apparatus on the cradle 1 (step S5101) and carries out charging of the mobile apparatus (steps S5102 to S5104). Further, the cradle 1 issues an inquiry about an apparatus ID to the mobile apparatus placed thereon (step S5105) and transfers an apparatus ID response transmitted thereto in response to the inquiry about an apparatus ID to the server apparatus 2 (step S5106).

Thereafter, the cradle 1 carries out relaying of transmission and reception of data between the server apparatus 2 and the mobile apparatus placed on the cradle 1 (step S5107). After the series of relaying processes comes to an end, the cradle 1 carries out end conformation of the charging (steps S5108 and S5109) and ends the charging process (step S5110). Then, the cradle 1 carries out transmission of an end confirmation to the mobile apparatus (step S5111) and a relaying process of the end response from the mobile apparatus to the server apparatus 2 (step S5112), thereby ending the process for linkage of the cradle 1.

[Processing of the Server Apparatus 2]

FIG. 51 illustrates processes carried out by the server apparatus 2 where the portable telephone terminal 4(1) and the digital still camera 4(2) link to each other as described hereinabove with reference to FIGS. 49 and 50 such that text data is produced from still image data obtained by image pickup in the memo mode and retained in the digital still camera 4(2) and is processed such that it can be utilized also on the portable telephone terminal 4(1). The process illustrated in FIG. 51 is executed principally by the control section 21 and the transmission/reception control section 27 when the server apparatus 2 is in a state wherein the power supply thereto is on.

After the power supply is turned on, the transmission/reception control section 27 of the server apparatus 2 determines whether or not an apparatus ID report of a mobile apparatus placed on the cradle 1 from the cradle 1 is received through the input/output terminal 26b and the external interface 26a (step S8201). If it is determined by the decision process at step S8201 that an apparatus ID report is not received as yet, then the process at step S8201 is repeated to wait for reception of an apparatus ID response of the mobile apparatus placed on the cradle 1.

If it is determined by the decision process at step S8201 that an apparatus ID report from the cradle 1 is received, then since the control section 21 recognizes another apparatus ID received already, it determines whether or not a plurality of mobile apparatus are placed on the cradle 1 (step S8202). If it is determined by the decision process at step S8202 that a plurality of mobile apparatus are not placed on the cradle 1, that is, that only one mobile apparatus is placed, then the processes at the steps beginning with step S8201 are repeated.

If it is determined by the decision process at step S8202 that a plurality of mobile apparatus are placed on the cradle 1, then the control section 21 refers to an apparatus linkage table formed in the nonvolatile memory 214 as described hereinabove with reference to FIG. 48 (step S8203). Then, the control section 21 determines whether or not the combination of the two mobile apparatus placed on the cradle 1 is registered as a combination of apparatus to be linked to each other in the apparatus linkage table (step S8204).

If it is determined by the decision process at step S8204 that the combination of the two mobile apparatus placed on the cradle 1 is not registered as a combination of apparatus to be linked to each other in the apparatus linkage table, then since there exists no process for linking the mobile apparatus to each other, the process illustrated in FIG. 51 is ended.

On the other hand, if it is determined by the decision process at step S8204 that the combination of the two mobile apparatus placed on the cradle 1 is registered as a combination of apparatus to be linked to each other in the apparatus linkage table, then the control section 21 specifies a linkage process to be carried out between the mobile apparatus placed on the cradle 1 based on information of the apparatus linkage table referred to. Then, the server apparatus 2 registers the two mobile apparatus as apparatus to be linked to each other into the nonvolatile memory 214 of the server apparatus 2 (step S8205).

In the present second example, since the apparatus 1 is the digital still camera 4(2) and the apparatus 2 is the portable telephone terminal 4(1) as described hereinabove with reference to FIGS. 44 to 50, a "process of converting an image for memo applications of the apparatus 1 into text data and transferring the text data to the apparatus 2" registered in the fourth set of information illustrated in FIG. 48 is specified as a linkage process to be executed. Further, the digital still camera 4(2) as the apparatus 1 and the portable telephone terminal 4(1) as the apparatus 2 are registered as apparatus to be linked to each other into the nonvolatile memory 214.

The processes at the steps beginning with step S8206 in the process illustrated in FIG. 51 correspond to the linkage process specified at step S8205 and are processes according to a program specified by the program ID of the linkage apparatus table illustrated in FIG. 48. In the case of the present example, the control section 21 forms a request for an accumulated data list of still image data obtained by image pickup in the memo mode destined for the digital still camera 4(2). Then, the transmission/reception control section 27 transmits the request for an accumulated data list through the external interface 26a and the input/output terminal 26b (step S8206). This request for an accumulated data list is transmitted to the digital still camera 4(2) through the cradle 1 as described hereinabove.

In response to the request for an accumulated data list, an accumulated data list of still image data obtained by image pickup in the memo mode is transmitted from the digital still camera 4(2) through the cradle 1. Therefore, the transmission/reception control section 27 controls the external interface 26a to receive the accumulated data list of still image data obtained by image pickup in the memo mode from the digital still camera 4(2) and then stores the accumulated data list into a predetermined region of the HDD 30 (step S8207).

Then, the control section 21 detects still image data accumulated newly based on the accumulated data list of still image data obtained by image pickup in the memo mode stored in the HDD 30 (step S8208). In particular, the control section 21 can detect newly accumulated still image data, which have not been processed by the server apparatus 2, by detecting the difference of the accumulated data list of still image data obtained by image pickup in the memo mode stored in the HDD 30 from the accumulated data list which has been provided already to the server apparatus 2.

Then, the control section 21 determines based on a result of the detection at step S8208 whether or not new accumulated data, that is, still image data obtained by image pickup in the memo mode which has not been processed by the server apparatus 2 as yet, exists (step S8209). If it is determined by the decision process at step S8209 that, for example, image pickup in the memo mode has not been carried out at all and still image data obtained by image pickup in the memo mode does not exist, then text data to be supplied to the portable telephone terminal 4(1) does not exist. Therefore, the processing advances to step S8215, at which the linkage apparatus registration carried out for the nonvolatile memory 214 at step S8205 is erased, thereby ending the process of FIG. 51.

On the other hand, if it is determined by the decision process at step S8209 that new accumulated data, that is, still image data obtained by image pickup in the memo mode which has not been processed by the server apparatus 2 as yet, exists, then the control section 21 forms a request for provision of new accumulated data destined for the digital still camera 4(2). Then, the transmission/reception control section 27 transmits the request for provision of new accumulated data through the external interface 26a and the input/output terminal 26b (step S8210). This request for provision of new accumulated data is transmitted to the digital still camera 4(2) through the cradle 1 as described hereinabove.

In response to the request for provision of new accumulated data, new accumulated data, that is, still image data obtained by image pickup in the memo mode, is transmitted from the digital still camera 4(2) through the cradle 1. Consequently, the transmission/reception control section 27 controls the external interface 26a to receive the new accumulated data from the digital still camera 4(2) and store the new accumulated data into a predetermined region of the HDD 30 (step S8211).

Then, the control section 21 of the server apparatus 2 analyzes the still image data obtained by image pickup in the memo mode and stored in the HDD 30 and converts character information or character portions included in the still image data into text data (step S8212). Thereafter, the transmission/reception control section 27 controls the external interface 26a to transmit the text data to be transmitted to the portable telephone terminal 4(1) to the portable telephone terminal 4(1) (step S8213). The text data destined for the portable telephone terminal 4(1) is transmitted to the portable telephone terminal 4(1) through the cradle 1 as described hereinabove.

Thereafter, the control section 21 of the server apparatus 2 enters and remains in a waiting state until it receives an end response from the portable telephone terminal 4(1) and the digital still camera 4(2) which are linkage apparatus (step S8214). Then, when an end response is received from both of the portable telephone terminal 4(1) and the digital still camera 4(2), the control section 21 erases the linkage apparatus registration carried out for the nonvolatile memory 214 at step S205 (step S8215), thereby ending the process of FIG. 51.

[Processing of the Digital Still Camera 4(2)]

Processes which are executed by the digital still camera 4(2) when the portable telephone terminal 4(1) and the digital still camera 4(2) described hereinabove with reference to FIGS. 49 and 50 link to each other such that text data is produced from still image data obtained by image pickup in the memo mode and retained by the digital still camera 4(2) and is processed such that it can be utilized also on the portable telephone terminal 4(1) are same as the processes carried out by the digital still camera 4(2) in the first example described hereinabove with reference to FIG. 31. Therefore, processes of the digital still camera 4(2) in the present third example are described below with reference to FIG. 31.

In particular, also in the digital still camera 4(2) in the present third example, when it is placed into a predetermined mode such as, for example, the charging mode wherein it is placed on the cradle 1 and carries out a data communication process and a charging process, the process illustrated in FIG. 31 is executed principally by the control section 41 and the transmission/reception control section 47 of the digital still camera 4(2).

First, if the mode of the digital still camera 4(2) is changed over to the predetermined mode, then the transmission/reception control section 47 places itself into a waiting state wherein it waits for an inquiry about an apparatus ID from the cradle 1 through the transmission/reception antenna 45b and the radio communication section 45a (step S5301).

If it is determined by the decision process at step S5301 that the digital still camera 4(2) receives an inquiry about an apparatus ID from the cradle 1, then the control section 41 acquires necessary information such as an apparatus ID and an apparatus attribute stored and retained, for example, in the ROM 412 of the digital still camera 4(2). Then, the control section 41 forms such an apparatus ID response as illustrated in FIG. 7C based on the necessary information and transmits the apparatus ID response through the radio communication section 45a and the transmission/reception antenna 45b (step S5302). This apparatus ID response is transmitted to the server apparatus 2 through the cradle 1.

Then, the transmission/reception control section 47 receives a request for an accumulated data list of still image data obtained by image pickup in the memo mode from the server apparatus 2 transmitted through the cradle 1 through the transmission/reception antenna 45b and the radio communication section 45a (step S5303). Then, when a request for an accumulated data list is received, the control section 41 forms an accumulated data list of still image data obtained by image pickup in the memo mode destined for the server apparatus 2. Then, the transmission/reception control section 47 controls the radio communication section 45a to transmit the accumulated data list (step S5304). Also this accumulated data list is transmitted to the server apparatus 2 through the cradle 1.

Then, the transmission/reception control section 47 receives the request for new accumulated data from the server apparatus 2 transmitted through the cradle 1 through the transmission/reception antenna 45b and the radio communication section 45a (step S5305). Then, when the request for new accumulated data is received, the control section 41 reads out the requested new accumulated data, that is, those of the still image data obtained by image pickup in the memo mode which have not been transmitted to the server apparatus 2 as yet, from the image storage section 44. Then, the transmission/reception control section 47 controls the radio communication section 45a to transmit the still image data (step S5306). Also this new accumulated data is transmitted to the server apparatus 2 through the cradle 1.

Thereafter, the transmission/reception control section 47 receives an end confirmation transmitted from the cradle 1 through the transmission/reception antenna 45b and the radio communication section 45a (step S5307). Then, if an end confirmation is received, then the transmission/reception control section 47 places itself into and remains in a waiting state until the linkage process ends (step S5308). Then, if the series of linkage processes ends, then the control section 41 forms an end response, and the transmission/reception control section 47 controls the radio communication section 45a to transmit the end response (step S5309), thereby ending the process of FIG. 31.

In this manner, in the present third example, the digital still camera 4(2) carries out a process of providing still image data obtained by image pickup in the memo mode to the server apparatus 2 in accordance with a request from the server apparatus 2.

[Processing of the Portable Telephone Terminal 4(1)]

Figure 52:
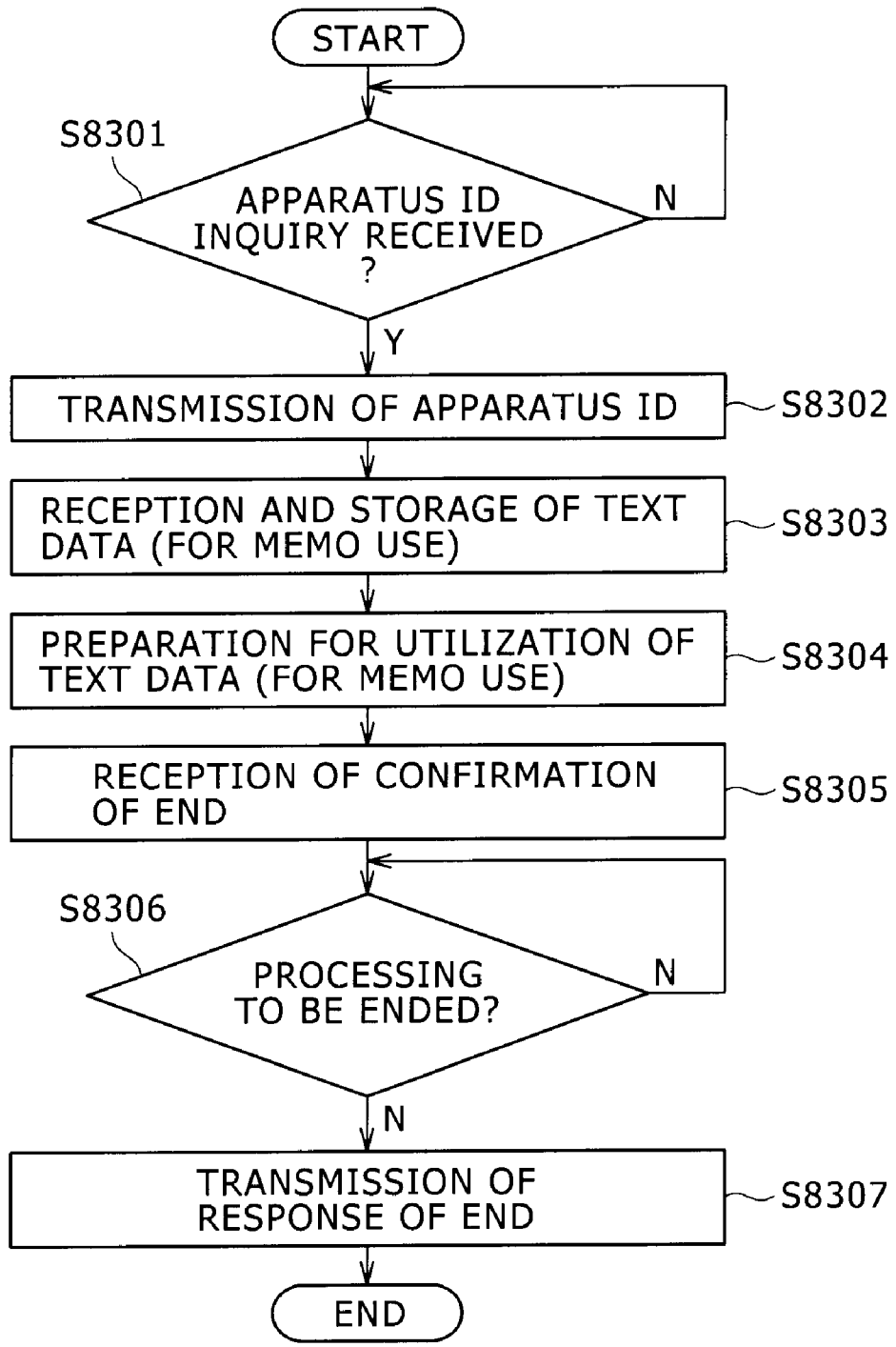
FIG. 52 is a flow chart illustrating a process carried out by the portable telephone terminal used in the third example of the second embodiment.

FIG. 52 illustrates processes carried out by the portable telephone terminal 4(1) where the portable telephone terminal 4(1) and the digital still camera 4(2) link to each other as described hereinabove with reference to FIGS. 49 and 50 such that text data is produced from still image data obtained by image pickup in the memo mode and retained in the digital still camera 4(2) and is processed such that it can be utilized also on the portable telephone terminal 4(1).

The process illustrated in FIG. 52 is executed principally by the control section 61 of the portable telephone terminal 4(1) as a mobile apparatus when it is placed into a predetermined mode such as, for example, the charging mode in which it is placed on the cradle 1 and carries out a data communication process and a charging process.

First, if the mode of the portable telephone terminal 4(1) is changed over to the predetermined mode, then the control section 61 determines whether or not an inquiry about an apparatus ID from the cradle 1 is received through the transmission/reception antenna 66b and the radio communication section 66a (step S8301). If it is determined by the decision process at step S8301 that an inquiry about an apparatus ID is not received, then the process at step S8301 is repeated to wait for reception of an inquiry about an apparatus ID.

On the other hand, if it is determined by the decision process at step S8301 that an inquiry about an apparatus ID from the cradle 1 is received, then the control section 41 acquires necessary information such as an apparatus ID and an apparatus attribute stored and retained, for example, in the ROM 612 of the portable telephone terminal 4(1). Then, the control section 41 forms such an apparatus ID response as illustrated in FIG. 7C based on the necessary information, and the control section 61 transmits the apparatus ID response through the radio communication section 66a and the transmission/reception antenna 66b (step S8302). This apparatus ID response is transmitted to the server apparatus 2 through the cradle 1.

Then, the control section 61 receives text data from the server apparatus 2 transmitted through the cradle 1 through the transmission/reception antenna 66b and the radio communication section 66a and stores the text data into the content storage section 62 (step S8303). Then, the control section 61 reads out the text data stored in the content storage section 62 and carries out preparations such as to change the format of the data such that the data can be utilized (step S8304).

Thereafter, the control section 61 receives an end confirmation transmitted from the cradle 1 through the transmission/reception antenna 66b and the radio communication section 66a (step S8305). After the end confirmation is received, the control section 61 places itself into and remains in a waiting state until the linkage process ends (step S8306). If the series of linkage processes ends, then the control section 61 forms an end response and controls the radio communication section 45a to transmit the end response (step S8307), thereby ending the process of FIG. 52.

In this manner, in the case of the present third example, the portable telephone terminal 4(1) and the digital still camera 4(2) which can pick up a still image for memo applications link to each other, and still image data obtained by image pickup in the memo mode by the digital still camera 4(2) is provided to the server apparatus 2. Then, the server apparatus 2 converts character information portions included in the still image data into text data and provides the text data to the portable telephone terminal 4(1) automatically such that the portable telephone terminal 4(1) can utilize the text data.

[(4) Linkage Which Uses Image Data and Association Information between an Image Pickup Apparatus and a Portable Telephone Terminal]

Figure 53:
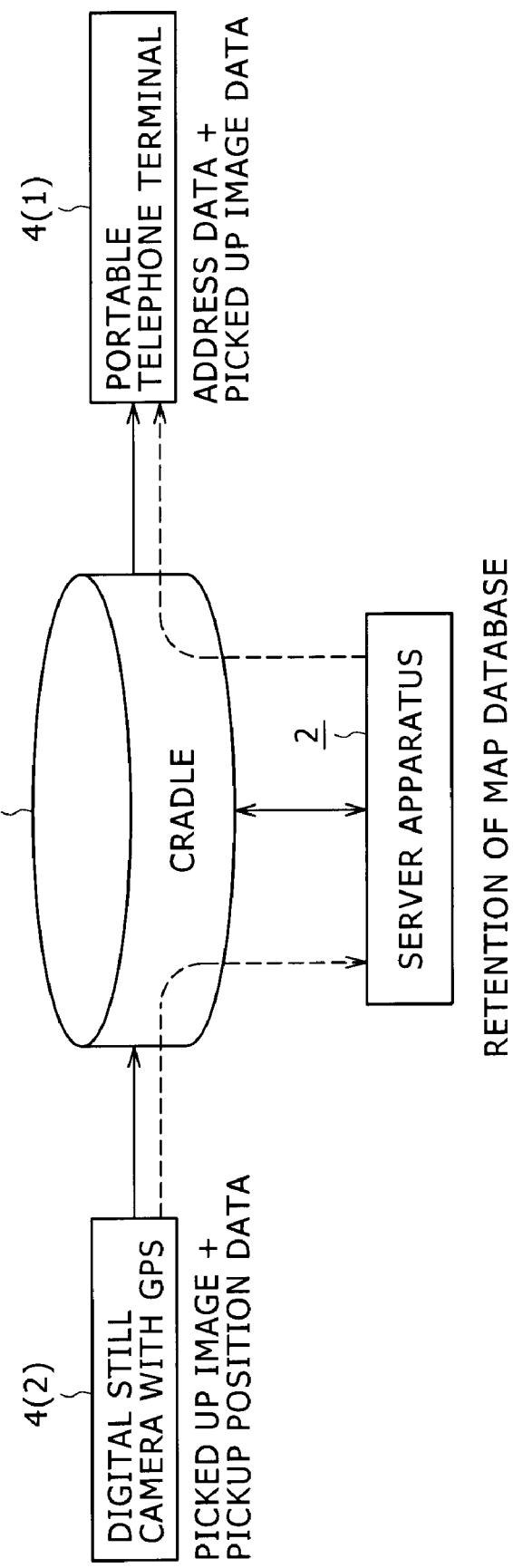
FIG. 53 is a schematic view showing a general configuration of a data communication system according to a fourth example of the second embodiment of the present invention.

FIG. 53 illustrates an outline of linkage of a fourth example which uses image data and association information which is image pickup position data between an image pickup apparatus and a portable telephone terminal. Also in the example of the fourth example, it is assumed that, for example, the portable telephone terminal 4(1) and the digital still camera 4(2) are placed on the cradle 1 as seen in FIG. 44.

Then, also in the present fourth example, what is significant is that the portable telephone terminal 4(1) and the digital still camera 4(2) are placed on the cradle 1, but the timings of the placement of them may be different from each other. For example, where the portable telephone terminal 4(1) is placed first on the cradle 1, the digital still camera 4(2) may be placed on the cradle 1 after lapse of several hours. On the contrary, where the digital still camera 4(2) is placed first on the cradle 1, the portable telephone terminal 4(1) may be placed later. The point is that the portable telephone terminal 4(1) and the digital still camera 4(2) are in a situation wherein both of them are placed on the cradle 1.

In recent years, the Global Positioning System (GPS) has become to be used popularly. According to the GPS, the position of a measuring person at present can be measured accurately by receiving a plurality of radio waves transmitted from different artificial satellites. The GPS is used in a car navigation system and so forth, and reduction in size and weight of GPS apparatus is advancing such that it can be incorporated also in portable electronic apparatus such as a portable telephone terminal or a digital still camera. Thus, the digital still camera 4(2) used in the fourth example incorporates the GPS function and can measure the position of the image pickup point at present and add image pickup position data to still image data obtained by image pickup as hereinafter described in detail.

Therefore, in the present fourth example, when the portable telephone terminal 4(1) and the digital still camera 4(2) are placed on the cradle 1, still image data stored and retained in the digital still camera 4(2) and having image pickup position data added thereto is fetched into the server apparatus 2 as seen in FIG. 53. The server apparatus 2 includes a map database as hereinafter described and refers to the map database based on image pickup position data added to the still image data to form address data including the name and the address of a shop or a company existing at the position. Then, the server apparatus 2 adds the formed address data to the still image data and transfers resulting data to the portable telephone terminal 4(1).

This reinforces the functional linkage between the portable telephone terminal 4(1) and the digital still camera 4(2). Consequently, the portable telephone terminal 4(1) which does not include map information can utilize still image data from the digital still camera 4(2) and information relating to a location of an image formed from the still image data based on image pickup position data added to the still image data from the digital still camera 4(2).

[Example of a Configuration of the Digital Still Camera 4(2) which has a GPS Function and is a Mobile Apparatus]

Figure 54:
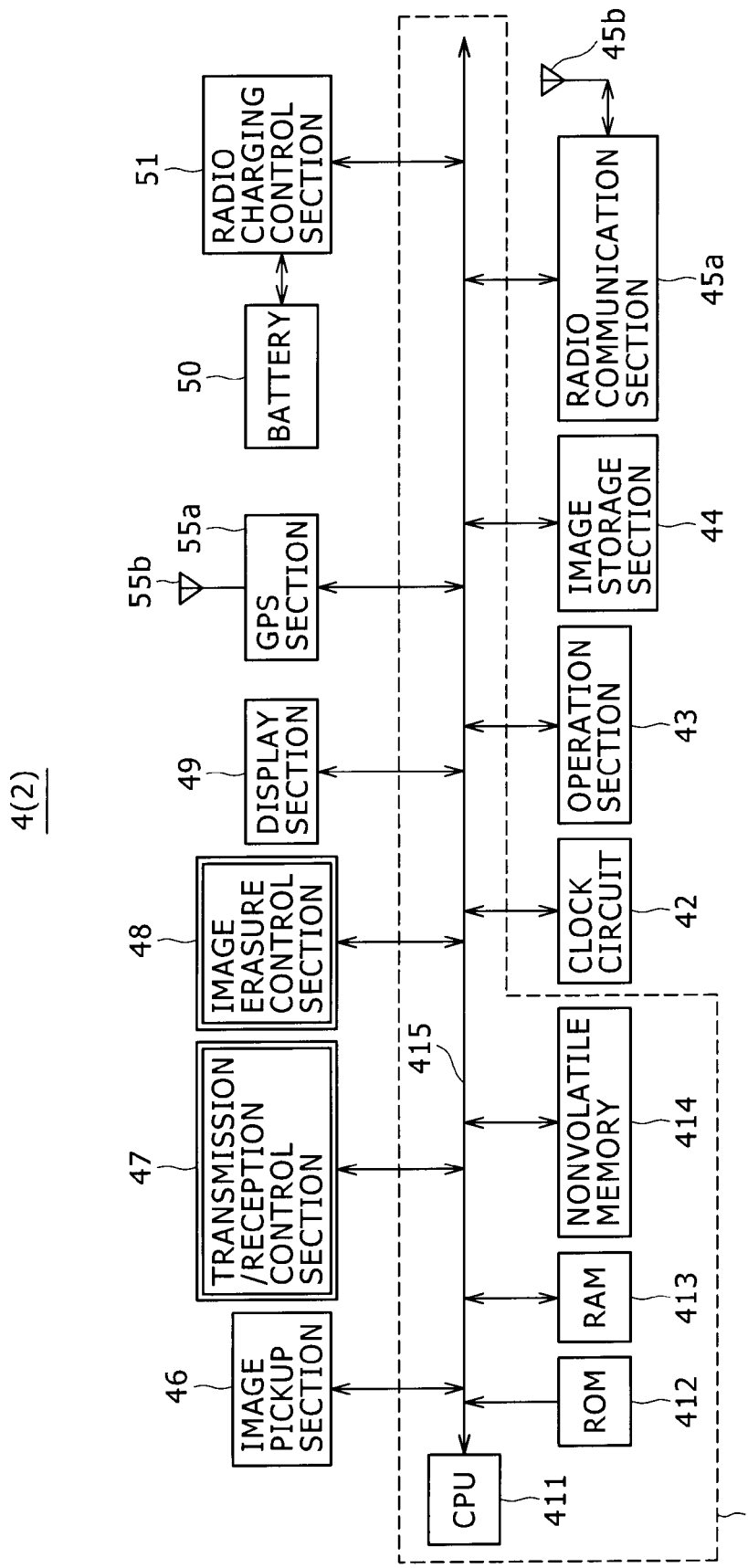
FIG. 54 is a block diagram showing an example of a configuration of the digital still camera used in the data communication system of the fourth example of the second embodiment.

FIG. 54 shows an example of a configuration of the digital still camera 4(2) with a GPS function which is one of mobile apparatus used in the data communication system of the fourth example according to the second embodiment. Referring to FIG. 54, the digital still camera 4(2) shown is configured similarly to the digital still camera as a mobile apparatus shown in FIG. 4 except that it additionally includes a GPS section 55a and a GPS reception antenna 55b.

Therefore, in the digital still camera 4(2) shown in FIG. 54, like components to those of the digital camera as a mobile apparatus shown in FIG. 4 are denoted by like reference characters, and overlapping description of them is omitted herein to avoid redundancy.

In the digital still camera 4(2) used in the present fourth example, for example, upon image pickup, signals from artificial satellites which can be received through the GPS reception antenna 55b are analyzed by the GPS section 55a to obtain present position data, which is supplied to the control section 41. The control section 41 can thus add the image pickup position data to still image data obtained by image pickup.

Accordingly, the image pickup position can be specified based on the image pickup position data added to the still image data obtained by image pickup by the digital still camera 4(2) used in the present fourth example.

[Example of a Configuration of the Server Apparatus 2 Which can Utilize Map Information]

Figure 55:
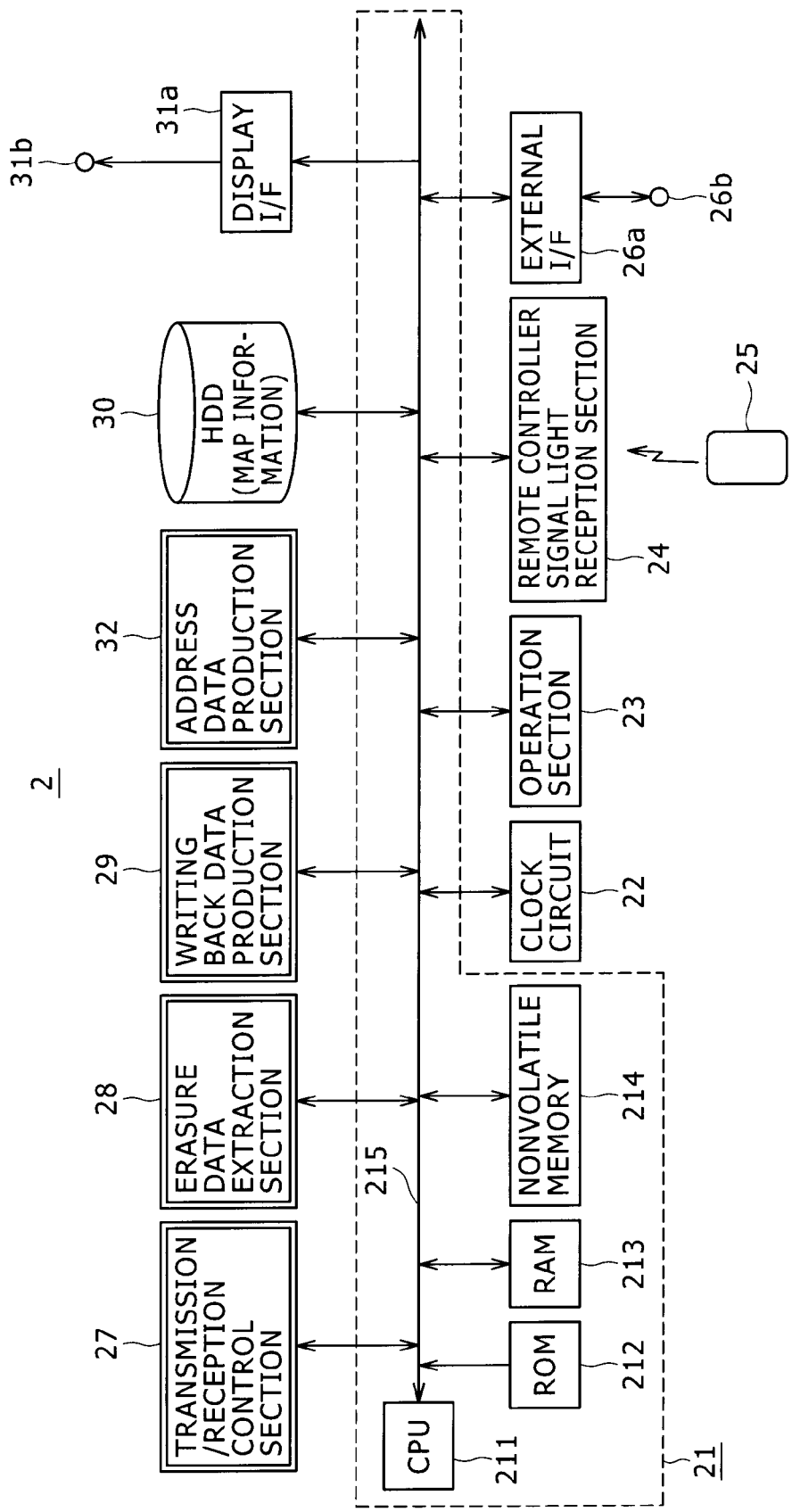
FIG. 55 is a block diagram showing an example of a configuration of the server apparatus used in the data communication system of the fourth example of the second embodiment.

FIG. 55 shows an example of a configuration of the server apparatus 2 which can utilize map information used in the data communication system of the fourth example according to the second embodiment. Referring to FIG. 55, the server apparatus 2 is configured similarly to the server apparatus 2 described hereinabove with reference to FIG. 3 except that it includes an address data production section 32 and map information is accumulated in the HDD 30.

Therefore, in the server apparatus 2 shown in FIG. 55, like components to those of the server apparatus 2 shown in FIG. 3 are denoted by like reference characters, and overlapping description of them is omitted herein to avoid redundancy.

In the server apparatus 2 used in the present fourth example, detailed map information is stored and retained in the HDD 30. This detailed map information includes information of position data including the longitude and the latitude, address data, name data such as a shop name or a company name and so forth associated with each other. If the server apparatus 2 used in the present fourth example receives supply of still image data having image pickup position data added thereto from the digital still camera 4(2) having the GPS function described above, then the server apparatus 2 can use the function of the address data production section 32 to refer to the map information of the HDD 30 based on the image pickup position data added to the still image data to produce address data including the name of a shop, a company or the like existing at a position specified by the image pickup position data and the address of the shop or the company. Then, the server apparatus 2 can add the produced address data to the still image data.

Consequently, as hereinafter described, also the portable telephone terminal 4(1) having no detailed map information can clearly recognize the still image data obtained by image pickup by the digital still camera 4(2) and the name and the address of a shop, a company or the like indicated by an image formed from the still image data.

In the following description, it is assumed that the portable telephone terminal 4(1) having the configuration described hereinabove with reference to FIG. 25 and the digital still camera 4(2) having the configuration described hereinabove with reference to FIG. 54 as mobile apparatus are placed on the cradle 1 having the configuration described hereinabove with reference to FIG. 2 and the server apparatus 2 having the configuration described hereinabove with reference to FIG. 55 is connected to the cradle 1 through the interface cable 3 as seen in FIG. 53.

[Example of a Layout of Still Image Data Formed in the Digital Still Camera 4(2)]

FIG. 56 illustrates an example of a layout of still image data as accumulated data stored and retained in the image storage section 44 of the digital still camera 4(2) having the configuration described hereinabove with reference to FIG. 54 and used in the data communication system of the present example.

The still image data as accumulated data is acquired by image pickup by the digital still camera 4(2). The still image data as accumulated data obtained by pickup of an image by the digital still camera 4(2) and stored and retained in the image storage section 44 has header information added thereto as seen in FIG. 56.

Referring to FIG. 56, the header information includes an apparatus ID, a data ID, a data attribute, a production date and time, protect, a print mark, a data size, the number of times of use, position data and other information. The apparatus ID, data ID, data attribute, production date and time, protect, print mark, data size and the number of times of use individually have the same substances as those of the information described hereinabove in connection with the layout of accumulated data in the form of image data described hereinabove with reference to FIG. 9.

The position data is used in the present fourth example. As described hereinabove, the digital still camera 4(2) in the present fourth example has a GPS function. Upon image pickup, the digital still camera 4(2) acquires image pickup position data using the GPS function and stores the image pickup position data into the position data column provided in the header of the layout example illustrated in FIG. 56. Consequently, from still image data to which the information is added, it can be recognized at which position image pickup was carried out to the still image data.

[Example of a Layout of Still Image Data Accumulated in a Portable Telephone Terminal]

FIG. 57 illustrates an example of a layout of still image data as accumulated data stored and retained in the content storage section 62 of the portable telephone terminal 4(1) which has the configuration described hereinabove with reference to FIG. 25 and to which the still image data is supplied from the server apparatus 2.

Referring to FIG. 57, still image data accumulated in the content storage section 62 has header information added thereto. The header information includes an apparatus ID, a data ID, a data attribute, a production date and time, protect, a print mark, a data size, a name, an address and other information.

The apparatus ID, data ID, data attribute, production date and time, protect, print mark and data size are similar to the information described hereinabove in connection with the layout of accumulated data in the form of image data described hereinabove with reference to FIG. 9. Further, the name and the address are used in the present forth example.

In particular, the name and the address added as header information of still image data illustrated in FIG. 57 are added through reference to the detailed map information by the server apparatus 2 based on image pickup data, that is, the position data of FIG. 55, added to still image data obtained by image pickup by the digital still camera 4(2).

[Example of a Configuration of an Apparatus Linkage Table]

Also in the present fourth example, linkage of different mobile apparatus can be implemented by control of the server apparatus 2 in accordance with information of an apparatus linkage table produced, for example, in the nonvolatile memory 214 of the server apparatus 2. The apparatus linkage table used in this instance is similar to that described hereinabove with reference to FIG. 48.

Referring to FIG. 48, the first and second sets of registration information are used in the first example described hereinabove and the third set of registration information is used in the second example while the fourth set of registration information is used in the third example. Further, the fifth set of registration information in FIG. 48 is used in the present fourth example.

In particular, in the fifth set of registration information of the apparatus linkage table shown in FIG. 48, the apparatus 1 is a "digital still camera with a GPS function"; the apparatus 2 is a "portable telephone terminal"; and the substance of the linkage process is "to form, from a picked up image of the digital still camera with a GPS function as the apparatus 1+image pickup position data, a picked up image to which address data is added and transfer the picked up image to the portable telephone terminal as the apparatus 2". Further, the program ID of a program executed by the server apparatus 2 in order to carry out the linkage process described is "PG5".

Then, in the present fourth example, if the server apparatus 2 detects that the portable telephone terminal 4(1) and the digital still camera 4(2) are placed on the cradle 1 as described hereinabove with reference to FIG. 53, then the server apparatus 2 carries out a linkage process between the mobile apparatus in which also image pickup position data added to still image data is taken into consideration in accordance with the fifth set of registration information of the apparatus linkage data shown in FIG. 48 in the data communication system.

[Operation of the System where Linkage Wherein Still Image Data and Image Pickup Position Data are Used]

Figure 58:
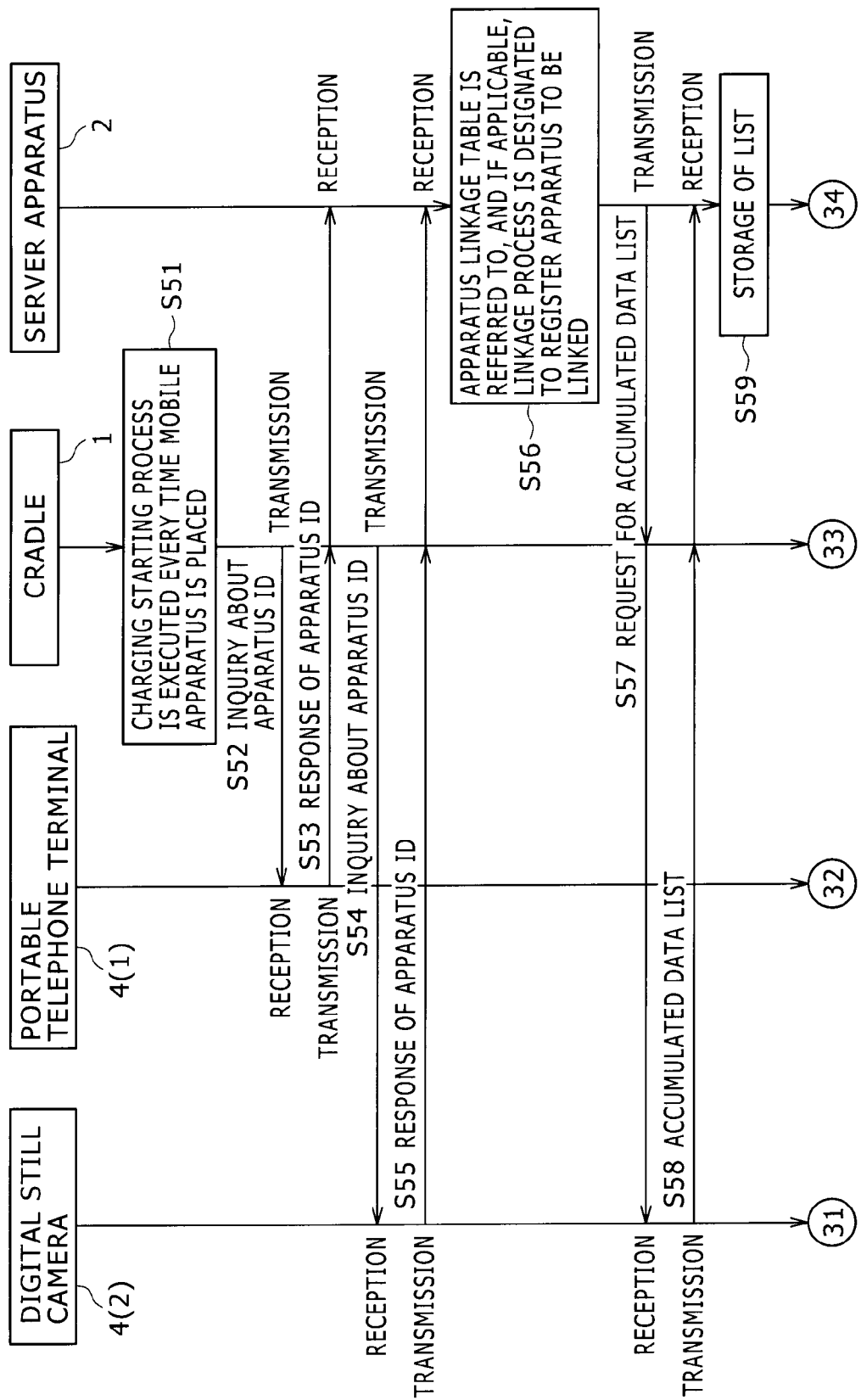
FIGS. 58 and 59 are timing charts illustrating operation of the data communication system of the fourth example of the second embodiment.
Figure 59:
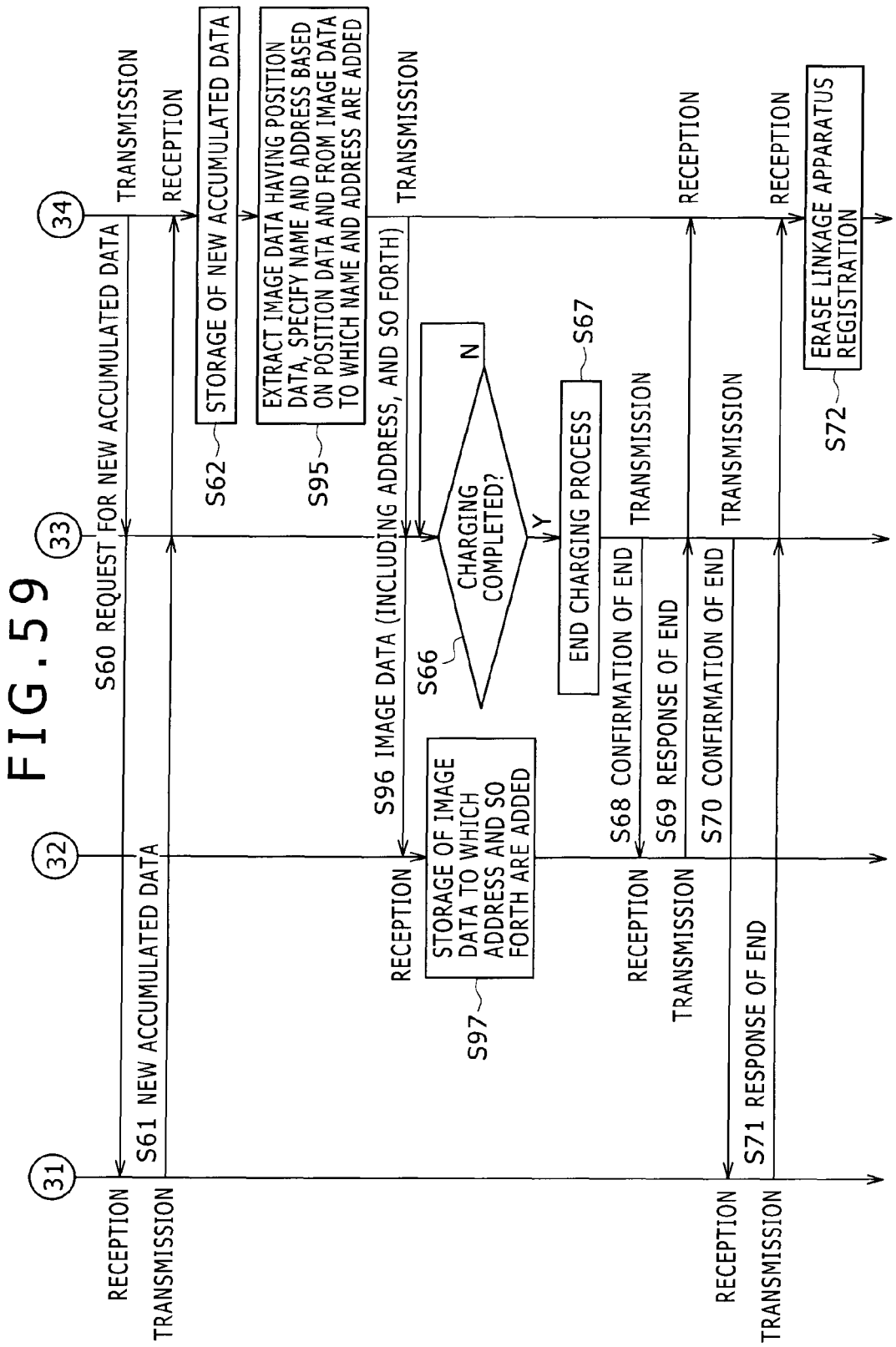

Now, operation of the data communication system in the present fourth example wherein the portable telephone terminal 4(1) and the digital still camera 4(2) are used as mobile apparatus and linkage wherein still image data and image pickup position data are used is carried out between the mobile apparatus is described. FIGS. 58 and 59 illustrate operation of the data communication system of the present fourth example wherein linkage wherein still image data and image pickup position data are used can be carried out between mobile apparatus.

Also in the present fourth example, information is transmitted and received between different mobile apparatus through the cradle 1 and the server apparatus 2 similarly as in the case described hereinabove with reference to FIGS. 27 and 28. Therefore, in order to simplify the description, like items carried out similarly to those described hereinabove with reference to FIGS. 27 and 28 are denoted by like reference characters in FIGS. 58 and 59, and since detailed description of the items is same as that given hereinabove with reference to FIGS. 27 and 28, it is omitted herein to avoid redundancy.

It is to be noted that, although the timings at which the portable telephone terminal 4(1) and the digital still camera 4(2) are placed on the cradle 1 do not particularly matter as described hereinabove, in order to simplify the description, it is assumed that the portable telephone terminal 4(1) is placed first on the cradle 1 and then the digital still camera 4(2) is placed on the cradle 1.

Further, it is assumed that, in the present fourth example, accumulated data of the layout described hereinabove with reference to FIG. 55 formed by adding image pickup position data or position data acquired through the GPS section 55a upon image pickup by the digital still camera 4(2) to still image pickup data obtained by the image pickup are stored in the image storage section 44 of the digital still camera 4(2).

In the present fourth example, processes at steps S51 to S59 illustrated in FIG. 58 and processes at steps S60 to S62 illustrated in FIG. 59 are carried out similarly as in the case of the first example described hereinabove with reference to FIGS. 27 and 28. In particular, the cradle 1 executes a process of carrying out charging, that is, a charging starting process, when it detects that a mobile apparatus is placed on the cradle 1 (step S51). Then, the cradle 1 carries out inquiry about an apparatus ID to the mobile apparatus placed thereon (steps S52 and S54).

An apparatus ID response is transmitted back from the mobile apparatus after it receives the inquiry about an apparatus ID (steps S53 and S55). The cradle 1 receives and transmits the apparatus ID response to the server apparatus 2. Consequently, the server apparatus 2 can recognize based on the apparatus ID response or apparatus ID report transmitted thereto through the cradle 1 what the mobile apparatus placed on the cradle 1 is.

Then, if a plurality of mobile apparatus are placed on the cradle 1 based on the apparatus ID response from each of the mobile apparatus placed on the cradle 1, then the server apparatus 2 refers to the apparatus linkage table produced in the EEPROM 214 of the server apparatus 2 to specify a linkage process of the apparatus to be carried out and registers the apparatus to be linked to each other (step S56).

In the present fourth example, since the portable telephone terminal 4(1) and the digital still camera 4(2) are placed on the cradle 1, the fifth set of registration information of the apparatus linkage table illustrated in FIG. 48 coincides with the combination of mobile apparatus.

Accordingly, in the present fourth example, since the digital still camera 4(2) with a GPS function is the apparatus 1 and the portable telephone terminal 4(1) is the apparatus 2, a process of forming a picked up image or still image data to which address data is added from a picked up image or still image data of the digital still camera 4(2) of the apparatus 1 and image pickup position data and transferring the formed picked up image or still image data is specified as the substance of a linkage process to be executed at step S56 of FIG. 49. Further, the digital still camera 4(2) with a GPS function is registered as the apparatus 1 and the portable telephone terminal 4(1) is registered as the apparatus 2 in an associated relationship into the nonvolatile memory 214 of the server apparatus 2.

In the present fourth example, since the providing source of a picked up image which is still image data for memo applications, that is, the apparatus 1 is the digital still camera 4(2), the server apparatus 2 forms a request for an accumulated data list for requesting provision of an accumulated data list of still image data obtained by image pickup and transmits the request for an accumulated data list to the digital still camera 4(2) (step S57).

The digital still camera 4(2) receives the request for an accumulated data list of still image data obtained by image pickup from the server apparatus 2 transmitted through the cradle 1. In response to the request for an accumulated data list, the digital still camera 4(2) transmits the accumulated data list of still image data obtained by image pickup and stored and retained in the image storage section 44 to the server apparatus 2 through the radio communication section 45*a* and the transmission/reception antenna 45*b* (step S58).

In the present fourth example, since the accumulated data list of still image data obtained by image pickup is formed in accordance with the layout described hereinabove with reference to FIG. 8 based on the header information of accumulated data, that is, still image data, described hereinabove with reference to FIG. 56.

The server apparatus 2 receives the accumulated data list from the digital still camera 4(2) transmitted through the cradle 1 and stores the accumulated data list into a predetermined region of the HDD 30 of the server apparatus 2 (step S59). Thereafter, the processing advances to the process illustrated in FIG. 59.

Referring to FIG. 59, in the present fourth example, the server apparatus 2 specifies still image data obtained by image pickup, which have not been provided as yet, from the difference between the accumulated data list of still image data obtained by image pickup in the memo mode and stored in the HDD 30 of the server apparatus 2 and the accumulated data list of still image data obtained by image pickup in the memo mode which have been provided and stored and retained already. Then, the server apparatus 2 forms a request for new accumulated data for requesting provision of new accumulated data for the digital still camera 4(2) and transmits the request for new accumulated data to the digital still camera 4(2) through the cradle 1 (step S60).

The digital still camera 4(2) receives the request for new accumulated data from the server apparatus 2 transmitted through the cradle 1, that is, the request for new accumulated data of still image data obtained by image pickup. Then, in response to the request for new accumulated data, the digital still camera 4(2) extracts those of the still image data obtained by image pickup which have not been transmitted to the server apparatus 2 as yet from the image storage section 44 of the digital still camera 4(2), and transmits the extracted still image data to the server apparatus 2 (step S61). Here, the accumulated data provided from the digital still camera 4(2) to the server apparatus 2 is still image data obtained by image pickup and having the configuration described hereinabove with reference to FIG. 56.

The server apparatus 2 receives the accumulated data from the digital still camera 4(2) transmitted through the cradle 1, that is, the still image data obtained by image pickup, and stores the accumulated data into a predetermined region of the HDD 30 of the server apparatus 2 (step S62).

Then, in the present fourth example, the control section 21 of the server apparatus 2 controls the address data production section 32 to refer to the detailed map information stored in the HDD 30 based on the position data or image pickup position data added to the still image data obtained by image pickup and stored into the HDD 30 at step S62 to specify the name and the address. The control section 21 further controls the address data production section 32 to form still image data to which the name and the address are added, that is, still picture data of the layout described hereinabove with reference to FIG. 57 (step S95).

Thereafter, the still image data formed at step S95 and having the information of the address and so forth added thereto is outputted through the external interface 26*a* and the input/output terminal 26*b* (step S96). The text data destined for the portable telephone terminal 4(1) is received through the input/output terminal 14*b* and the external interface 14*a* of the cradle 1 and transmitted to the portable telephone terminal 4(1) through the radio communication section 15*a* and the transmission/reception antenna 15*b*.

The portable telephone terminal 4(1) receives the still image data having the address and so forth added thereto from the server apparatus 2 transmitted through the cradle 1 through the transmission/reception antenna 66*b* and the radio communication section 66*a*. Then, the portable telephone terminal 4(1) records the received still image data into the content storage section 62 thereof such that the still image data can be utilized also on the portable telephone terminal 4(1) (step S97).

Thereafter, processes similar to those at steps S66 to S72 described hereinabove with reference to FIG. 28 in the first example are carried out. In particular, the cradle 1 ends the charging process when the charging of the mobile apparatus placed on the cradle 1 is completed (steps S66 and S67) and then carries out end confirmation of the linkage process for the mobile apparatus (steps S68 and S70).

The mobile apparatus receives the end confirmation and conforms that the process to be executed on the mobile apparatus ends and then transmits an end response (step S69 and S71). Therefore, the cradle 1 receives and transmits the end response to the server apparatus 2. Thus, when the server apparatus 2 receives the end response from the two mobile apparatus to be linked to each other, the server apparatus 2 can determine that the linkage process ends, and erases the linkage apparatus registration carried out at step S56 of FIG. 58, thereby ending the series of linkage process wherein text data is used.

[Processing of the Component Apparatus of the Data Communication System where a Portable Telephone Terminal and a Digital Still Camera Link to Each Other Through Still Image Data and Image Pickup Position Data]

[Processing of the Cradle 1]

Also in the preset fourth example, similar to the third example, processes to be executed by the cradle 1 from among the portable telephone terminal 4(1), digital still camera 4(2), cradle 1 and server apparatus 2 which compose the data communication system are similar to those carried out by the cradle 1 in the first example described hereinabove with reference to FIG. 29. Therefore, processes of the cradle 1 in the present fourth example are described below with reference to FIG. 29.

In particular, also the cradle 1 in the present fourth example detects placement of a mobile apparatus on the cradle 1 (step S5101) and carries out charging (steps S5102 to 5104). Then, the cradle 1 issues an inquiry about an apparatus ID to the mobile apparatus placed on the cradle 1 (step S5105) and transfers an apparatus ID response transmitted thereto in response to the inquiry about an apparatus ID to the server apparatus 2 (step S5106).

Thereafter, the cradle 1 carries out relaying of transmission and reception of data between the server apparatus 2 and the mobile apparatus placed on the cradle 1 (step S5107). Then, after the series of relaying processes comes to an end, the cradle 1 carries out end confirmation of the charging (steps S5108 and S5109) and ends the charging process (step S5110). Thereafter, the cradle 1 carries out transmission of an end confirmation to the mobile apparatus (step S5111) and a relaying process of an end response from the mobile apparatus to the server apparatus 2 (step S5112), thereby ending the process for linkage by the cradle 1.

[Processing of the Server Apparatus 2]

Figure 60:
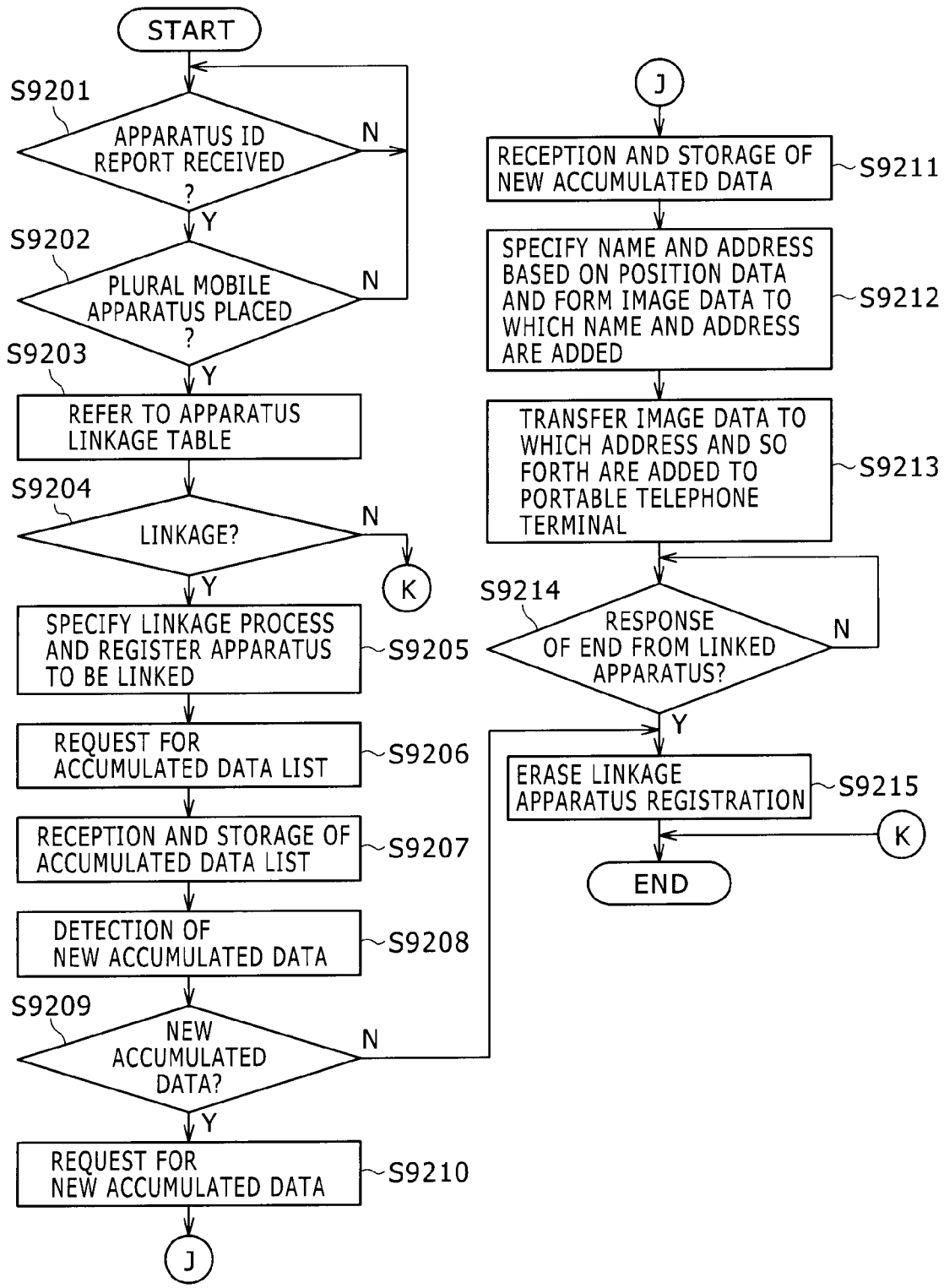
FIG. 60 is a flow chart illustrating a process carried out by the server apparatus used in the fourth example of the second embodiment.

FIG. 60 illustrates processes executed by the server apparatus 2 where the portable telephone terminal 4(1) and the digital still camera 4(2) described hereinabove with reference to FIGS. 58 and 59 link to each other such that, from still image data obtained by image pickup and retained in the digital still camera 4(2) and image pickup position data added to the still image data, image data to which the name and the address of a shop, a company or the like existing at the image pickup position are added is formed such that it can be utilized also on the portable telephone terminal 4(1). The process illustrated in FIG. 60 is executed principally by the control section 21 and the transmission/reception control section 27 when the server apparatus 2 is in a state wherein the power supply thereto is on.

After the power supply is turned on, the transmission/reception control section 27 of the server apparatus 2 determines whether or not an apparatus ID report of a mobile apparatus placed on the cradle 1 from the cradle 1 is received through the input/output terminal 26b and the external interface 26a (step S9201). If it is determined by the decision process at step S9201 that an apparatus ID report is not received as yet, then the process at step S9201 is repeated to wait for reception of an apparatus ID response of the mobile apparatus placed on the cradle 1.

On the other hand, if it is determined by the decision process at step S9201 that an apparatus ID report from the cradle 1 is received, then since the control section 21 recognizes another apparatus ID received already, it determines whether or not a plurality of mobile apparatus are placed on the cradle 1 (step S9202). If it is determined by the decision process at step S9202 that a plurality of mobile apparatus are not placed on the cradle 1, that is, that only one mobile apparatus is placed, then the processes at the steps beginning with step S9201 are repeated.

On the other hand, if it is determined by the decision process at step S9202 that a plurality of mobile apparatus are placed on the cradle 1, then the control section 21 refers to an apparatus linkage table formed in the nonvolatile memory 214 as described hereinabove with reference to FIG. 48 (step S9203). Then, the control section 21 determines whether or not the combination of the two mobile apparatus placed on the cradle 1 is registered as a combination of apparatus to be linked to each other in the apparatus linkage table (step S9204).

If it is determined by the decision process at step S9204 that the combination of the two mobile apparatus placed on the cradle 1 is not registered as a combination of apparatus to be linked to each other in the apparatus linkage table, then since there exists no process for linking the mobile apparatus to each other, the process illustrated in FIG. 60 is ended.

On the other hand, if it is determined by the decision process at step S9204 that the combination of the two mobile apparatus placed on the cradle 1 is registered as a combination of apparatus to be linked to each other in the apparatus linkage table, then the control section 21 specifies a linkage process to be carried out between the mobile apparatus placed on the cradle 1 based on the information of the apparatus linkage table referred to. Then, the server apparatus 2 registers the two mobile apparatus as apparatus to be linked to each other into the nonvolatile memory 214 of the server apparatus 2 (step S9205).

In the present fourth example, since the apparatus 1 is the digital still camera 4(2) and the apparatus 2 is the portable telephone terminal 4(1) as described hereinabove with reference to FIGS. 53 to 59, a "process of forming, from a picked up image of the digital still camera with a GPS function as the apparatus 1+image pickup position data, a picked up image to which address data is added and transfer the picked up image to the portable telephone terminal as the apparatus 2" registered as the fifth set of information illustrated in FIG. 48 is specified as a linkage process to be executed. Further, the digital still camera 4(2) with a GPS function as the apparatus 1 and the portable telephone terminal 4(1) as the apparatus 2 are registered as apparatus to be linked to each other into the nonvolatile memory 214.

The processes at the steps beginning with step S9206 in the process illustrated in FIG. 51 correspond to the linkage process specified at step S9205 and are processes according to a program specified by the program ID of the linkage apparatus illustrated in FIG. 48. In the case of the present example, the control section 21 forms a request for an accumulated data list of still image data obtained by image pickup destined for the digital still camera 4(2). Then, the transmission/reception control section 27 transmits the request for an accumulated data list through the external interface 26a and the input/output terminal 26b (step S9206). This request for an accumulated data list is transmitted to the digital still camera 4(2) through the cradle 1 as described hereinabove.

In response to the request for an accumulated data list, an accumulated data list of still image data obtained by image pickup is transmitted from the digital still camera 4(2) through the cradle 1. Therefore, the transmission/reception control section 27 controls the external interface 26a to receive the accumulated data list from the digital still camera 4(2) and then stores the accumulated data list into a predetermined region of the HDD 30 (step S9207).

Then, the control section 21 detects still image data accumulated newly based on the accumulated data list stored in the HDD 30 (step S9208). In particular, the control section 21 can detect newly accumulated still image data, which have not been processed by the server apparatus 2, by detecting the difference of the accumulated data list stored in the HDD 30 from the accumulated data list which has been proved already to the server apparatus 2.

Then, the control section 21 determines based on a result of the detection at step S9208 whether or not new accumulated data, that is, still image data which has not been processed by the server apparatus 2 as yet, exists (step S9209). If it is determined by the decision process at step S9209 that, for example, image pickup in the memo mode has not been carried out at all and still image data obtained by image pickup does not exist, then still image data to be supplied to the portable telephone terminal 4(1) does not exist. Therefore, the processing advances to step S9215, at which the linkage apparatus registration carried out for the nonvolatile memory 214 at step S9205 is erased (step S9215), thereby ending the process of FIG. 60.

On the other hand, if it is determined by the decision process at step S9209 that new accumulated data, that is, still image data obtained by image pickup which has not been processed by the server apparatus 2 as yet, exists, then the control section 21 of the server apparatus 2 forms a request for provision of new accumulated data destined for the digital still camera 4(2). Then, the transmission/reception control section 27 transmits the request for provision of new accumulated data through the external interface 26a and the input/output terminal 26b (step S9210). This request for provision of new accumulated data is transmitted to the digital still camera 4(2) through the cradle 1 as described hereinabove.

In response to the request for provision of new accumulated data, new accumulated data, that is, still image data obtained by image pickup, is transmitted from the digital still camera 4(2) through the cradle 1. Consequently, the transmission/reception control section 27 controls the external interface 26a to receive the new accumulated data from the digital still camera 4(2) and store the new accumulated data into a predetermined region of the HDD 30 (step S9211).

Then, the control section 21 of the server apparatus 2 controls the address data production section 32 to refer to the detailed map information stored and retained in the HDD 30 based on the image pickup position data added to the still image data obtained by image pickup and stored in the HDD 30 to specify the name and the address of the image pickup position and add the name and the address to the still image data to form still image data for transmission (step S9212). Thereafter, the transmission/reception control section 27 controls the external interface 26a to transmit the still image data to be transmitted to the portable telephone terminal 4(1), that is, the still image data to which the name and the address of the image pickup position are added, to the portable telephone terminal 4(1) (step S9213). The text data destined for the portable telephone terminal 4(1) is transmitted to the portable telephone terminal 4(1) through the cradle 1 as described hereinabove.

Thereafter, the control section 21 of the server apparatus 2 enters and remains in a waiting state until it receives an end response from the portable telephone terminal 4(1) and the digital still camera 4(2) which are linkage apparatus (step S9214). Then, when an end response is received from both of the portable telephone terminal 4(1) and the digital still camera 4(2), the control section 21 erases the linkage apparatus registration carried out for the nonvolatile memory 214 at step S205 (step S9215), thereby ending the process of FIG. 60.

[Processing of the Digital Still Camera 4(2)]

Processes which are executed by the digital still camera 4(2) when the portable telephone terminal 4(1) and the digital still camera 4(2) described hereinabove with reference to FIGS. 58 and 59 link to each other such that the name and the address of an image pickup position are specified from image pickup position data retained in the digital still camera 4(2) and added to still image data and the still image data to which the specified name and address are added can be utilized also on the portable telephone terminal 4(1) are same as the processes carried out by the digital still camera 4(2) in the first example described hereinabove with reference to FIG. 31. Therefore, the processes of the digital still camera 4(2) in the present fourth example are described here with reference to FIG. 31.

In particular, also in the digital still camera 4(2) in the present fourth example, when it is placed into a predetermined mode such as, for example, the charging mode wherein it is placed on the cradle 1 and carries out a data communication process and a charging process, the process illustrated in FIG. 31 is executed principally by the control section 41 and the transmission/reception control section 47 of the digital still camera 4(2).

First, if the mode of the digital still camera 4(2) is changed over to the predetermined mode, then the transmission/reception control section 47 places itself into a waiting state wherein it waits for an inquiry about an apparatus ID from the cradle 1 through the transmission/reception antenna 45b and the radio communication section 45a (step S5301).

If it is determined by the decision process at step S5301 that the digital still camera 4(2) receives an inquiry about an apparatus ID from the cradle 1, then the control section 41 acquires necessary information such as an apparatus ID and an apparatus attribute stored and retained, for example, in the ROM 412 of the digital still camera 4(2). Then, the control section 41 forms such an apparatus ID response as illustrated in FIG. 7C based on the necessary information and transmits the apparatus ID response through the radio communication section 45a and the transmission/reception antenna 45b (step S5302). This apparatus ID response is transmitted to the server apparatus 2 through the cradle 1.

Then, the transmission/reception control section 47 receives a request for an accumulated data list of still image data obtained by image pickup from the server apparatus 2 transmitted through the cradle 1 through the transmission/reception antenna 45b and the radio communication section 45a (step S5303). Then, when a request for an accumulated data list is received, the control section 41 forms an accumulated data list of still image data destined for the server apparatus 2. Then, the transmission/reception control section 47 controls the radio communication section 45a to transmit the accumulated data list (step S5304). Also this accumulated data list is transmitted to the server apparatus 2 through the cradle 1.

Then, the transmission/reception control section 47 receives the request for an accumulated data list from the server apparatus 2 transmitted through the cradle 1 through the transmission/reception antenna 45b and the radio communication section 45a (step S5305). Then, when the request for an accumulated data list is received, the control section 41 reads out the requested new accumulated data, that is, those of the still image data obtained by image pickup which have not been transmitted to the server apparatus 2 as yet, from the image storage section 44. Then, the transmission/reception control section 47 controls the radio communication section 45a to transmit the still image data (step S5306). Also this new accumulated data is transmitted to the server apparatus 2 through the cradle 1.

Thereafter, the transmission/reception control section 47 receives an end confirmation transmitted from the cradle 1 through the transmission/reception antenna 45b and the radio communication section 45a (step S5307). Then, if an end confirmation is received, then the transmission/reception control section 47 places itself into and remains in a waiting state until the linkage process ends (step S5308). Then, if the series of linkage processes ends, then the control section 41 forms an end response, and the transmission/reception control section 47 controls the radio communication section 45a to transmit the end response (step S5309), thereby ending the process of FIG. 31.

In this manner, in the present fourth example, the digital still camera 4(2) carries out a process of providing still image data obtained by image pickup to the server apparatus 2 in accordance with a request from the server apparatus 2.

[Processing of the Portable Telephone Terminal 4(1)]

FIG. 61 illustrates processes executed by the portable telephone terminal 4(1) when the portable telephone terminal 4(1) and the digital still camera 4(2) described hereinabove with reference to FIGS. 58 and 59 link to each other such that, from still image data obtained by image pickup and retained in the digital still camera 4(2) and image pickup position data added to the still image data, still image data to which the name and the address of a shop, a company or the like existing at the image pickup position is produced and processed so that it can be utilized also on the portable telephone terminal 4(1) in the data communication system of the fourth example.

The process illustrated in FIG. 61 is executed principally by the control section 61 of the portable telephone terminal 4(1) as a mobile apparatus when it is placed into a predetermined mode such as, for example, the charging mode in which it is placed on the cradle 1 and carries out a data communication process and a charging process.

First, if the mode of the portable telephone terminal 4(1) is changed over to the predetermined mode, then the control section 61 determines whether or not an inquiry about an apparatus ID from the cradle 1 is received through the transmission/reception antenna 66b and the radio communication section 66a (step S9301). If it is determined by the decision process at step S9301 that an inquiry about an apparatus ID is not received, then the process at step S9301 is repeated to wait for reception of an inquiry about an apparatus ID.

On the other hand, if it is determined by the decision process at step S9301 that an inquiry about an apparatus ID from the cradle 1 is received, then the control section 41 acquires necessary information such as an apparatus ID and an apparatus attribute stored and retained, for example, in the ROM 612 of the portable telephone terminal 4(1). Then, the control section 41 forms such an apparatus ID response as illustrated in FIG. 7C based on the necessary information, and the control section 61 transmits the apparatus ID response through the radio communication section 66a and the transmission/reception antenna 66b (step S9302). This apparatus ID response is transmitted to the server apparatus 2 through the cradle 1.

Then, the control section 61 receives still image data having the name and the address added thereto from the server apparatus 2 transmitted through the cradle 1 through the transmission/reception antenna 66b and the radio communication section 66a and stores the still image data into the content storage section 62 (step S9303). Then, the control section 61 reads out the image pickup data stored in the content storage section 62 and carries out preparations such as to change the format of the data such that the data can be utilized (step S9304).

Thereafter, the control section 61 receives an end confirmation transmitted from the cradle 1 through the transmission/reception antenna 66b and the radio communication section 66a (step S9305). Then, when the end confirmation is received, the control section 61 places itself into and remains in a waiting state until the linkage process ends (step S9306). If the series of linkage processes ends, then the control section 61 forms an end response and controls the radio communication section 45a to transmit the end response (step S9307), thereby ending the process of FIG. 61.

In this manner, in the case of the present fourth example, the portable telephone terminal 4(1) and the digital still camera 4(2) with a GPS function link to each other, and still image data with image pickup position data obtained by image pickup by the digital still camera 4(2) is provided to the server apparatus 2. Then, the server apparatus 2 specifies the name and the address of the image pickup place from the image pickup position data and automatically provides the still image data with the specified name and address added thereto to the portable telephone terminal 4(1). Consequently, a still image to which the name and the address of the image pickup place are added can be utilized on the portable telephone terminal 4(1).

In particular, only if the user places the portable telephone terminal 4(1) and the digital still camera 4(2) with a GPS function on the cradle 1, then an address book including names, addresses and still images can be produced automatically in the content storage section 62 of and utilized on the portable telephone terminal 4(1).

In this manner, in the data communication system of the second embodiment, different mobile apparatus placed on the cradle 1 can link to each other such that the user can utilize a new function on the mobile apparatus without any participation of the user as described above particularly in connection with the first to fourth examples.

It is to be noted that the first to fourth examples of the second embodiment described above are mere examples and linkage can be carried out also between various other mobile apparatus.

Further, while the first to fourth examples of the second embodiment described above carry out linkage between two mobile apparatus, the linkage is not limited to this. Also it is possible to receive supply of information from predetermined two different mobile apparatus, merge the information into one data and provide the data to a predetermined different mobile apparatus or to provide information received from one mobile apparatus to a plurality of different mobile apparatus. In particular, the apparatus linkage tables described hereinabove with reference to FIGS. 26, 37 and 48 may be modified such that they handle three or more linkage apparatus or the substances of linkage processes are defined more particularly. By this, more complicated linkage processes between more than two mobile apparatus can be implemented.

Further, in the second embodiment described above, communication capabilities of portable electronic apparatus as mobile apparatus such as a portable telephone terminal, a digital still camera and a digital video camera is implemented, in the digital still cameras shown in FIGS. 4, 34 and 54, by the radio communication section 45a and the transmission/reception antenna 45b, and in the portable telephone terminal shown in FIG. 25, by the radio communication section 66a and the transmission/reception antenna 66b.

Meanwhile, transmission control and reception control in the portable electronic apparatus are implemented, in the digital still cameras shown in FIGS. 4, 34 and 54, by the control section 41 and the transmission/reception control section 47, and in the portable telephone terminal shown in FIG. 25, by the control section 61. Further, preparation and utilization control in the portable electronic apparatus are implemented, in the digital still cameras shown in FIGS. 4, 34 and 54, by the control section 41, and in the portable telephone terminal shown in FIG. 25, by the control section 61. Further, storage in the portable electronic apparatus is implemented, in the digital still cameras shown in FIGS. 4, 34 and 54, by the image storage section 44 or the data storage section 54, and in the portable telephone terminal shown in FIG. 25, by the content storage section 62.

Further, first communication in the cradle apparatus is implemented by the radio communication section 15a and the transmission/reception antenna 15b, and second communication is implemented by the external interface (I/F) 14a and the input/output terminal 14b. Further, the connection detection section is implemented by the placement detection section 16, the notification control section is implemented by the control section 11, and the relay control section is implemented by the transmission/reception control section.

Further, the program for executing the process of the flow chart shown in FIG. 29 corresponds to a transfer control program. This program is formed and recorded in the ROM 112 of the cradle 1 having the configuration described hereinabove with reference to FIG. 2 such that it can be executed by the CPU 111 of the control section 11.

Further, the programs for executing the processes of the flow charts of FIGS. 30, 41, 51 and 60 correspond to a communication control program. This program is formed and recorded in the ROM 212 of the server apparatus 2 having the configuration described hereinabove with reference to FIG. 3 such that it can be executed by the CPU 211 of the control section 21.

Also in the second embodiment, it is possible to connect a plurality of server apparatus to the cradle 1 such that the server apparatus are selectively used similarly as in the first embodiment.

Further, in the second embodiment described above, a linkage process between different mobile apparatus is carried out in accordance with registration information of an apparatus linkage table formed in the nonvolatile memory 214 of the server apparatus 2. The apparatus linkage table can be modified suitably by the user.

It is to be noted that, where mobile apparatus to be linked to each other are somewhat restricted, it is possible for a manufacturing company of the cradle 1 or the like to produce a basic linkage table and record the basic linkage table on and provide a recording medium such as a CD-ROM such that the basic linkage table may be recorded into a predetermined memory of the server apparatus 2 and used. In other words, the combination of mobile apparatus to be linked to each other or the substance of a linkage process may be determined in advance or may be set by the user.

Further, not only in the first embodiment but also in the second embodiment, it is naturally possible to form the cradle 1 and the server apparatus 2 as a unitary member.

Further, while, in the first and second embodiments described hereinabove, charging and data communication can be carried out without any contact of contacts of various mobile apparatus 4 and the cradle 1, such a non-contacting configuration is not essentially required. For example, it is possible to provide contacts for charging and/or contacts for data communication on both of the mobile apparatus 4 and the cradle 1 such that, when any of the mobile apparatus 4 and the cradle 1 are connected to each other through the contacts, charging and/or data communication are carried out. Also it is possible to use a cable to connect the cradle 1 and the mobile apparatus 4.

Also it is naturally possible to use optical communication for the data communication while such a non-contacting configuration as described above is used for charging.

While preferred embodiments of the present invention have been described using specific terms, such description is for illustrative purpose only, and it is to be understood that changes and variations may be made without departing from the spirit or scope of the following claims.

What is claimed is:

1. A data communication system, comprising:
a server apparatus; and
a cradle apparatus configured to mediate transmission and reception of data between the server apparatus and a portable electronic apparatus connected to the cradle apparatus;
the cradle apparatus including
a first interface configured to communicate with the portable electronic apparatus,
a second interface configured to communicate with the server apparatus,
a detector configured to detect that the portable electronic apparatus is connected to the cradle apparatus,
a notification unit configured to notify the server apparatus, via the second interface, that the portable electronic apparatus is connected to the cradle apparatus, and
an interface controller configured to control reception of first data for the portable electronic apparatus from the server apparatus via the second interface and control transmission of the first data to the portable electronic apparatus via the first interface,
the server apparatus including
a memory configured to store a transmission history corresponding to a plurality of pieces of data transmitted from the server, the transmission history identifying a date and time that each piece of data was transmitted and identifying a portable electronic device to which each piece of data was transmitted,
an interface configured to communicate with the cradle apparatus,
a controller configured to prepare the first data for the portable electronic apparatus based on a comparison between attribute data indicative of a type of the portable electronic apparatus and attribute data indicative of a type of data stored at the server apparatus that has not yet been transmitted to the portable electronic apparatus as indicated by the stored transmission history, and
an interface controller configured to control transmission of the first data to the portable electronic apparatus via the interface of the server apparatus.

2. A server apparatus, comprising:
a memory configured to store a transmission history corresponding to a plurality of pieces of data transmitted from the server, the transmission history identifying a date and time that each piece of data was transmitted and identifying a portable electronic device to which each piece of data was transmitted,
an interface configured to communicate with a cradle apparatus;
a controller configured to prepare data for a portable electronic apparatus to be provided to the portable electronic apparatus based on a comparison between attribute data indicative of a type of the portable electronic apparatus and attribute data indicative of a type of data stored at the server apparatus that has not yet been transmitted to the portable electronic apparatus as indicated by the stored transmission history; and
an interface controller configured to control transmitting the prepared data for the portable electronic apparatus to the portable electronic apparatus via the interface.

3. The server apparatus of claim 2, further comprising:
a memory configured to store data transmitted from the portable electronic apparatus through the cradle apparatus and received through the interface;
an erasure instruction unit configured to form an erasure instruction of data to be transmitted to the portable electronic apparatus;
the controller configured to prepare the data for the portable electronic apparatus based on the stored data from the portable electronic apparatus; and
the interface controller configured to control reception of the data transmitted from the portable electronic apparatus and provided through the cradle apparatus through the interface and transmission of the erasure instruction to the portable electronic apparatus through the cradle apparatus via the interface.

4. A data communication system, comprising:
first and second portable electronic apparatus;
a server apparatus; and
a cradle apparatus configured to mediate transmission and reception of data between the first and second portable electronic apparatus and the server apparatus,
the first portable electronic apparatus including
an interface configured to communicate with the cradle apparatus,
a controller configured to prepare transmission information to be transmitted to a requesting source of the request in response to the request, and
an interface controller configured to control transmitting the transmission information to the requesting source through the interface,
the second portable electronic apparatus including
an interface configured to communicate with the cradle apparatus,
an interface controller configured to control the interface to receive provision information from the server apparatus transmitted to the second portable electronic apparatus,
a memory configured to store the provision information destined for the second portable electronic apparatus received through the interface, and
a controller configured to control utilization of the provision information stored in the memory,
the cradle apparatus including
a first interface configured to communicate with the first and second portable electronic apparatus connected to the cradle apparatus,
a second interface configured to communicate with the server apparatus,
a detector configured to detect that any of the first and second portable electronic apparatus is connected to the cradle apparatus,
a controller configured to notify the server apparatus through the second interface that the portable electronic apparatus is connected to the cradle apparatus, and
the controller configured to control the first and second interfaces to repeat the communication between the first and second portable electronic apparatus and the server apparatus,
the server apparatus including
an interface configured to communicate with the cradle apparatus,
a controller configured to determine when a notification that any of the first and second portable electronic apparatus is connected to the cradle apparatus is accepted through the interface, whether or not the first and/or second portable electronic apparatus are connected to the cradle apparatus,
the controller configured to form a request for provision of object information for the first portable electronic apparatus and control the interface to transmit the request for provision to the first portable electronic apparatus,
an interface controller configured to control the interface to receive transmission information transmitted from the first portable electronic apparatus in response to the request for provision,
the controller configured to form provision information to be provided to the second portable electronic apparatus based on the transmission information accepted through the interface, and
the interface controller configured to control the interface to transmit the provision information to the second portable electronic apparatus.

5. The data communication system of claim 4, wherein the first portable electronic apparatus is an image pickup apparatus and the second portable electronic apparatus is a portable electronic apparatus with a display function, and
in the server apparatus:
the controller is configured to form a request for provision for requesting provision of image data obtained by image pickup to the first portable electronic apparatus and controls the interface to transmit the request for provision to the first portable electronic apparatus;
the interface controller is configured to control the interface to receive image data from the first portable electronic apparatus;
the controller is configured to form image data for the second portable electronic apparatus from the image data from the first portable electronic apparatus; and
the interface controller is configured to control the interface to transmit the image data for the second portable electronic apparatus formed by the controller to the second portable electronic apparatus.

6. The data communication system of claim 4, wherein the first and second portable electronic apparatus have a music reproduction function, and
in the server apparatus:
the controller is configured to form a request for provision for requesting provision of music data retained in the first portable electronic apparatus and control the interface to transmit the request for provision to the first portable electronic apparatus;

the interface controller is configured to control the interface to receive music data from the first portable electronic apparatus;

the controller is configured to form music data for the second portable electronic apparatus from the music data from the first portable electronic apparatus; and the interface controller is configured to control the interface to transmit the music data for the second portable electronic apparatus to the second portable electronic apparatus.

7. The data communication system of claim 4, wherein the first portable electronic apparatus is an image pickup apparatus and the second portable electronic apparatus is a portable electronic apparatus with a display function, and in the server apparatus:

the controller is configured to form a request for provision for requesting provision of image data obtained by image pickup to the first portable electronic apparatus and control the interface to transmit the request for provision to the first portable electronic apparatus;

the interface controller is configured to control the interface to receive image data from the first portable electronic apparatus;

the controller is configured to form text data from character information included in the image data from the first portable electronic apparatus; and the interface controller is configured to control the interface to transmit the text data to the second portable electronic apparatus.

8. The data communication system according to claim 4, wherein the first portable electronic apparatus is an image pickup apparatus having a measuring function of an image pickup position and capable of adding image pickup position data to image data obtained by image pickup and the second portable electronic apparatus is a portable electronic apparatus with a display function, and in the server apparatus:

the controller is configured to form a request for provision for requesting provision of image data obtained by image pickup to the first portable electronic apparatus and control the interface to transmit the request for provision to the first portable electronic apparatus;

the interface controller is configured to control the interface to receive image data from the first portable electronic apparatus;

the controller is configured to refer to map information retained in the server apparatus based on the image pickup position data added to the image data from the first portable electronic apparatus to form image data to which map relating information including a name and an address of the image pickup position is added; and the interface controller is configured to control the interface to transmit the map data having the map relating information added thereto to the second portable electronic apparatus.

9. A server apparatus, comprising:

means for storing a transmission history corresponding to a plurality of pieces of data transmitted from the server, the transmission history identifying a date and time that each piece of data was transmitted and identifying a portable electronic apparatus to which each piece of data was transmitted;

means for communicating with a cradle apparatus;

means for preparing data for a portable electronic apparatus to be provided to the portable electronic apparatus based on a comparison between attribute data indicative of a type of the portable electronic apparatus and attribute data indicative of a type of data stored at the server apparatus that has not yet been transmitted to the portable electronic apparatus as indicated by the stored transmission history; and means for controlling the means for communicating with a cradle apparatus to transmit the data prepared for the portable electronic apparatus to the portable electronic apparatus.

10. A method implemented at a server apparatus for communicating with a portable electronic apparatus via a cradle apparatus, comprising:

storing a transmission history corresponding to a plurality of pieces of data transmitted from the server, the transmission history identifying a date and time that each piece of data was transmitted and identifying a portable electronic apparatus to which each piece of data was transmitted;

communicating with the cradle apparatus;

receiving a notification from the cradle apparatus that a portable electronic apparatus is connected to the cradle apparatus;

preparing data for the portable electronic apparatus to be provided to the portable electronic apparatus based on a comparison between attribute data indicative of a type of the portable electronic apparatus and attribute data indicative of a type of data stored at the server apparatus that has not yet been transmitted to the portable electronic apparatus as indicated by the stored transmission history; and transmitting the data prepared for the portable electronic apparatus to the portable electronic apparatus via the cradle apparatus.

* * * * *